US012479521B2

(12) United States Patent
Schmidt et al.

(10) Patent No.: US 12,479,521 B2
(45) Date of Patent: Nov. 25, 2025

(54) WIRELESS NETWORK, SYSTEMS AND METHODS FOR CONFIGURATION, OPERATION AND USE OF MOTORIZED, WHEELED AND STEERABLE PASSENGER-CARRYING CARTS FOR ENTERTAINMENT PURPOSES

(71) Applicant: ScooterBug, Inc., Orlando, FL (US)

(72) Inventors: Mark Christopher Schmidt, Windermere, FL (US); Edward Joel Rodriguez, Kissimmee, FL (US); Marc Maxwell Barber, Deltona, FL (US)

(73) Assignee: ScooterBug, Inc., Orlando, FL (US)

( * ) Notice: Subject to any disclaimer, the term of this patent is extended or adjusted under 35 U.S.C. 154(b) by 366 days.

(21) Appl. No.: 17/828,739

(22) Filed: May 31, 2022

(65) Prior Publication Data

US 2023/0036188 A1 Feb. 2, 2023

Related U.S. Application Data

(63) Continuation-in-part of application No. 17/399,080, filed on Aug. 11, 2021, now Pat. No. 11,995,943,
(Continued)

(51) Int. Cl.
B62D 39/00 (2006.01)
B60L 50/60 (2019.01)
(Continued)

(52) U.S. Cl.
CPC .............. B62D 39/00 (2013.01); B60L 50/60 (2019.02); B60Q 5/00 (2013.01); B60W 30/09 (2013.01);
(Continued)

(58) Field of Classification Search
CPC .. G06Q 20/3224; G06Q 20/308; G06Q 30/04; G06Q 20/4012; G06Q 20/40155;
(Continued)

(56) References Cited

U.S. PATENT DOCUMENTS 689,243 A 12/1901 Sutton
1,409,312 A 3/1922 Pippin
(Continued)

FOREIGN PATENT DOCUMENTS

BE 1024241 B1 1/2018
CN 2558420 Y 7/2003
(Continued)

OTHER PUBLICATIONS

CN201120161545 (Year: 2011).*
(Continued)

Primary Examiner — Yong Hang Jiang
(74) Attorney, Agent, or Firm — DLA Piper LLP US

(57) ABSTRACT

A wireless network, systems and methods, wherein each passenger-carrying rideable vehicle deployed in the system includes: a modular construction consisting of a lightweight body driven by an electric-battery driven motor, and specially adapted for receiving a customizable ornamental body having the appearance and personality of a particular or an inanimate object; motorized and/or animated elements disposed beneath the animal character skin covering for enabling animal behaviors and/or expressions that promote a fun and entertaining ride experience; an audio-transducers mounted within the animal character body for playing music from smartphone applications and animated animal character body portions to provide a sense of realism and excitement as the electric entertainment vehicle is ridden through an amusement facility.

14 Claims, 140 Drawing Sheets

Related U.S. Application Data which is a continuation-in-part of application No. 16/990,381, filed on Aug. 11, 2020, now Pat. No. 11,631,295.

(51) Int. Cl.

| | | |
|---|---|---|
| *B60Q 5/00* | (2006.01) | |
| *B60W 30/09* | (2012.01) | |
| *B62D 1/14* | (2006.01) | |
| *B62D 1/16* | (2006.01) | |
| *G06Q 30/02* | (2023.01) | |
| *G01S 15/931* | (2020.01) | |
| *G01S 19/51* | (2010.01) | |

(52) U.S. Cl.
CPC ................ *B62D 1/14* (2013.01); *B62D 1/16* (2013.01); *G06Q 30/02* (2013.01); *B60W 2420/408* (2024.01); *G01S 15/931* (2013.01); *G01S 19/51* (2013.01)

(58) Field of Classification Search
CPC .... G06Q 20/389; G06Q 10/063; G06Q 30/02; G06Q 20/325; G06Q 30/0241; G06Q 10/02; G06Q 20/202; G06Q 20/3276; G06Q 30/0645; G06Q 20/3278; G06Q 20/127; B62D 1/14; B62D 1/16; B62D 39/00; B60W 30/09; B60Q 5/00; G07F 17/0057; G07F 17/12; G06F 16/9537; G06F 16/9554; G07C 9/00896; B60L 50/60

See application file for complete search history.

(56) References Cited

U.S. PATENT DOCUMENTS

| | | |
|---|---|---|
| 1,411,496 A | 4/1922 | Herrmann |
| 1,681,093 A | 8/1928 | Capek |
| 1,732,030 A | 10/1929 | Runyan |
| 3,447,735 A | 6/1969 | Whitney |
| 3,978,959 A | 9/1976 | Muellner |
| 4,177,589 A | 12/1979 | Villa |
| 4,494,805 A | 1/1985 | Washburn |
| 4,496,896 A | 1/1985 | Melocik |
| 4,654,482 A | 3/1987 | Deangelis |
| 4,698,630 A | 10/1987 | Ellsberg |
| 4,841,132 A | 6/1989 | Kajitani |
| D304,110 S | 10/1989 | Yang |
| 5,157,687 A | 10/1992 | Tymes |
| 5,169,222 A | 12/1992 | Bollore |
| 5,202,817 A | 4/1993 | Koenck |
| 5,231,272 A | 7/1993 | Mardon |
| 5,280,498 A | 1/1994 | Tymes |
| 5,288,976 A | 2/1994 | Citron |
| D349,796 S | 8/1994 | Wimberley |
| 5,345,379 A | 9/1994 | Brous |
| 5,370,408 A | 12/1994 | Eagan |
| 5,429,290 A | 7/1995 | Greene, Jr. |
| 5,448,046 A | 9/1995 | Swartz |
| 5,483,052 A | 1/1996 | Smith, III |
| 5,490,217 A | 2/1996 | Wang |
| 5,506,697 A | 4/1996 | Li |
| 5,523,666 A | 6/1996 | Hoelzl |
| 5,547,684 A | 8/1996 | Vainberg |
| 5,635,694 A | 6/1997 | Tuhro |
| 5,804,803 A | 9/1998 | Cragun |
| 5,815,657 A | 9/1998 | Williams |
| 5,825,002 A | 10/1998 | Roslak |
| 5,842,713 A | 12/1998 | Barnes |
| 5,869,819 A | 2/1999 | Knowles |
| 5,894,277 A | 4/1999 | Keskin |
| 5,902,353 A | 5/1999 | Reber |
| 5,903,729 A | 5/1999 | Reber |
| 5,905,251 A | 5/1999 | Knowles |
| 5,918,213 A | 6/1999 | Bernard |
| 5,923,884 A | 7/1999 | Peyret |
| 5,929,276 A | 7/1999 | Kirkovits |
| 5,930,767 A | 7/1999 | Reber |
| 5,933,829 A | 8/1999 | Durst |
| 5,938,726 A | 8/1999 | Reber |
| 5,940,000 A | 8/1999 | Dykema |
| 5,940,595 A | 8/1999 | Reber |
| 5,946,660 A | 8/1999 | McCarty |
| D415,073 S | 10/1999 | Meehan |
| 5,971,277 A | 10/1999 | Cragun |
| 5,978,773 A | 11/1999 | Hudetz |
| 5,979,757 A | 11/1999 | Tracy |
| 5,992,752 A | 11/1999 | Wilz, Sr. |
| 6,012,102 A | 1/2000 | Shachar |
| 6,027,024 A | 2/2000 | Knowles |
| 6,064,979 A | 5/2000 | Perkowski |
| 6,070,793 A | 6/2000 | Reichl |
| 6,073,958 A | 6/2000 | Gagnon |
| 6,108,656 A | 8/2000 | Durst |
| 6,139,061 A | 10/2000 | Lewis |
| 6,165,773 A | 12/2000 | New |
| 6,185,773 B1 | 2/2001 | Goedde |
| 6,199,048 B1 | 3/2001 | Hudetz |
| D446,478 S | 8/2001 | Wu |
| 6,311,214 B1 | 10/2001 | Rhoads |
| 6,321,991 B1 | 11/2001 | Knowles |
| 6,321,992 B1 | 11/2001 | Knowles |
| 6,345,764 B1 | 2/2002 | Knowles |
| 6,375,078 B1 | 4/2002 | Russell |
| 6,384,717 B1 | 5/2002 | Devolpi |
| 6,386,453 B1 | 5/2002 | Russell |
| 6,400,272 B1 | 6/2002 | Holtzman |
| 6,412,699 B1 | 7/2002 | Russell |
| 6,464,139 B1 | 10/2002 | Wilz, Sr. |
| 6,491,122 B2 | 12/2002 | Leitner |
| 6,505,776 B1 | 1/2003 | Wilz, Sr. |
| 6,510,997 B1 | 1/2003 | Wilz, Sr. |
| 6,525,510 B1 | 2/2003 | Ayano |
| 6,542,927 B2 | 4/2003 | Rhoads |
| 6,568,595 B1 | 5/2003 | Garrett |
| 6,622,917 B1 | 9/2003 | Knowles |
| 6,622,919 B1 | 9/2003 | Wilz |
| 6,625,581 B1 | 9/2003 | Perkowski |
| 6,655,180 B2 | 12/2003 | Gokcebay |
| 6,694,043 B2 | 2/2004 | Seder |
| 6,694,217 B2 | 2/2004 | Bloom |
| 6,791,450 B2 | 9/2004 | Gokcebay |
| 6,802,000 B1 | 10/2004 | Greene |
| 6,806,807 B2 | 10/2004 | Cayne |
| 6,827,273 B2 | 12/2004 | Wilz, Sr. |
| 6,850,153 B1 | 2/2005 | Murakami |
| 6,868,433 B1 | 3/2005 | Philyaw |
| 6,879,243 B1 | 4/2005 | Booth |
| 6,882,269 B2 | 4/2005 | Moreno |
| 6,942,150 B2 | 9/2005 | Knowles |
| 6,961,712 B1 | 11/2005 | Perkowski |
| 6,961,713 B2 | 11/2005 | Perkowski |
| 6,980,797 B1 | 12/2005 | Tuulos |
| 6,988,662 B2 | 1/2006 | Russell |
| 6,999,825 B2 | 2/2006 | Inomata |
| 7,012,053 B1 | 3/2006 | Barnabas |
| 7,012,503 B2 | 3/2006 | Nielsen |
| 7,023,177 B1 | 4/2006 | Bussinger |
| 7,055,642 B1 | 6/2006 | Chambers |
| 7,068,149 B2 | 6/2006 | Lee |
| 7,089,199 B2 | 8/2006 | Perkowski |
| 7,108,171 B1 | 9/2006 | Ergo |
| 7,143,055 B1 | 11/2006 | Perkowski |
| 7,176,782 B2 | 2/2007 | Shitan |
| 7,183,925 B2 | 2/2007 | Marshall |
| 7,221,273 B1 | 5/2007 | Seyfarth |
| 7,323,967 B2 | 1/2008 | Booth |
| 7,337,968 B2 | 3/2008 | Wilz, Sr. |
| 7,341,191 B2 | 3/2008 | Russell |
| 7,430,528 B2 | 9/2008 | Perkowski |
| 7,434,674 B1 | 10/2008 | Bain |
| 7,438,148 B1 | 10/2008 | Crea |
| 7,441,710 B2 | 10/2008 | Perkowski |

(56) References Cited

U.S. PATENT DOCUMENTS

| | | |
|---|---|---|
| 7,445,300 B2 | 11/2008 | Collins |
| 7,458,514 B1 | 12/2008 | Kitada |
| 7,477,132 B2 | 1/2009 | Mayer |
| 7,493,908 B2 | 2/2009 | Carter |
| 7,516,094 B2 | 4/2009 | Perkowski |
| 7,526,122 B2 | 4/2009 | Usuda |
| 7,533,040 B2 | 5/2009 | Perkowski |
| 7,548,988 B2 | 6/2009 | Philyaw |
| 7,591,335 B2 | 9/2009 | Howell |
| 7,659,891 B2 | 2/2010 | Mackenzie |
| 7,705,731 B2 | 4/2010 | Trammell, III |
| 7,711,598 B2 | 5/2010 | Perkowski |
| 7,739,353 B2 | 6/2010 | Philyaw |
| 7,748,511 B1 | 7/2010 | Maher |
| 7,764,176 B2 | 7/2010 | Zhang |
| 7,785,167 B2 | 8/2010 | Friend-Douglass |
| 7,819,316 B2 | 10/2010 | Philyaw |
| 7,819,719 B2 | 10/2010 | Tye |
| 7,822,829 B2 | 10/2010 | Philyaw |
| 7,828,399 B1 | 11/2010 | Bass |
| 7,844,492 B2 | 11/2010 | Perkowski |
| 7,848,948 B2 | 12/2010 | Perkowski |
| 7,865,275 B2 | 1/2011 | Palmer |
| 7,866,422 B2 | 1/2011 | Peters |
| 7,880,585 B1 | 2/2011 | Aronson |
| 7,900,952 B2 | 3/2011 | Cone, II |
| 7,904,333 B1 | 3/2011 | Perkowski |
| 8,172,033 B2 | 5/2012 | Corbett |
| 8,239,251 B2 | 8/2012 | Wellman |
| 8,253,533 B2 | 8/2012 | Jones |
| RE43,680 E | 9/2012 | Kitada |
| 8,366,135 B2 | 2/2013 | Asbach |
| 8,368,700 B1 | 2/2013 | Difrancesco |
| 8,390,629 B2 | 3/2013 | Anderson |
| 8,410,901 B2 | 4/2013 | Mullin |
| 8,463,765 B2 | 6/2013 | Lesavich |
| 8,500,012 B2 | 8/2013 | Amdahl |
| 8,639,578 B2 | 1/2014 | Barber |
| 8,714,452 B2 | 5/2014 | Amdahl |
| 8,854,184 B2 | 10/2014 | Mullin |
| 8,854,185 B2 | 10/2014 | Mullin |
| 8,892,463 B2 | 11/2014 | Mullin |
| 8,990,110 B2 | 3/2015 | Mullin |
| 9,010,769 B1 | 4/2015 | Munive |
| 9,050,879 B2 | 6/2015 | Guzzetta |
| 9,138,638 B2 | 9/2015 | Bastawros |
| 9,145,067 B1 | 9/2015 | Dahlen |
| 9,158,946 B2 | 10/2015 | Amdahl |
| 9,284,054 B2 | 3/2016 | Saint-Jalmes |
| 9,339,671 B1 | 5/2016 | Raj |
| 9,418,345 B1 | 8/2016 | Meehan |
| 9,430,892 B2 | 8/2016 | Amdahl |
| 9,558,608 B2 | 1/2017 | Amdahl |
| 9,610,510 B2 | 4/2017 | Comploi |
| 9,656,682 B2 | 5/2017 | Ahlemeier |
| 9,659,424 B2 | 5/2017 | Huber |
| 9,706,835 B2 | 7/2017 | Zaniker |
| 9,795,214 B2 | 10/2017 | Zaniker |
| 9,818,217 B2 | 11/2017 | Tena |
| 9,826,049 B2 | 11/2017 | Lim |
| 9,889,979 B2 | 2/2018 | Nelson |
| 9,936,804 B2 | 4/2018 | Zaniker |
| 9,937,932 B2 | 4/2018 | Nemeth |
| 9,943,769 B2 | 4/2018 | Comploi |
| 9,948,603 B1 | 4/2018 | Lee |
| 9,975,031 B2 | 5/2018 | Bastawros |
| 9,984,356 B2 | 5/2018 | Janis |
| 10,040,611 B2 | 8/2018 | Nelson |
| 10,052,246 B2 | 8/2018 | Lozano |
| 10,064,123 B2 | 8/2018 | Bari |
| 10,068,403 B1 | 9/2018 | Mcgehee |
| 10,096,183 B2 | 10/2018 | Nitu |
| 10,127,795 B1 | 11/2018 | Hwang |
| 10,140,191 B2 | 11/2018 | Kaulgud |
| 10,182,952 B1 | 1/2019 | Nelson-Herron |
| 10,184,797 B2 | 1/2019 | Georgy |
| 10,210,474 B2 | 2/2019 | Robinson |
| 10,234,087 B2 | 3/2019 | Spriggins |
| 10,249,128 B1 | 4/2019 | Yang |
| 10,322,675 B2 | 6/2019 | Naboulsi |
| 10,346,614 B1 | 7/2019 | Ko |
| 10,435,093 B2 | 10/2019 | White |
| 10,460,539 B2 | 10/2019 | Zielkowski |
| 10,474,797 B2 | 11/2019 | Lowenthal |
| 10,504,313 B2 | 12/2019 | Dautz |
| 10,536,211 B2 | 1/2020 | Leroux |
| 10,594,929 B2 | 3/2020 | Tyson |
| 10,596,930 B2 | 3/2020 | Chiesa |
| 10,621,811 B2 | 4/2020 | Tovey |
| 10,660,806 B1 | 5/2020 | Nelson-Herron |
| 10,672,211 B2 | 6/2020 | Flynn |
| 10,679,239 B2 | 6/2020 | Khoyilar |
| 10,693,714 B2 | 6/2020 | Teo |
| 10,701,074 B2 | 6/2020 | Tsao |
| 10,755,508 B2 | 8/2020 | Ghorpade |
| 10,779,642 B2 | 9/2020 | Zaniker |
| 10,814,926 B2 | 10/2020 | White |
| 10,817,484 B2 | 10/2020 | Rana |
| 10,820,265 B2 | 10/2020 | Schneider |
| 10,827,358 B2 | 11/2020 | Cui |
| 10,839,629 B2 | 11/2020 | Jones |
| 10,846,970 B2 | 11/2020 | Ruggiero |
| 10,861,267 B2 | 12/2020 | Aman |
| 10,915,856 B2 | 2/2021 | Fee |
| 10,965,684 B2 | 3/2021 | Achtermann |
| 10,992,711 B2 | 4/2021 | Hu |
| 11,038,838 B2 | 6/2021 | Lau |
| 11,082,839 B2 | 8/2021 | Jacobson |
| 2002/0035515 A1 | 3/2002 | Moreno |
| 2002/0180582 A1 | 12/2002 | Nielsen |
| 2003/0022138 A1 | 1/2003 | Korala |
| 2003/0023453 A1 | 1/2003 | Hafen |
| 2003/0141840 A1 | 7/2003 | Sanders |
| 2003/0227550 A1 | 12/2003 | Manico |
| 2003/0236601 A1 | 12/2003 | McLeod |
| 2004/0046014 A1 | 3/2004 | Russell |
| 2004/0116782 A1* | 6/2004 | Weaver ............ G06N 5/00 600/300 |
| 2005/0040093 A1 | 2/2005 | Yanagisawa |
| 2005/0040931 A1 | 2/2005 | Shitan |
| 2005/0044906 A1 | 3/2005 | Spielman |
| 2005/0068178 A1 | 3/2005 | Lee |
| 2005/0086127 A1 | 4/2005 | Hastings et al. |
| 2005/0090981 A1 | 4/2005 | Gaegauf |
| 2005/0171663 A1 | 8/2005 | Mittelsteadt |
| 2005/0179349 A1 | 8/2005 | Booth |
| 2005/0190037 A1 | 9/2005 | Shitan |
| 2005/0254185 A1 | 11/2005 | Cunningham |
| 2005/0283043 A1 | 12/2005 | Sisk |
| 2006/0095286 A1 | 5/2006 | Kimura |
| 2007/0001804 A1 | 1/2007 | Lanier |
| 2007/0021032 A1 | 1/2007 | Tye |
| 2007/0208483 A1 | 9/2007 | Rabin |
| 2007/0213872 A1* | 9/2007 | Matsuzaki ............ A63H 11/00 700/245 |
| 2008/0010105 A1 | 1/2008 | Rose |
| 2008/0015745 A1 | 1/2008 | Gaegauf |
| 2008/0054704 A1 | 3/2008 | Friend-Douglass |
| 2008/0103696 A1 | 5/2008 | Cheok |
| 2008/0170355 A1 | 7/2008 | Kyriakides |
| 2008/0244699 A1* | 10/2008 | Parhofer ............ G07C 9/37 726/2 |
| 2009/0033445 A1 | 2/2009 | Menard |
| 2009/0033456 A1 | 2/2009 | Castillo |
| 2009/0079153 A1 | 3/2009 | Chaudeurge |
| 2009/0121832 A1 | 5/2009 | Mullin |
| 2009/0153566 A1 | 6/2009 | Anderson |
| 2009/0174363 A1 | 7/2009 | Maher |
| 2009/0200838 A1 | 8/2009 | Cone, II |
| 2009/0257564 A1 | 10/2009 | Kito |
| 2009/0267564 A1 | 10/2009 | Gerber |
| 2010/0030590 A1 | 2/2010 | Sodaro |
| 2010/0043682 A1* | 2/2010 | Talmage ............ E05G 1/00 109/50 |

(56) References Cited

U.S. PATENT DOCUMENTS

| | | |
|---|---|---|
| 2010/0089846 A1 | 4/2010 | Navarro Ruiz |
| 2010/0102780 A1 | 4/2010 | Koh |
| 2010/0155471 A1 | 6/2010 | Heinz et al. |
| 2010/0228405 A1 | 9/2010 | Morgal |
| 2010/0287057 A1 | 11/2010 | Aihara |
| 2011/0074350 A1 | 3/2011 | Kocher |
| 2011/0074541 A1 | 3/2011 | Jones |
| 2011/0140656 A1 | 6/2011 | Starr |
| 2011/0163520 A1 | 7/2011 | Fair |
| 2011/0208710 A1 | 8/2011 | Lesavich |
| 2011/0258895 A1* | 10/2011 | Rodgers, Jr. ............ G09F 21/04 40/447 |
| 2011/0301748 A1 | 12/2011 | Lecarpentier |
| 2011/0303371 A1 | 12/2011 | Harrison |
| 2012/0007848 A1 | 1/2012 | Han |
| 2012/0078413 A1 | 3/2012 | Baker, Jr. |
| 2012/0098493 A1 | 4/2012 | Budike |
| 2012/0138548 A1 | 6/2012 | Young |
| 2012/0203672 A1 | 8/2012 | Morgan |
| 2012/0203673 A1 | 8/2012 | Morgan |
| 2012/0203695 A1 | 8/2012 | Morgan |
| 2012/0312562 A1 | 12/2012 | Woehrle |
| 2012/0324966 A1 | 12/2012 | Dallaire |
| 2013/0036456 A1 | 2/2013 | Boysen |
| 2013/0073377 A1 | 3/2013 | Heath |
| 2013/0117078 A1 | 5/2013 | Weik, III |
| 2013/0173242 A1 | 7/2013 | Anderson |
| 2013/0197992 A1 | 8/2013 | Bao |
| 2013/0254122 A1 | 9/2013 | Mullin |
| 2013/0292468 A1 | 11/2013 | Amdahl |
| 2013/0317693 A1* | 11/2013 | Jefferies ............ G06Q 30/0645 701/31.5 |
| 2014/0035721 A1 | 2/2014 | Jon |
| 2014/0058870 A1 | 2/2014 | Zhao |
| 2014/0136414 A1* | 5/2014 | Abhyanker ........ G06Q 20/3224 701/25 |
| 2014/0203076 A1 | 7/2014 | Amdahl |
| 2014/0309842 A1 | 10/2014 | Jefferies |
| 2014/0316918 A1 | 10/2014 | Zaniker |
| 2014/0330407 A1 | 11/2014 | Corder |
| 2014/0346746 A1 | 11/2014 | Li |
| 2014/0354403 A1 | 12/2014 | Zaniker |
| 2015/0004873 A1 | 1/2015 | Schecter |
| 2015/0007619 A1 | 1/2015 | Finney |
| 2015/0102630 A1 | 4/2015 | Guzzetta |
| 2015/0102711 A1 | 4/2015 | Zaniker |
| 2015/0112887 A1 | 4/2015 | Camp |
| 2015/0120602 A1 | 4/2015 | Huffman |
| 2015/0170164 A1 | 6/2015 | Marsico |
| 2015/0179006 A1 | 6/2015 | Von Zurmuehlen |
| 2015/0199610 A1 | 7/2015 | Hershberg |
| 2015/0254760 A1 | 9/2015 | Pepper |
| 2015/0255226 A1 | 9/2015 | Rouvala |
| 2015/0356801 A1 | 12/2015 | Nitu |
| 2016/0035166 A1 | 2/2016 | Amdahl |
| 2016/0066733 A1 | 3/2016 | Gozar |
| 2016/0098678 A1 | 4/2016 | Levy |
| 2016/0133074 A1 | 5/2016 | Amdahl |
| 2016/0133075 A1 | 5/2016 | Amdahl |
| 2016/0180623 A1 | 6/2016 | Rashkovan |
| 2016/0189147 A1 | 6/2016 | Vanczak |
| 2016/0189439 A1* | 6/2016 | Vetterick ................ G07C 5/006 701/29.4 |
| 2016/0200261 A1 | 7/2016 | White |
| 2017/0016249 A1 | 1/2017 | Johnson |
| 2017/0032597 A1 | 2/2017 | Johnson |
| 2017/0059534 A1 | 3/2017 | Mcadams |
| 2017/0098210 A1 | 4/2017 | Laracey et al. |
| 2017/0098273 A1 | 4/2017 | Meehan |
| 2017/0104963 A1* | 4/2017 | Veneziano ............ H04N 23/56 |
| 2017/0116449 A1 | 4/2017 | Kotlarsky |
| 2017/0123422 A1* | 5/2017 | Kentley ................ B60L 15/20 |
| 2017/0157521 A1 | 6/2017 | Comploi |
| 2017/0244262 A1 | 8/2017 | Schadow |
| 2017/0250834 A1 | 8/2017 | Hsiao |
| 2017/0266069 A1 | 9/2017 | Lozano |
| 2017/0311715 A1 | 11/2017 | Zaniker |
| 2017/0341672 A1 | 11/2017 | Fleming |
| 2017/0347885 A1 | 12/2017 | Tan |
| 2017/0367909 A1 | 12/2017 | Barnes |
| 2018/0029522 A1* | 2/2018 | Gordon ................... B60Q 7/00 |
| 2018/0040181 A1 | 2/2018 | Groeger |
| 2018/0041493 A1 | 2/2018 | Wilkinson |
| 2018/0061157 A1 | 3/2018 | Zielkowski |
| 2018/0091503 A1 | 3/2018 | Tang |
| 2018/0101833 A1 | 4/2018 | Parekh |
| 2018/0109308 A1 | 4/2018 | Leroux |
| 2018/0135987 A1 | 5/2018 | Evans |
| 2018/0139290 A1 | 5/2018 | Lim |
| 2018/0162613 A1 | 6/2018 | Nelson |
| 2018/0165638 A1 | 6/2018 | Wilkinson |
| 2018/0165640 A1 | 6/2018 | Wilkinson |
| 2018/0182194 A1 | 6/2018 | Schmidt-Lackner |
| 2018/0191719 A1 | 7/2018 | Tsao |
| 2018/0225749 A1 | 8/2018 | Shoen |
| 2018/0315012 A1 | 11/2018 | Janis |
| 2018/0330614 A1* | 11/2018 | Lin ...................... G07F 17/246 |
| 2018/0331386 A1 | 11/2018 | Koh |
| 2018/0337820 A1 | 11/2018 | Chen |
| 2018/0350144 A1 | 12/2018 | Rathod |
| 2018/0350177 A1 | 12/2018 | Dautz |
| 2018/0365641 A1 | 12/2018 | Zhu |
| 2019/0021921 A1 | 1/2019 | Nelson-Herron |
| 2019/0035186 A1 | 1/2019 | Nitu |
| 2019/0042175 A1 | 2/2019 | Shah |
| 2019/0054972 A1 | 2/2019 | Meehan |
| 2019/0056745 A1 | 2/2019 | Meehan |
| 2019/0080574 A1 | 3/2019 | Cai |
| 2019/0108430 A1 | 4/2019 | Coppedge |
| 2019/0132329 A1 | 5/2019 | Verberkt |
| 2019/0134515 A1* | 5/2019 | Freedman .......... G02B 27/0101 |
| 2019/0172011 A1 | 6/2019 | Robinson |
| 2019/0174279 A1* | 6/2019 | Verma ................... G07B 15/063 |
| 2019/0195443 A1 | 6/2019 | Spriggins |
| 2019/0236873 A1 | 8/2019 | Estill |
| 2019/0246262 A1 | 8/2019 | Salkintzis |
| 2019/0248439 A1 | 8/2019 | Wang |
| 2019/0259232 A1 | 8/2019 | Gopal |
| 2019/0281030 A1 | 9/2019 | Isaacson |
| 2019/0304216 A1 | 10/2019 | Mendelson |
| 2019/0325691 A1 | 10/2019 | Tovey |
| 2019/0329125 A1 | 10/2019 | Peretz |
| 2019/0333304 A1 | 10/2019 | Flynn |
| 2019/0347532 A1 | 11/2019 | Amisar |
| 2019/0379739 A1 | 12/2019 | Schulz |
| 2019/0386954 A1 | 12/2019 | Lau |
| 2020/0045546 A1 | 2/2020 | Zhou |
| 2020/0059363 A1 | 2/2020 | Lobo |
| 2020/0068029 A1 | 2/2020 | Lim |
| 2020/0112614 A1 | 4/2020 | Lim |
| 2020/0184758 A1 | 6/2020 | Groeger |
| 2020/0193375 A1 | 6/2020 | Santangeli |
| 2020/0220788 A1 | 7/2020 | Ramanathan |
| 2020/0226706 A1 | 7/2020 | Ramarao |
| 2020/0229596 A1 | 7/2020 | Finney |
| 2020/0268577 A1 | 8/2020 | Lau |
| 2020/0286354 A1 | 9/2020 | Bloom |
| 2020/0301748 A1 | 9/2020 | Gupta |
| 2020/0309551 A1 | 10/2020 | Yang |
| 2020/0357211 A1 | 11/2020 | Mendelson |
| 2020/0385046 A1 | 12/2020 | Vollmar |
| 2020/0394436 A1 | 12/2020 | Rakshit |
| 2021/0049846 A1 | 2/2021 | Kashi |
| 2021/0065256 A1 | 3/2021 | Shontz |
| 2021/0126810 A1 | 4/2021 | Dinh |
| 2021/0142277 A1 | 5/2021 | Fee |
| 2021/0278846 A1* | 9/2021 | Nickols .................. B63H 21/21 |
| 2021/0375068 A1 | 12/2021 | Maya et al. |
| 2022/0051509 A1 | 2/2022 | Schmidt |
| 2022/0051510 A1 | 2/2022 | Schmidt |
| 2022/0051511 A1 | 2/2022 | Schmidt |
| 2022/0051512 A1 | 2/2022 | Schmidt |
| 2022/0051513 A1 | 2/2022 | Schmidt |

(56) References Cited

U.S. PATENT DOCUMENTS

| | | | |
|---|---|---|---|
| 2022/0051514 A1 | 2/2022 | Schmidt | |
| 2022/0051515 A1 | 2/2022 | Schmidt | |
| 2023/0036188 A1 | 2/2023 | Schmidt | |

FOREIGN PATENT DOCUMENTS

| | | | | |
|---|---|---|---|---|
| CN | 1565673 A | | 1/2005 | |
| CN | 201940046 U | | 8/2011 | |
| CN | 202208341 U | * | 5/2012 | |
| CN | 207473750 U | | 6/2018 | |
| CN | 207565656 U | | 7/2018 | |
| CN | 108404422 | * | 8/2018 | ............. A63H 33/28 |
| CN | 109102359 A | | 12/2018 | |
| CN | 208233253 | | 12/2018 | |
| CN | 112169343 B | * | 2/2022 | ............. A63G 19/20 |
| EP | 0645728 A2 | | 3/1995 | |
| EP | 2887240 | | 6/2015 | |
| EP | 2887240 A1 | | 6/2015 | |
| EP | 3668467 A1 | | 2/2019 | |
| EP | 3410410 B1 | | 1/2021 | |
| JP | 2021144542 A | | 9/2021 | |
| KR | 101272562 B1 | | 6/2013 | |
| KR | 20210150689 A | | 12/2021 | |
| WO | WO-0156871 A1 | * | 8/2001 | ............... B62K 9/00 |
| WO | 2005076233 | | 8/2005 | |
| WO | 2006036913 | | 4/2006 | |
| WO | 2006036913 A2 | | 4/2006 | |
| WO | 2007098571 | | 9/2007 | |
| WO | 2007098571 A1 | | 9/2007 | |
| WO | 2009079514 A1 | | 6/2009 | |
| WO | WO-2009148991 A1 | * | 12/2009 | ............... B62K 9/00 |
| WO | 2010036952 A2 | | 4/2010 | |
| WO | 2010067006 | | 6/2010 | |
| WO | 2012050891 | | 4/2012 | |
| WO | 2013049259 A2 | | 4/2013 | |
| WO | 2013115815 | | 8/2013 | |
| WO | 2013115815 A1 | | 8/2013 | |
| WO | 2014014362 | | 1/2014 | |
| WO | 2014014362 A1 | | 1/2014 | |
| WO | 2017059534 A1 | | 4/2017 | |
| WO | 2019035888 | | 2/2019 | |
| WO | 2019035888 A1 | | 2/2019 | |

OTHER PUBLICATIONS

Images of Rydeables™ motor scooters illustrated on Rydeables website at https://www.rydables.com circa May 19, 2021, A Funomenalk Co. (25 Pages).
International Preliminary Report on Patentability (IPRP) issued in PCT Application No. PCT/US2021/045456.
International Preliminary Report on Patentability (IPRP) issued in PCT Application No. PCT/US2021/045459.
International Search Report mailed Dec. 15, 2021 issued in PCT International Application No. PCT/US2021/045461 (pp. 9).
International Search Report mailed Feb. 1, 2022 issued in PCT International Application No. PCT/US2021/045456 (pp. 13).
International Search Report mailed Feb. 7, 2022 issued in PCT International Application No. PCT/US2021/045463 (pp. 15).
International Search Report mailed Jan. 26, 2022 issued in PCT International Application No. PCT/US2021/045459 (pp. 8).
Office Action (Final Rejection) dated Feb. 9, 2023 for U.S. Appl. No. 17/242,922 (pp. 1-8).
Office Action (Final Rejection) dated Mar. 1, 2023 for U.S. Appl. No. 17/242,945 (pp. 1-12).
Office Action (Non-Final Rejection) dated Feb. 28, 2023 for U.S. Appl. No. 17/242,933 (pp. 1-14).
Office Action (Non-Final Rejection) dated Apr. 25, 2022 for U.S. Appl. No. 16/990,381 (pp. 1-12).
Office Action (Non-Final Rejection) dated May 12, 2022 for U.S. Appl. No. 17/242,922 (pp. 1-12).
Office Action (Non-Final Rejection) dated Jun. 6, 2023 for U.S. Appl. No. 17/399,079 (pp. 1-15).
Office Action (Non-Final Rejection) dated Jun. 7, 2023 for U.S. Appl. No. 17/399,080 (pp. 1-12).
Office Action (Non-Final Rejection) dated Nov. 23, 2022 for U.S. Appl. No. 17/242,990 (pp. 1-11).
Office Action (Notice of Allowance and Fees Due (PTOL-85)) dated Feb. 8, 2023 for U.S. Appl. No. 16/990,381 (pp. 1-7).
Office Action (Notice of Allowance and Fees Due (PTOL-85)) dated Jun. 5, 2023 for U.S. Appl. No. 17/399,077 (pp. 1-7).
Office Action (Notice of Allowance and Fees Due (PTOL-85)) dated Aug. 24, 2023 for U.S. Appl. No. 17/242,933 (pp. 1-15).
Office Action (Notice of Allowance and Fees Due (PTOL-85)) dated Aug. 24, 2023 for U.S. Appl. No. 17/242,990 (pp. 1-16).
Office Action (Notice of Allowance and Fees Due (PTOL-85)) dated Sep. 6, 2023 for U.S. Appl. No. 17/242,922 (pp. 1-11).
Office Action (Notice of Allowance and Fees Due (PTOL-85)) dated Sep. 8, 2023 for U.S. Appl. No. 17/242,945 (pp. 1-12).
Office Action dated Jun. 9, 2020 for U.S. Appl. No. 16/152,144 (pp. 1-195).
Reply to Written Opinion issued in PCT Application No. PCT/US2021/45459 dated Oct. 4, 2022.
Rydables Inc. "Rydables" May 2021 (pp. 25).
Screenshots of Rydeables™ website at https://www.rydables.com captured on Mar. 21, 2024, A Funomenalk Co. (12 Pages).
US Trademark Registration No. 5547684 for the mark "Rydables" granted to Ridabl, LLC on Aug. 21, 2018 (pp. 1-29).
Webpage Screenshot showing Beston Stuffed Animal Scooters captured on Beston Website at https://bestonamusementequipment.com/electric-walking-animal-scooter-rides-for-sale/, Beston Rides Co., Ltd, circa Apr. 21, 2021 (1 Page).
Webpage Screenshots showing Beston Stuffed Animal Scooters captured on Beston Website at https://bestonamusementequipment.com/electric-walking-animal-scooter-rides-for-sale/, Beston Rides Co., Ltd, Mar. 21, 2024 (6 Pages).
Written Opinion mailed Dec. 15, 2021 issued in PCT International Application No. PCT/US2021/045461 (pp. 11).
Written Opinion mailed Feb. 1, 2022 issued in PCT International Application No. PCT/US2021/045456 (pp. 42).
Written Opinion mailed Feb. 7, 2022 issued in PCT International Application No. PCT/US2021/045463 (pp. 22).
Written Opinion mailed Jan. 26, 2022 issued in PCT International Application No. PCT/US2021/045459 (pp. 36).

* cited by examiner

RULE-BASED TRIGGERS FOR AUTOMATED RE-DIRECTION OF TRANSACTIONAL WORKFLOW UPON AUTOMATED DETECTION THEREOF DURING QR DRIVEN ACCESS CONTROL PROCESSES EXECUTING ON SYSTEM SERVERS

TRIGGER RULE #1

If all or specific type Vehicles are sold out at specific Site-Level, Then Re-Direct to Facility-Level in the Transactional

TRIGGER RULE #2

If a different (new) mobile phone scans a Device-Level QR code on a locker that is currently rented, then the system will displays a message in the web browser of the mobile phone: "this Vehicle is already rented by a different user, if you would like to rent a vehicle, look for a GREEN LED" indicator on the vehicle steering console.

TRIGGER RULE #3

If a guest re-scans a Device-Level code upon returning to her vehicle, and the mobile phone performing the scanning is recognized by its stored Transaction Identifier, then the system will pre-populate the PIN of the guest into the PIN field of the web browser application

TRIGGER RULE #4

If a guest's mobile smartphone scans a Device-Level QR code and Internet operation is detected as unavailable, then mobile phone should load its local Bluetooth (BT) communication GUI to establish a wireless BT communication connection between theVehicle and mobile smartphone and invite the user to enter his or her PIN code into the vehicle's console so it can be started

TRIGGER RULE #5

If a guest's mobile smartphone scans a Facility-Level or Site-Level QR Code, and the mobile phone does not receive an Internet Server Connection Status from System Network Servers, then load and display a GUI on mobile smartphone with message requesting the guest user to attempt to scan a Device-Level QR code on a Vehicle using WIFI so as to rent a new vehicle.

FIG. 2C

EXEMPLARY MULTI-LEVEL MACHINE-READABLE CODE HIERARCHY EMPLOYED IN THE WIRELESS ACCESS CONTROL SYSTEM NETWORK

| QR code type | URL (for example only) | Additional info associated to the Unique ID pulled from the Database |
|---|---|---|
| Device level | //GoPod.mobi/door | Facility,<br>Site,<br>Vehcile,<br>Type options,<br>Time (timed/daily),<br>Size,<br>Pricing |
| Site level | //GoPod.mobi/site | Facility,<br>Site,<br>Vehicle,<br>Type options,<br>Time (timed/daily),<br>Size OPTIONS,<br>pricing for each type option –<br>*inventory status of each type* |
| Facility level | //GoPod.mobi/facility | Facility,<br>Site(s) – to be rendered as choices<br>Vehicle types,<br>Type options,<br>pricing for each type option |

FIG. 3

LOCAL DATABASE RECORD TABLE MAINTAINED IN EACH VEHICLE
IN THE NETWORKED RIDE SYSTEM OF THE PRESENT INVENTION

| Database Records for Vehicle # | | |
|---|---|---|
| Vehicle # | Vehicle Housing # | Vehicle Size |
| Status | Track ID | OnBoard Cameras |
| Skin Type | Features | IP Address - Vehicle |
| Rental Transaction Identifier | | |
| Device (Phone) ID (e.g. a Cookie or Digital Token Generated and Stored in Cache Memory of the Mobile Phone Scanning The QR Code For The Vehicle Rental) | | |
| Guest PIN (4 Digits) | | |

FIG. 8C

GLOBAL DATABASE TABLE MAINTAINED FOR EACH VEHICLE MANAGED
AT A SITE IN THE FACILITY OF THE PRESENT INVENTION

| Site #1 | Site #2 | Site #3 | Site #4 |
|---|---|---|---|
| Records for Vehicle # | Records for Vehicle # | Records for Vehicle # | Records for Vehicle # |
| Records for Vehicle # | Records for Vehicle # | Records for Vehicle # | Records for Vehicle # |
|  |  |  |  |
| Records for Vehicle # | Records for Vehicle # | Records for Locker # | Records for Vehicle # |

FIG. 8D

SPECIFICATION OF GPS-DEFINED GEO-FENCES ASSIGNED TO
PARTICULAR GROUPS OF ENTERTAINMENT VEHICLES DEPLOYED
WITHIN THE GPS-TRACKED VEHICLE ACCESS CONTROL SYSTEM NETWORK

GPS-DEFINED GEO-FENCE NO. 001
{GPS-Boundaries For Geo-Fence #1}
{Vehicle #'s Assigned within Geo-Fence #1}

GPS-DEFINED GEO-FENCE NO. 002
{GPS-Boundaries For Geo-Fence #2}
{Vehicle #'s Assigned within Geo-Fence #2}

\* \* \*

GPS-DEFINED GEO-FENCE NO. 00N
{GPS-Boundaries For Geo-Fence #N}
{Vehicle #'s Assigned within Geo-Fence #N}

SPECIFICATION OF GPS-DEFINED ELECTRIC BATTERY RECHARGING SERVICE STATIONS DEPLOYED WITHIN THE GPS-TRACKED VEHICLE ACCESS CONTROL SYSTEM NETWORK OF THE PRESENT INVENTION

BATTERY RECHARGING STATION NO. 001
{GPS-Boundaries For Battery Recharging Station (BRS) #1}
{Vehicle #'s Rechargeable within BRS #1}

BATTERY RECHARGING STATION NO. 002
{GPS-Boundaries For Battery Recharging Station (BRS) #2}
{Vehicle #'s Rechargeable within BRS #2}

* * *

BATTERY RECHARGING STATION NO. 00N
{GPS-Boundaries For Battery Recharging Station (BRS) #N}
{Vehicle #'s Rechargeable within BRS #N}

FIG. 8G

Single Rider Safety-Seating System With Automated Footboard Height Adjustment

Automated Footboard Height Adjustment Subsystem
For Use With Safety-Seating Systems Installed Aboard
Electric Vehicle Systems of The Present Invention

Method of Automated Intelligent Passenger Seating Safety Control

A: Automatically detecting the presence of one or more passengers Sitting on a seating saddle mounted on an electric passenger vehicle;

B: Automatically sensing and detecting the presence of the left and right feet of each detected passenger, and determining if the footboards require adjustment to support the legs of each passenger;

C: Automatically adjusting the position of the footboards on left and right sides of the electric passenger vehicle until the feet of the detected passengers are detected as being supported in stable manner under the detected passenger riding conditions;

D: Automatically generating a vehicle enable signal to enable the electric passenger to be operated in a motion-enabling state of Operation;

E: During vehicle operation, automatically sensing and detecting the position of the passengers on the seating saddle, and passenger feet on the footboards, and in the event of detected disruptions in essential Passenger riding conditions (i.e. feet must be on floorboards, etc.), automatically generating a vehicle disable signal to disable the passenger from operating the vehicle in a motion-enabling state of operation F: When automatically sensing and detecting that the passengers are Seated once again on the seating saddle, with their feet on positioned on the footboards, automatically generating a vehicle re-enable signal to enable the passenger to continue operating the vehicle in a motion-enabling state of operation while satisfying essential rider conditions

FIG. 24F

SCAN VEHICLE-LEVEL QR CODE
FOR DIGITAL KEY OPERATION

METHOD OF MANAGING ACCESS CONTROL TO A NETWORKED MOBILITY SYSTEM
BY SCANNING FACILITY-LEVEL QR CODES POSTED AT THE ENTRANCE GATE
OR OUTSIDE OF AN AMUSEMENT PARK FACILITY, USING A MOBILE SMARTPHONE
WIRELESS CONNECTED TO THE WIRELESS ACCESS CONTROL SYSTEM NETWORK
OF THE PRESENT INVENTION

STEP A: Using a mobile smartphone deployed on the wireless access control system network to practice a facility-level access control method by (i) the scanning of a Facility-Level QR Code, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier – Facility Entry" (RTI-FE) within the cache on the mobile smartphone STEP B: Using the mobile smartphone deployed on the wireless access control system network to practice a facility-level access control method by selecting which Site within the Facility (e.g. Main Gate, South Entrance, or Picnic Area) where the guest user would like to rent and access a vehicle to ride around the facility.

STEP C: Using the mobile smartphone deployed on the wireless access control system network to practice a facility-level access control method by selecting the particular ride vehicle and time/date of the vehicle rental at the Site within the Facility when would the guest user would like to rent and ride the vehicle around the facility

FIG. 27A

STEP D: Using the mobile smartphone deployed on the wireless access control system network to practice a facility-level access control method by the guest user requesting to rent the ride vehicle previously specified by the site, time/date, and type selected by the guest within the Facility, while displaying the price of the ride rental and availability at the time of the rental offer (prior to acceptance and order placement), and terms & conditions of the rental agreement, and then accepting the terms and condition of the vehicle rental agreement STEP E: Using the mobile smartphone deployed on the wireless access control system network to practice a facility-level access control method by the user's selection of a four-digit passcode for use in accessing the ride vehicle, and saving the request in the RDBMS of the wireless access control system network STEP F: Using the mobile smartphone deployed on the wireless access control system network to practice a facility-level access control method by displaying the selected vehicle and user passcode, and entering the guest's phone number to which the system network will transmit vehicle information and rental receipt via SMS/text once the user enters the phone number information to initiate the webbased transaction between the web-enabled mobile phone and the system's web-enabled e-commerce-supported vehicle access control servers maintained at the data center

FIG. 27B

STEP G: Using the mobile smartphone deployed on the wireless access control system network to practice a facility-level access control method by displaying the selected vehicle, entered passcode, text receipt phone number, and total price of the rental (tax included), and providing several options for the user to make payment (e.g. using ApplePay® or using a credit card or debit card of the user, in which case, the card number and expiration date, i.e. month/year are requested)

STEP H: Using the mobile smartphone deployed on the wireless access control system network to practice a facility-level access control method by displaying, after the prior payment transaction has been successfully completed, a message that the vehicle is ready to ride

FIG. 27C

Scanning Device-Level QR Code
After Facility Level QR Scanning

STEP I: Using the mobile smartphone deployed on the wireless access control system network to complete the facility-level access control method, by (i) the scanning of the Device-Level QR code on the rented vehicle using the user's web-enabled mobile smartphone, (ii) automatically directing the smartphone web-browser application to parse and analyze the scanned QR code and serve, load and display the webpage specified by the URL encoded in the Device-Level QR Code, and (iii) executing the access control transaction script for the vehicle rental transaction identified by the "Rental Transaction Identifier - Facility Entry" stored on the phone by the application servers, so as to determine the state of the transaction for the Device-Level Access Control Method STEP J: Using the mobile smartphone deployed on the wireless access control system network to practice a facility-level access control method, by displaying a message that the vehicle is parked and to press the button "POWER" to start the Vehicle, and the user to return the vehicle to the rental kiosk when ready to end the vehicle ride, and to start riding.

STEP K: Using the mobile smartphone deployed on the wireless access control system network to practice a facility-level access control method, by displaying a message press the button "PARK" to stop and park the vehicle and terminate the vehicle rental agreement, after bringing the vehicle back to the rental kiosk within the park facility.

FIG. 27D

METHOD OF RENTING, ACCESSING AND CONTROLLING A NETWORKED RIDE VEHICLE BY SCANNING FACILITY-LEVEL QR CODE AT PARK, AND THEN SCANNING A DEVICE-LEVEL QR CODE ON THE NETWORKED VEHICLE AT THE SITE WHERE THE VEHICLE IS PARKED

FACILITY-LEVEL

1. Guest Uses A Web-Enabled Mobile Phone To Scan a Facility-Level QR Code posted at Facility having one or more Sites supporting a plurality of Network Devices (e.g. Ride Vehicles) For Rental and Use in The Facility 2. System Automatically Generates and Stores a Rental Transaction Record and Identifier in the System Database In response to the scanning of the Site-Level QR Code and Facilitates Rental Of a Networked Device (e.g. Ride Vehicle)

3. System Automatically Generates and Stores A Device Identifier (i.e. Cookie/Digital Token) On the Mobile Phone Scanning The Site-Level QR Code; Requests Guest to Enter Access PIN; Then Assigns Vehicle Identified by Vehicle # and Issues Vehicle Rental Agreement

DEVICE-LEVEL

4. Guest Uses The Mobile Phone To Scan A Device-Level QR Code on the Rented Ride Vehicle 5. System Automatically Reads and Updates the Rental Transaction Record and Identifier Stored in the System Database 6. System Automatically Reads The Device Identifier (i.e. Cookie/Digital Token) Stored On The Mobile Phone Used to Scan The Site-Level QR Code and Rent A Ride Vehicle; Request Guest to Enter Access PIN, Start Vehicle and Operate 7. After Park Experience, Guest Uses The Mobile Phone To Scan Device-Level QR Code on The Rented Vehicle 8. System Automatically Reads and Updates the Rental Transaction Record and Identifier Stored in the System Database 9. System Automatically Reads The Device Identifier (i.e. Cookie/Digital Token) On Mobile Phone Used To Scan The Site-Level QR Code, Request Guest to Enter Access PIN, and Determines and Displays on Mobile Phone Display if Extra Rental Fee Is Due To Vehicle Rental Time Overage 10. Guest Uses The Mobile Scanning Phone To Pay for Extra Rental Time If and As Required and Terminate the Vehicle Rental Transaction 11. System Automatically Reads and Updates the Rental Transaction Record and Identifier Stored in the System Database, to Reflect That The Ride Vehicle is AVAILABLE for Rental 12. System Automatically Drives and Activates the Vehicle (Rental) Status Indication Light (LEDs) on the Available Vehicle to Indicate Rental AVAILABILITY Status

FIG. 29

METHOD OF MANAGING ACCESS CONTROL TO A NETWORKED VEHICLE BY SCANNING SITE-LEVEL QR CODES POSTED AT A PARTICULAR SITE IN AN AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP A: Using a mobile smartphone deployed on the wireless access control system network to practice a site-level access control method by (i) the scanning of a Site-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier - Site-Entry" (RTI-SE) (digital token/cookie) within the cache on the mobile smartphone STEP B: Using the mobile smartphone deployed on the wireless access control system network to practice a site-level access control method by selecting the time/date of the networked vehicle rental at the Site within the Facility when would the guest user would like to rent and access the networked ride vehicle STEP C: Using the mobile smartphone deployed on the wireless access control system network to practice a site-level access control method by selecting the networked vehicle type/kind at the selected Site within the Facility which the guest user would like to rent and access a rideable vehicle to ride about the facility STEP D: Using the mobile smartphone deployed on the wireless access control system network to practice a site-level access control method by the guest user confirming the vehicle type selected by the guest at the Site, while displaying the price of the vehicle rental and availability at the time of the rental offer (prior to acceptance and order placement) and the terms and conditions of the vehicle rental agreement, and then accept the terms and conditions of the rental agreement (B)

FIG. 31A

SCAN SITE-LEVEL QR CODE

METHOD OF MANAGING ACCESS CONTROL TO A NETWORKED DEVICE OR SYSTEM (E.G., ECVs ETC.) BY SCANNING DEVICE-LEVEL QR CODES POSTED OR DISPLAYED ON EACH VEHICLE DEPLOYED WITHIN THE AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP D: Using the mobile smartphone deployed on the wireless access control system network to display the selected vehicle, entered passcode, text receipt phone number, and total price of the vehicle rental (tax included), and provide options for the user to make payment (e.g. using ApplePay® or using a credit card or debit card of the user, in which STEP E: Using the mobile smartphone deployed on the wireless access control system network to display, after the prior payment transaction, a message that the networked vehicle is ready to ride, immediately or when the guest renter is ready to do so.

STEP F: Using the mobile smartphone deployed on the wireless access control system network to select the POWER button on the steering console to power up, start and ride the electric vehicle, without passcode if required by the facility and rental agreement.

STEP G: Using the mobile smartphone deployed on the wireless access control system network to select the PARK button to power down, stop and park the vehicle at a rental kiosk in the facility.

FIG. 35B

GPS-TRACKING BASED METHOD OF CONTROLLING AND CONSTRAINING
THE MOTION OF AN ELECTRIC ENTERTAINMENT VEHICLE
WITHIN A GEOFENCED REGION OF A PARK FACILITY

A: SETTING UP AND MAINTAINING A GPS-TRACKING VEHICLE ACCESS CONTROL
SYSTEM NETWORK SUPPORTING A GPS-TRACKED GEO-FENCE SYSTEM WITHIN A
FACILITY OPERABLY CONNECTED TO THE GPS-TRACKING WIRELESS SYSTEM

B: DEFINING GPS-DEFINED REGIONS WITHIN THE FACILITY, IN WHICH PARTICULAR ENTERTAINMENT
VEHICLES ARE OPERATIONALLY CONSTRAINED ACCORDING TO GPS-SPECIFIC ENVIRONMENT AWARE
VEHICLE-OPERATION RULES

C: ASSIGNING PARTICULAR ENTERTAINMENT VEHICLES TO PARTICULAR GPS-DEFINED
REGIONS WITHIN THE GPS-TRACKING WIRELESS SYSTEM NETWORK

D: ASSIGNING A UNIQUE VEHICLE IDENTIFIER TO EACH ENTERTAINMENT VEHICLE AVAILABLE
FOR RENTAL WITHIN THE FACILTY

E: RENTING A GPS-TRACKED ENTERTAINMENT VEHICLE TO RIDE WITHIN THE FACILITY, USING
A PARTICULAR MOBILE SMARTPHONE REGISTERED WITH THE GPS-TRACKING WIRELESS SYSTEM
NETWORK, AND ADAPTED TO READ A DEVICE-LEVEL QR CODE ON THE VEHICLE TO INITIATE A
RENTAL TRANSACTION

F: ASSIGNING A UNIQUE PHONE IDENTIFIER TO EACH MOBILE SMARTPHONE USED TO SCAN THE
QR CODE USED TO RENT THE ENTERTAINMENT VEHICLE; AND LINKING THE VEHICLE IDENTIFIER TO
THE MOBILE PHONE IDENTIFIER

G. OPERATING ENTERTAINMENT VEHICLES WITHIN THE FACILITY, WHILE CONTROLLING THEIR
OPERATION BY APPLYING THE GPS-SPECIFIC VEHICLE-OPERATION RULES THAT APPLY WHEN A
VEHICLE IS LOCATED IN A SPECIFIC GPS-SPECIFIED AND TRACKED REGION OF THE FACILITY

FIG. 38

VEHICLE CONSTRAINTS WITHIN GPS-TRACKING BASED
GEO-FENCE SYSTEM OF THE PRESENT INVENTION

VEHICLE CONSTRAINTS WITHIN GEO-FENCE SYSTEM OF THE PRESENT INVENTION

1 - BEEP BEEP WARNING GIVEN WHEN VEHICLE APPROACHES 100 YARDS TO BOUNDRY

2 - SPEED REDUCTION IS ENABLED

3 - ONLY REVERSE MOTION IS ALLOWED

FIG. 39

WIRELESS NETWORK, SYSTEMS AND METHODS FOR CONFIGURATION, OPERATION AND USE OF MOTORIZED, WHEELED AND STEERABLE PASSENGER-CARRYING CARTS FOR ENTERTAINMENT PURPOSES

RELATED CASES

The present Patent Application is a Continuation-in-Part (CIP) of co-pending U.S. patent application Ser. No. 17/399,080 filed Aug. 11, 2021, which is a CIP of co-pending application Ser. No. 16/990,381 filed Aug. 11, 2020; said Patent Applications are commonly owned by SCOOTERBUG, INC. and incorporated herein by reference as if fully set forth herein.

BACKGROUND OF THE INVENTION

Field of Invention

The present invention relates to the field of amusement park, theme park and recreational environments, and more particularly, to new and improved methods of and apparatus for guest visitors to rent, access, and use electric entertainment vehicles (EEVs) and related services, without compromising the park or venue experience.

Brief Description of the State of the Art of Knowledge

Since the beginning of time, mankind has sought various and diverse forms of entertainment to help break-up the monotony and humdrum nature of ordinary modern life.

In recent times, electric convenience vehicles (ECVs) have grown in great popularity across theme and amusement parks which often stretch out for miles on end. Such distances are often too far to walk for many, and create inaccessibility problems for a growing population who require ECVs and wheelchairs, and younger children who require strollers to help bridge the distances between sites located throughout an expansive park facility.

In general, driving such ECVs have not been glamourous or exciting, and have been perceived more often than not, as an appliance for the handicapped, often creating a stigma of sorts which is undesirable in society.

At the same time, there has been a growing trend in the deployment of electric ride carts, often dressed in animal character skins and coverings, for use in indoor mall settings as disclosed on U.S. Pat. No. 9,145,067 to Dahlen, and more recently in outdoor park settings as illustrated by Ryde-ables™ battery-powered electric rental vehicles, with stuffed character bodies, offered for rental by the Funomenal Co., at a number of facilities across the USA.

Thus despite some advances made in the field of outdoor battery-powered entertainment vehicles over the few years, there is a still a great need in the art for new and improved methods and technologies for vendors to make, operate and serve such animal character electric entertainment vehicles, while enabling guest users to remotely access and control the rental and deployment of such entertainment vehicle products at particular site locations, using web-enabled mobile smartphones in ways that deliver greater levels of convenience and value to consumers beyond that enabled by the current state of the art.

OBJECTS AND SUMMARY OF PRESENT INVENTION

Accordingly, a primary object of the present invention is to provide a new and improved cloud-based (i.e. Internet-based) wireless vehicle access control system network employing mobile smartphones in diverse application environments, including amusement and theme parks, entertainment centers, recreational facilities and the like, supporting the rental, access and control of mobility solutions, particularly electric entertainment-providing ride vehicles, designed to overcome the shortcomings and drawbacks of prior art systems and methodologies.

Another object of the present invention is to provide a new and improved wireless network, system and method for rental, configuration and use of motorized, wheeled and steerable passenger-carrying carts (e.g. vehicles) rideable within a specified environment while providing transportation and entertainment, wherein each passenger-carrying cart is configured with a customized ornamental body or shell specified by the guest and rideable by one or more guest passengers for convenience, amusement and/or enjoyment purposes within the environment.

Another object of the present invention is to provide such a new and improved wireless system network, mobile systems and methods for controlling access electric entertainment vehicles.

Another object of the present invention is to provide such a new and improved wireless system network, wherein multi-level QR codes are embedded at the facility, site, and device (i.e. thing) level of the park environment to enable park guests, visitors and other system users to procure, access and deliver entertainment-providing mobility products and services while visiting an amusement park.

Another object of the present invention is to provide a new and improved cloud-based GPS-tracking QR code driven wireless vehicle system network, particularly configured for procurement and access control over electrically-powered entertainment-providing vehicles and related services offered within an enterprise-level amusement park facility.

Another object of the present invention is to provide a new and improved GPS-tracking wireless system network supporting remote access control to GPS-tracked wireless networked electric entertainment vehicles displaying Device-Level QR Codes for procurement and access control guests by scanning these QR codes using mobile smartphones.

Another object of the present invention is to provide a new and improved GPS-tracking wireless vehicle access control system network comprising a plurality of GPS-tracked wireless networked electric entertainment vehicle (EEV) systems, and system network components interfaced with an TCP/IP Internet infrastructure.

Another object of the present invention is to provide a new and improved GPS-tracked wireless networked vehicle system having a plurality of wireless networked electric entertainment vehicles, wherein each such vehicle is accessible by scanning the multi-level QR code posted or displayed on the unit, using a web-enabled mobile smartphone deployed in the system network, and carrying out the transaction supported on the display screen of the mobile smartphone.

Another object of the present invention is to provide a new and improved GPS-tracked wireless networked vehicle system having a plurality of wireless networked electric entertainment vehicles, wherein each such vehicle is provided with binocular stereoscopic digital video cameras having field of views (FOVs) directed in the forward direction of the vehicle, and capable of recording scenery within the FOVs for storage on cloud-based servers.

Another object of the present invention is to provide a new and improved GPS-tracked wireless networked vehicle system having a plurality of wireless networked electric entertainment vehicles, wherein each such vehicle supports and wirelessly interfaces with a smartphone system owned and operated by the guest user, docked with the steering console of the vehicle, and having a digital video camera with a field of view (FOVs) directed at the vehicle operator and passenger(s) and capable of recording scenery within the FOV for storage in the smartphone and on cloud-based servers.

Another object of the present invention is to provide such new and improved wireless network, systems and methods, wherein each passenger-carrying rideable vehicle deployed in the system comprises features including: a modular construction consisting of a lightweight body driven by an electric-battery driven motor, and specially adapted for receiving a customizable ornamental body (i.e. shell) having the appearance and personality of a particular animal (e.g. dolphin, shark, whale, tiger, etc.) or an inanimate object (e.g. a train, boat, banana, etc.); a structural scaffold assembly for supporting an ornamental and decorative skin covering internal components employed in the vehicle;

Another object of the present invention is to provide such new and improved wireless network, systems and methods, wherein each passenger-carrying rideable vehicle deployed in the system further comprises: a Bluetooth RF communication interface installed within the vehicle, and linkable to the guest user's smartphone or tablet, enabling guest users to use their smartphone/tablet and mobile app to support GUIs configured for managing a selection of customizable features (e.g. animal sounds emulating the selected animal or inanimate object) triggered from button on steering wheel; and apparatus integrated into the body exterior for providing lighting effects.

Another object of the present invention is to provide such new and improved wireless network, systems and methods, wherein each passenger-carrying rideable vehicle deployed in the system further comprises: motorized skin elements disposed beneath the animal skin covering for enabling animal behaviors and/or expressions that promote a fun and entertaining ride experience; audio-transducers mounted within the animal character body for playing music from smartphone applications; and animated animal character body portions to provide a sense of realism and excitement as the electric entertainment vehicle is ridden through an amusement facility.

Another object of the present invention is to provide a new and improved electric-powered passenger riding vehicle system having an improved seating saddle system mounted on the electric vehicle and having automatically adjustable footboards to support the legs of the passengers to that they will be stably seated while riding the electric vehicle, and using sensors to automatically disable operation of the electric vehicle upon automated detection that the passenger riders are not maintaining essential passenger riding conditions enforced by the system.

Another object of the present invention is to provide such a new and improved electric-powered passenger riding vehicle system, wherein its improved seating saddle system is provided with embedded sensors that automatically detect the seating of passengers and the footboards included embedded sensors are well to detect the positioning of the passenger's fee thereon while riding the electric vehicle, and automatically detection when the passenger riders are not maintaining essential passenger riding conditions to be enforced by the system.

Another object of the present invention is to provide a new and improved method of configuring and deploying a cloud-supported Internet-of-Things (IOT) electric-powered entertainment vehicle customized to each particular guest user employing a mobile web-enabled smartphone to remotely access, control, configure and operate the electric entertainment vehicle being rented within a park facility or environment, while provided with animated and non-animated features selected by the guest user renting the electric entertainment vehicle.

Another object of the present invention is to provide a new and improved electrically-powered entertainment vehicle system, wherein (i) the animal-shaped body portion is provided with a pass-through central housing architecture that is adapted to contain and house a pair of open-type top loading storage baskets located on the left and right sides of the vehicle, supported on the vehicle chassis, above the battery storage modules, and (ii) the animal body skirt covering is provided with flexible hinged-like panels, overlapping with the top-loading open storage baskets, and fastened with Velcro® hook and loop fasteners, so that the guest users can quickly lift up the animal skin panels and access the storage baskets from either side of the vehicle to access and store personal belongings during the course of the vehicle rental.

Another object of the present invention is to provide a new and improved electrically-powered entertainment vehicle system, wherein its animal skin covering and seating assembly have been removed to reveal the double top-loading storage basket system mounted on the left and rights sides of the chassis frame, for holding personal possessions while riding the vehicle.

Another object of the present invention is to provide a new and improved electrically-powered entertainment vehicle system, wherein a mobile phone system is used to electronically-activate (i.e. digitally unlock) and enable operation of the vehicle via wireless communications, with wireless communication equipment embedded within the steering console of the vehicle.

Another object of the present invention is to provide a new and improved electrically-powered entertainment vehicle system, wherein the system is further provided with a dual rider safety seating system having adjustable foot stirrups for supporting the feet of a small-sized passenger sitting before a larger-sized passenger/rider whose feet are placed firmly on automated height-adjustable left and right floor-boards mounted on both sides of the vehicle system.

Another object of the present invention is to provide a new and improved electrically-powered entertainment vehicle system, wherein the adjustable foot stirrups support the feet of a small-sized passenger sitting before a larger-sized passenger/rider whose feet are placed firmly on automated height-adjustable left and right floor-boards mounted on both sides of the vehicle system.

Another object of the present invention is to provide a new and improved electrically-powered entertainment vehicle system, wherein the system is further provided with a single rider safety seating system for a passenger sitting on the seat portion/saddle while feet are placed firmly on automated height-adjustable left and right floor-boards mounted on both sides of the vehicle system.

Another object of the present invention is to provide a new and improved electrically-powered entertainment vehicle system, wherein the passenger while sitting on the saddle seat can place his/her feet placed firmly on automated height-adjustable left and right floor-boards mounted on both sides of the vehicle system.

Another object of the present invention is to provide a new and improved electrically-powered entertainment vehicle system, wherein the system is further provided with a dual rider safety seating system for a first passenger sitting before a second passenger/rider with their feet placed firmly on automated height-adjustable left and right floor-boards mounted on both sides of the vehicle system.

Another object of the present invention is to provide a new and improved electrically-powered entertainment vehicle system, wherein an automated footboard height adjustment mechanism is employed in the electrically-powered entertainment vehicle systems.

Another object of the present invention is to provide a new and improved electrically-powered entertainment vehicle system, deployed within a GPS-tracking system network supporting a geo-fencing system configured to automatically control the behavior and operation of the electrically-powered entertainment vehicle systems.

These and other objects will become more apparent hereinafter in view of the Detailed Description and pending Claims to Invention.

BRIEF DESCRIPTION OF THE DRAWINGS

In order to understand the Objects more fully, the following Detailed Description of the illustrative embodiments should be read in conjunction with the accompanying Drawings, wherein:

FIG. 2C is a table setting forth rule-based triggers that are employed for automated re-direction of transactional workflow upon automated detection thereof during the QR driven access control processes executing on system servers of the present invention;

FIG. 3 is a table showing the Multi-Level QR Code Hierarchy comprising (i) Device/Vehicle-Level QR Codes intelligently encoded with data attributes including facility (park), site, vehicle, rental (e.g. timed/daily), skin-kind, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention;

FIG. 8C is a schematic representation in the form of a locally maintained table showing the various mobility vehicle records maintained and updated for each vehicle #, in the networked rideable vehicle system of the present invention, during each rental transaction supported at the site within the facility in which the electric convenience vehicle systems of the present invention are deployed;

FIG. 8D is a schematic representation in the form of a globally maintained table showing the various vehicle records maintained and updated for each networked device #, during each rental transaction supported at the site within the facility in which the vehicle system is deployed;

FIG. 8F is a schematic representation of the specification of GPS-defined geo-fences operational for particular groups of vehicles deployed within the GPS-tracked vehicle access control system network of the present invention, wherein for each defined geo-fence system, a specific of vehicle ID numbers are assigned for the system to automatically track and maintain GPS-tracking constraints of where any particular ride vehicle is permitted to travel within a given park facility;

FIG. 8G is a schematic representation of the specification of GPS-defined electric battery recharging service stations deployed within the GPS-tracking vehicle access control system of the present invention, wherein for each GPS-defined battery recharging service station within the facility, specific vehicle ID numbers are assigned so that the system can automatically enable the recharging of the assigned vehicle on a particular time and date;

FIG. 24F is a flow chart describing the primary steps involved in the method of automatic intelligent passenger seating safety control for use in the in the electric passenger vehicle of the present invention;

FIGS. 27A, 27B, 27C and 27D, taken together, provide a flow chart describing the primary steps involved in carrying out a method of renting, accessing and controlling a networked vehicle (e.g. entertainment vehicle, stroller, etc.) of the present invention by scanning a Facility-Level QR Code at the park, and then scanning a Device-Level QR Code on the networked vehicle at a ride/attraction site so as to access and use the device under the executed rental agreement;

FIG. 29 is a flow chart describing the primary steps involved in carrying out the method of renting, accessing and controlling a networked device (e.g. ride vehicle) of the present invention by scanning facility-level QRS code at park, and then scanning a device/vehicle-level QRS code on the networked vehicle typically parked nearby a rental kiosk within the facility;

FIGS. 31A, 31B, and 31C, taken together, provide a flow chart describing a method of managing access control to a networked vehicle of the present invention by scanning site-level QRS codes posted at a particular site in an amusement park facility, using a mobile smartphone wireless connected to the wireless access control system network of the present invention;

Figure 7A:
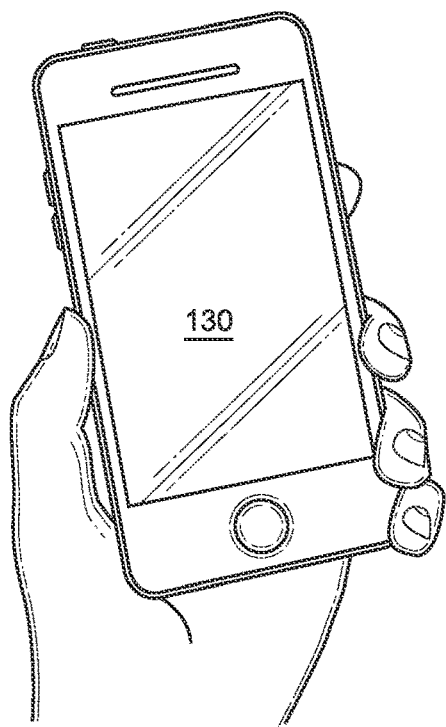
FIG. 7A is a perspective view of a mobile smartphone system (e.g. Apple iPhone device)
Figure 32A:
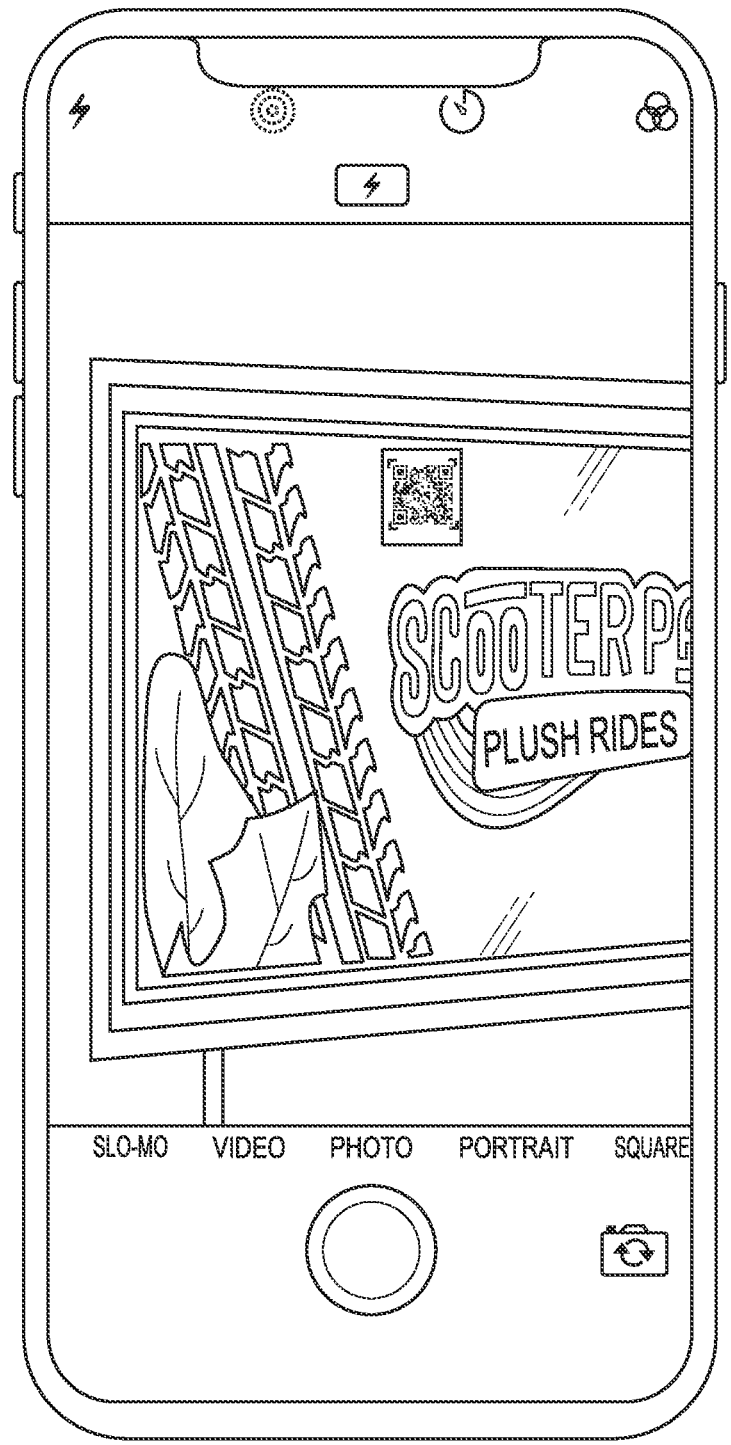
FIG. 32A is a graphical user interface (GUI) screen of the mobile smartphone shown in FIG. 7A, deployed on the wireless access control system network of the present invention, and showing the first step in the site-level access control method involving (i) the scanning of a Site-Level QR Code as shown in FIGS. 26A and 26B, and (ii) automatically directing the smartphone web-browser application (e.g. Apple Safari) to parse and analyze the scanned QR code and serve, load and display the webpage specified by the URL encoded in the Site-Level QR Code as illustrated in table of FIG. 3, and whereupon, the application server stores a "Rental Transaction Identifier-Site Entry" (RTI-SE) within the cache on the mobile smartphone.
Figure 32B:
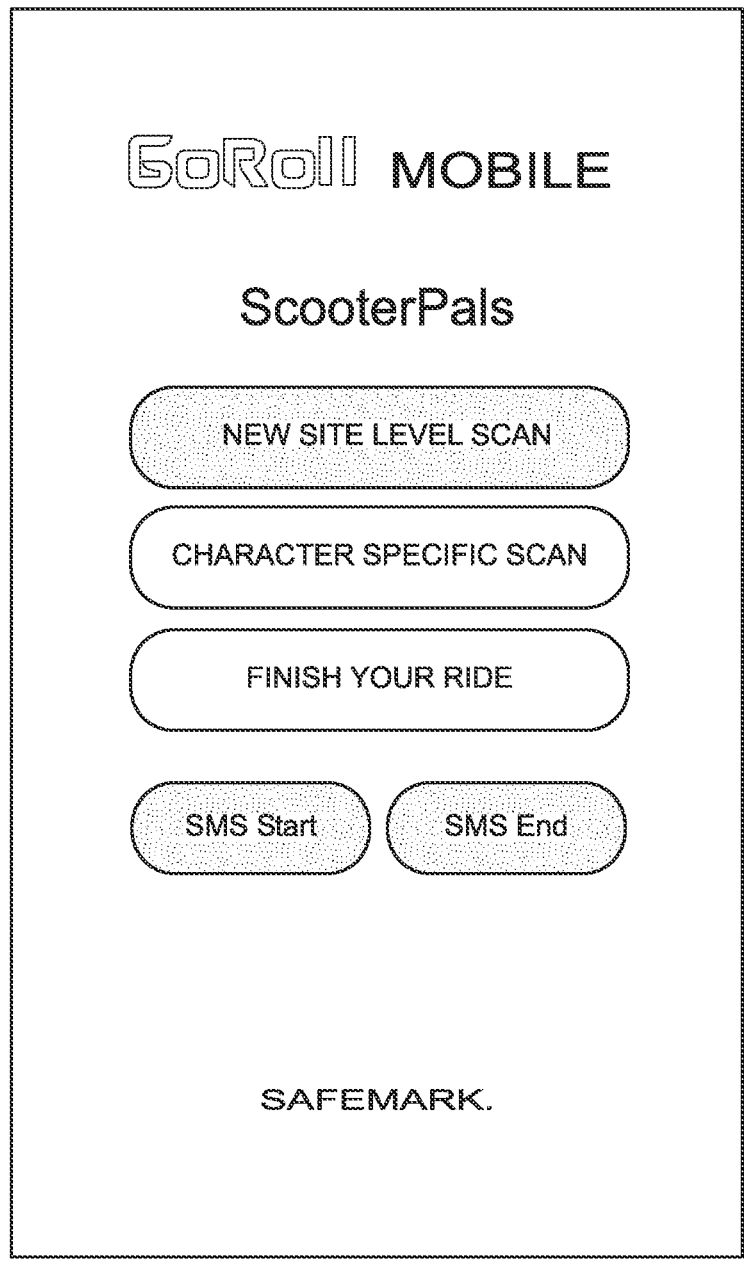
FIG. 32B is a graphical user interface (GUI) screen of the mobile smartphone shown in FIG. 7A, deployed on the wireless access control system network of the present invention, and showing the second step in the method involving the selection of one or more options from the group consisting of (i) site-level scanning, (ii) character-specific scanning, and (iii) finish your ride.
Figure 32C:
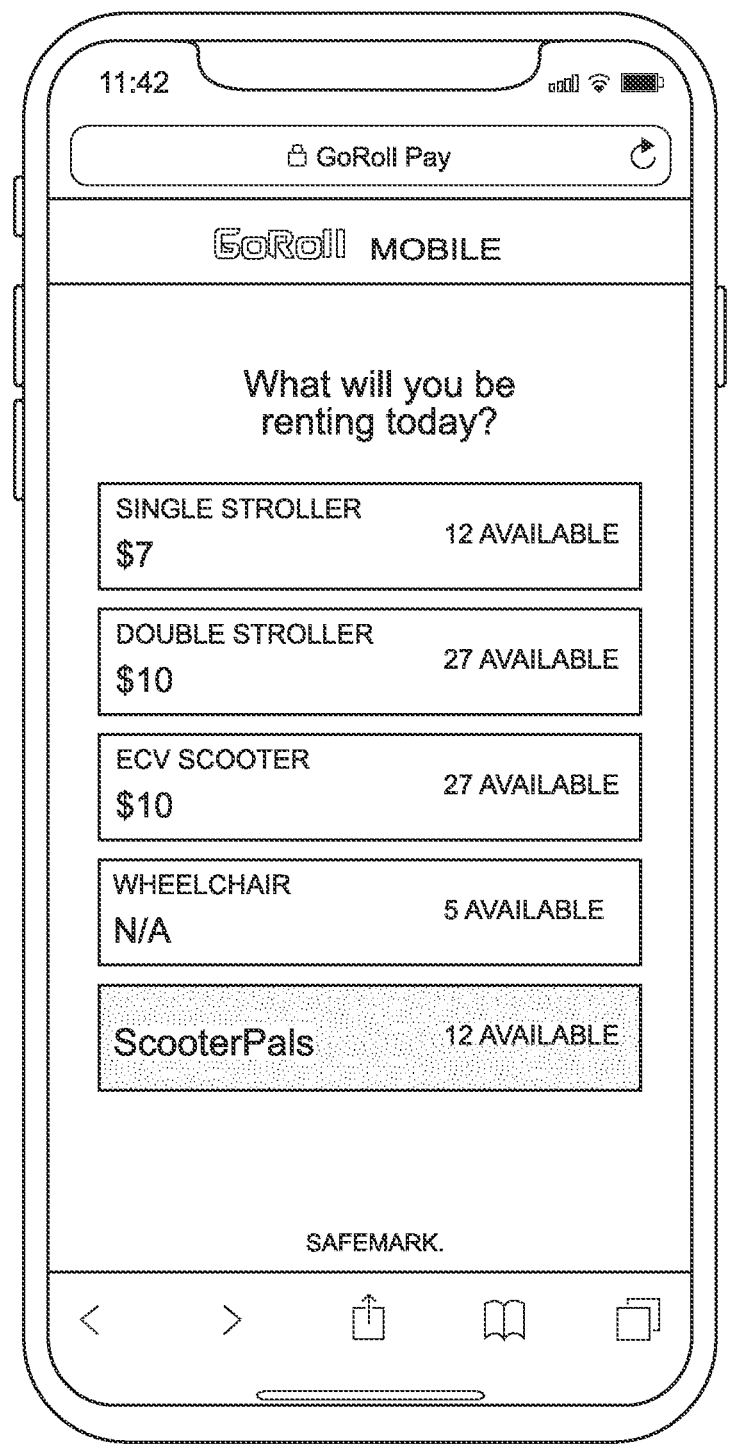
Figure 32D:
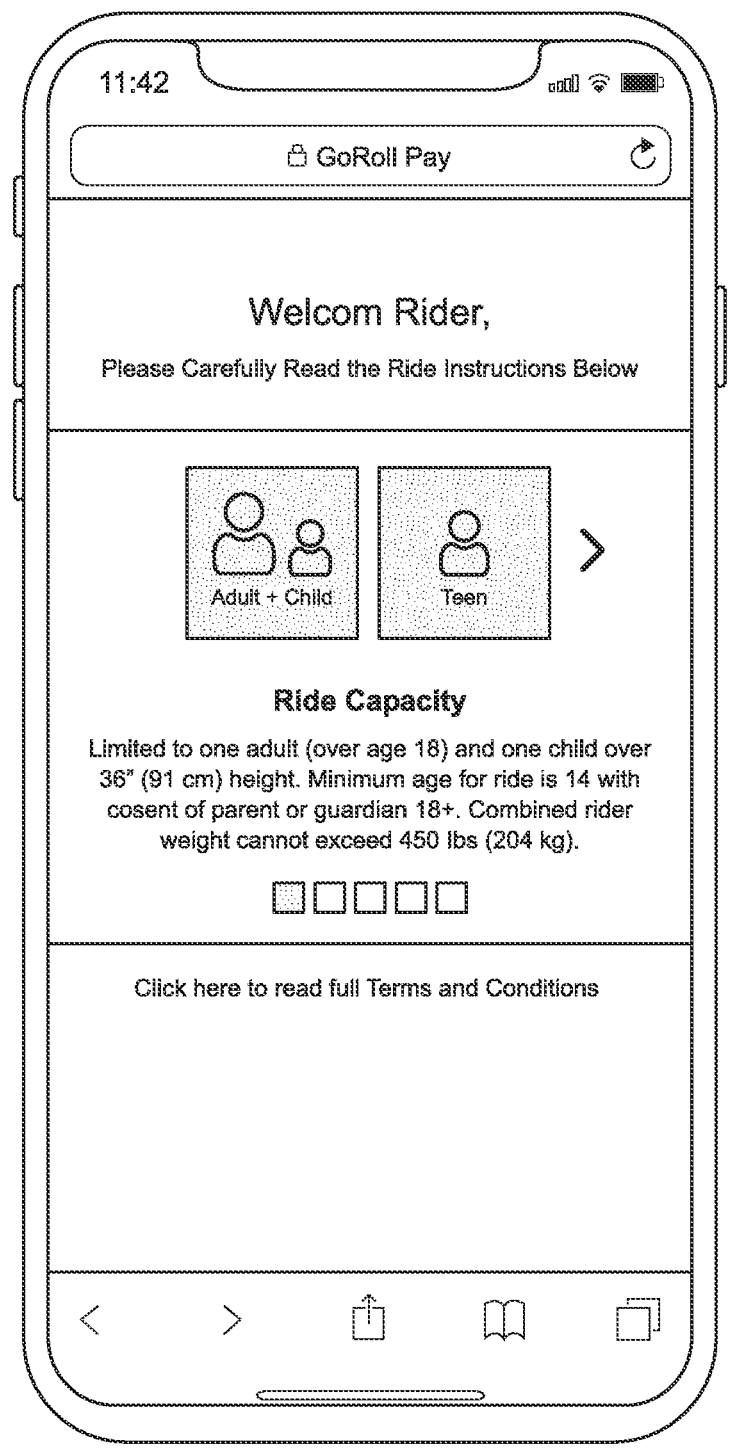
Figure 32E:
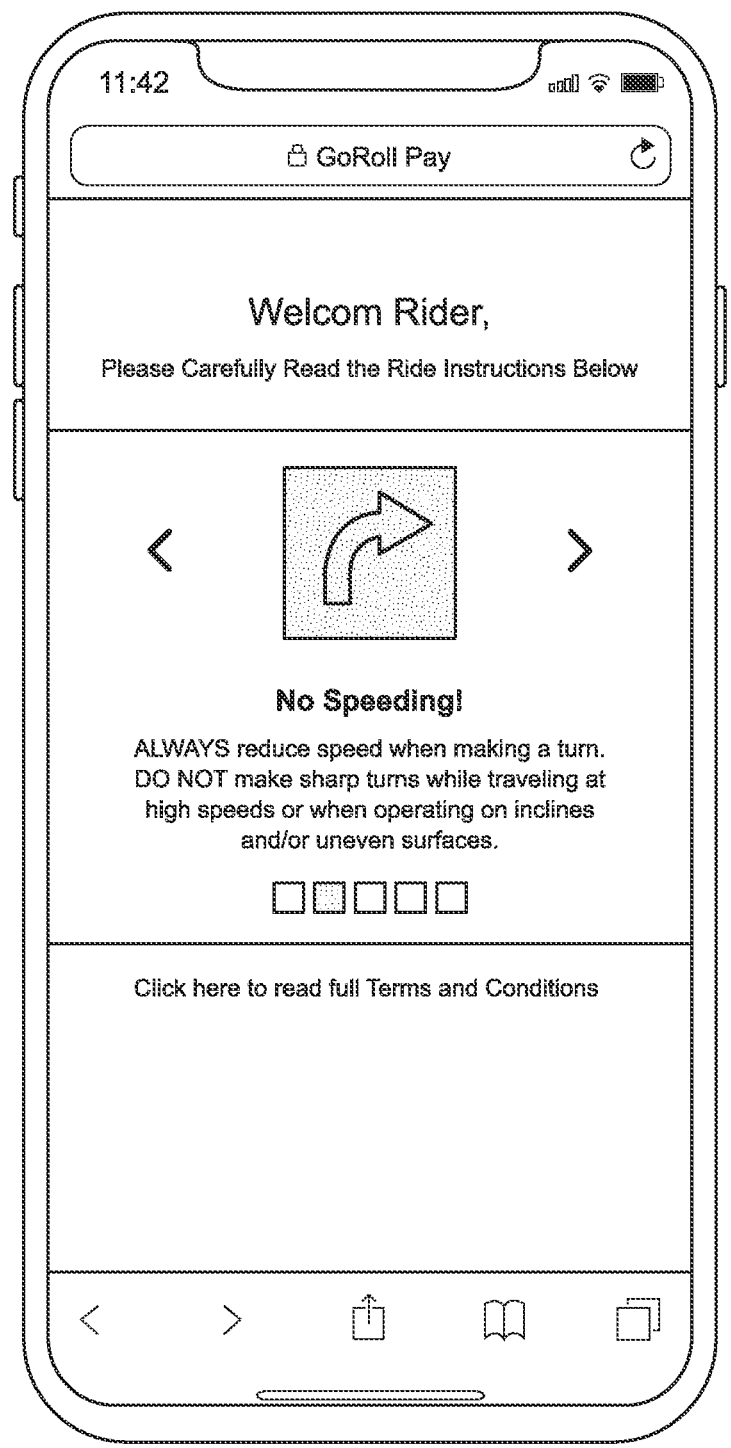
Figure 32F:
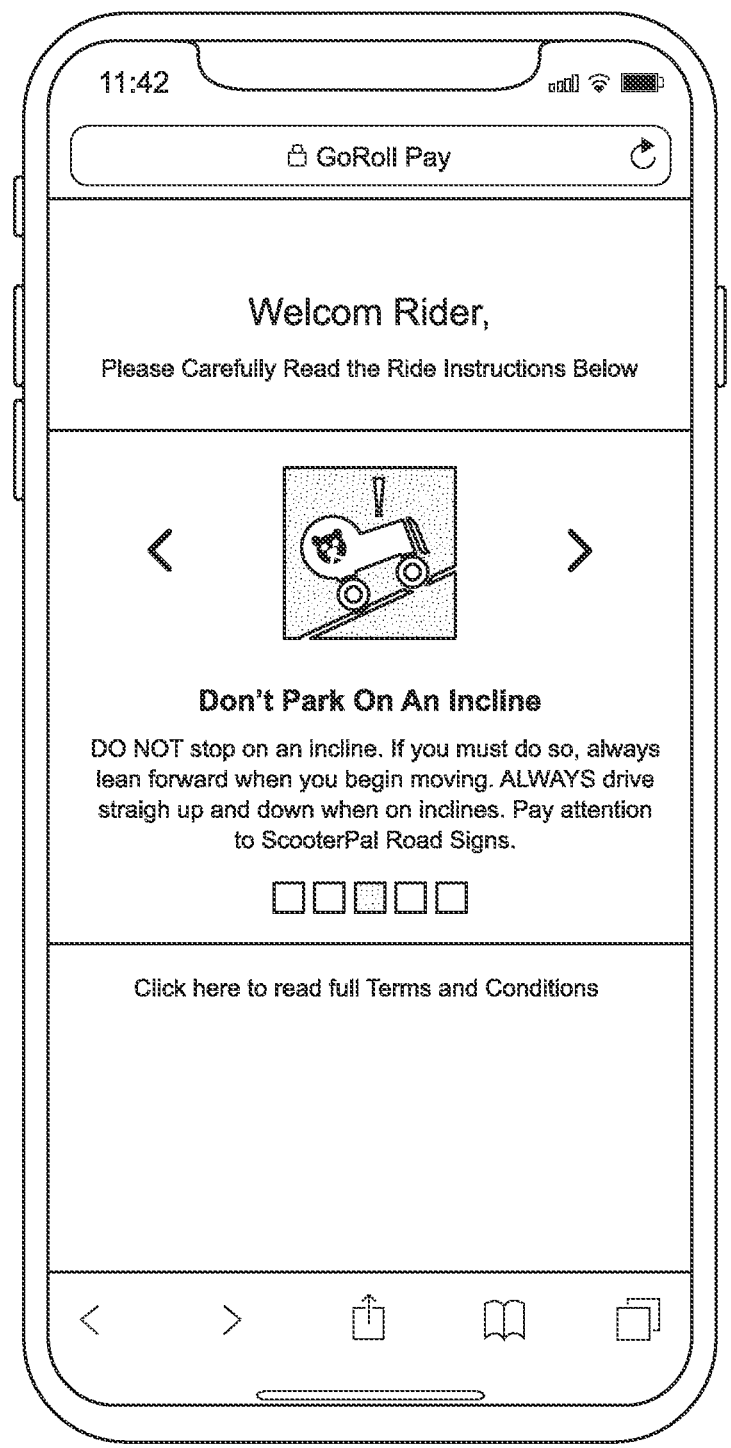
Figure 32G:
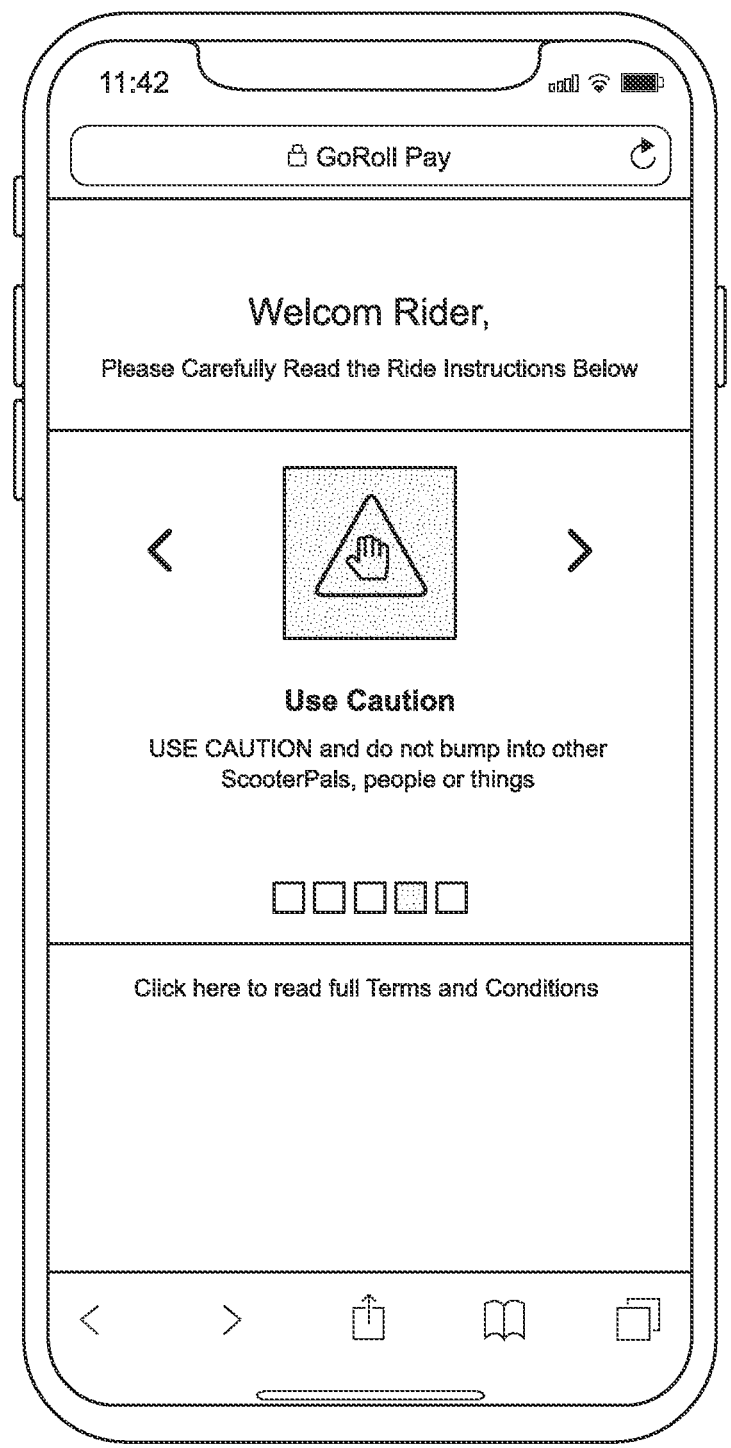
Figure 32H:
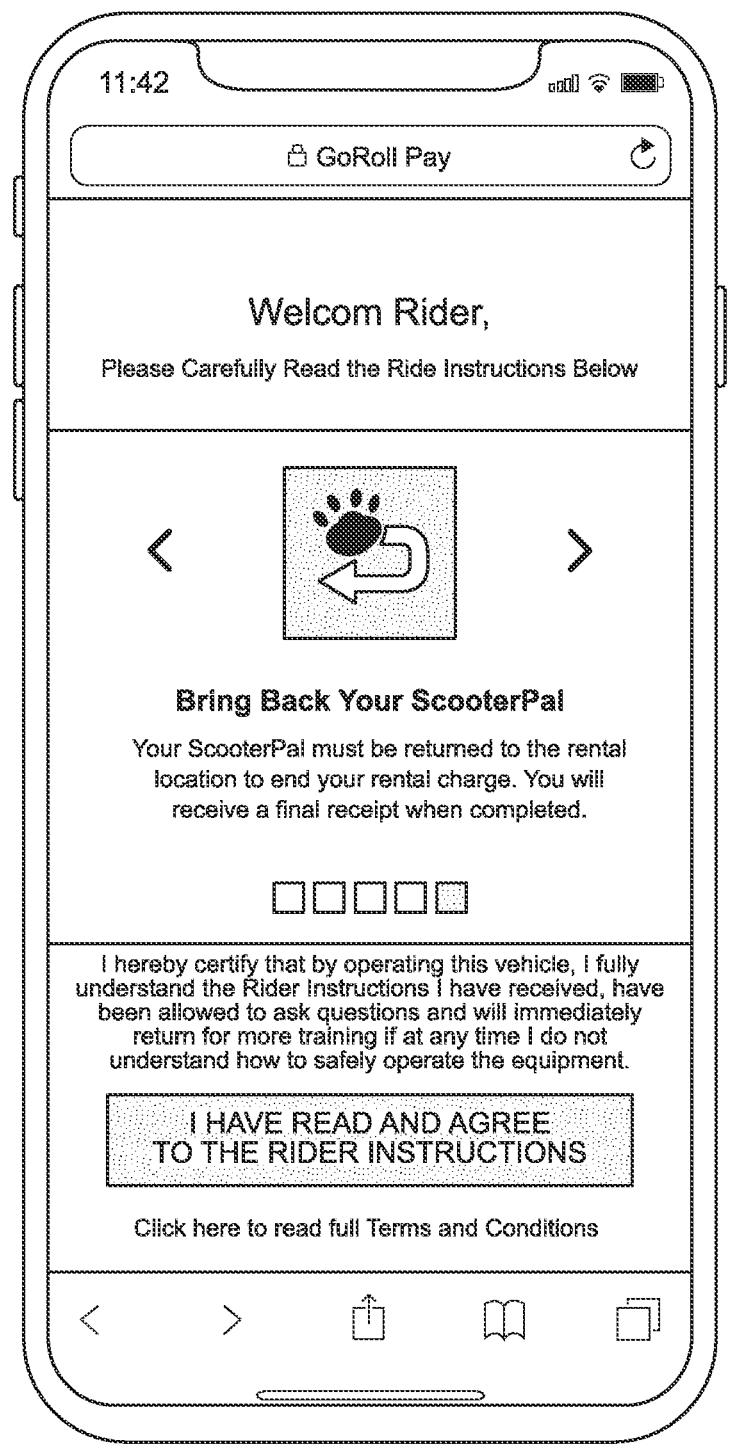
Figure 32I:
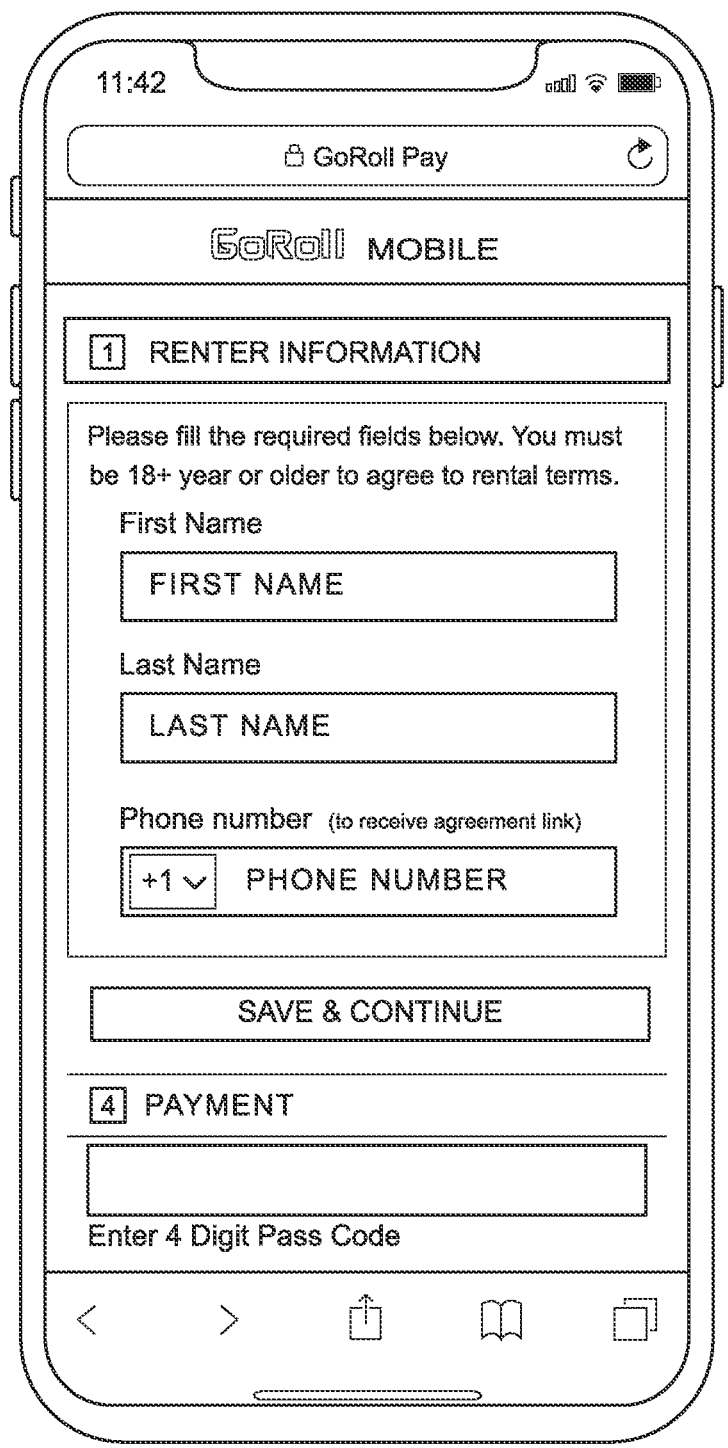
Figure 32J:
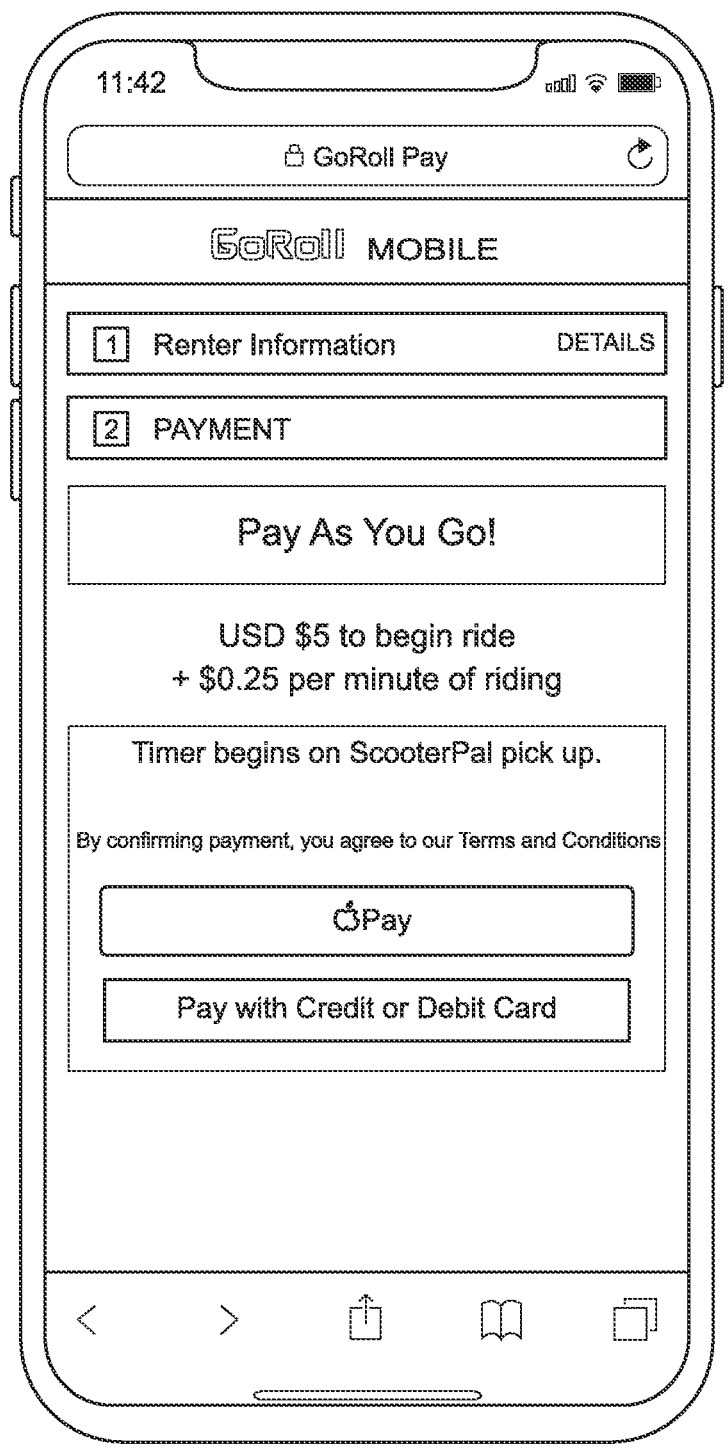
Figure 32K:
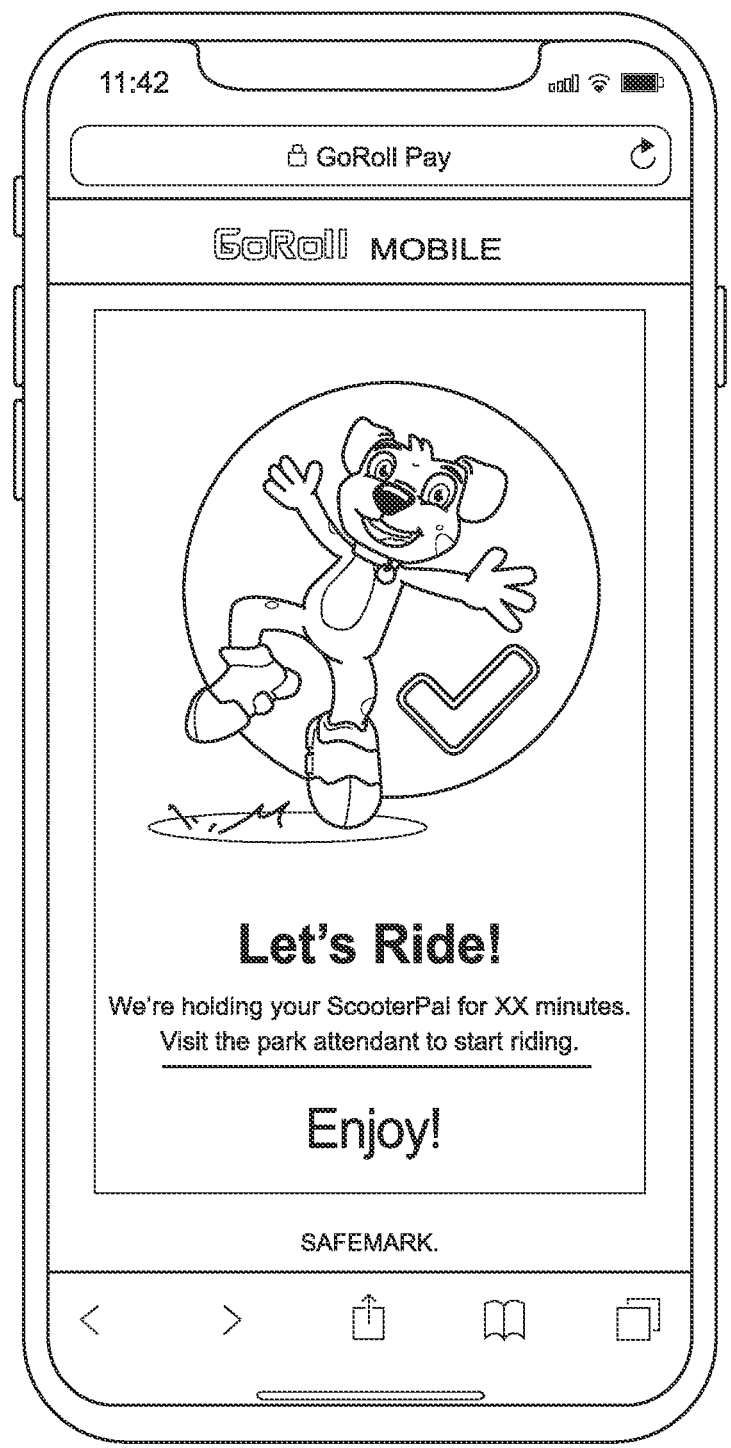
Figure 32L:
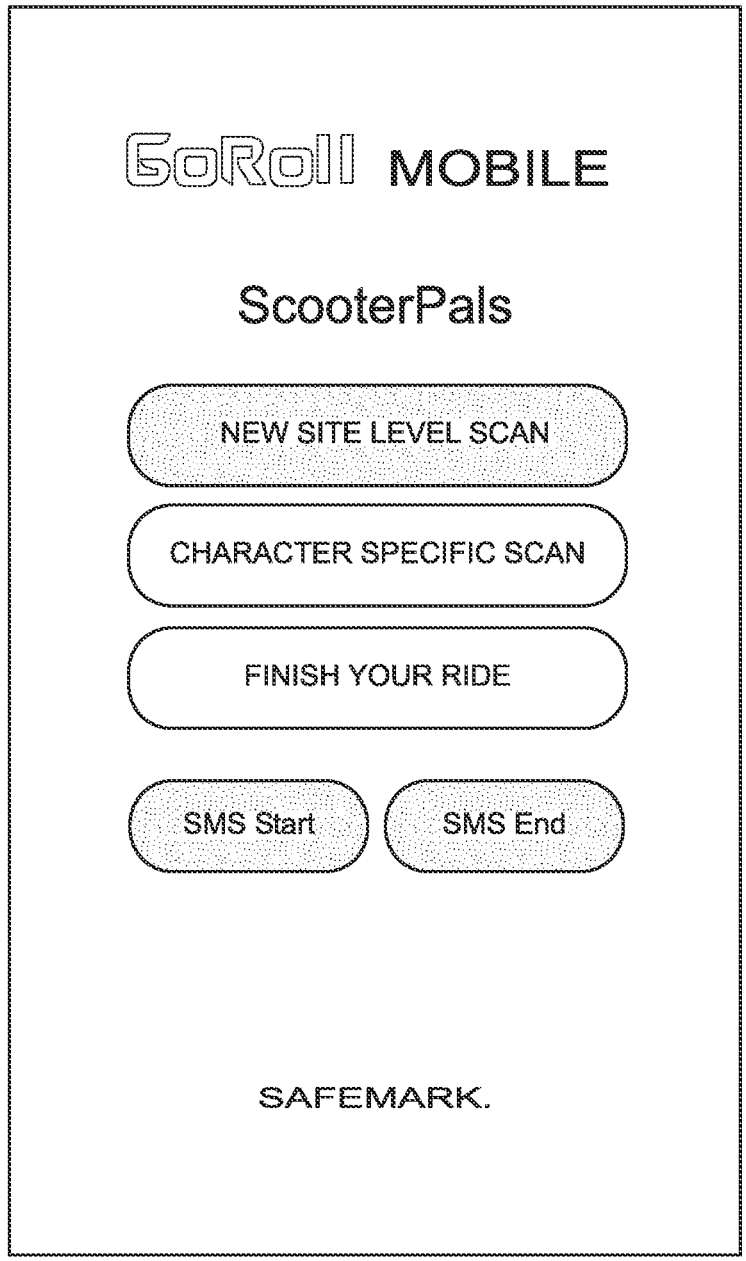
Figure 32M:
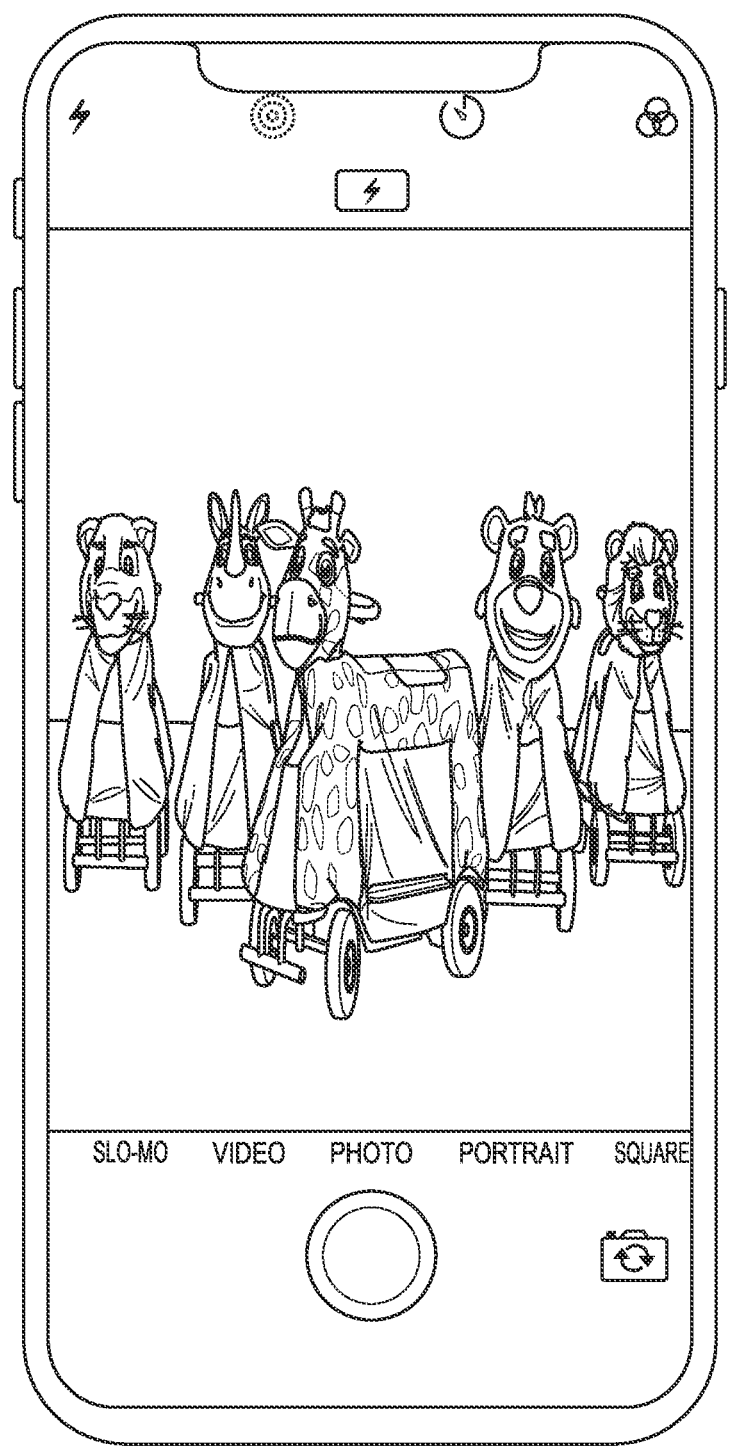
Figure 32N:
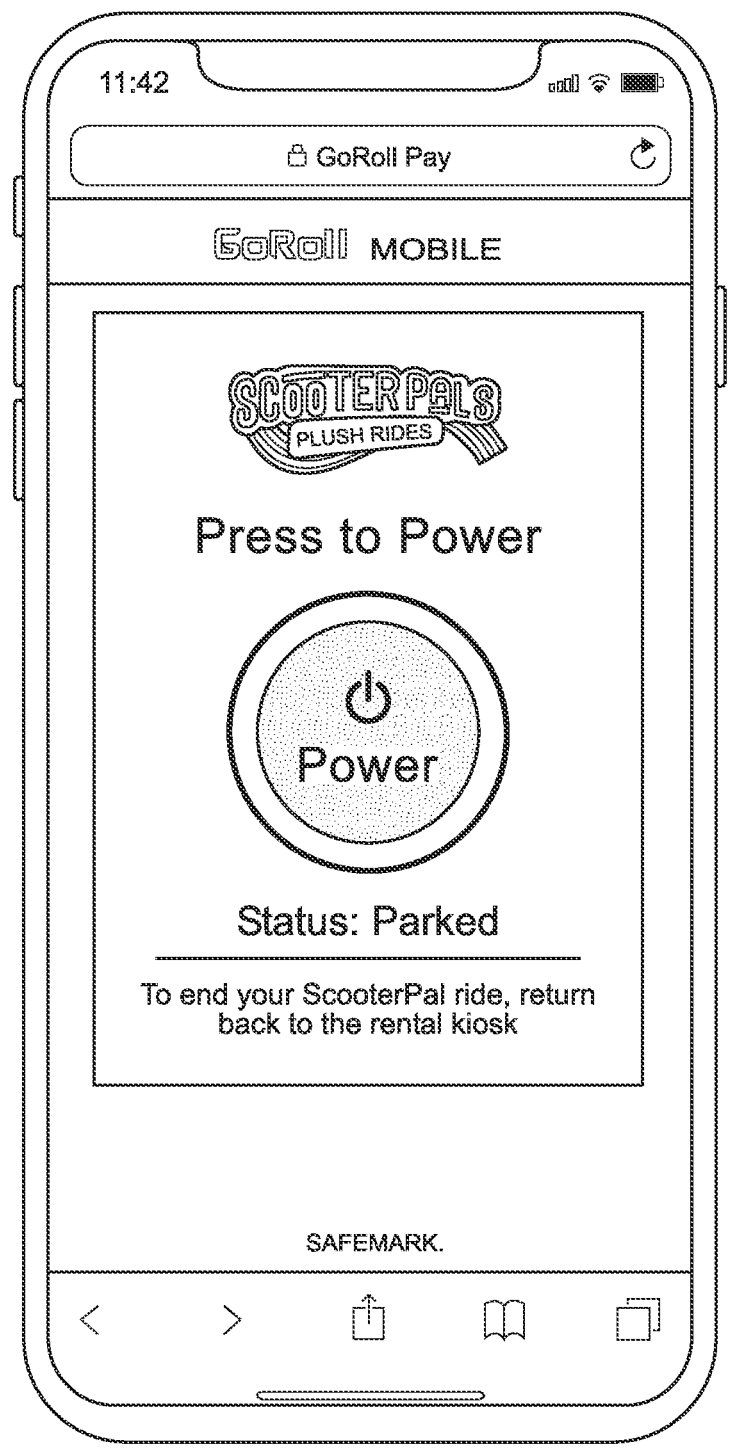
Figure 32O:
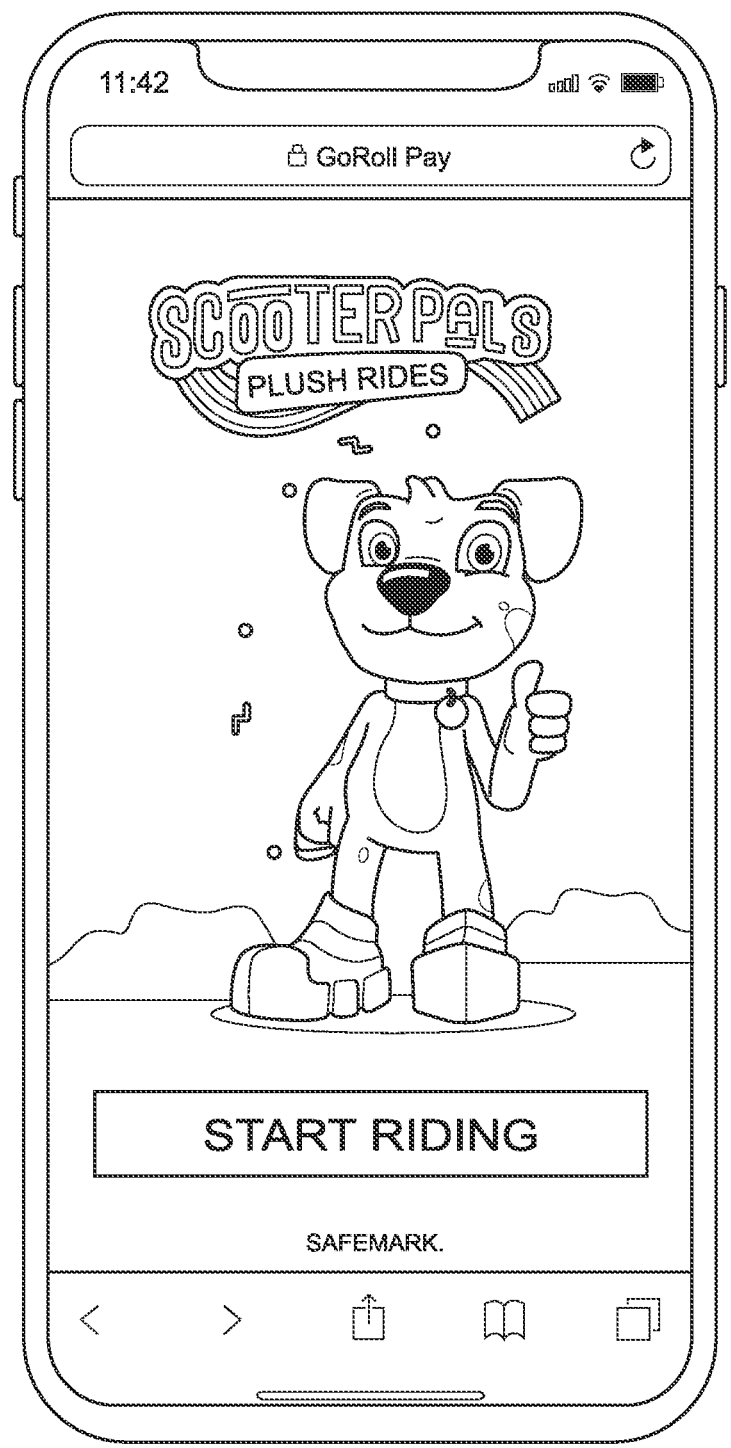
Figure 32P:
Figure 33:
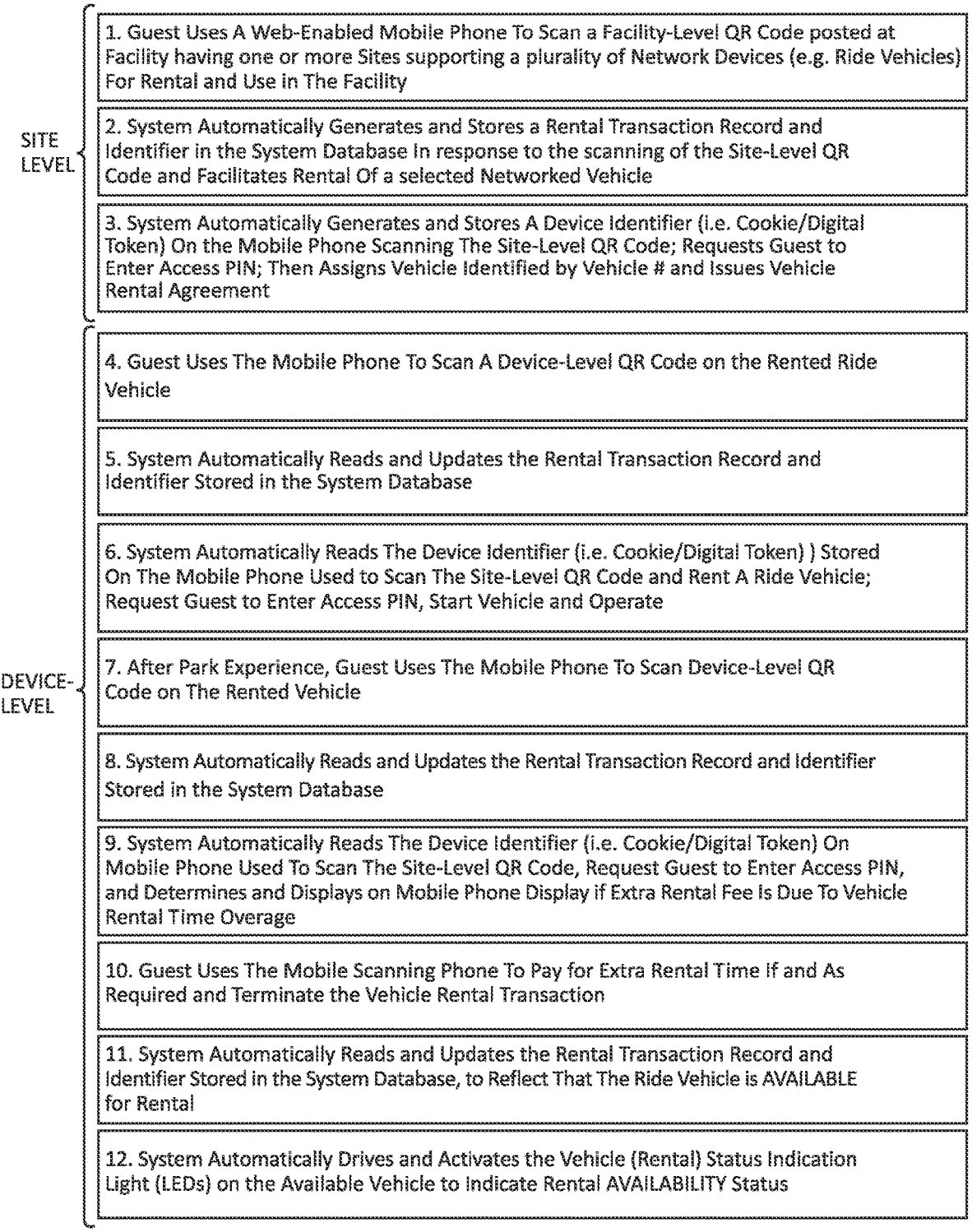
Figure 34A:
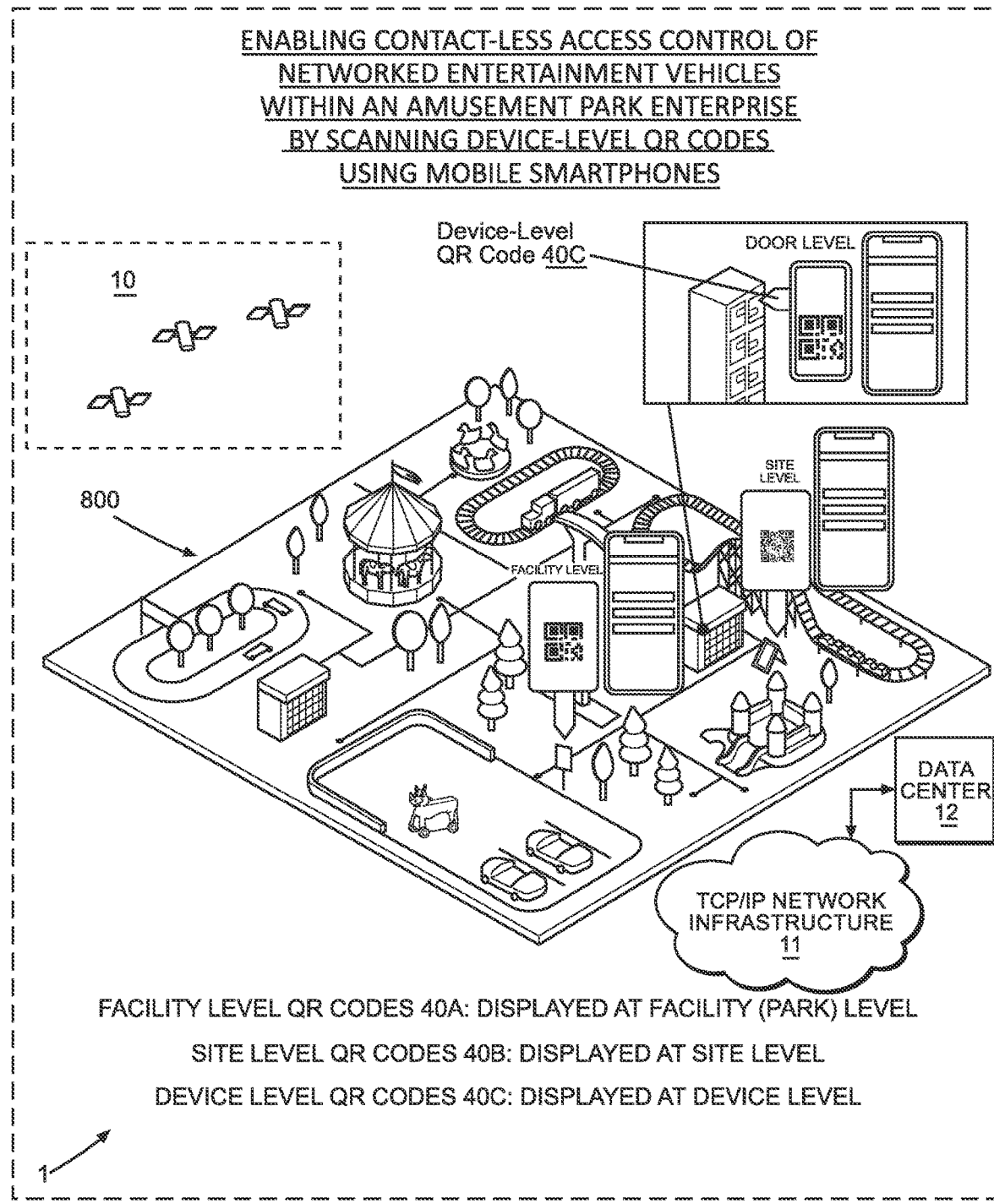
Figure 34B:
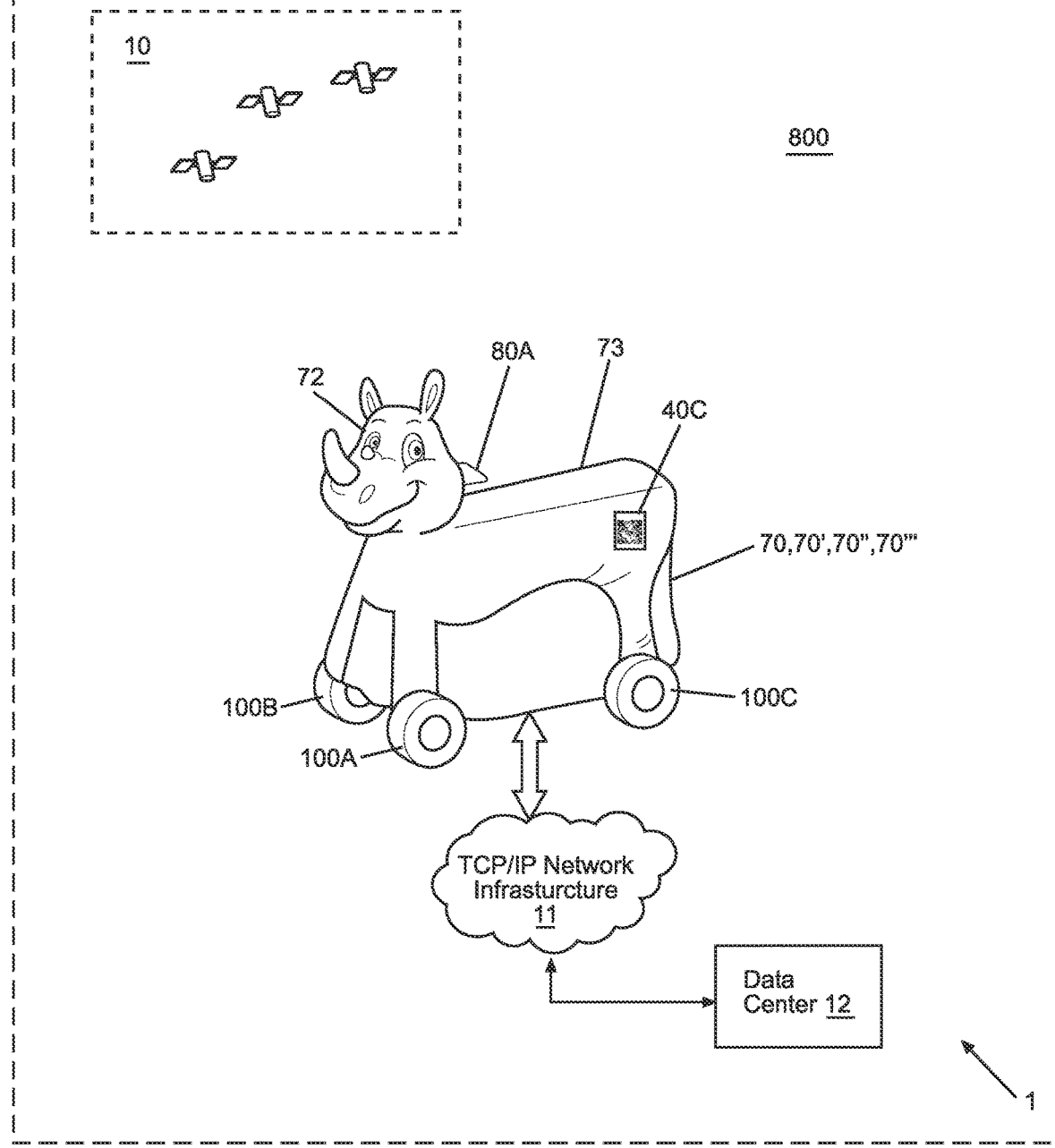
Figure 35A:
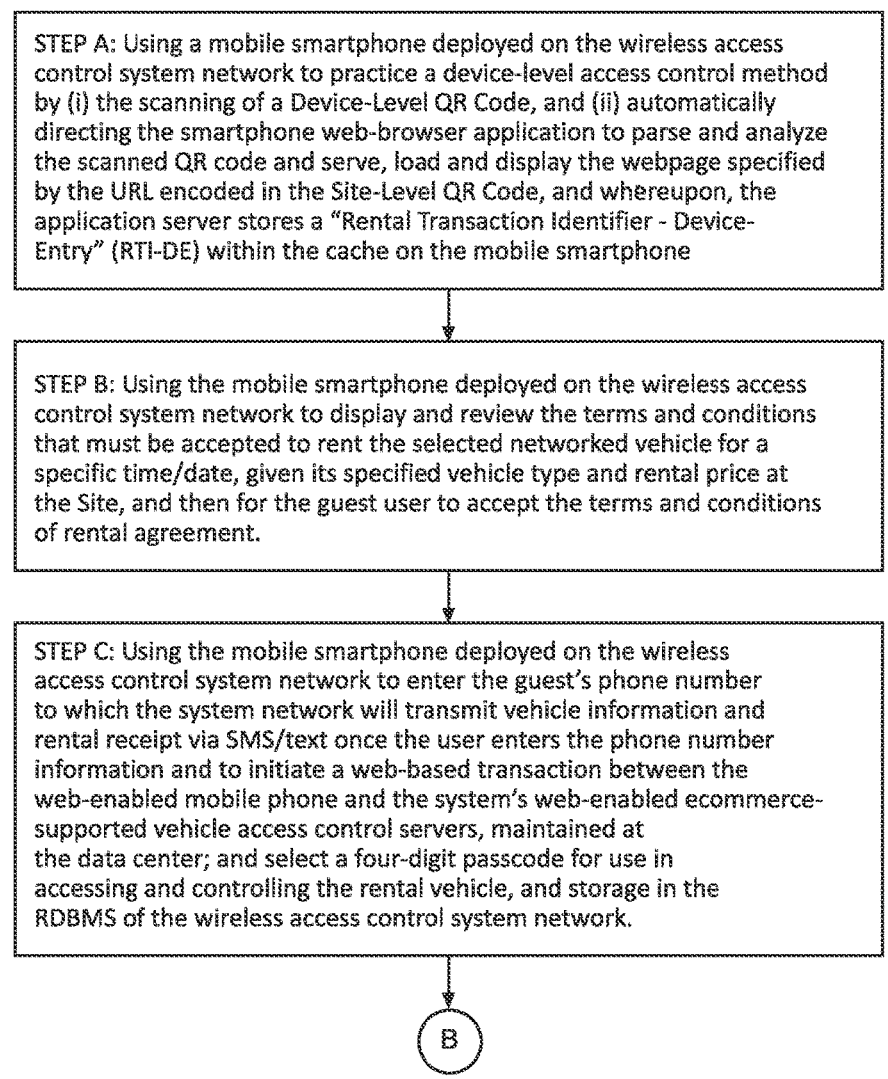
Figure 36A:
Figure 36B:
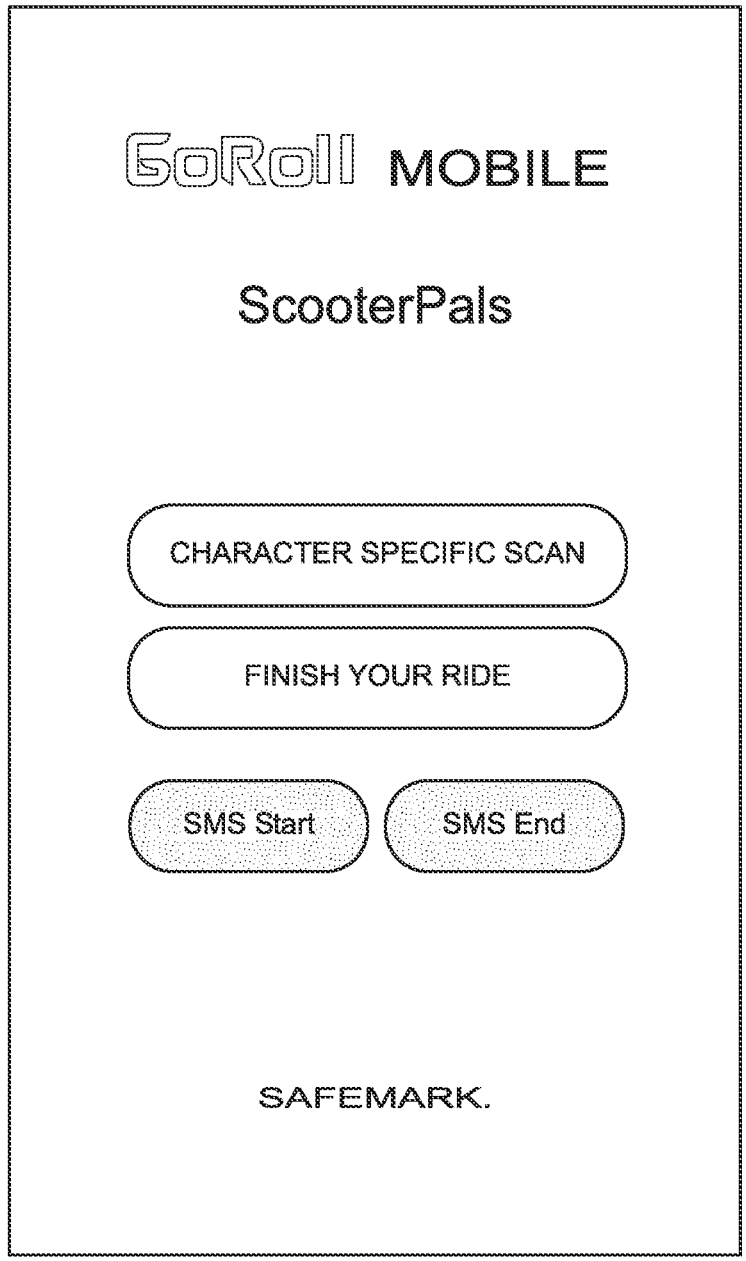
Figure 36C:
Figure 36D:
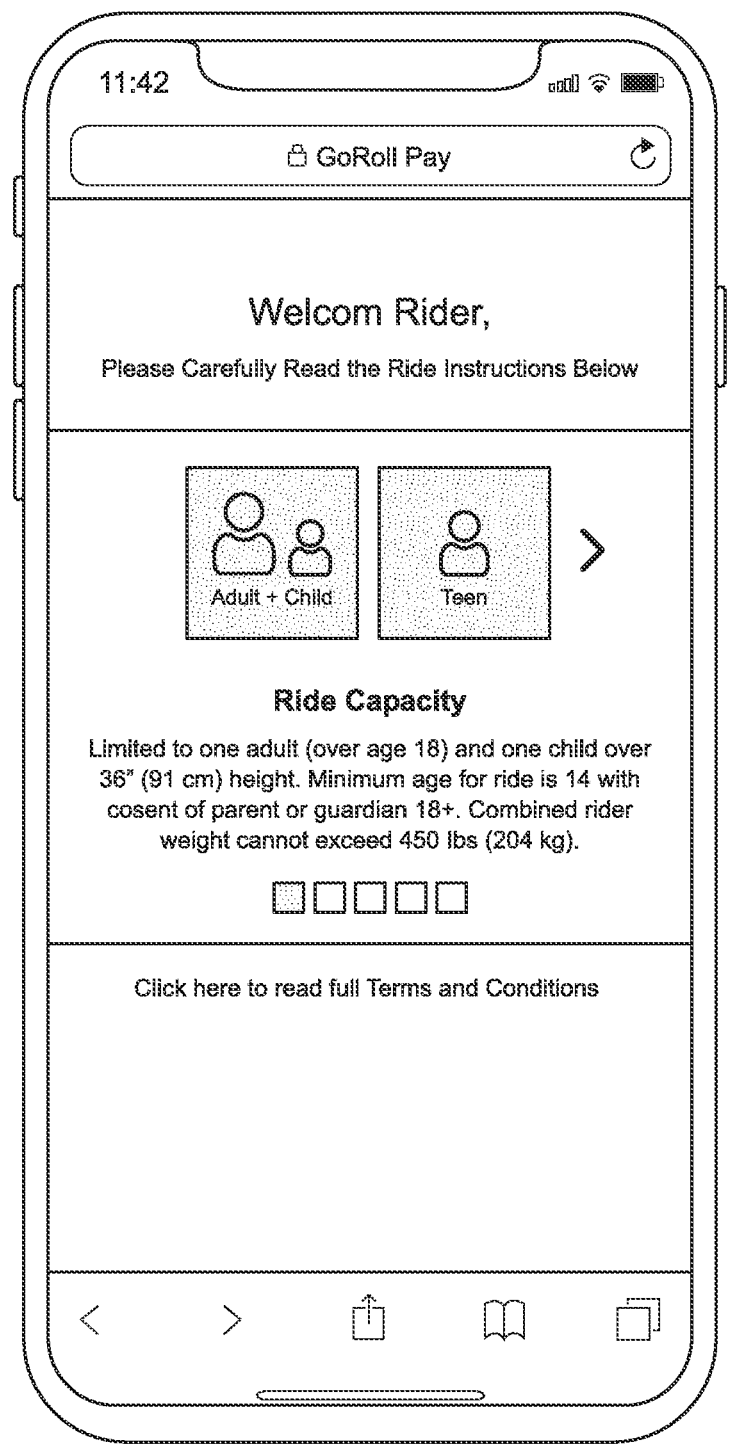
Figure 36E:
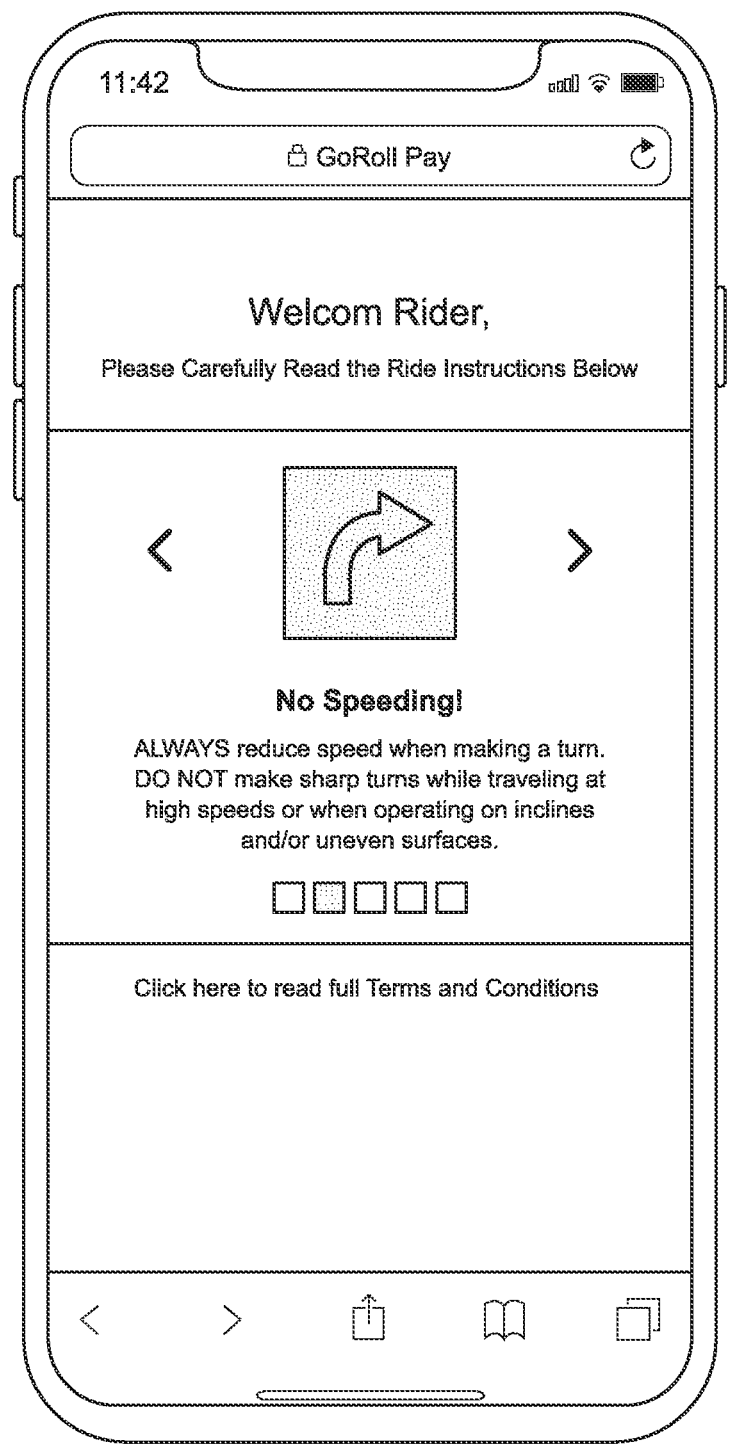
Figure 36F:
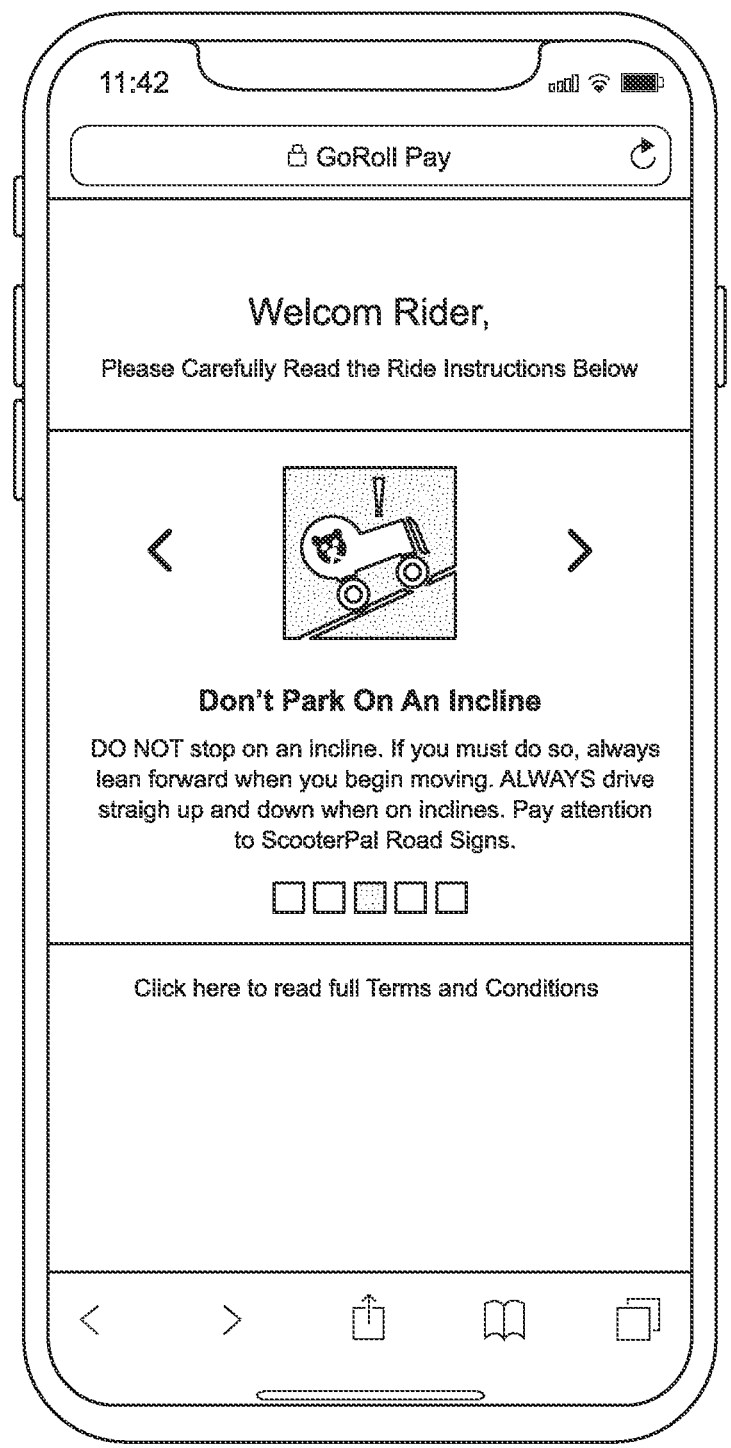
Figure 36G:
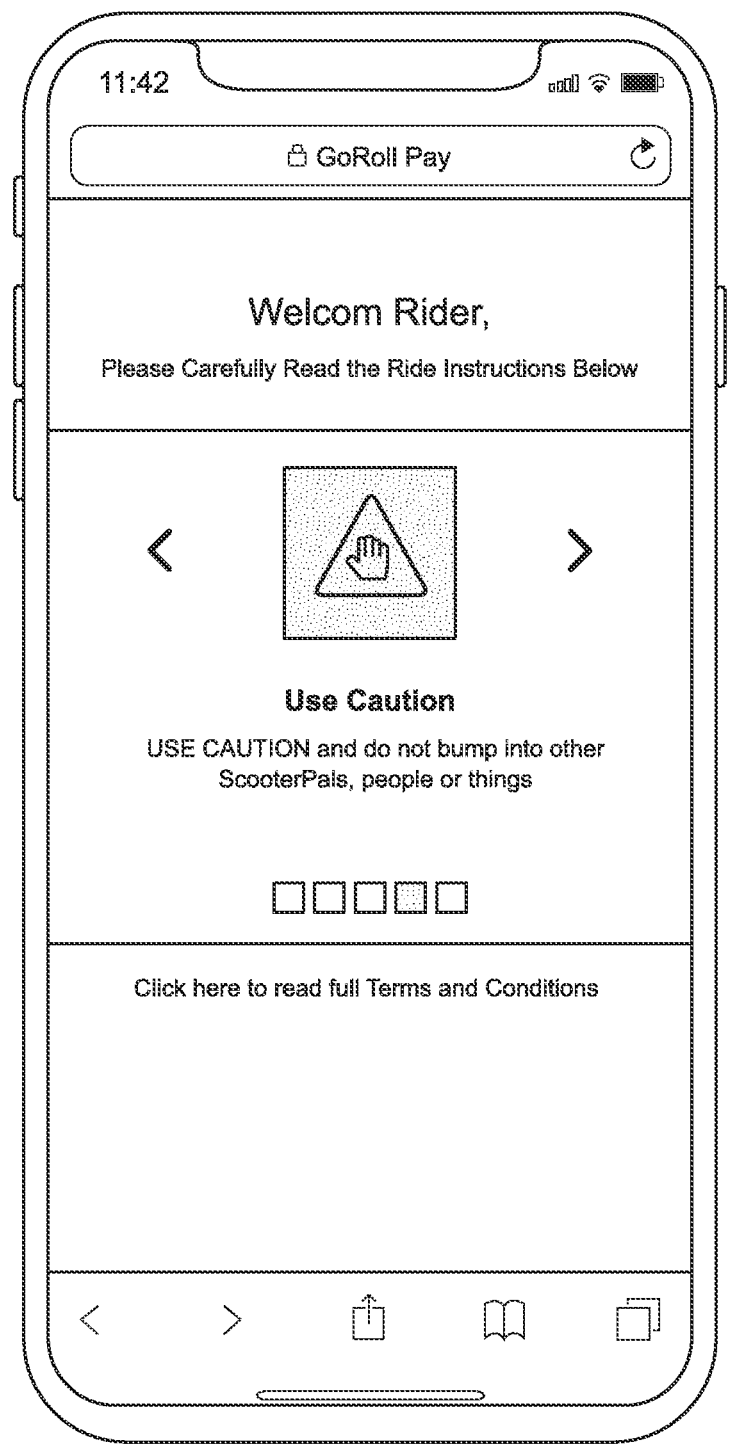
Figure 36H:
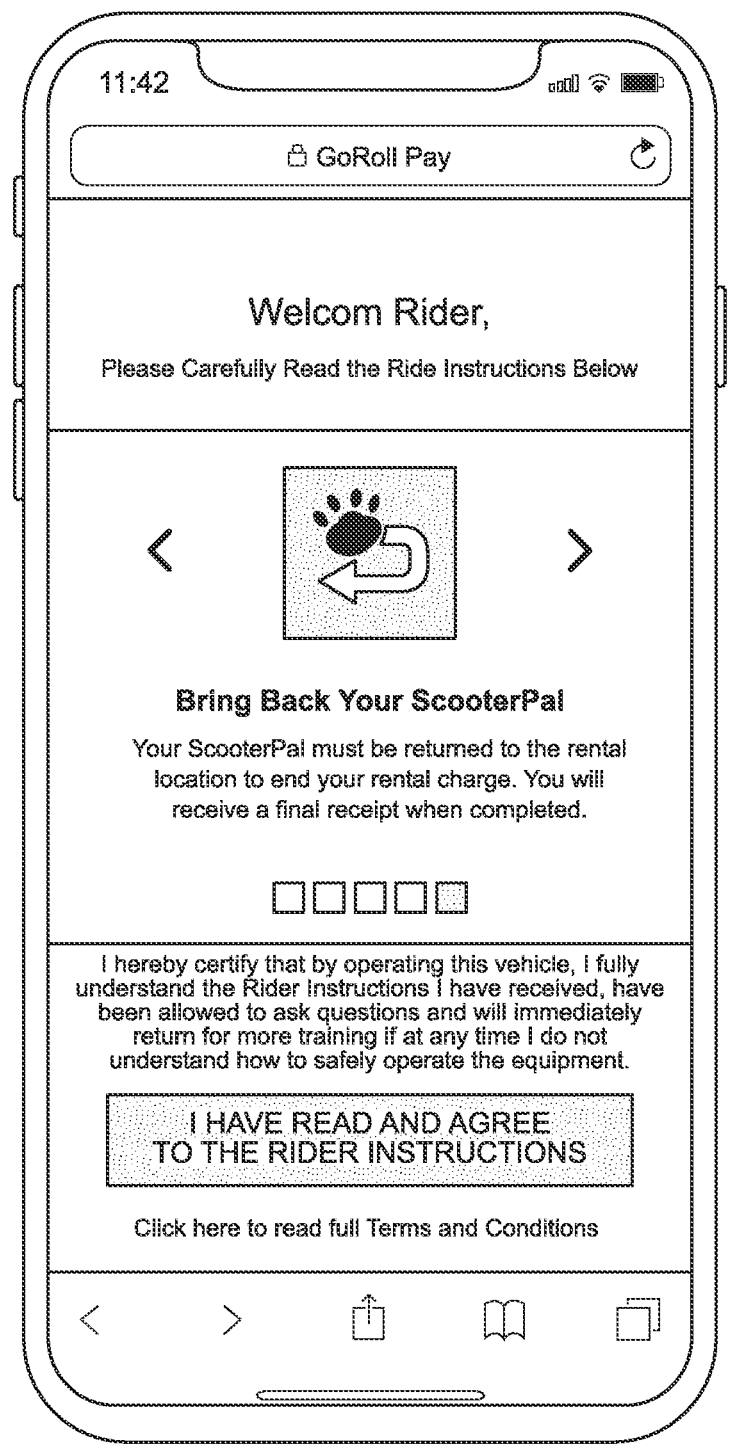
Figure 36I:
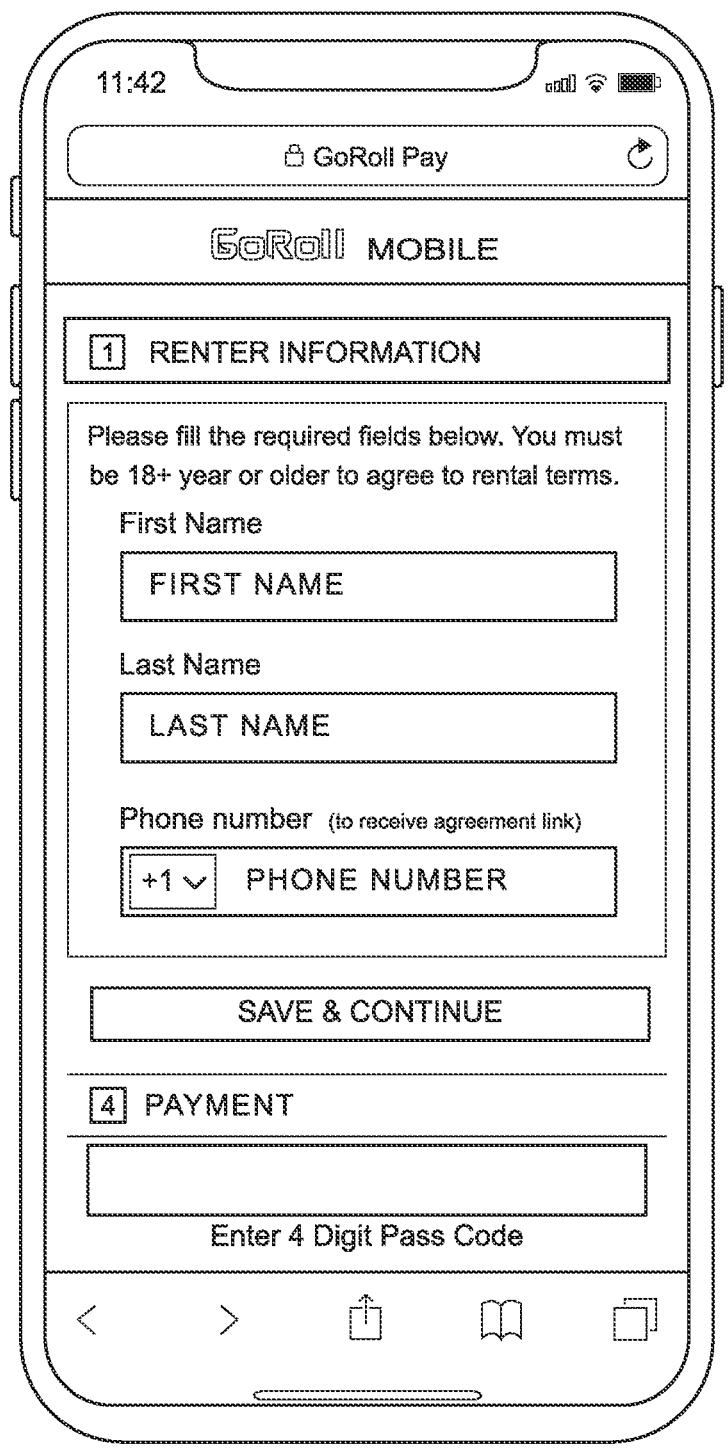
Figure 36J:
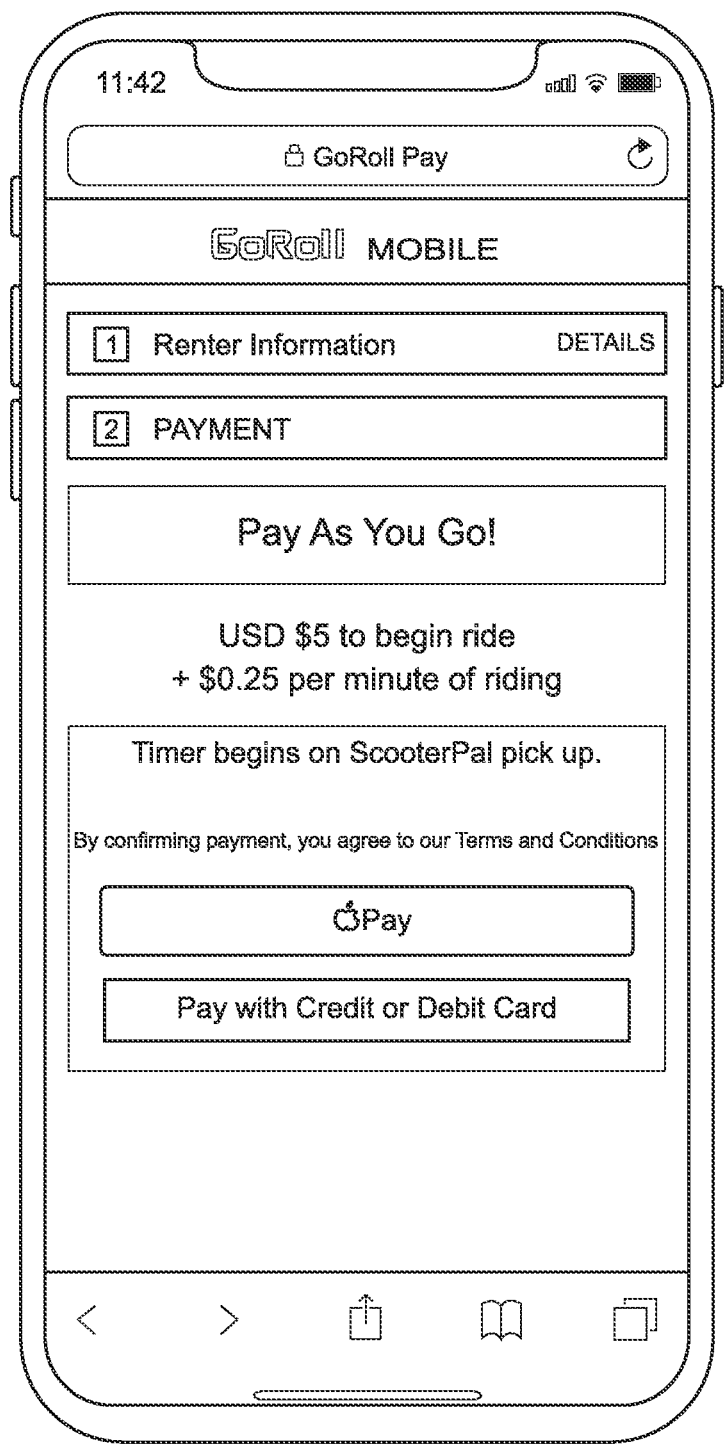
Figure 36K:
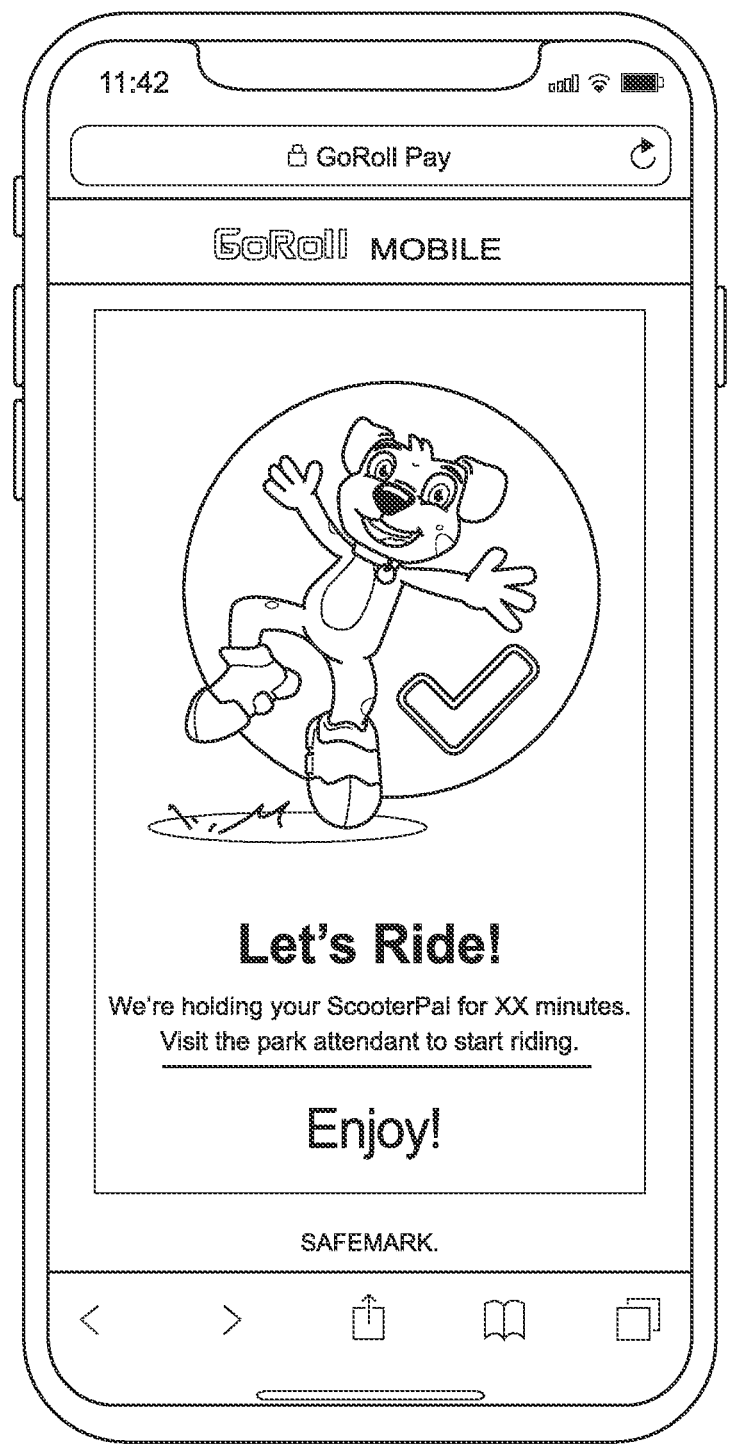
Figure 36L:
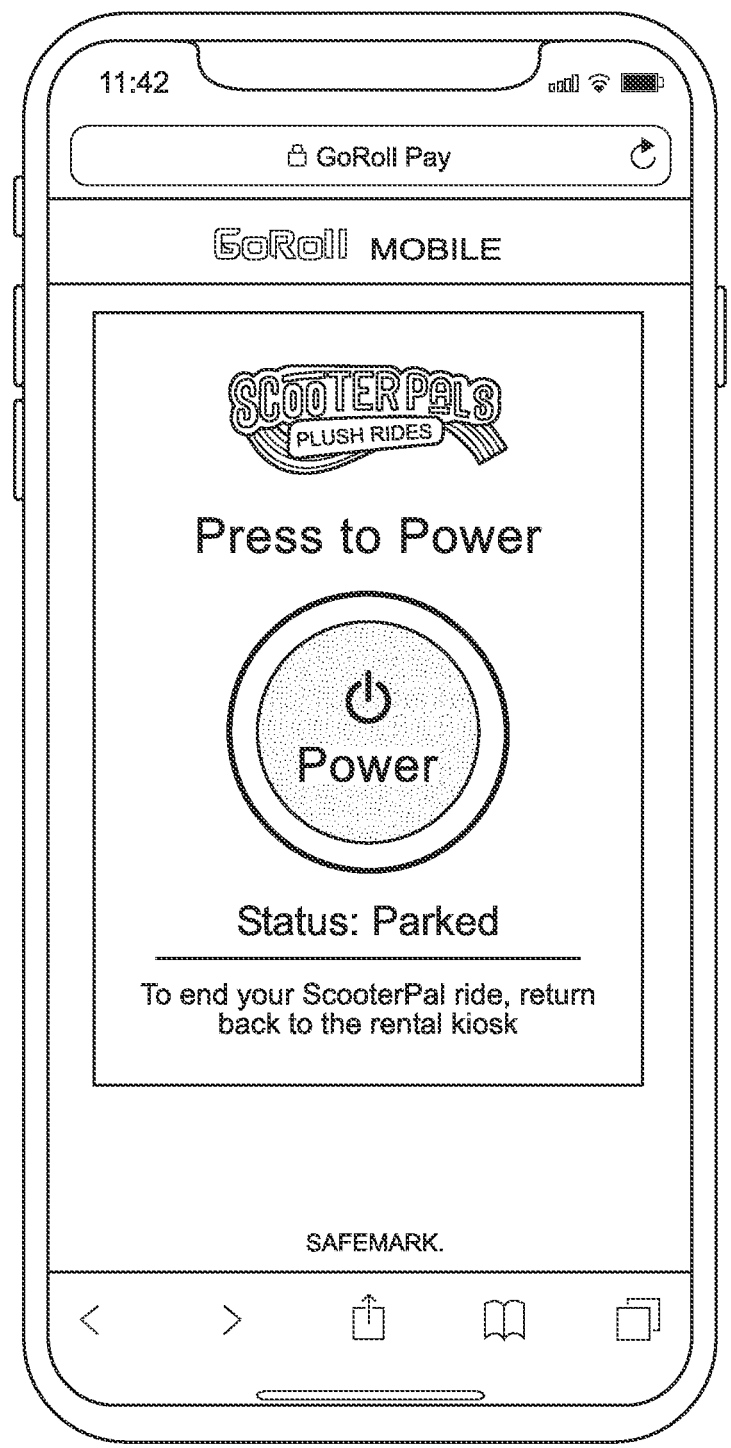
Figure 36M:
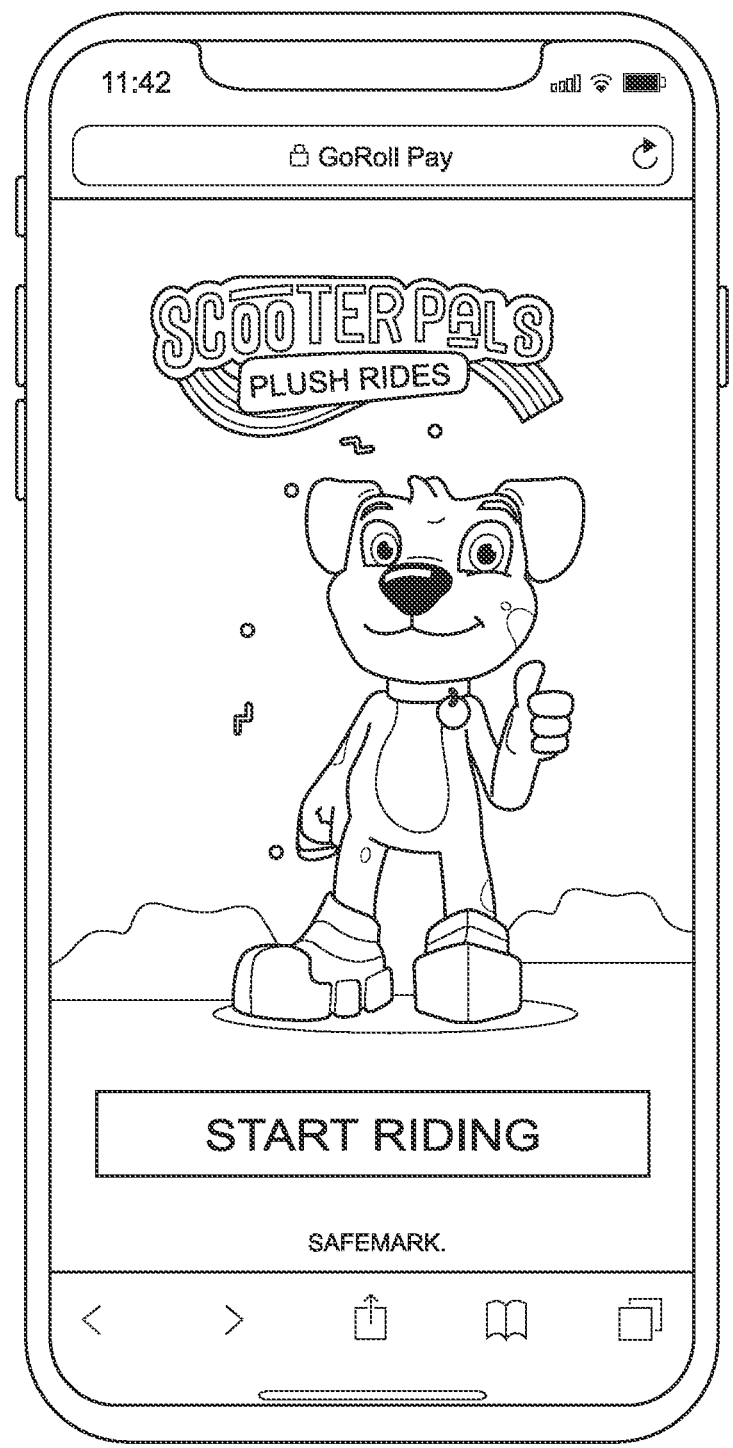
Figure 36N:
Figure 37:
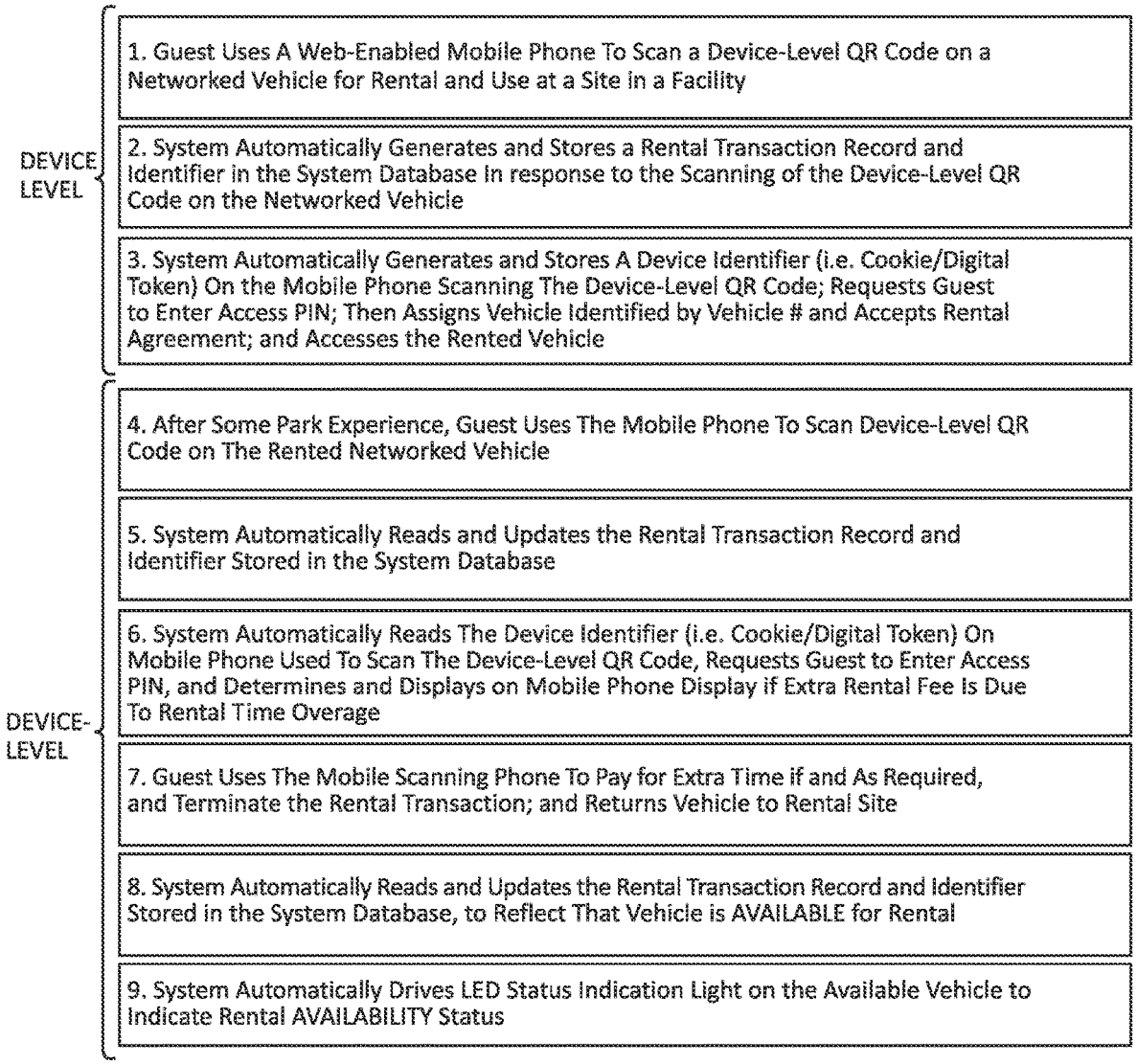

FIG. 32C is a graphical user interface (GUI) screen of the mobile smartphone shown in FIG. 7A, deployed on the wireless access control system network of the present invention, and showing the third step in the site-level access control method of the present invention involving the selection of a particular mobility vehicle (e.g. networked entertainment vehicles, single and double strollers, ECV scooters, and wheelchairs) at the selected Site within the Facility which the guest user would like to rent and access a rideable vehicle under the terms and conditions of the rental agreement;

FIG. 32D is a graphical user interface (GUI) screen of the mobile smartphone shown in FIG. 7A, deployed on the wireless access control system network of the present invention, and showing the fourth step in the site-level access control method of the present invention involving the guest user being advised on rider capacity under the terms and conditions of the rental agreement;

FIG. 32E is a graphical user interface (GUI) screen of the mobile smartphone shown in FIG. 7A, deployed on the wireless access control system network of the present invention, and showing the fifth step in the site-level access control method of the present invention involving the guest user being advised on policy of no speeding under the terms and conditions of the rental agreement;

FIG. 32F is a graphical user interface (GUI) screen of the mobile smartphone shown in FIG. 7A, deployed on the wireless access control system network of the present invention, and showing the sixth step in the site-level access control method of the present invention involving the guest user being advised on policy of no parking on an incline road surface under the terms and conditions of the rental agreement;

FIG. 32G is a graphical user interface (GUI) screen of the mobile smartphone shown in FIG. 7A, deployed on the wireless access control system network of the present invention, and showing the seventh step in the site-level access control method of the present invention involving the guest user being advised on policy of always using caution under the terms and conditions of the rental agreement;

FIG. 32H is a graphical user interface (GUI) screen of the mobile smartphone shown in FIG. 7A, deployed on the wireless access control system network of the present invention, and showing the eighth step in the site-level access control method of the present invention involving the guest user being advise on policy of returning and parking the rented vehicle to the original rental location or other rental kiosk location;

FIG. 32I is a graphical user interface (GUI) screen of the mobile smartphone shown in FIG. 7A, deployed on the wireless access control system network of the present invention, and showing the seventh step in the site-level access control method of the present invention involving the user's provision of (i) first and last name and phone number of mobile phone to be used to access the wireless access control system network, and if required, (ii) a four or fixed digit passcode for use (wherever required) as a second factor authentication when accessing and controlling the rented electric vehicle on the access control network;

FIG. 32J is a graphical user interface (GUI) screen of the mobile smartphone shown in FIG. 7A, deployed on the wireless access control system network of the present invention, and showing the eighth step in the site-level access control method of the present invention displaying the selected rideable vehicle, text receipt phone number, and total price of the vehicle rental (tax included), and providing several options for the user to make payment (e.g. using ApplePay® or using a credit card or debit card of the user, in which case, the card number and expiration date i.e. month/year are requested);

FIG. 32K is a graphical user interface (GUI) screen of the mobile smartphone shown in FIG. 7A, deployed on the wireless access control system network of the present invention, and showing the ninth step in the site-level access control method of the present invention displaying, after the prior payment transaction has been successfully completed, a message that the rented vehicle is ready, along with the vehicle # and a message to ride the vehicle (i.e. "Let's Ride!") by visiting the park attendant at the rental site;

FIG. 32L is a graphical user interface (GUI) screen of the mobile smartphone shown in FIG. 7A, deployed on the wireless access control system network of the present invention, and showing the tenth step in the site-level access control method of the present invention displaying, a screen for use in selecting the character specific scanning function to scan the vehicle/device-level QR code on the specific animal character electric vehicle rented at the site level of the park environment;

FIG. 32M is a graphical user interface (GUI) screen of the mobile smartphone shown in FIG. 7A, deployed on the wireless access control system network of the present invention, and showing the twelfth step in the site-level access control method of the present invention scanning the vehicle-level QR code on the recently rented vehicle using the same mobile smartphone recognized and tagged on the wireless access control system network;

FIG. 32N is a graphical user interface (GUI) screen of the mobile smartphone shown in FIG. 7A, deployed on the wireless access control system network of the present invention, and showing the thirteenth step in the site-level access control method of the present invention displaying, a "Power/Start" button, and a message to select the Power button to power up and ride the vehicle, and commence the vehicle rental;

FIG. 32O is a graphical user interface (GUI) screen of the mobile smartphone shown in FIG. 7A, deployed on the wireless access control system network of the present invention, and showing the fourteenth step in the site-level access control method of the present invention displaying a message for the guest renter to "start riding" the vehicle;

FIG. 32P is a graphical user interface (GUI) screen of the mobile smartphone shown in FIG. 7A, deployed on the wireless access control system network of the present invention, and showing the seventeenth step in the site-level access control method of the present invention displaying, a "Park" button, and a message to select the Park button to power down and park the vehicle at a rental kiosk, and end the vehicle rental;

FIG. 33 is flow chart describing the steps involved in the method of renting, as shown in FIG. 7A, a networked entertainment vehicle deployed on the wireless access control system network of the present invention, and showing the first step in the device-level access control method involving (i) the scanning of a Device-Level QR Code as shown in FIGS. 34A and 34B, and (ii) automatically directing the smartphone web-browser application (e.g. Apple Safari) to parse and analyze the scanned QR code and serve, load and display the webpage specified by the URL encoded in the Device-Level QR Code as illustrated in table of FIG. 3, and whereupon, the application server stores a "Rental Transaction Identifier-Device Entry" (RTI-DE) within the cache on the mobile smartphone;

FIG. 34A is a schematic illustrating showing a perspective view of an amusement park facility, with networked vehicles available to rent at a Site in the park, displaying a Device-Level QR code as shown in FIG. 34B, which upon scanning with a web-enabled mobile smartphone is engineered to direct the guest user to a web-based e-commerce-enabled vehicle rental and access control transaction, and allowing guest users to select a vehicle, mobility solution or other service at the Site within the amusement park, and then allow the wireless system network to automatically assign an available vehicle to the guest at the selected Site;

FIG. 34B is an enlarged view of the Device-Level QR Code posted on a networked vehicle of the present invention deployed within the amusement park illustrated in FIG. 34A, wherein at the Device Level, the user is able to scan a Device-Level QR code that is intelligently assigned to that vehicle, and users will select the vehicle, and the wireless system network will automatically rent the vehicle to the user;

FIGS. 35A and 35B, taken together, sets forth a flow chart describing method of managing access control to a networked device or system (e.g., ECVs etc.) by scanning device-level QR codes posted or displayed on each vehicle deployed within the amusement park facility, using a mobile smartphone wireless connected to the wireless access control system network of the present invention;

FIG. 36A is a graphical user interface (GUI) screen of the mobile smartphone shown in FIG. 7A, deployed on the wireless vehicle access control system network of the present invention, and showing the first step in the method involving the scanning of a device-level code on a character-specific vehicle to be rented;

FIG. 36B is a graphical user interface (GUI) screen of the mobile smartphone shown in FIG. 7A, deployed on the wireless vehicle access control system network of the present invention, and showing the second step in the method involving the selection of one or more options from the group consisting of (i) device-level character-specific scanning, and (iii) finish your ride;

FIG. 36C is a graphical user interface (GUI) screen of the mobile smartphone shown in FIG. 7A, deployed on the wireless vehicle access control system network of the present invention, and showing the third step in the device-level access control method of the present invention involving the selection of a particular mobility vehicle (e.g. rideable vehicles, single a double strollers, EEV scooters, and wheelchairs) at a selected Site within the Facility which the guest user would like to rent and access a rideable vehicle;

FIG. 36D is a graphical user interface (GUI) screen of the mobile smartphone shown in FIG. 7A, deployed on the wireless access control system network of the present invention, and showing the fourth step in the site-level access control method of the present invention involving the guest user being advise on rider capacity under the terms and conditions of the rental agreement;

FIG. 36E is a graphical user interface (GUI) screen of the mobile smartphone shown in FIG. 7A, deployed on the wireless vehicle access control system network of the present invention, and showing the fifth step in the device-level access control method of the present invention involving the guest user being advise on policy of no speeding under the terms and conditions of the rental agreement;

FIG. 36F is a graphical user interface (GUI) screen of the mobile smartphone shown in FIG. 7A, deployed on the wireless vehicle access control system network of the present invention, and showing the sixth step in the device-level access control method of the present invention involving the guest user being advise on policy of no parking on an incline road surface under the terms and conditions of the rental agreement under the terms and conditions of the rental agreement;

FIG. 36G is a graphical user interface (GUI) screen of the mobile smartphone shown in FIG. 7A, deployed on the wireless access control system network of the present invention, and showing the seventh step in the device-level access control method of the present invention involving the guest user being advise on policy of always using caution under the terms and conditions of the rental agreement;

FIG. 36H is a graphical user interface (GUI) screen of the mobile smartphone shown in FIG. 7A, deployed on the wireless access control system network of the present invention, and showing the eighth step in the device-level access control method of the present invention involving the guest user being advise on policy of returning vehicle to original rental location under the terms and conditions of the rental agreement;

FIG. 36I is a graphical user interface (GUI) screen of the mobile smartphone shown in FIG. 7A, deployed on the wireless access control system network of the present invention, and showing the seventh step in the device-level access control method of the present invention involving the user's provision of (i) first and last name and phone number of mobile phone to be used to access the wireless access control system network, and if required (ii) a four or fixed pass code for use in supporting two-factor authentication when accessing and controlling the electric vehicle on the system network of the present invention;

FIG. 36J is a graphical user interface (GUI) screen of the mobile smartphone shown in FIG. 7A, deployed on the wireless access control system network of the present invention, and showing the eighth step in the device-level access control method of the present invention displaying the selected rideable vehicle, text receipt phone number, and total price of the vehicle rental (tax included), and providing several options for the user to make payment (e.g. using ApplePay® or using a credit card or debit card of the user, in which case, the card number and expiration date i.e. month/year are requested);

FIG. 36K is a graphical user interface (GUI) screen of the mobile smartphone shown in FIG. 7A, deployed on the wireless access control system network of the present invention, and showing the ninth step in the device-level access control method of the present invention displaying, after the prior payment transaction has been successfully completed, a message that the rented vehicle is ready, along with the vehicle # and a message to ride the vehicle, by visiting the park attendant at the rental site, and showing a GUI screen to "Let's Ride";

FIG. 36L is a graphical user interface (GUI) screen of the mobile smartphone shown in FIG. 7A, deployed on the wireless access control system network of the present invention, and showing the tenth step in the device-level access control method of the present invention displaying a "Power" button, and a message to select the Power/Start button to power up and ride the vehicle, commence the vehicle rental agreement, and return the vehicle back to the rental kiosk when ready to end the ride rental;

FIG. 36M is a graphical user interface (GUI) screen of the mobile smartphone shown in FIG. 7A, deployed on the wireless access control system network of the present invention, and showing the fourteenth step in the device-level access control method of the present invention displaying the message "Start Riding" the vehicle;

FIG. 36N is a graphical user interface (GUI) screen of the mobile smartphone shown in FIG. 7A, deployed on the wireless access control system network of the present invention, and showing the seventeenth step in the device-level access control method of the present invention displaying, a "Park" button, and a message to select the Park button to power down and park the vehicle at a rental kiosk, and end the vehicle rental;

FIG. 37 is flow chart describing the steps involved in the method of renting, accessing and controlling a networked device by scanning a device-level QR code on a vehicle to be rented at a site in the amusement or theme park, and then rescanning the device-level QR code on the networked device;

FIG. 38 is a flow chart describing the steps involved in the GPS-tracking based method of safely controlling and constraining the motion of an electric entertainment vehicle within a geofenced region of a park facility; and FIG. 39 is a flow chart describing the steps involved in the GPS-tracking based method of automatically sending messages to a mobile phone device linked to a rented electric entertainment vehicle operating within a geo-fenced region of a park facility.

DETAILED DESCRIPTION OF THE ILLUSTRATIVE EMBODIMENTS OF THE PRESENT INVENTION

Referring to the figures in the accompanying Drawings, the illustrative embodiments of the system and will be described in great detail, wherein like elements will be indicated using like reference numerals.

Applicant's co-pending U.S. patent application Ser. No. 17/399,080 filed Aug. 11, 2021, and co-pending application Ser. No. 16/990,381 filed Aug. 11, 2020, and also incorporated herein by reference as if fully set forth herein. Also, U.S. Pat. No. 8,990,110, US Patent Application No. US2019/0035186, U.S. Pat. Nos. 9,558,608, 10,474,797, 7,341,191, 9,145,067 (to Dahlen) and pending U.S. patent application Ser. No. 14/728,887 filed Jun. 2, 2015, and Ser. No. 16/663,057 filed Oct. 24, 2019, are each hereby incorporated herein by reference in their entirety, as if set forth fully herein.

Figure 1:
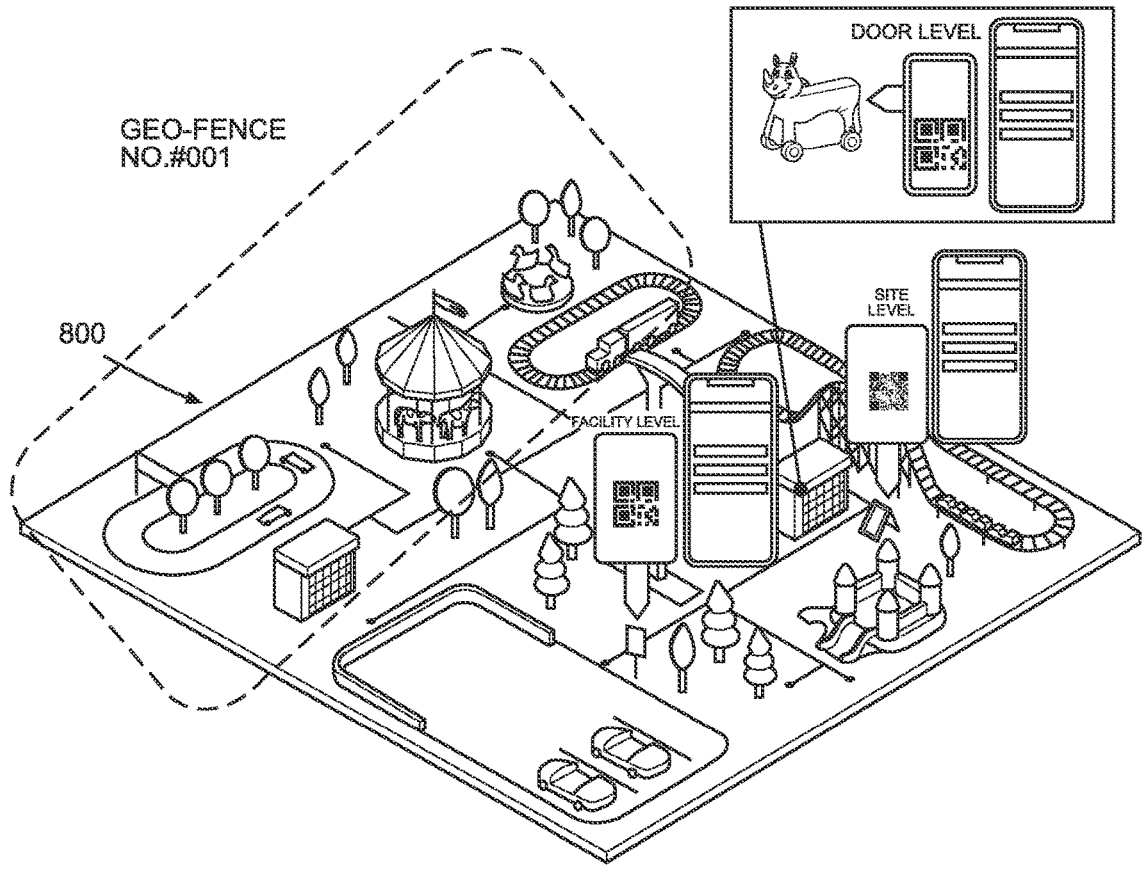
FIG. 1 shows a schematic illustrating providing a global view of an amusement park facility supported by the cloud-based Quick Response (QR) code driven wireless system network, mobility solutions and other guest services in accordance with the principles of the present invention, wherein multi-level QR codes (e.g. facility-level QR codes, site-level QR codes, and device-level QR codes) are deployed across the entire amusement park facility (i.e. enterprise) to support the contact-less procurement and provision of diverse kinds of valuable products and services to park guests and visitors, anywhere within the park environment, when simply using their mobile (smart) phones.

Brief Overview of the GPS-Tracking Wireless Vehicle Control Access System Network of the Present Invention for GPS-Tracking and Access Control of Electrically-Powered Steerable and Rideable Entertainment Vehicles FIG. 1 illustrates a global view of an amusement park facility supported by a cloud-based Quick Response (QR) code driven wireless vehicle control access system network 1 supporting the rental, access and control of vehicle and mobility solutions, particularly electrically-powered steerable and rideable entertainment vehicles of the present invention 70, 70', 70", 70''', and other supporting guest services delivered in accordance with the principles of the present invention.

In the illustrative embodiments disclosed herein, multi-level QR codes (e.g. facility-level QR codes 40A, site-level QR codes 40B and device-level QR codes 40C) are deployed across the entire amusement park facility (i.e. enterprise) 800 to support the contact-less procurement and provision of diverse kinds of valuable mobility products, particularly the electrically-powered steerable and rideable entertainment vehicles of the present invention 70, 70', 70", 70''', particularly to park guests and visitors, anywhere within the park environment, when simply using their mobile smartphones deployed on the wireless system network 1.

Figure 2A:
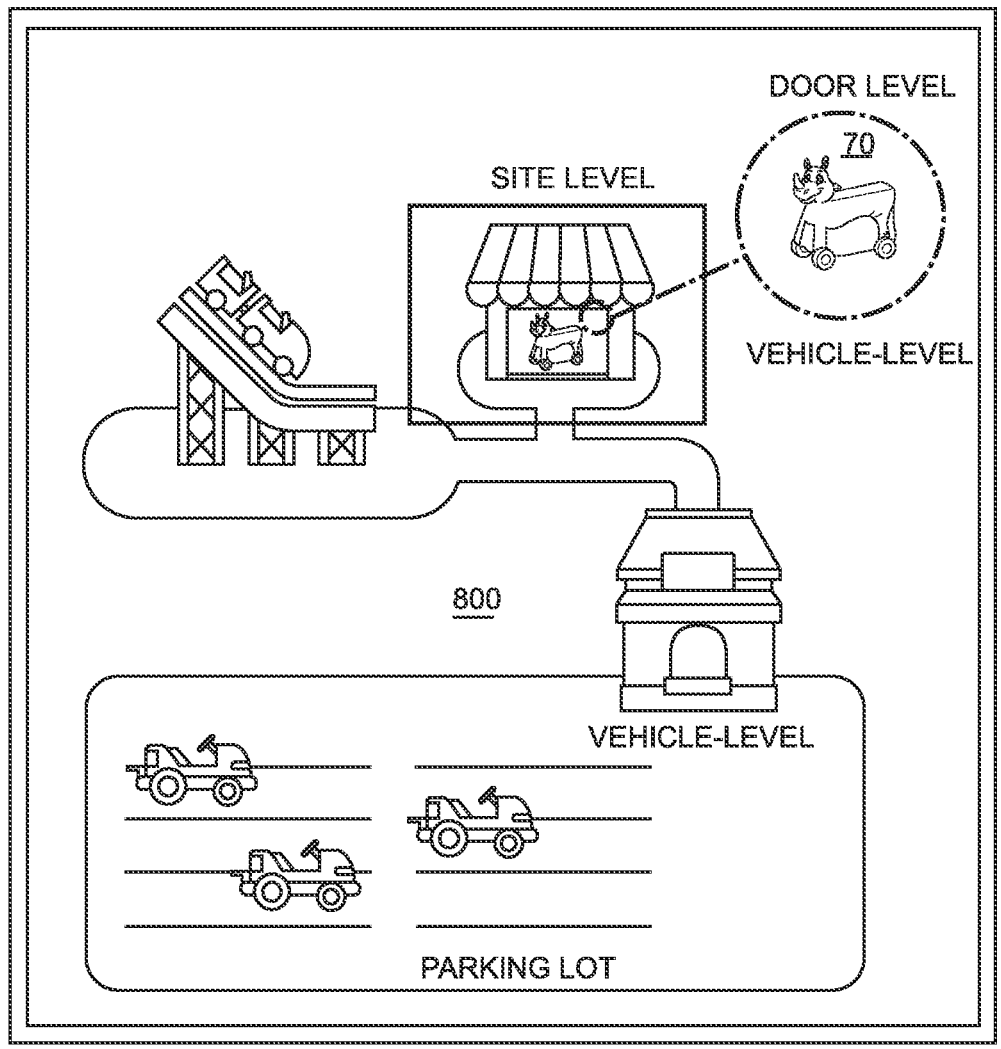
FIG. 2A shows a schematic representation of an amusement park facility, which the system of multi-level QR codes of the present invention are embedded at the facility, site, and device (i.e. thing) level of the park environment to enable park guests, visitors and other system users to procure, access and receive storage, mobility, and other valuable products and services while visiting an amusement park environment.

While the use of the term "amusement park" and "amusement park facility" has been used herein in connection with many illustrative embodiments of the present invention, including provision of the electrically-powered steerable and rideable entertainment vehicles of the present invention 70, 70', 70", 70"', it is understood that this term shall be understood to include, but not be limited to, any "adventure seeking" or "human social" activity on Earth, including, for example:

Casinos
Museums
National Parks
Amusement Parks
Theme Parks
Sporting Arenas and Centers
Virtual Reality and Augmented Reality Adventure Parks
Colosseums and Amphitheatre
Music and Arts Festivals
Water and River Rafting and Outdoor Activities
Western Activities
Horseback Riding
Hiking and Mountain Climbing Activities
Sporting and Recreational Centers
Gymnastic Centers
National Beaches
Rodeos
Animal Shows
Sporting Games and Contests
Film and Performing Arts Theaters
Public Parks
Ice Skating Rinks
Public Swimming Pools
ATR vehicles and trailblazing
Ski Lodges
Snowboarding
Alpine Sports
Hunting and Fishing Lodges While amusement park venue will provide many opportunities to serve people using the wireless system network of the present invention 1, it is understood that any social environment involving human and/or animal life will be suitable venues for the wireless system network 1, where mobile phones can be used to provide machine-code driven access control to electrically-powered steerable and rideable entertainment vehicles 70, 70', 70", 70"', and related services of value (e.g. personal storage lockers and coolers integrated into rental vehicles). For examples, social environments for use of the wireless system network of the present invention 1 will include, but are not limited to:

National Disaster and Relief Centers (FEMA)
International Red Cross Relief Centers
Homeless Shelters and Centers
Personal Relief Shelters
Shared Business Office Space
Community Living Environments
Senior Citizen Centers
Transportation Centers FIG. 2A shows an amusement park facility 800, in which a system of exemplary multi-level QR codes of the present invention are embedded at the facility, site, and vehicle/device level of the park environment to enable park guests, visitors and other system users to procure, access and control storage, mobility and other valuable products and services while visiting an amusement park environment.

Figure 2B:
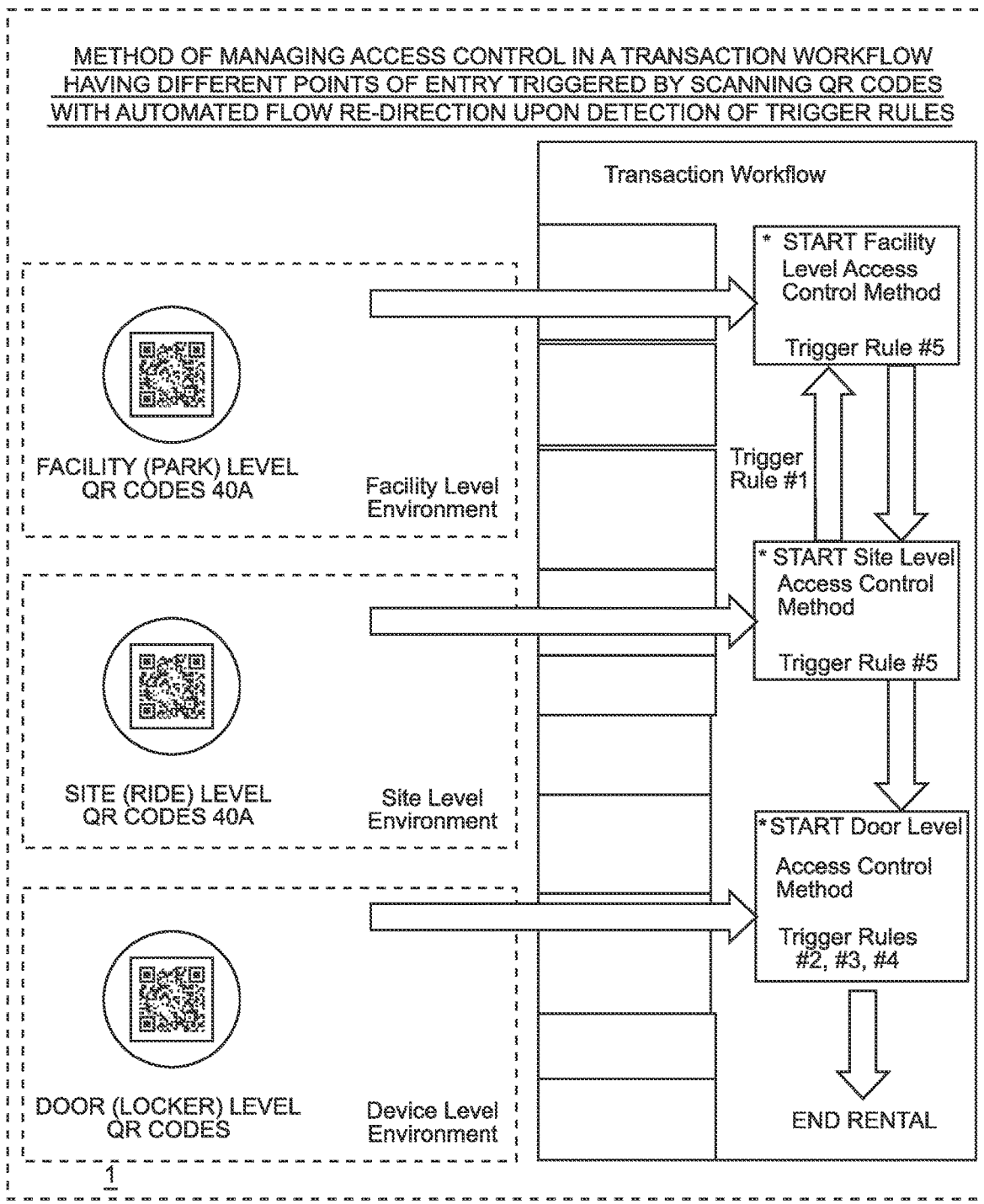
FIG. 2B shows a schematic representation illustrating the mapping of multi-level QR codes to particular entry points in transaction workflows designed to support procurement and delivery of services to an amusement park, tourist, or adventure seeking environment, wherein (i) Facility-Level QR codes are mapped to facility-level entry points in the transactional workflow and posted/displayed at physical and virtual locations outside of amusement park facility, (ii) Site-Level QR codes are mapped to site-level entry points in the transactional workflow and posted/displayed at physical Site locations within the amusement park facility, and (iii) Device-Level QR codes are mapped to vehicle-level entry points in the transactional workflow and posted/displayed on vehicles located at Sites within the amusement park facility.

FIG. 2B illustrates the mapping of multi-level QR codes to particular entry points in transaction workflows designed to support procurement and delivery of services to an amusement park, tourist, or adventure seeking environment. As shown, the (i) Facility-Level QR codes 40A are mapped to facility-level entry points in the transactional workflow and posted/displayed at physical and virtual locations outside of amusement park facility, (ii) Site-Level QR codes 40B are mapped to site-level entry points in the transactional workflow and posted/displayed at physical Site locations within the amusement park facility, and (iii) Device/Vehicle-Level QR codes 40C are mapped to Device-Level (e.g. vehicle level) entry points in the transactional workflow and posted/displayed on actual physical vehicles located at Sites within the amusement park facility.

FIG. 2C list a set of exemplary rule-based triggers that can be employed for automated re-direction of transactional workflow upon automated detection thereof during the QR driven access control processes executing on system servers of the present invention. This list is merely exemplary and will vary from embodiment to embodiment, and application to application.

FIG. 3 shows the Multi-Level QR Code Hierarchy used to practice the illustrative embodiments of the present invention, namely: (i) Device/Vehicle-Level QR Codes intelligently encoded with data attributes including facility (park), site, vehicle, type (e.g. timed/daily), and pricing and URL directed to a first server component supported on the wireless system network of the present invention, (ii) Site-Level QR Codes intelligently encoded with data attributes including facility (park), site, type (e.g. timed/daily), size options, the pricing for each type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each type options, and URL directed to a third server component supported on the wireless system network of the present invention. This code hierarchy is merely exemplary, and will vary from embodiment to embodiment of the present invention disclosed herein.

In general, when practicing the principles of the present invention, each Multi-Level QR (Quick Response) Code Structure (e.g. Facility-Level, Site-Level and Device/Vehicle-Level QR Code Structure) can be realized using (i) any machine-readable optically-readable bar code symbol of any symbology type, and/or (ii) any RFID tag component, realized using an RFID technology including active and passive RFID technologies known, and as may be developed and advanced in the future.

These machine-readable codes, including optically-readable codes and other forms of graphical indicia containing decodable information, can be printed in a physical medium and posted on the signs, doors, and devices described herein requiring wireless remote and local access control, as described herein, by scanning and decoding (i.e. reading) the code with aa user's web-enabled mobile phone deployed on the wireless access control system network of the present invention.

Alternatively, these machine-readable codes can be electronically displayed on electronic-ink (e.g. E-Ink display media) and LCD display screens alike mounted on signs, doors, and devices (e.g. vehicles) described herein also requiring wireless remote and local access control by scanning the code with a user's web-enabled mobile phone deployed on the wireless access control system network of the present invention.

Figure 4:
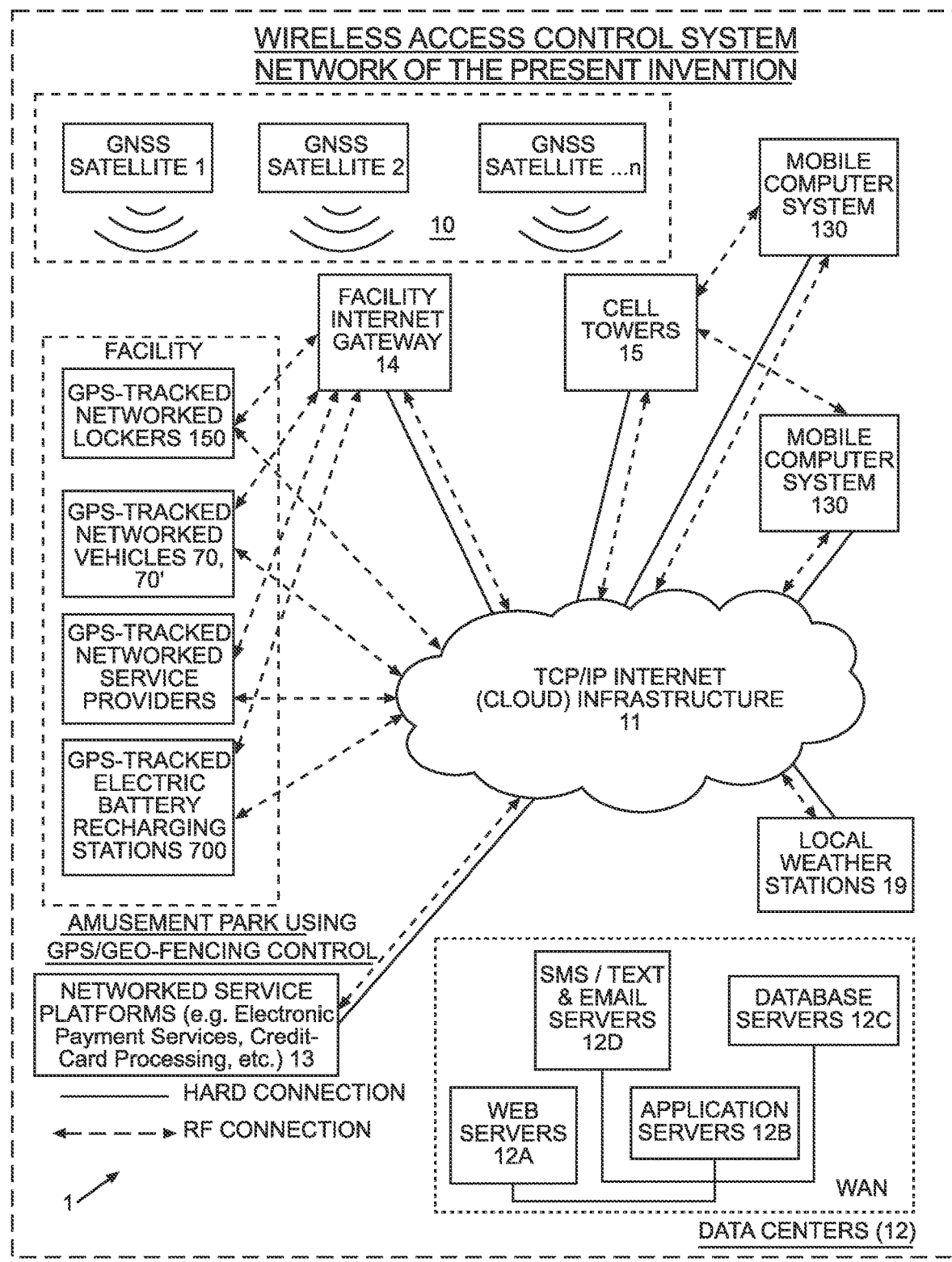
FIG. 4 is a schematic system block diagram of the cloud-based (i.e. Internet-based) GPS-tracking wireless vehicle access control system network of the present invention configured for procurement and access control of storage lockers, mobility solutions and other services offered within an enterprise-level amusement park facility.

In general, FIG. 4 shows the cloud-based (i.e. Internet-based) GPS-tracking wireless vehicle access control system network of the present invention 1 configured for procurement and access control of mobility solutions/vehicles and other services offered within an enterprise-level amusement park facility. As shown, the system network 1 comprises: a system of GNSS satellites 10 orbiting around the Earth, GPS-tracked wireless networked lockers, GPS-tracked wireless networked vehicles 70 (e.g. EEVs, wheelchairs, and strollers), GPS-tracked service providers, GPS-tracked vendors, and other diverse types of GPS-tracked wireless networked securable devices, each being interfaced with a TCP/IP infrastructure 11 directly, and/or via a facility-based Internet Gateway 14; a network of cellular towers 15 for supporting wireless data communication services between wireless mobile computing devices and network communication adapters; a plurality of wireless mobile computing systems (e.g. smartphones, tablet computers, etc.) 130; one or more industrial strength data centers 12, each supporting a cluster of communication servers (e.g. web servers) 12A, a cluster of application servers 12B, and a cluster of database servers 12C, and SMS/text and email servers 12D supported by at least one wide area network (WAN), and local weather servers 19, and network service platforms 13 including electronic payment systems and services, credit card processing, and the universe of webservers supported on the WWW.

Figure 5A:
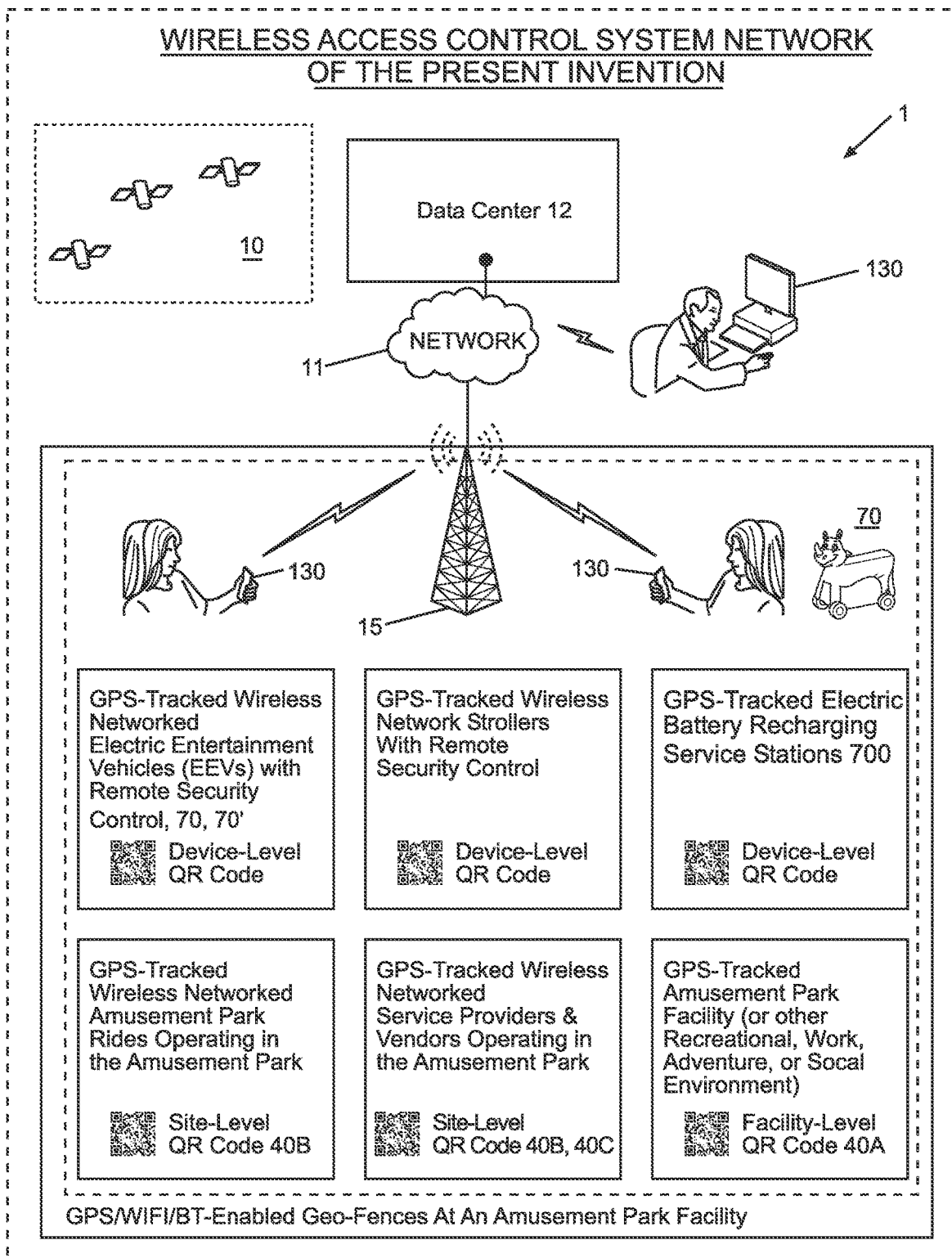
FIG. 5A is a schematic system diagram of the cloud-based GPS-tracking wireless vehicle access control system network of the present invention depicted in FIG. 4.

FIG. 5A shows the GPS-tracking wireless vehicle access control system network 1 depicted in FIG. 4, showing, in greater detail: (i) GPS-tracked wireless networked locker systems with remote access control and bearing Device-Level QR Codes 40A for procurement and access control by guests scanning these QR codes using mobile smartphones 130; (ii) GPS-tracked wireless networked strollers with remote security control and bearing Device-Level QR Codes 40C for procurement and access control by guests scanning these QR codes using mobile smartphones 130; (iii) GPS-tracked wireless networked electric entertainment vehicles (EEVs) 70 with remote security control and bearing Device-Level QR Codes 40C for procurement and access control guests by scanning these QR codes using mobile smartphones 130; (iv) GPS-tracked wireless networked amusement park rides (e.g. Sites) with remote security control and posting/displaying Site-Level QR Codes 40B for access to the park's storage and mobility service transactional workflow by guests scanning these QR codes using mobile smartphones 130; (v) GPS-tracked wireless networked Service Providers and Vendors (e.g. Sites) with remote security control and posting/displaying Site-Level QR Codes 40B for access to the park's service transactional workflow by guests scanning these QR codes using mobile smartphones 130; and (vi) GPS-tracked wireless networked Amusement Park Facility (e.g. Facility) 800 with remote security control and posting/displaying Facility-Level QR Codes 40A for access to the park's storage and mobility service transactional workflow by guests scanning these QR codes using mobile smartphones 130.

Figure 5B:
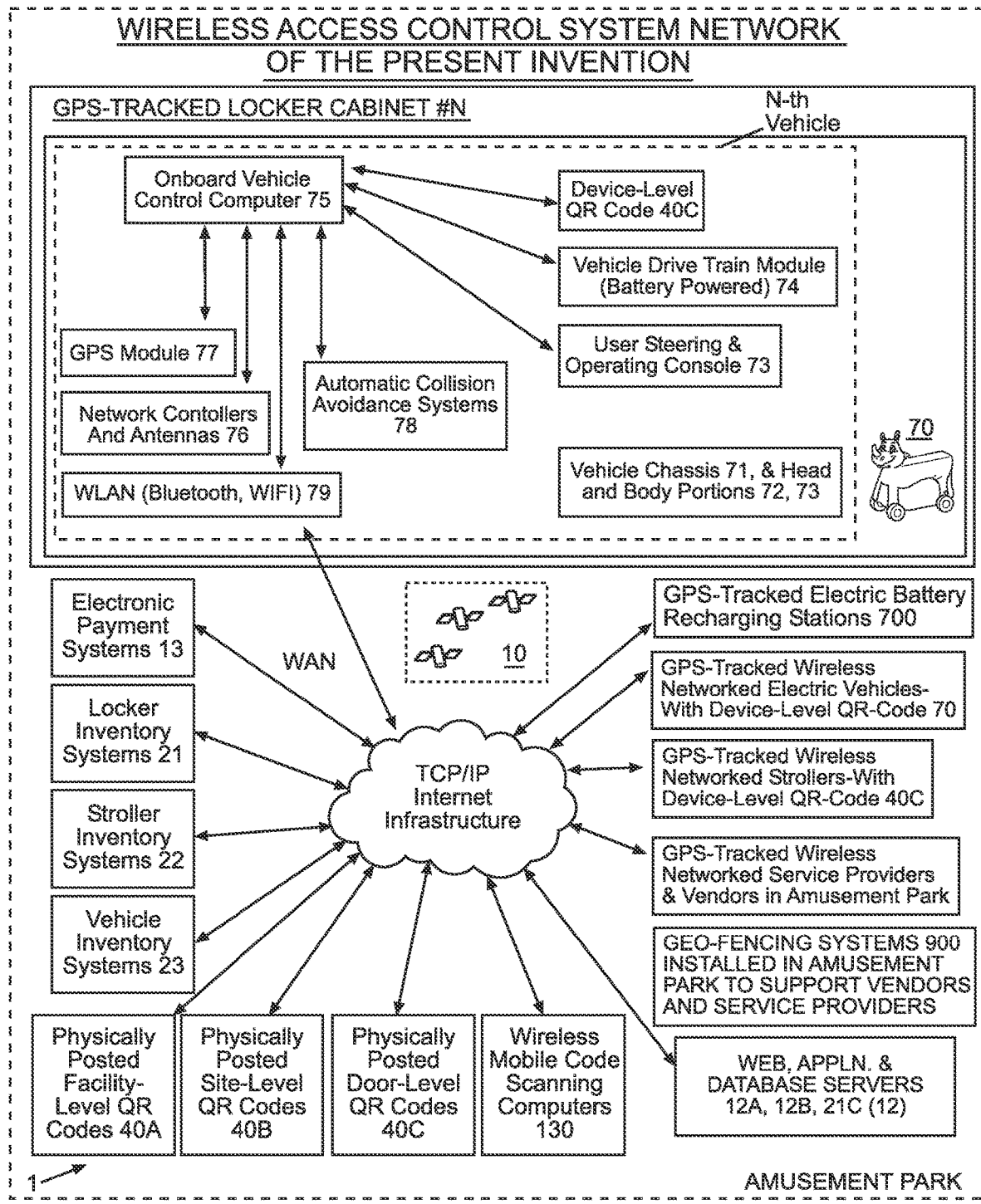
FIG. 5B is a schematic system block diagram of the cloud-based GPS-tracking wireless access control system network of the present invention, with other aspects thereof depicted in FIGS. 4 and 5A.

FIG. 5B shows the GPS-tracking wireless access control system network 1, with other aspects thereof depicted in FIGS. 4 and 5A, and showing the system subcomponents, and other its GPS-tracked wireless networked systems, and other system network components interfaced with its TCP/IP Internet infrastructure 11, namely: electronic payment systems 13, locker inventory systems 21, stroller inventory systems 22, electric entertainment vehicle (EEV) inventory system 23, mobile computing systems 130, GPS-tracking wireless networked EEVs 70 bearing device-level QR codes 40C, GPS-tracked wireless networked strollers 90 bearing device-level QR codes 40C, GPS-tracked wireless networked venues of service providers and/or vendors operating in the park facility, bearing site-level QR codes 40B, wireless networked geo-fencing systems installed in the amusement park to support the vendors and service providers operating in the amusement park facility 800 using wireless networked services, and web, application and database servers 12A, 12B, 12C associated with the data centers 12 deployed to support the services required by the system network of the present invention 1.

As shown in FIG. 5B, the GPS-tracking wireless access control system network 1 also includes a number of other system components, namely: fleets of GPS-tracked wireless networked electric vehicles 70, 70', 70", 70''' each provided with scannable device-level QR code 40 and parked at particular sites across the environment; a plurality of GPS-tracked electric battery recharging stations 700 strategically located throughout the amusement park environment and adapted for supporting the rapid docking of vehicles 70, 70', 70", 70''' within docking stations and quickly recharging and servicing of the electric battery power modules 105A, 105B stored aboard each electric vehicle 70; fleets of GPS-tracked wireless networked strollers each provided with a scannable device-level QR codes 40, and also parked at particular sites across the environment; a plurality of GPS-tracked wireless networked service providers and vendors operating within the environment using mobile and stationary code scanning computer systems 130 described in detail herein; and GPS-tracked geo-fencing systems 700 installed in the amusement park to support vendors and service providers, as described in greater detail hereinafter.

In the system network of present invention 6, each GPS-tracked entertainment vehicle, stroller, and/or thing (i.e. "networked device") 70 deployed and managed on the system network 1 is, or should wherever possible, be assigned a static IP address so as to enable data communication between networked devices and information servers deployed on the system network 1 using data communication protocols suitable for the application at hand, as described herein. It is also understood that preferably, the IP address will be set in the network controller of the networked device, as well as in the computer memory architecture of the programmed processor the networked device. However, in some embodiments, a network controller may be assigned to one or more or a group of networked devices, and IP address management and network protocol translation methods maybe be used as required or desired to achieve digital communication in a manner well known to those skilled in the computer architecture and networking communication arts.

Specification of the Network Architecture of the Wireless System Network of the Present Invention In general, FIGS. 4, 5A and 5B illustrate the network architecture of the wireless system network 1 implemented as a stand-alone platform designed to work independently from, but alongside of one or more networks deployed on the Internet. As shown, the wireless system network 1 comprises various system components, including a cellular phone and SMS messaging systems 12D, and one or more industrial-strength data centers 12, preferably mirrored with each other and running Border Gateway Protocol (BGP) between its router gateways, in a manner well known in the data center art. As shown in FIG. 4, each data center 12 comprises: a cluster of communication servers 12A for supporting http and other TCP/IP based communication protocols on the Internet; cluster of application servers 12B; a cluster of email processing servers 12D; cluster of SMS servers 12D; and a cluster of RDBMS servers 12C configured within a distributed file storage and retrieval ecosystem/system, and interfaced around the TCP/IP infrastructure 11 of the Internet in a manner well known in the art.

As shown in FIGS. 4, 5A and 5B, the system network architecture also comprises: a plurality of Web-enabled mobile client machines 130 (e.g. mobile smartphones, mobile computers such as iPad, laptop computers, workstations, and other Internet-enabled computing devices with graphics display capabilities, etc.) running native mobile applications and mobile web browser applications supported modules supporting client-side and server-side processes on the system network of the present invention; and numerous media servers (e.g. Google, Facebook, NOAA, etc.) operably connected to the infrastructure of the Internet. The network of mobile computing systems 130 will run enterprise-level mobile application software, operably connected to the TCP/IP infrastructure of the Internet. Each mobile computing system 130 is provided with GPS-tracking and having wireless internet connectivity with the TCP/IP infrastructure of the Internet, using various communication technologies (e.g. GSM, Bluetooth, WIFI, and other wireless networking protocols well known in the wireless communications arts).

Figure 7B:
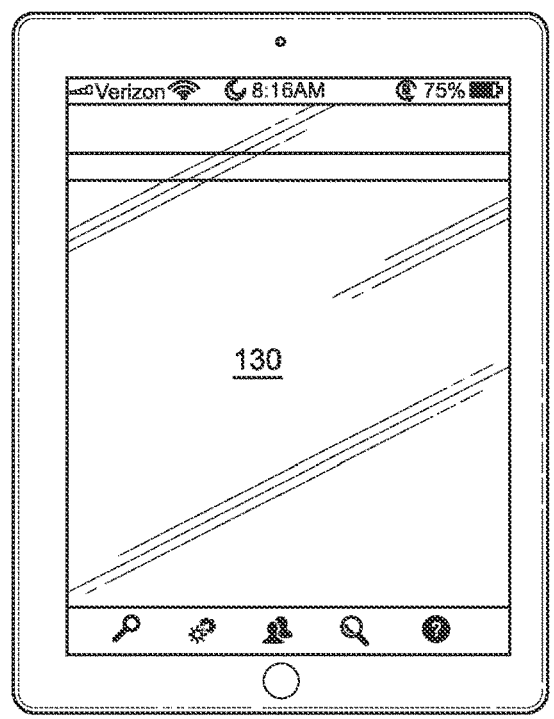
FIG. 7B is a perspective view of a mobile tablet computing system (e.g. Apple iPad device)
Figure 7C:
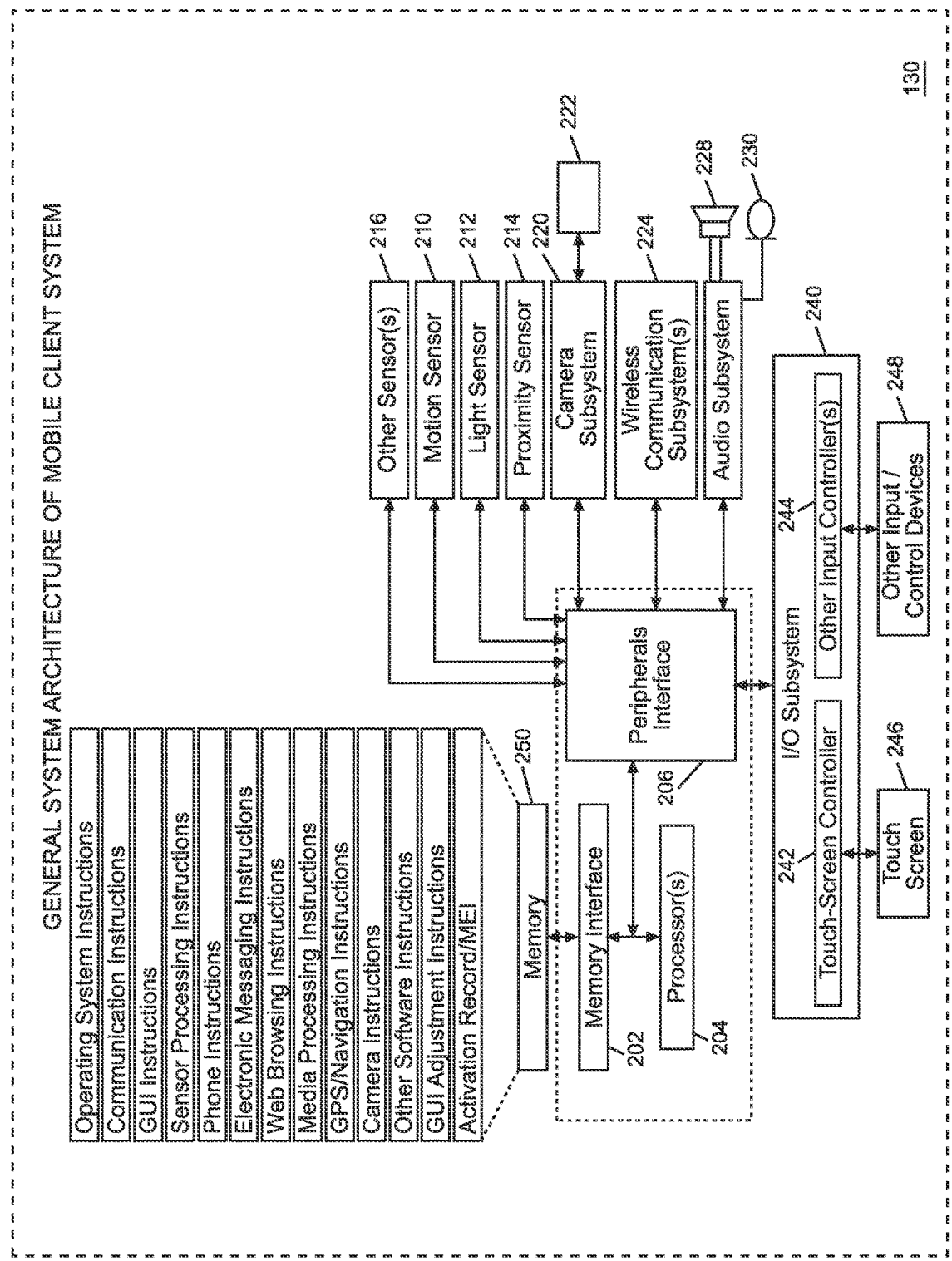
FIG. 7C is a schematic system block diagram of the mobile smartphone system and/or mobile tablet computing system shown in FIGS. 7A and 7B.

As shown in FIGS. 7A, 7B and 7C, each mobile computing system 130 may be realized as any wireless computing system supporting a web-enabled browser application for surfing the WWW, and other network addresses on the Internet. Preferably, mobile devices 130 are realized as mobile smartphone devices having wireless data communication capabilities, and supporting web-enabled browsers, with QR code drivers that enable automated QR code scanning and web-browser communication with the various servers deployed to support multi-level QR code symbol scanning principles in accordance with the principles of the present invention.

In general, regardless of the method of implementation employed, the wireless system networks of the illustrative embodiments of the present invention will be in almost all instances, realized as an industrial-strength, carrier-class Internet-based (i.e. cloud-based) network of object-oriented system design. Also, the system network will be deployed over a global data packet-switched communication network comprising numerous computing systems and networking components, as shown. As such, the information network of the present invention is often referred to herein as the "system" or "system network".

Preferably, although not necessary, the system network 1 would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art.

Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application described above. Such practices are well known in the computer programming, networking and digital communication arts.

Figure 6:
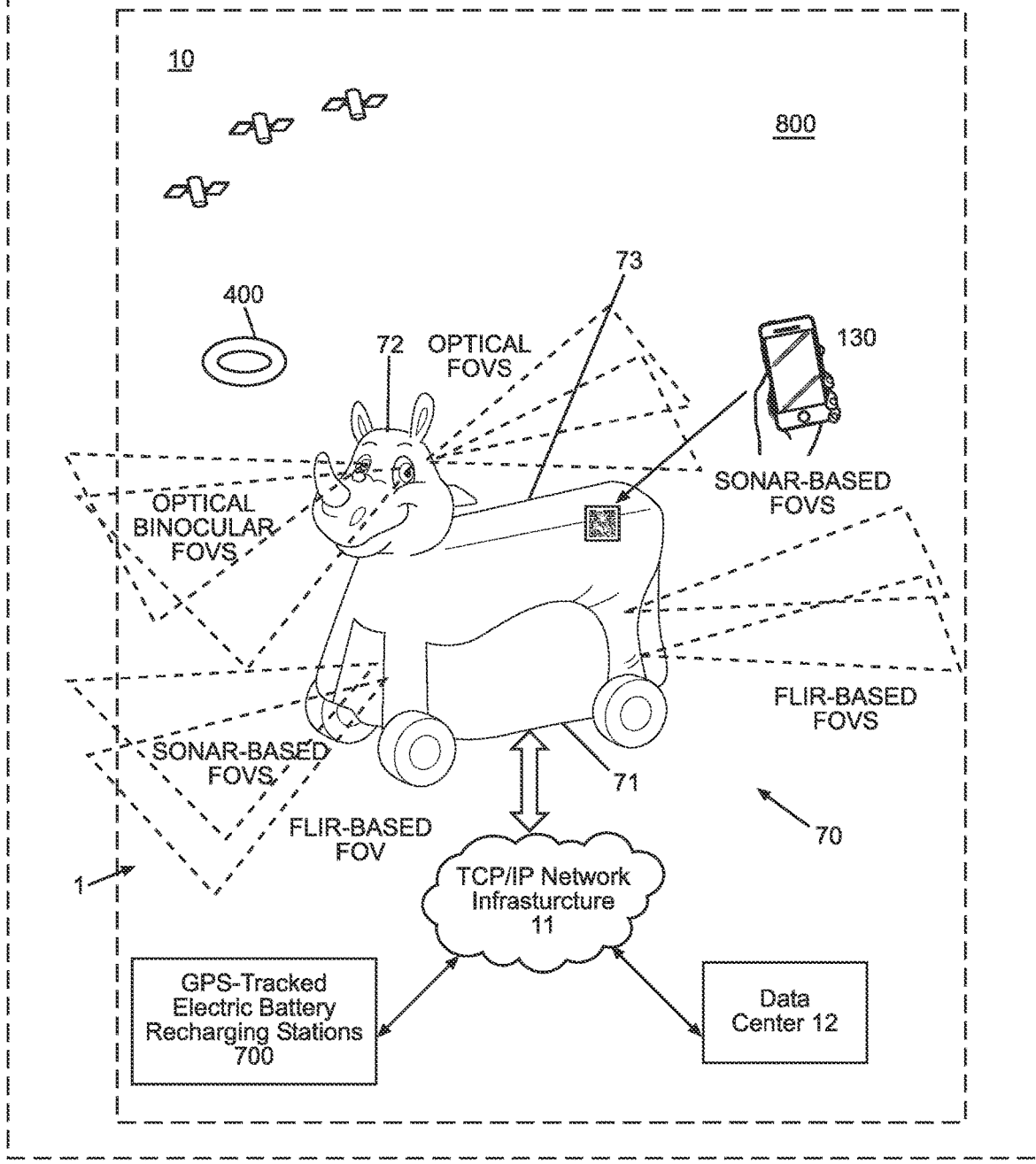
FIG. 6 is a perspective view of a GPS-tracked wireless networked electric entertainment vehicle (EEV) system provided with QRS-code driven access control over a rhinoceros-like character, using the GPS-tracking wireless vehicle access control system network of the present invention, illustrated in FIGS. 4, 5A and 5B.

Specification of GPS-Tracked Wireless Networked Mobile Vehicle System Supported by QR Code Driven Access Control According to the Present Invention FIG. 6 shows a GPS-tracked QR code-driven wireless-networked vehicle system 70, each accessible by scanning the device-level QR code 40C posted on the vehicle using a web-enabled mobile smartphone 130 deployed in the system network 1, and carrying out the transaction supported on the display screen of the mobile smartphone 130.

FIG. 6 shows a GPS-tracked wireless networked vehicle 70 of the present invention being rented, accessed and controlled using device-level QR codes 40C scanned using a mobile phone system 130 deployed on the GPS-tracking wireless vehicle access control system network of the present invention. Using the GPS-tracking wireless vehicle access control system network 1, users can now rent access and control ride vehicles 70 of their choice while provided with contactless transactions for a quick and safe guest rental experience. Web-based applications on mobile phones are initiated by scanning QR codes posted on (i) the ride vehicles available for rental, as well as (ii) site-level posting locations, and (iii) facility-level posting locations. The result of such code symbol scanning is to provide (i) an easy to use platform without requiring specialized native app installations, (ii) SMS receipt messaging for guest convenience and personalized rental confirmation, (iii) mobile payment support to reduce cash handling and labor costs, (iv) GPS-enabled fleet review and management, and (v) rider instructions for use of vehicle, and fleet reporting.

The technical details of the QR code-driven vehicle access control method and network according to the present invention will be described in greater detail hereinafter.

Specification of System Architecture of an Exemplary Mobile Computing System Deployed on the Wireless System Network of the Present Invention FIG. 7A shows a mobile smartphone system (e.g. Apple iPhone device). FIG. 7B shows a mobile tablet computing system (e.g. Apple iPad device). FIG. 7C shows the system architecture for each mobile smartphone system and/or mobile tablet computing system 130 shown in FIGS. 2A and 2B, and depicted in FIGS. 1, 4, 5A, 5B and throughout the Patent Specification.

FIG. 7C illustrate the system architecture of an exemplary mobile computing system (e.g. system component) 130 shown in FIGS. 7A and 7B and deployed on the wireless system network of the present invention 1, and supporting the many services offered on each electrically-powered ride vehicle 70 of the present invention, and by the network servers. As shown in FIG. 7C, the mobile computing device 130 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. One or more communication buses or signal lines can couple the various components in the mobile device. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g., GPS receiver), a temperature sensor, a biometric sensor, a gyroscope, or other sensing device, to facilitate related functionalities. A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile computing device 130 is intended to operate. For example, a mobile device 130 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the mobile computing device 130 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile computing device 130 can be found in U.S. Pat. No. 8,631,358 incorporated herein by reference in its entirety.

In the preferred embodiments of the present invention, each mobile smartphone 130 requires a web-enabled browser program, such as Apple® Safari http browser program for the Apple® iPhone device 130 and the Apple® iPad® device 130, or any suitable web browser program for other brands of mobile phones, such as offered by Samsung, Google, Microsoft and others. The mobile smartphone 130 should also be capable of scanning and reading any machine readable code 40 described herein, including optical code symbols and/or RFID tags, as the wireless access and control application at hand may require to be properly and adequately supported on the access and control system network of the present invention.

Alternatively, a native mobile application may be designed, developed and installed on any mobile computing system 130 to provide the mobile computing device 130 with the capacity to read machine-readable code symbols in accordance with the present invention, and support the display of GUI screens on the mobile device to support the rental, access and control services provided to the user by the service provider. In most applications, it is expected that native mobile applications designed for practicing components of the present invention will be (i) web/http-enabled despite running on native code, and (ii) enable the receipt, display and transmission of HMTL documents (e.g. webpages) on the mobile phone devices 130, in a manner well known in the Internet arts and Web-based technology pioneered by Tim Berners-Lee, the inventor of the World Wide Web (WWW). However, it is possible that someday HTML as we currently know it, may evolve into something different, and even called by a different or alternative name, but notwithstanding, such evolved technologies may serve as an enabling technology useful for practicing the various inventions disclosed herein.

Implementing the Mobile Client Machines and Wireless Devices on the Wireless System Network of the Present Invention In one illustrative embodiment, the enterprise-level wireless system network of the present invention is supported by a robust suite of hosted services delivered to (i) Web-based client subsystems 130 using an application service provider (ASP) model, and also to (ii) remote monitoring services deployed for various kinds of stationary and/or mobile systems to be monitored, as described above and below. In this embodiment, the Web-enabled mobile clients 130 can be realized using a web-browser application running on the operating system (OS) of a computing device 130 (e.g. Linux, Application IOS, etc.) to support online modes of system operation. It is understood, however, that some or all of the services provided by the system network can be accessed using Java clients, or a native client application running on the operating system (OS) of a client computing device 130 to support both online and limited off-line modes of system operation.

Figure 8A:
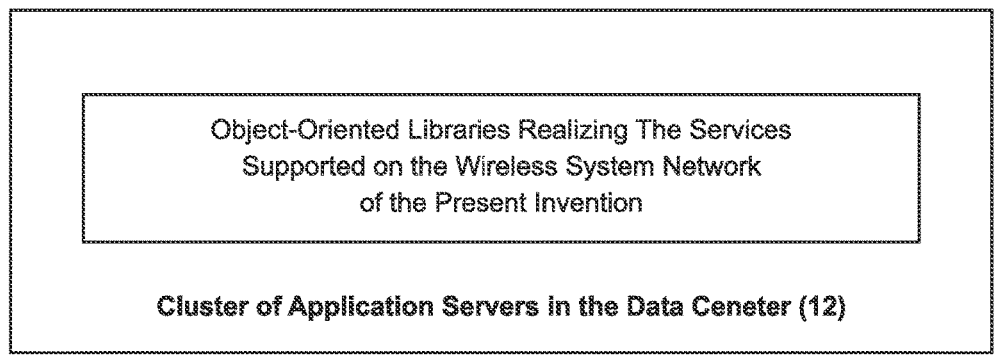
FIG. 8A is a schematic representation of the object-oriented libraries stored and executable within the cluster of application servers within the data center, realizing the many services supported on the wireless vehicle access control system network of the present invention.

Specification of Database Schema for the Database Component Used on the Wireless System Network of the Present Invention FIG. 8A illustrate object-oriented libraries that will be stored and executable within the cluster of application servers within the data centers supporting the wireless system network of the present invention, a realizing the many services supported on the wireless access control system network of the present invention.

Figure 8B:
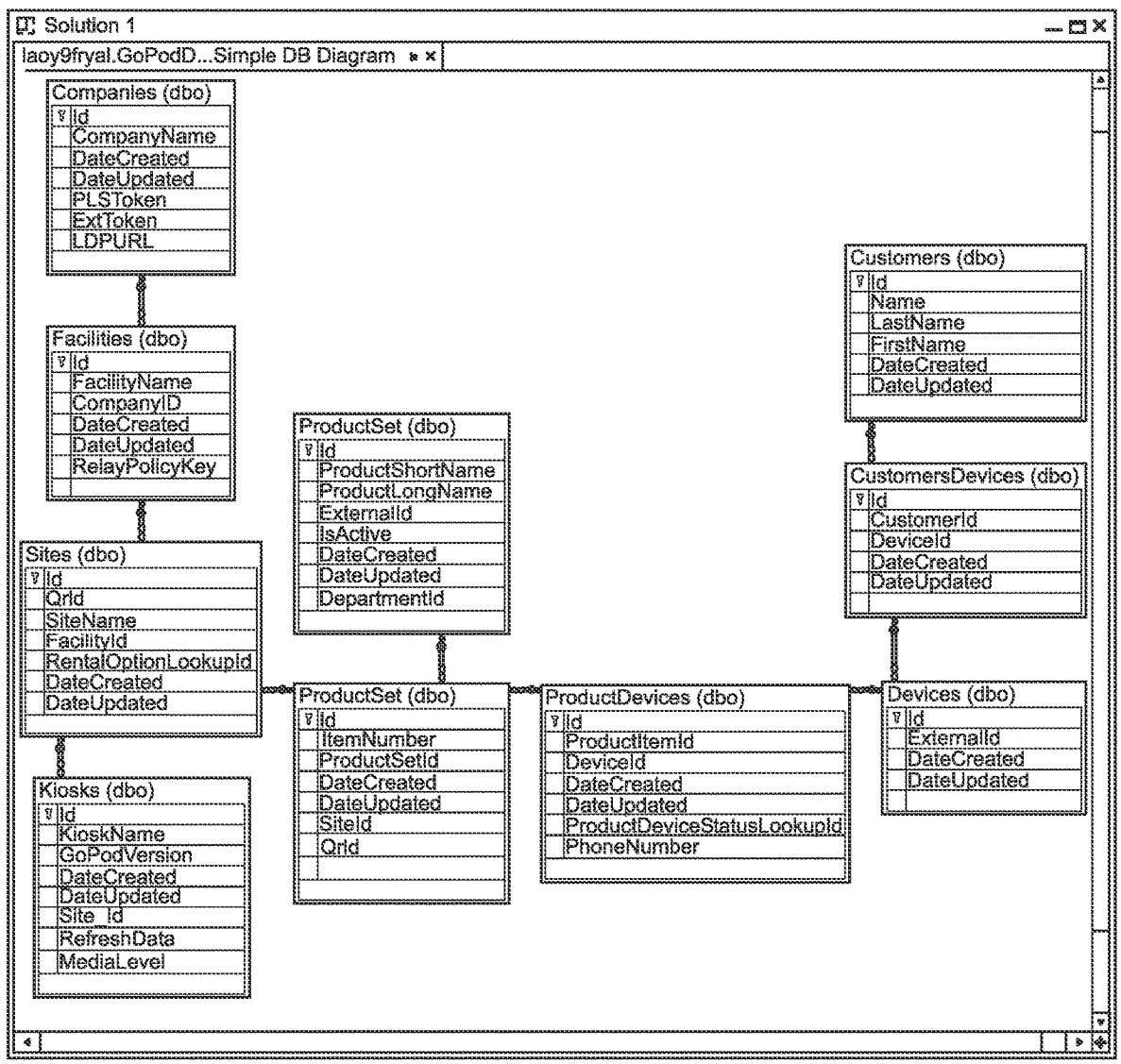
FIG. 8B is a schematic representation of the database structure associated with an exemplary relational database management system (RDBMS) used to illustrate a database architecture that will be designed and developed to support the wireless vehicle control access system network of the present invention, with the exemplary suite of services described in detail herein.

FIG. 8B represents a database structure associated with an exemplary relational database management system (RDBMS) used to illustrate a database architecture that will be designed and developed to support the wireless control access system network of the present invention, with the exemplary suite of services described in detail herein.

During the design and development of the system network, a data schema will be created for the object-oriented system-engineered (DOSE) software component thereof, for execution on a client-server architecture. In general, the software component of the system network will consist of classes, and these classes can be organized into frameworks or libraries that support the generation of graphical interface objects within GUI screens, control objects within the application or middle layer of the enterprise-level application, and enterprise or database objects represented within the system database (RDBMS) 12. Preferably, the RDBMS will be structured according to a database schema comprising enterprise objects, represented within the system database (e.g. RDBMS), including, for example: facilities including amusement and theme parks, recreational parks, centers and stadiums; rental equipment providers; vendors; service providers (e.g. instructors, trainers, medical personal); guest ID; facility managers; system user ID; Site ID; Site location; mobile phone ID; guest/visitor ID; mobile computer ID for computers deployed on the system network; and many other objects used to model the many different aspects of the system being developed. These objects and the database schema will be used and reflected in a set of object-oriented software modules developed for the system.

Each software module contains classes (written in an object-oriented programming language) supporting the system network of the present invention including, for example, the user registration module, vendor registration module, service provider registration module, mobile client computer registration module, user account management module, login module, settings module, contacts module, search module, data synchronization module, help module, and many other modules supporting the selection, delivery and monitoring of system monitoring related services supported on the system network of the present invention.

FIG. 8C shows a table (i.e. schema) used to create data records stored in the a local database 315 maintained within each networked mobility-device (e.g. vehicle, stroller or wheelchair) maintaining the various records for the device, which in the case of a networked vehicle device, would include: device # (e.g. vehicle #), and containing data records such as, for example: vehicle #; device size; device status (e.g. available; rented; out of order); Track ID (e.g. regular, medium, or fast); interior digital camera system(s) (FOV1=Y/N; FOV2=Y/N); IP Address for vehicle; rental transaction identifier (i.e. unique code assigned to rental transaction by rental server); guest PIN (i.e. 4 digits) stored by specific guest; device (phone) ID assigned to phone scanning the vehicle #; Device (Phone) ID (e.g. electronic cookie or digital token generated and stored in cache memory of the phone (e.g. randomly generated number for the rental transaction, or code generated based on MAC address and/or other phone identifier). These data records are used throughout the practice of the methods of access and control of the present invention described and specified herein, and will be generally different for the different kinds of networked devices managed on the system network 1, due to the different physical attributes of each such device.

FIG. 8D shows a schema for the database records that are stored in the global database system maintained in RDBMS server 12 for each networked, and other networked devices located at different sites that are being managed by the system network of the present invention 1.

Figure 8E:
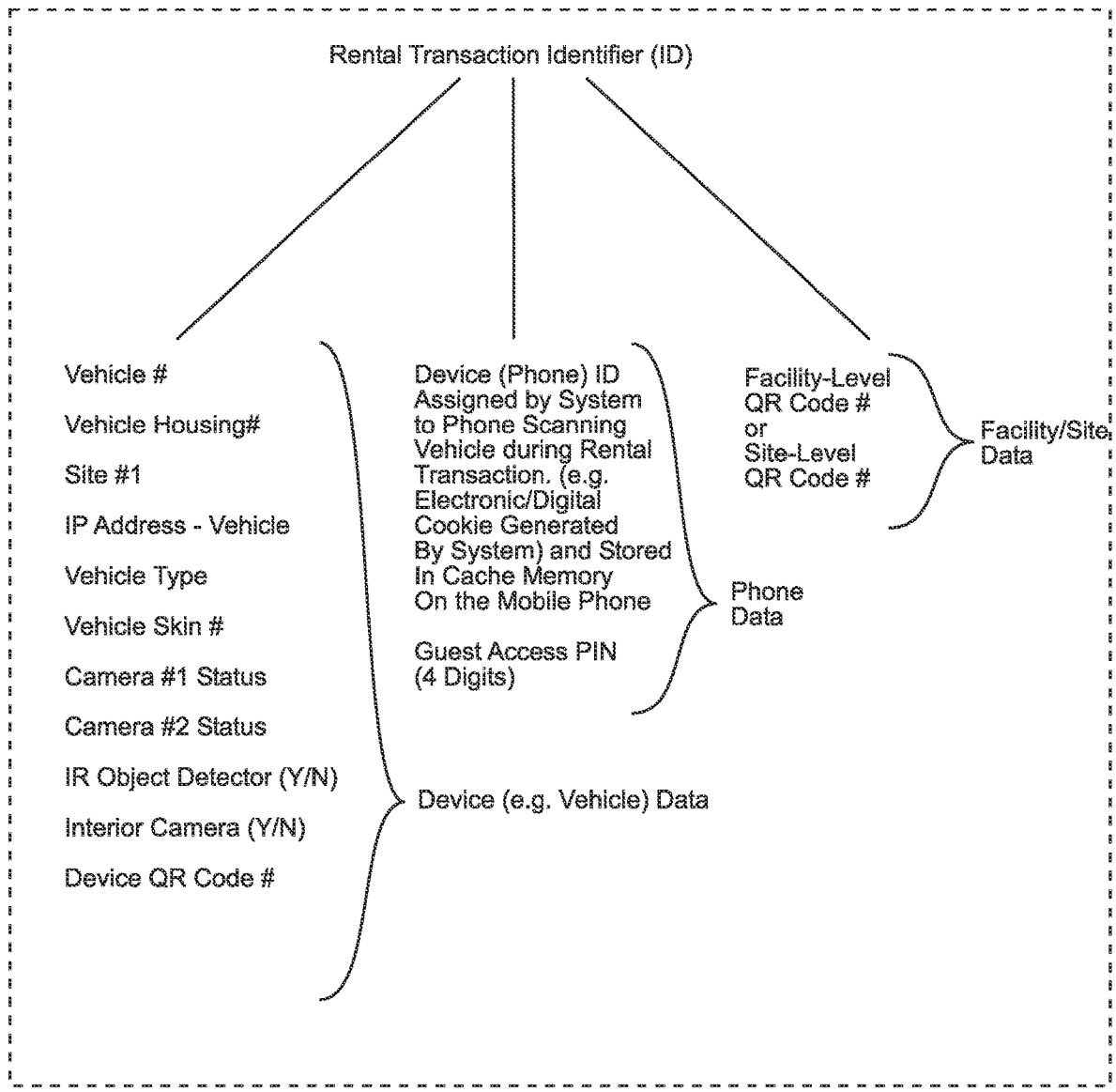
FIG. 8E is a schematic representation of a relational data structure formed and maintained within the RDBMS on the network database server of the system network of the present invention depicted in FIG. 15.
Figure 15:
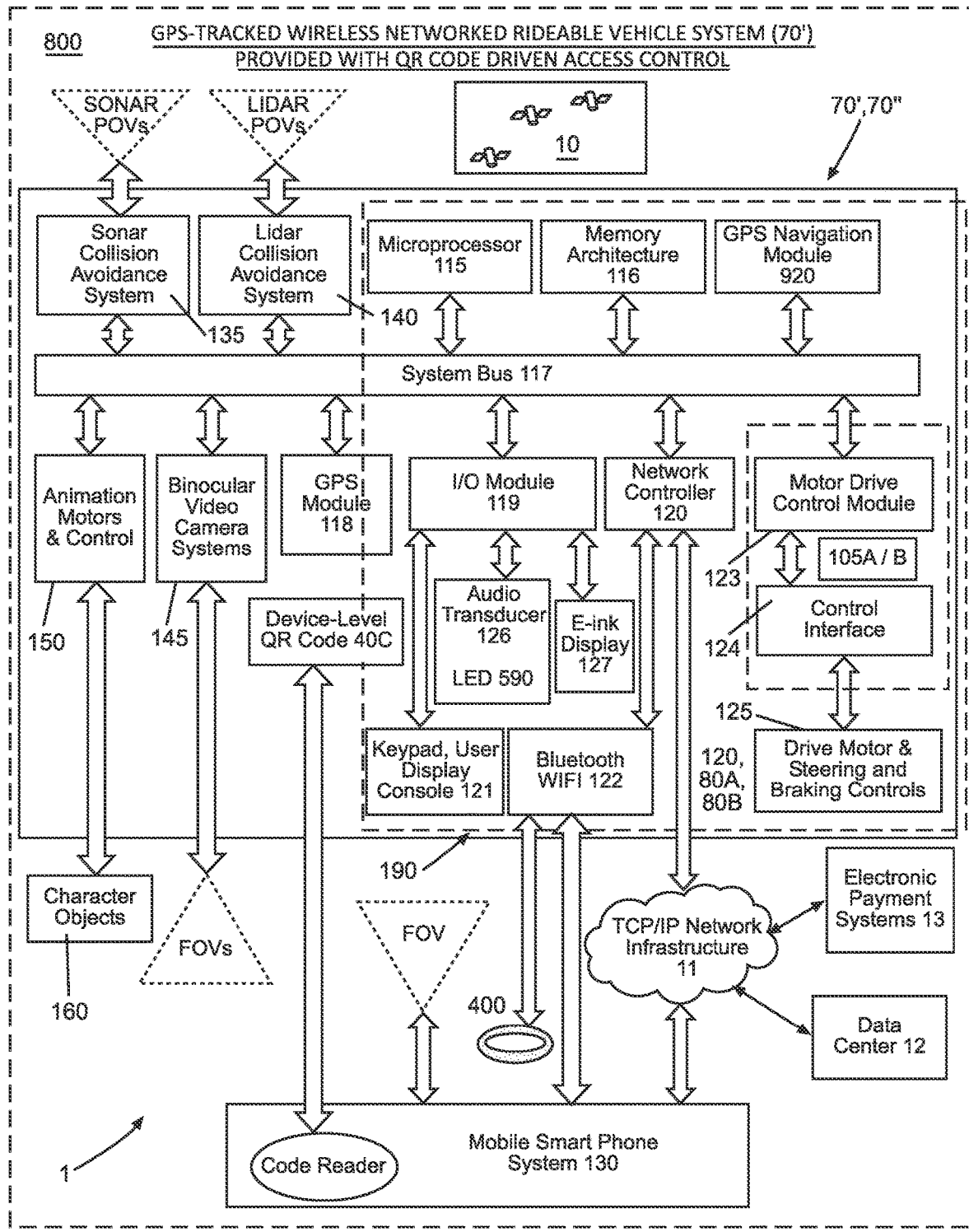
FIG. 15 is a schematic block system diagram showing the various system components used to construct the electrically-powered entertainment vehicle of FIG. 14A.

FIG. 8E illustrates a relational data structure formed and maintained within the RDBMS on the network database servers 12 of the system network of the present invention depicted in FIGS. 12 and 15, wherein for each rental transaction carried out within a particular facility supported by the system network, a relational-type rental transaction data structure is created and maintained. As shown in FIG. 8E, this data structure is representable by a tree-type data structure identified by (i) its rental transaction identifier assigned by the system, linked/related to (ii) device (phone) ID (e.g. electronic/digital cookie/token generated transaction ID) assigned to and stored in cache memory on the mobile phone 130 scanning (iii) a Facility-Level QR Code, Site/Ride-Level QR Code or Device-Level QR Code to initiate the rental of a vehicle, and (iv) the vehicle # being rented by the guest by scanning either a Facility-Level QR Code, a Site-Level QR Code or a Device-Level QR Code using the mobile phone identified and tagged by the system using the device ID (e.g. digital token) stored in memory on the scanning mobile phone 130.

FIG. 8F provides a specification for the various GPS-defined geo-fences 900 that are installed and rendered operational for particular groups of vehicles deployed within the wireless GPS-tracked vehicle access control system network of the present invention 1. As indicated, for each defined geo-fence system 900, identified by a unique "Geo-Fence No. X", there will be a specific number of vehicle ID numbers (i.e. a specific group of numbers) assigned to the Geo-Fence No. X for use by the wireless GPS-based vehicle access control system network 1 in carrying out its geo-fencing control functionalities as described herein.

A primary function of the wireless GPS-tracked vehicle access control system network is to automatically track vehicles moving within the facility and maintain specific GPS-tracking constraints within sets of imposed conditions, namely: (i) precisely where any particular ride vehicle is permitted to travel within a given park facility; (ii) how the particular ride vehicle shall be constrained to operate given its specific GPS-location at any given moment in time and space being monitored by the system network on a real-time basis; and (iii) specification and maintenance of GPS-specified zone activities of the mobile application, wherein, specific mobile application features are enabled and disabled based on the location of the vehicle linked to the mobile application, specifically, (a) GPS-determination as to where an electric vehicle will be enabled in the facility to commence a rental transaction and start riding the vehicle, and (b) GPS-determination as to where an electric vehicle will be enabled in the facility to be enabled to terminate a vehicle rental and make final payment.

In connection with such control operations, if a guest user who rents a vehicle operates a particular vehicle 70 outside the proscribed GPS tracked limits of the vehicle, then (i) one or more messages will be automatically generated by the system network 1 and displayed on the guest user's smartphone system 130 where supported, and (ii) visual indicators supported on the steering control console will flash or otherwise transmit signals to the vehicle operator, so as to advise the vehicle operator to (a) not proceed any further in any direction, (b) continue to operate at a reduce speed in a specific direction, and/or reverse direction, or (c) navigate to some other region in the facility as directed or navigated.

While GPS-enabled geo-fencing systems 900 are preferred in most application environments, as the means for geo-location management of the animal character vehicles of the present invention 70, 70', 70" and 70"', there are other geo-location methods can be used to practice the principles of the present invention illustrated in the Drawings and described throughout the Patent Specification. Specifically, the geo-location systems 900 deployed and integrated within the system network, a number of known methods can be used, namely: (i) Geolocation using GPS signals and conventional GPS location methods; (ii) Geolocation using Bluetooth Beacons, involving the processing of Bluetooth beacons/signals using received signal strength (RSSI) based geolocation methods to estimate the locations of devices within the facility; and (iii) Geolocation using WIPI signals, involving the processing of WIFI beacons/signals using received signal strength (RSSI) based geolocation methods to estimate the locations of devices within the facility.

Examples of Bluetooth and WIFI based geolocation/localization methods are disclosed in US Patent Application No. 2010/0177707), incorporated hereby reference. The geofencing vehicle control method of the present invention will be described in greater technical detail hereinafter with reference to FIG. 33.

Specification of GPS-Defined Electric Battery Recharging Service Stations Deployed within the GPS-Tracked Vehicle Access Control System Network of the Present Invention FIG. 8G provides an exemplary specification for the network of GPS-defined electric battery recharging service stations 700 deployed within the GPS-tracking vehicle access control system of the present invention. As shown, for each GPS-defined battery recharging service station 700 installed within the facility, a group of vehicle ID numbers are assigned to the service station 700 so that the system prepared and enabled to service the recharging of such pre-assigned vehicles over a particular time and on particular date(s), and able to manage delivery of high-quality service in a planned logistic manner. Alternatively, certain classes or types of electric battery powered vehicles can be defined within the table of FIG. 8G so that particular groups of electric powered vehicles can be exclusively recharged when required at such recharging stations within the facility, providing restrictions on recharging and servicing operations, to support different classes of support and service. During electric power recharging operations, each system will automatically track and record how much electrical power (e.g. mega-Joules) of electrical energy were delivered to the lithium-ion battery storage modules, and generate a record and possibly an invoice therefor, depending on the terms and conditions of the vehicle rental agreement executed at any given facility.

Specification of a GPS-Tracked Wireless Networked Electric Entertainment Vehicles (EEV) with QR-Code Driven Access Control According to the Present Invention FIGS. 9A, 9B, 9C, and 9D show a set of GPS-tracked wireless networked electric entertainment vehicles 70. Each of these vehicles 70 resembles an animal character and is provided with QR code-driven access control, using the GPS-tracking wireless vehicle access control system network of the present invention 1.

Figure 9A:
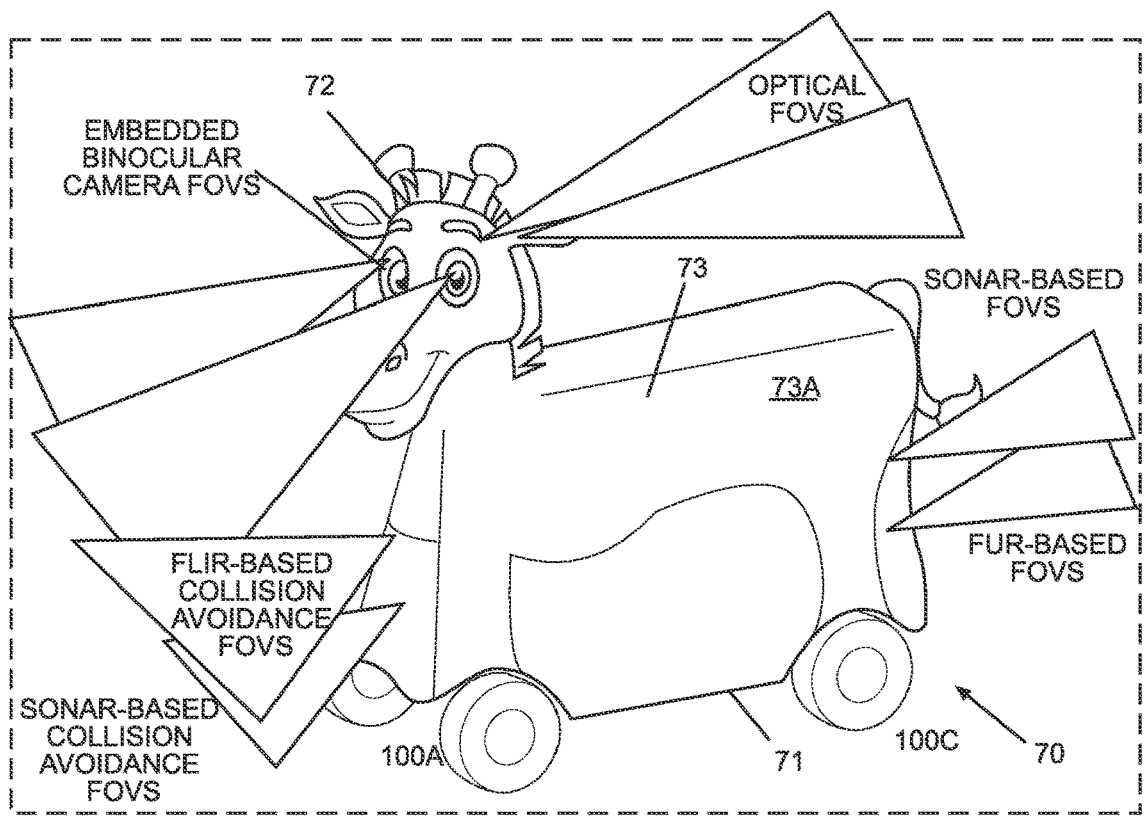
FIG. 9A is a perspective view of a first illustrative embodiment of the GPS-tracked electrically-powered amusement ride vehicle (system) of the present invention provided with an animal skin resembling a giraffe-like character having four rubber wheels (i.e. tires) and being access controlled over the GPS-tracked wireless vehicle access control system network of the present invention.

FIG. 9A shows a first illustrative embodiment of the GPS-tracked electrically-powered amusement ride vehicle (system) 70 provided with an animal character skin 73 resembling a giraffe-like character covering the vehicle chassis 1 having four rubber wheels (i.e. tires) 100A, 100B, 100C AND 100D and being access controlled over the wireless vehicle access control system network 1.

Figure 9B:
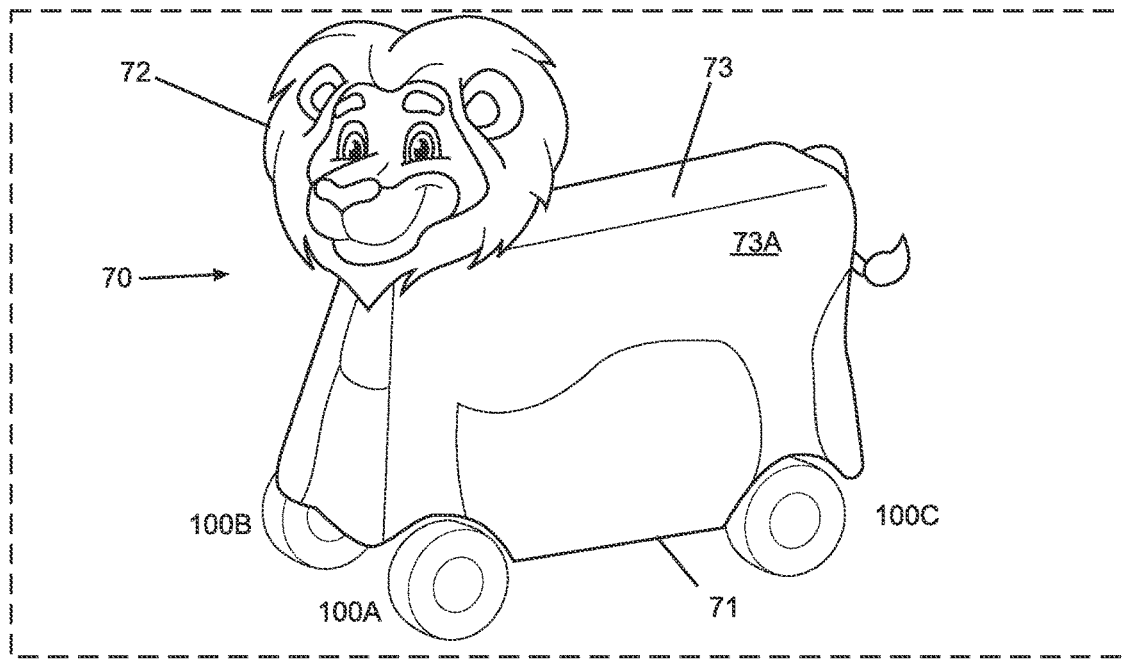
FIG. 9B is a perspective view of a second illustrative embodiment of the GPS-tracked electrically-powered amusement ride vehicle system of the present invention provided with an animal skin resembling a lion-like character having four rubber wheels (i.e. tires) and access controlled over the wireless vehicle access control system network of the present invention.

FIG. 9B shows a second illustrative embodiment of the GPS-tracked electrically-powered amusement ride vehicle system 70 provided with an animal skin resembling a lion-like character, covering the vehicle chassis 71 having four rubber wheels (i.e. tires) 100A-100D and access controlled over the wireless vehicle access control system network 1.

Figure 9C:
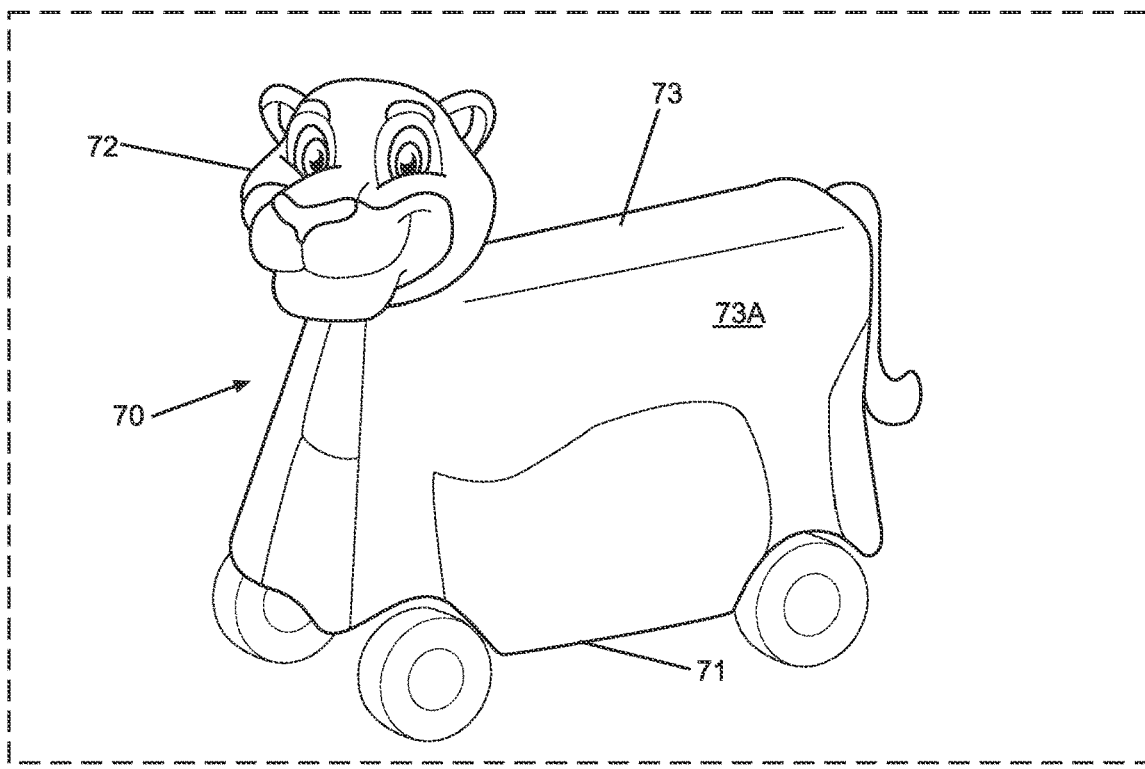
FIG. 9C is a perspective view of a third illustrative embodiment of the GPS-tracked electrically-powered amusement ride vehicle system of the present invention provided with an animal skin resembling a leopard-like character having four rubber wheels (i.e. tires) and access controlled over the GPS-tracked wireless vehicle access control system network of the present invention.

FIG. 9C shows a third illustrative embodiment of the GPS-tracked electrically-powered amusement ride vehicle system 70 provided with an animal skin resembling a leopard-like character covering the vehicle chassis 71 having four rubber wheels (i.e. tires) 100A-100D and access controlled over the wireless vehicle access control system network 1.

Figure 9D:
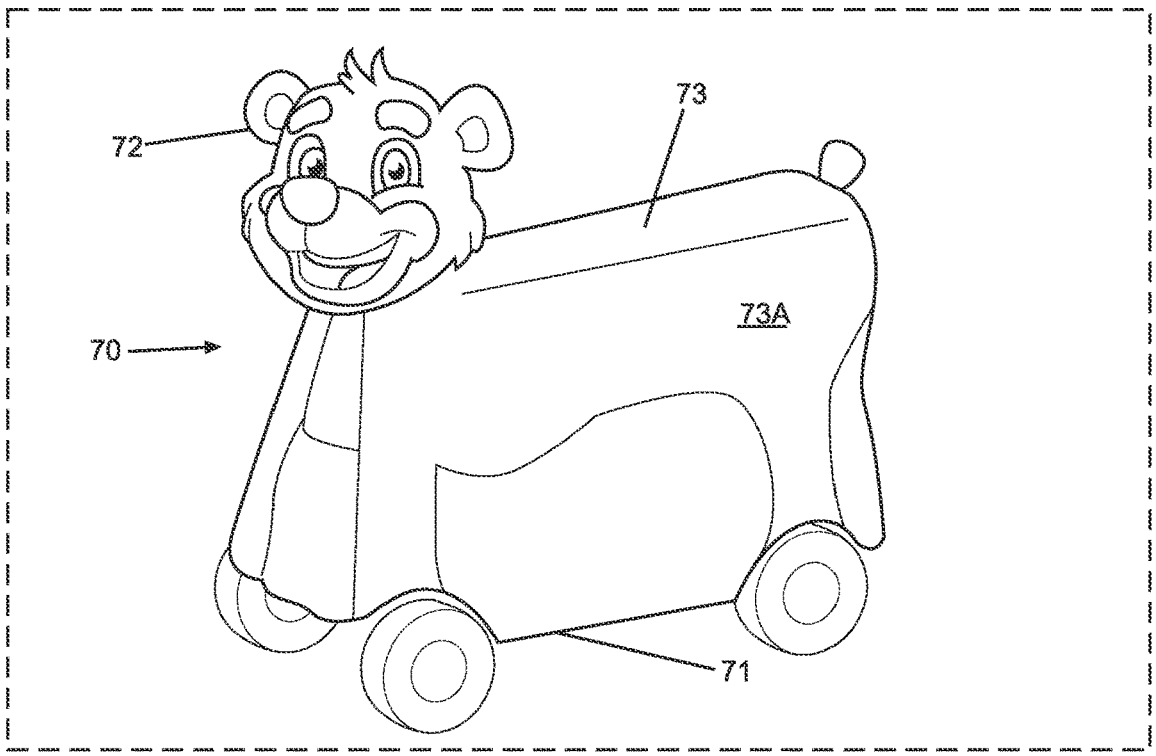
FIG. 9D is a perspective view of a third illustrative embodiment of the GPS-tracked electrically-powered amusement ride vehicle system of the present invention provided with an animal skin resembling a bear-like character having four rubber wheels (i.e. tires) and access controlled over the GPS-tracked wireless vehicle access control system network of the present invention.

FIG. 9D shows a fourth illustrative embodiment of the GPS-tracked electrically-powered amusement ride vehicle system 70 provided with an animal skin 73 resembling a bear-like character covering the vehicle chassis 71 having four rubber wheels (i.e. tires) and access controlled over the wireless vehicle access control system network 1.

As will be described and illustrated in greater detail hereinafter, each of these animal character vehicles 70 have the same vehicular chassis 73 supported by the same wireless network infrastructure 1. However, each animal character vehicle shown is equipped with a different character head assembly 72 and a different animal skin covering the vehicle chassis 71. The animal character vehicle is also configured with a different set of character behavior parameters, relating to animated features such as animal eyes, mouth, ears, nose, and tail, if appropriate, as the case may be, and relating to animal behaviors such as emitted sounds and noises, expressed movements and the like.

At the time of rental, the guest user will be provided with various menu choices regarding (i) the Type of Animal Character they wish to rent on a given day, over a particular time period, and at a particular Site in a given Facility; (ii) the Animated Character Features that are desired and enabled during the Rental period; and (iii) any add-on Accessories that should be provided to the electric entertainment ride vehicle at the time of rental, under the rental agreement.

The features of the GPS-tracked wireless-networked electric entertainment vehicle systems of the present invention including 70, 70', 70" and 70''' will be described in great detail hereinafter. In general, each passenger-carrying animal character ride vehicle 70 deployed on the wireless system network 1 may comprise some, many, or all of the technological features and functionalities listed hereinbelow, as the case may be:

- A modular construction characterized a lightweight body/chassis 71 driven by an electric-battery driven motor 102, and specially adapted for receiving a customizable ornamental body (i.e. skin) covering 73A having the appearance and personality of a particular animal (e.g. tiger, giraffe, dolphin, shark, whale, etc.) or an inanimate object (e.g. a train, boat, banana, etc.) as the case may be, as illustrated in FIGS. 10A through 24E;
- A structural scaffold assembly provided by the various structural components comprising the animal character body portion 73 of the vehicle, and adapted to support an ornamental and decorative skin/covering 73A for the animal character head portion 72 which, in turn, is supported on a neck-like portion 85 of the vehicle, about which a steering column assembly is realized and maintained, as illustrated in FIGS. 10A through 12O.
- A snap-fit smartphone and/or tablet computer holder 82 mounted on or about the steering console within driver's field of view (FOV) near steering bars, for support of the operator's mobile smartphone or tablet computer 130 while operating the vehicle 70, 70', 70", 70''';
- A wireless (Bluetooth or other) RF communication interface 122, preferably installed within or about the steering console 84 and linkable to the guest operator's smartphone or tablet computer 130, for enabling guests to use their smartphone/tablet computer 130 while running mobile apps to support GUIs and system operations, designed and engineered to offer many different selections on customizable features, and modes of system operation, such as for example:
    animal sounds emulating the selected animal or inanimate object—triggered from button on steering handle and controls;
    lighting effects integrated into the body exterior supported by the vehicle chassis;

a other animal behaviors and/or expressions that promote enjoyment and a fun ride experience, etc.

Figure 10A:
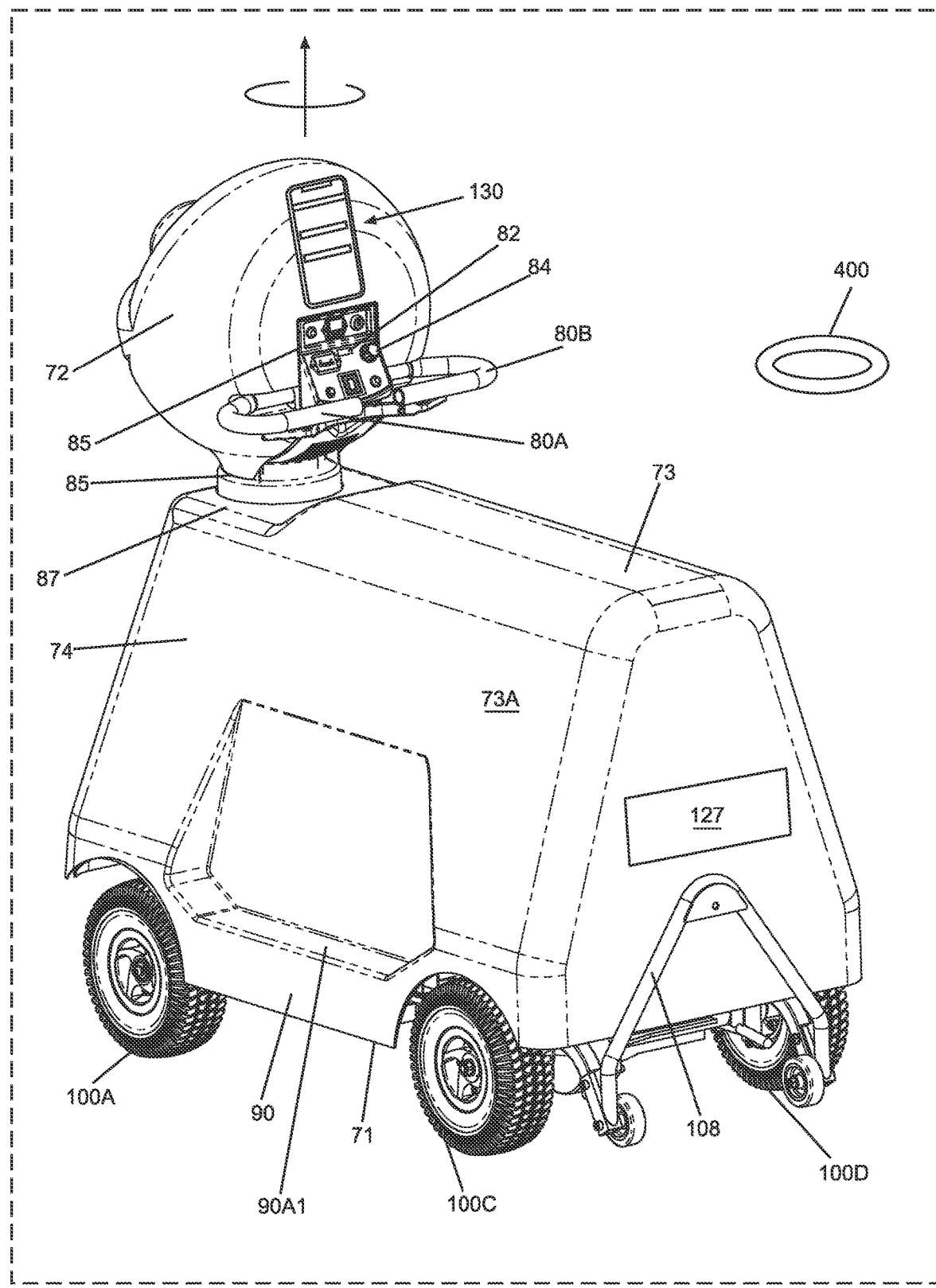
FIG. 10A is a perspective view of a first illustrative embodiment of the embodiment of the GPS-tracked electrically-powered entertainment vehicle system of the present invention, provided with (i) an animal character head portion embodied about the steering console of the vehicle system, and (ii) an animal body skirt covering installed over and supported by the chassis of vehicle having four wheels with rubber tires, and an electrically-powered drive motor electronically-controlled by electronic controls provided on the steering console.
Figure 10B:
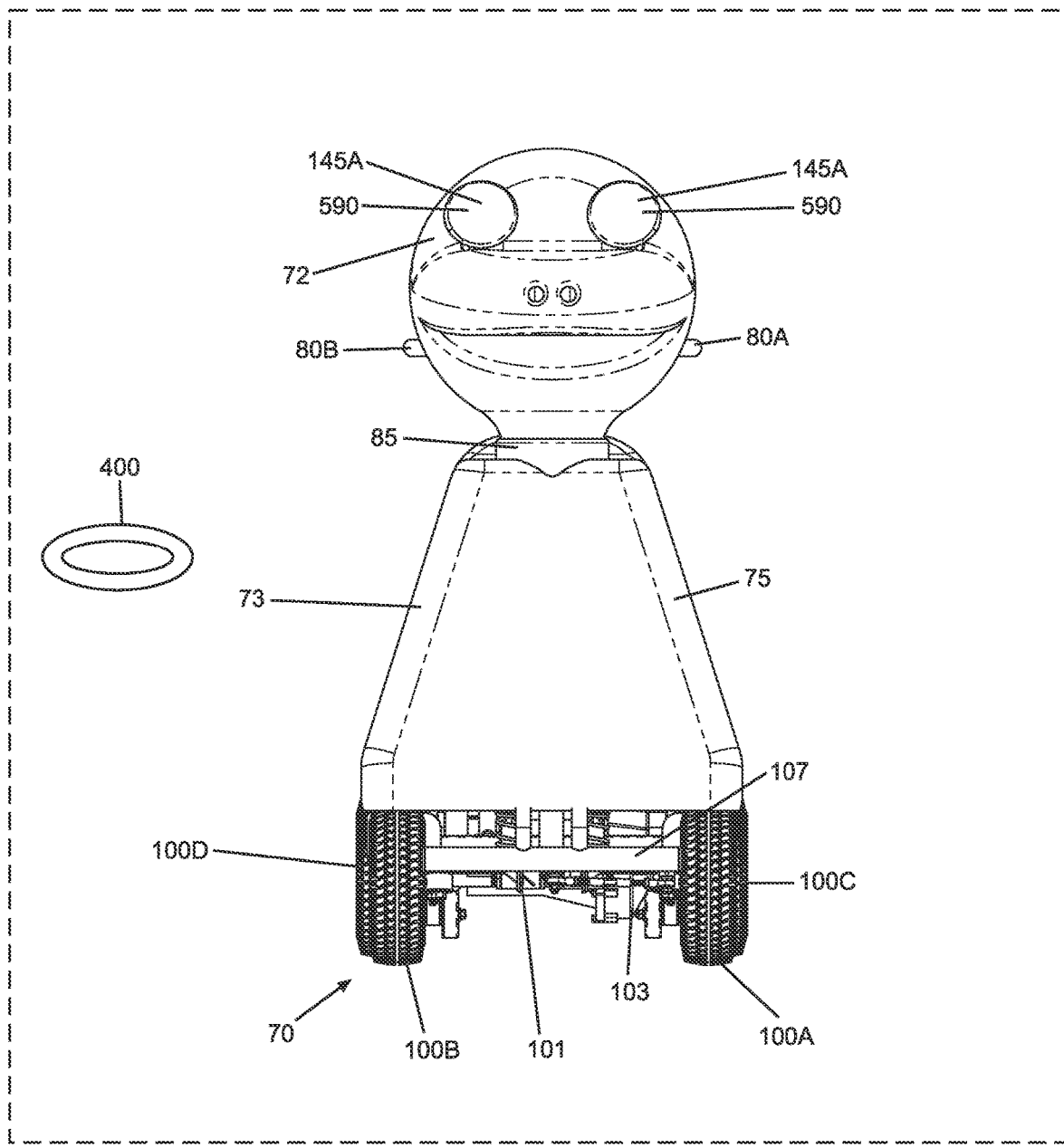
FIG. 10B is an elevated front view of the first illustrative embodiment of the GPS-tracked electrically-powered entertainment vehicle system of the present invention, shown in FIG. 10A.
Figure 11A:
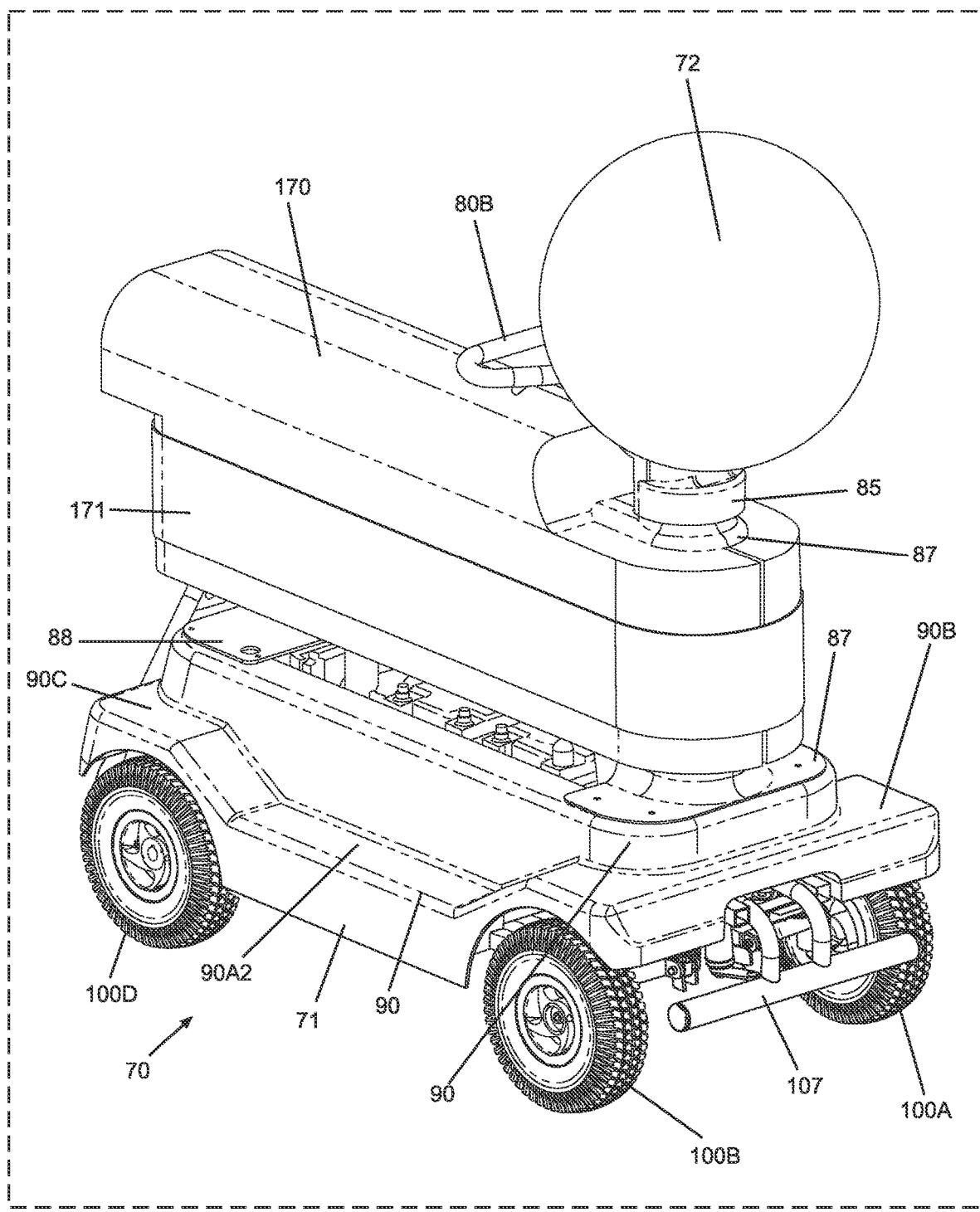
FIG. 11A is a first perspective front view of a first illustrative embodiment of the GPS-tracked electrically-powered amusement ride vehicle system of the present invention provided with (i) a spherically-shaped character head embodied about the steering console of the vehicle system, with (ii) its animal body skirt covering removed from and supported by the chassis of vehicle, and having four wheels and an electrically-powered drive motor electronically-controlled by controls on the steering console.
Figure 11B:
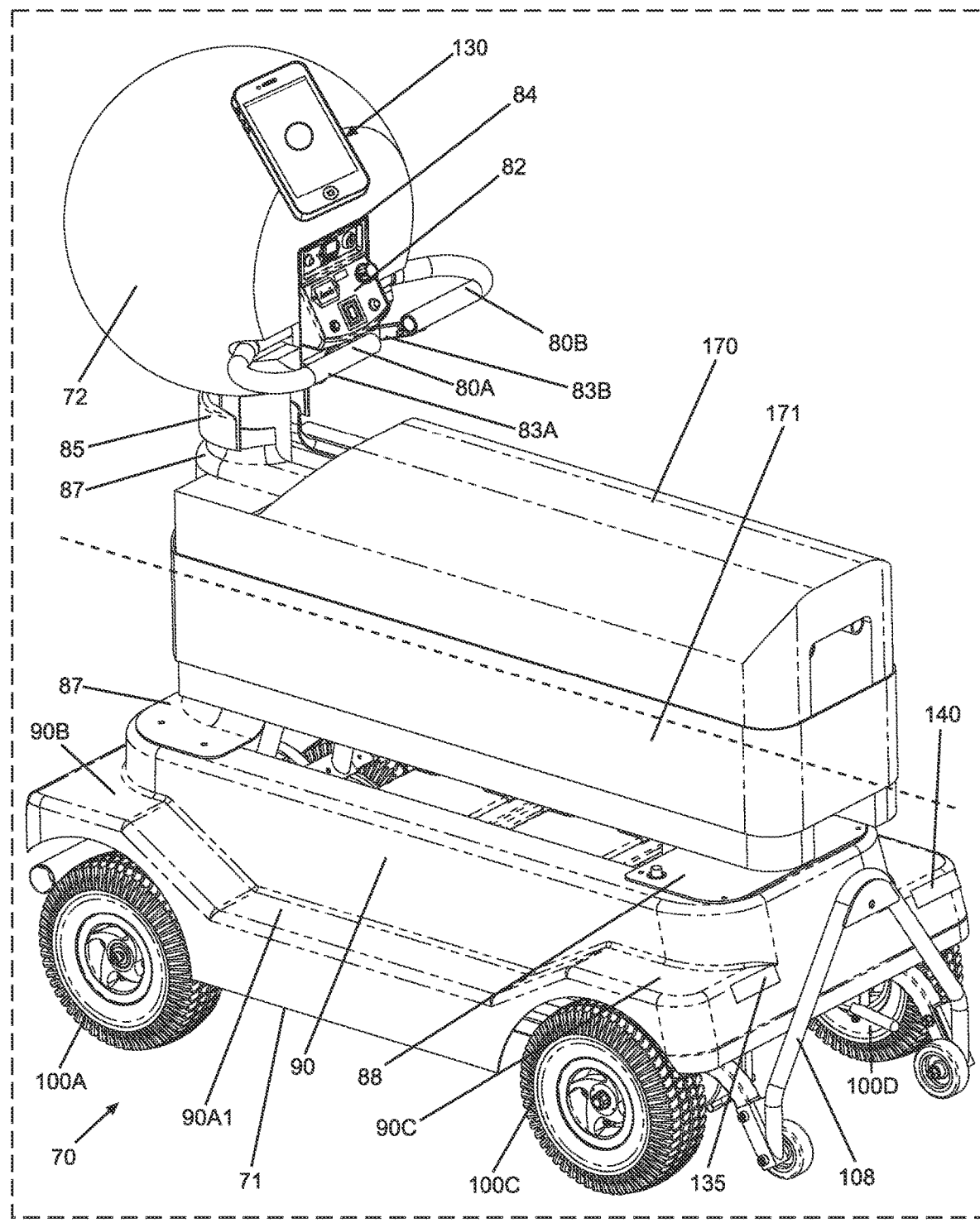
FIG. 11B is a perspective front view of a first illustrative embodiment of the electrically-powered amusement ride vehicle system of the present invention provided with (i) an animal character head embodied about the steering console of the vehicle system, with (ii) its animal body skirt covering removed from and supported by the chassis of vehicle, and having four wheels and an electrically-powered drive motor electronically-controlled by controls on the steering console.
Figure 12A:
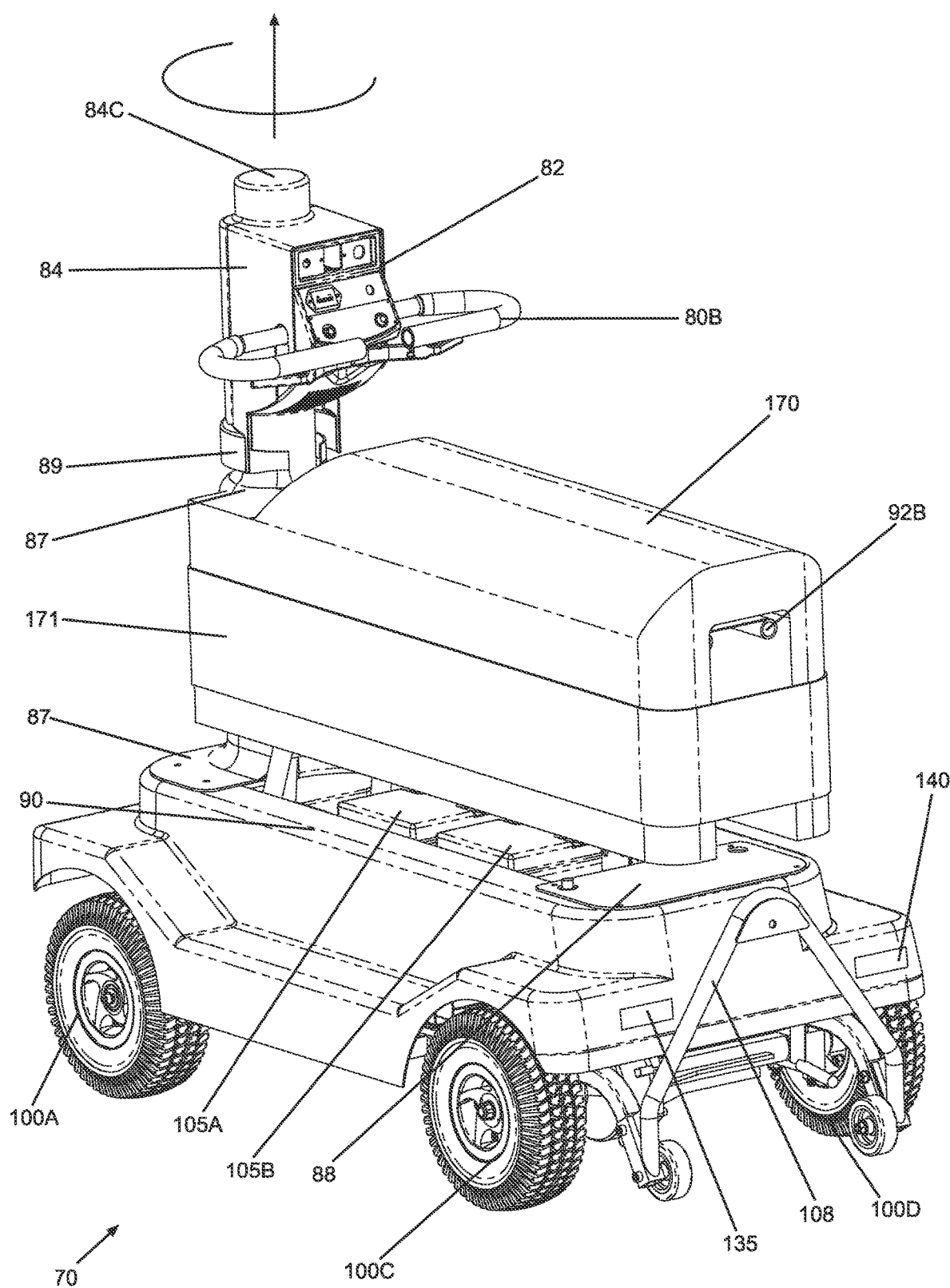
FIG. 12A is a first perspective rear view of the first illustrative embodiment of the electrically-powered amusement ride vehicle system shown in FIG. 11A, wherein (i) the character head assembly and (ii) animal body skirt covering both removed from the chassis of the vehicle, having two rear wheels driven by an electrically-powered drive train and motor, and two front wheels steerable by a manually-controlled steering console.
Figure 12B:
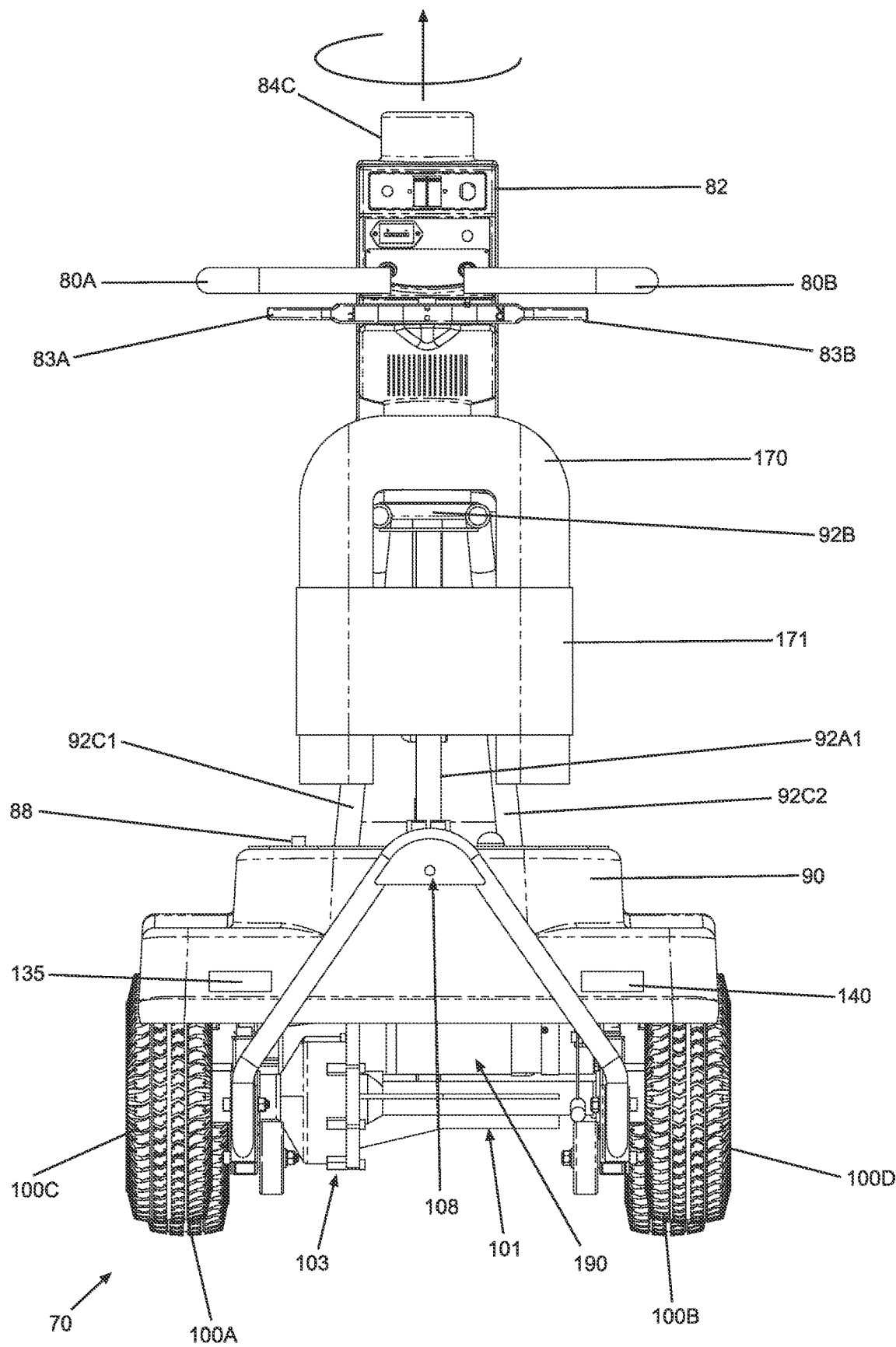
FIG. 12B is an elevated rear view of the first illustrative embodiment of the electrically-powered amusement ride vehicle system shown in FIG. 11A, wherein the character head assembly and animal body skirt covering are both removed from the chassis of the vehicle, having two rear wheels driven by an electrically-powered drive train and motor, and two front wheels steerable by a manually-controlled steering console.
Figure 12C:
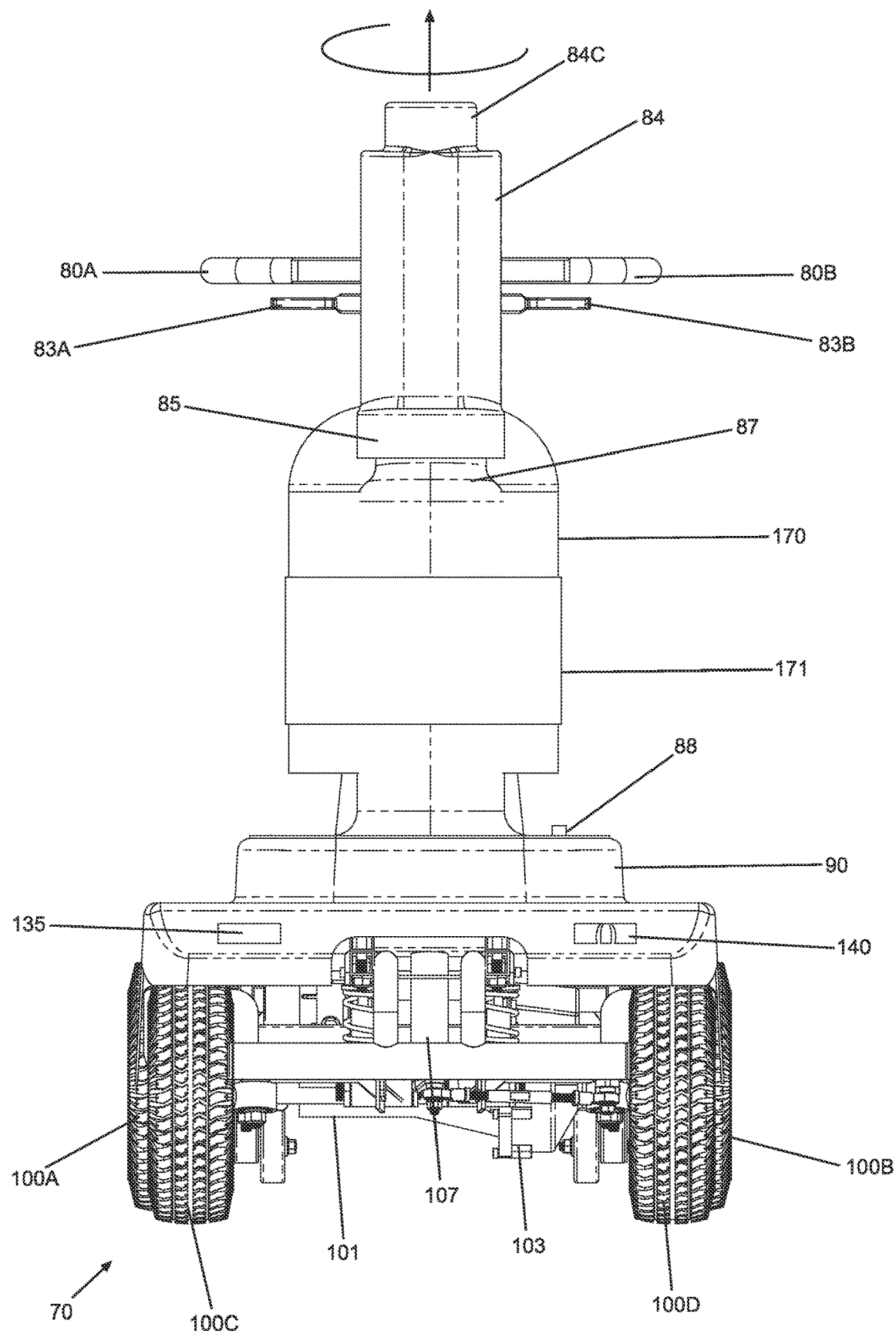
FIG. 12C is an elevated front view of the first illustrative embodiment of the electrically-powered amusement ride vehicle system shown in FIG. 11A, wherein the character head assembly and animal body skirt covering are both removed from the chassis of the vehicle, having two rear wheels driven by an electrically-powered drive train and motor, and two front wheels steerable by a manually-controlled steering console.
Figure 12D:
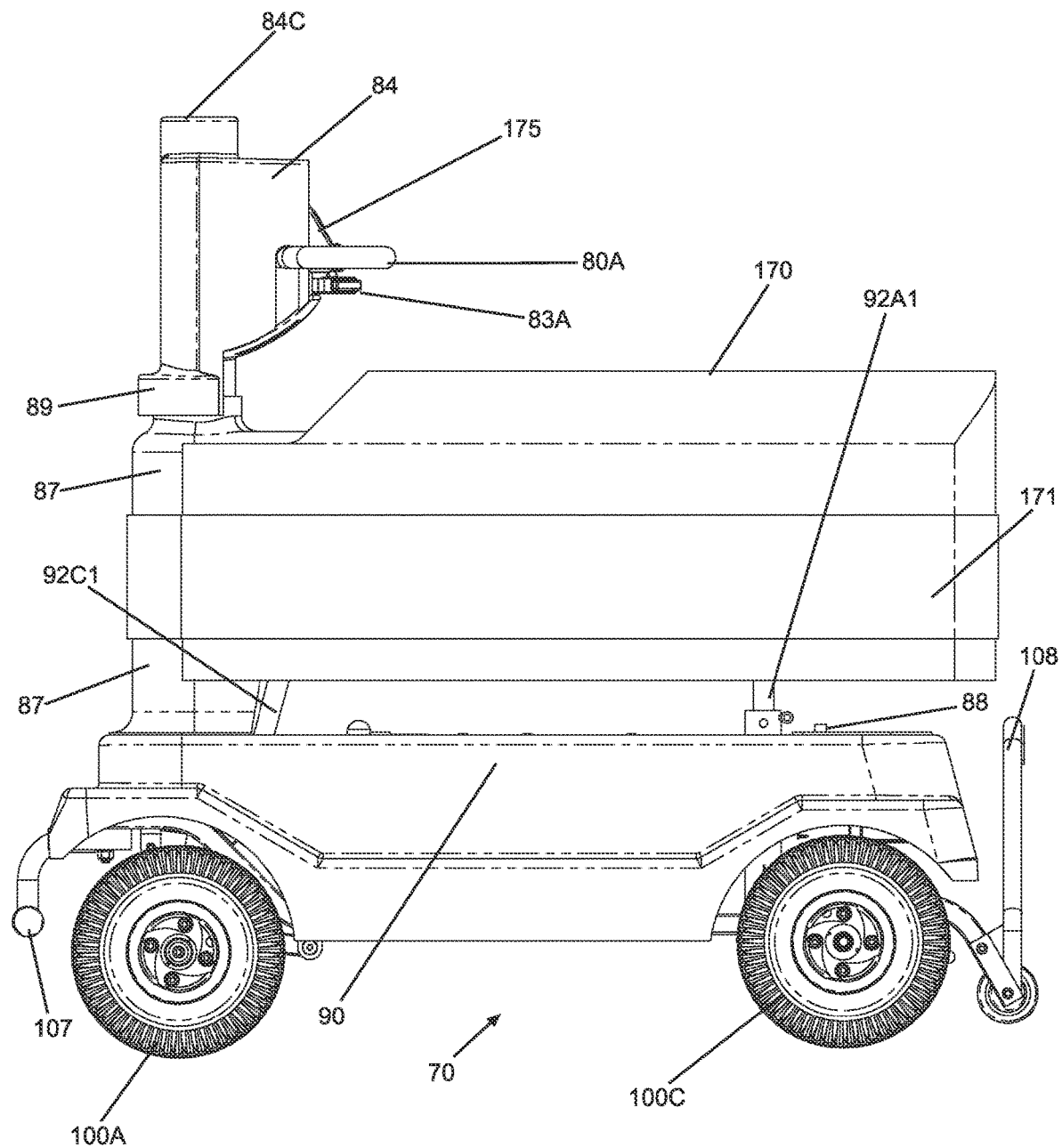
FIG. 12D is an elevated side view of the first illustrative embodiment of the electrically-powered amusement ride vehicle system shown in FIG. 11A, wherein the character head assembly and animal body skirt covering are both removed from the chassis of the vehicle, having two rear wheels driven by an electrically-powered drive train and motor, and two front wheels steerable by a manually-controlled steering console.
Figure 12E:
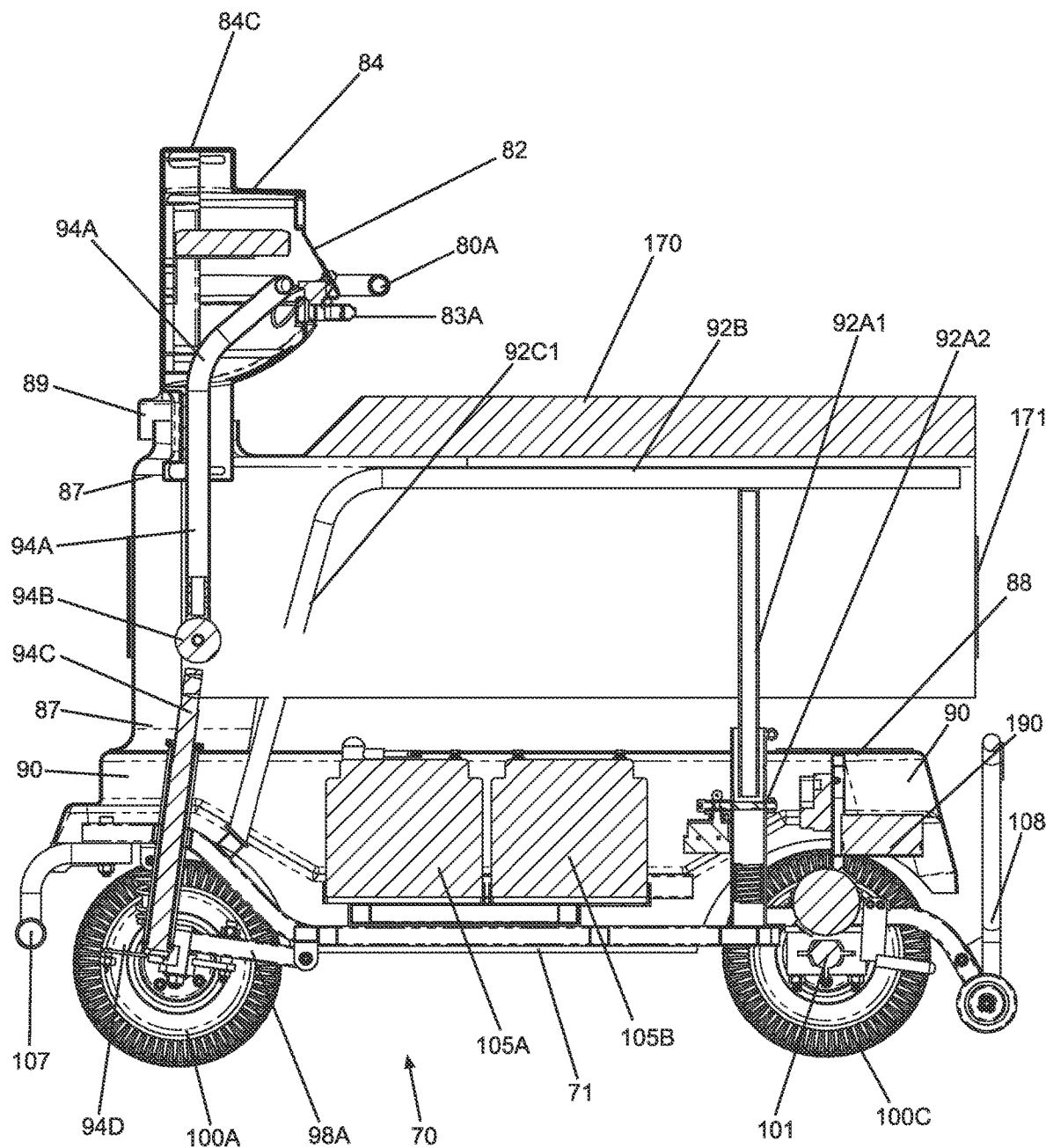
FIG. 12E is a cross-sectional view of the first illustrative embodiment of the electrically-powered entertainment vehicle system taken along line 12E-12E in FIG. 12C, wherein the character head assembly and animal body skirt covering, are both removed from the chassis of the vehicle, having two rear wheels driven by an electrically-powered drive train and motor, and two front wheels steerable by a manually-controlled steering console.
Figure 12F:
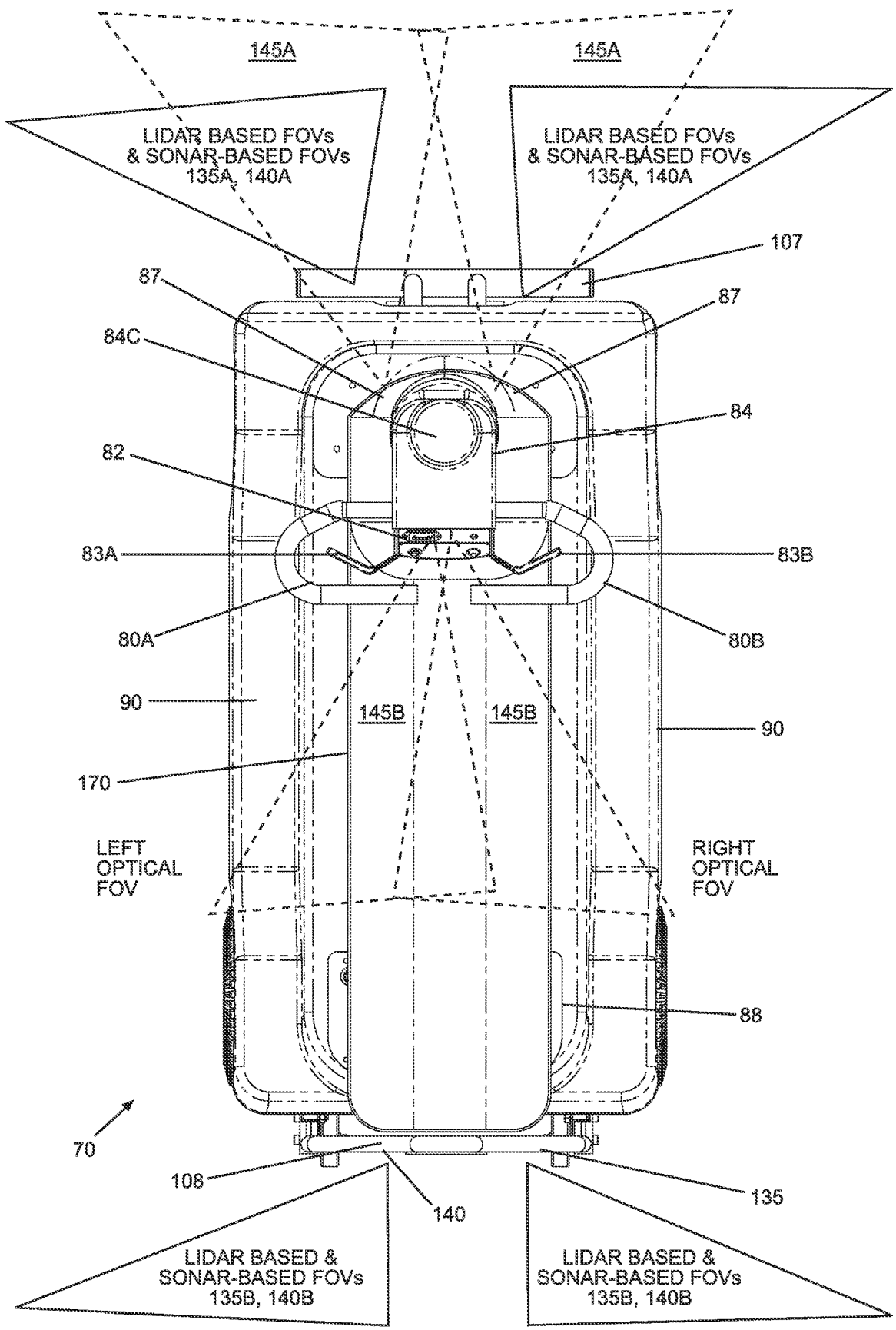
FIG. 12F is a plan view of the first illustrative embodiment of the electrically-powered entertainment vehicle system shown in FIG. 11A, wherein the character head assembly and animal body skirt covering are both removed from the chassis of the vehicle, having two rear wheels driven by an electrically-powered drive train and motor, and two front wheels steerable by a manually-controlled steering console.
Figure 12G:
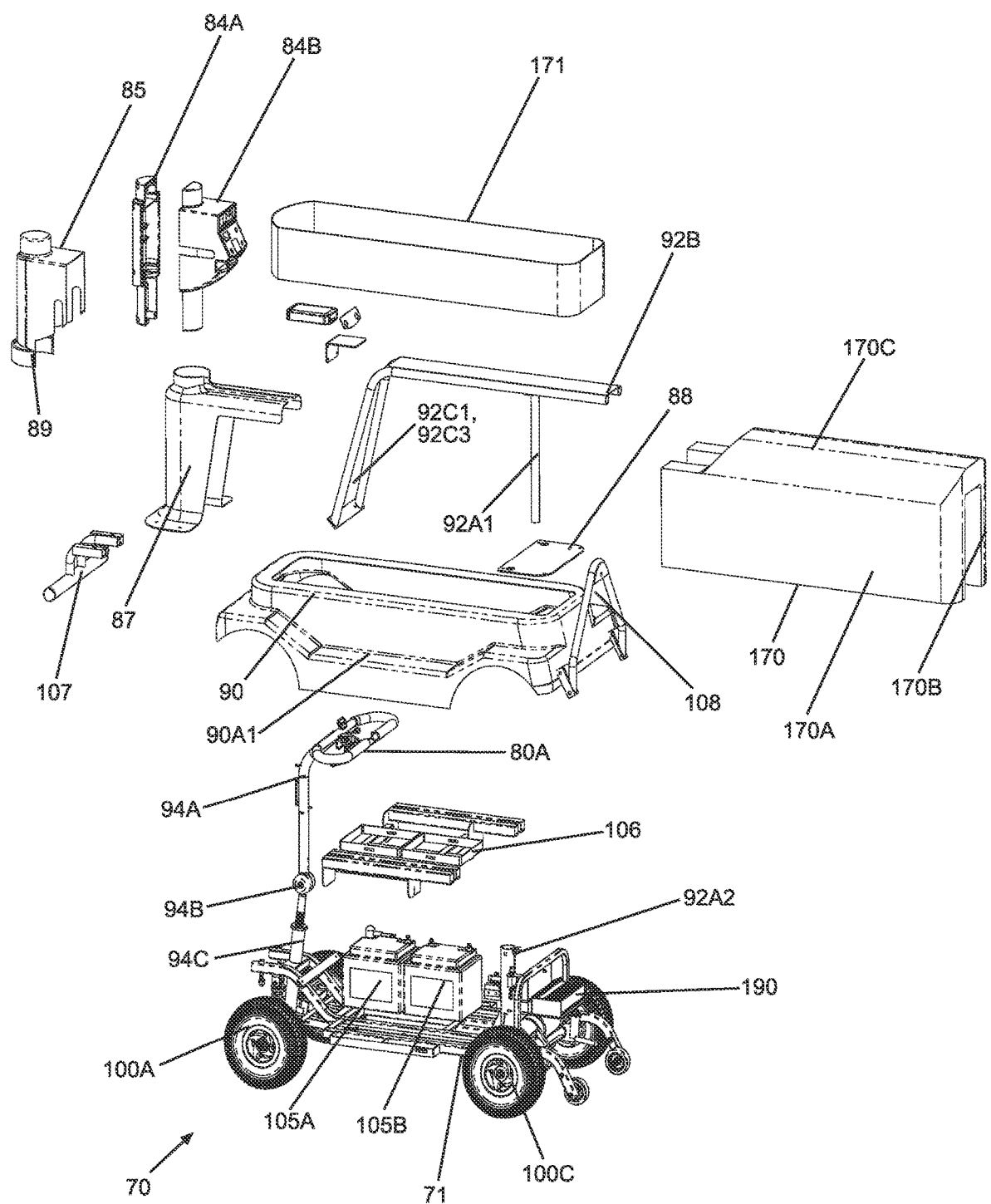
FIG. 12G is an exploded view of the first illustrative embodiment of the electrically-powered entertainment vehicle shown in FIG. 12A, showing the basic components that are used to construct the electrically-powered amusement ride vehicle, namely, (i) a chassis structure supporting four rubber-tire wheels connected by a pair of axles mounted to the chassis, (ii) a foot rest and electrical battery support bracket assembly for mounting on the chassis, (iii) a steering column and console assembly, (iv) a seat support bar assembly mounted to the chassis; (v) a seat cushion assembly configured and mounted over the seat support bar assembly and fastened thereto by way of a banding assembly, (vi) steering console assembly consisting of first and second housing halves for surrounding the upper portion of the steering shaft to form head assembly mounting post, about which a congruent hitching assembly can be supported and mounted and then fastened thereto, and (vii) a steering console cover housing for mounting about and covering the steering console assembly.
Figure 12H:
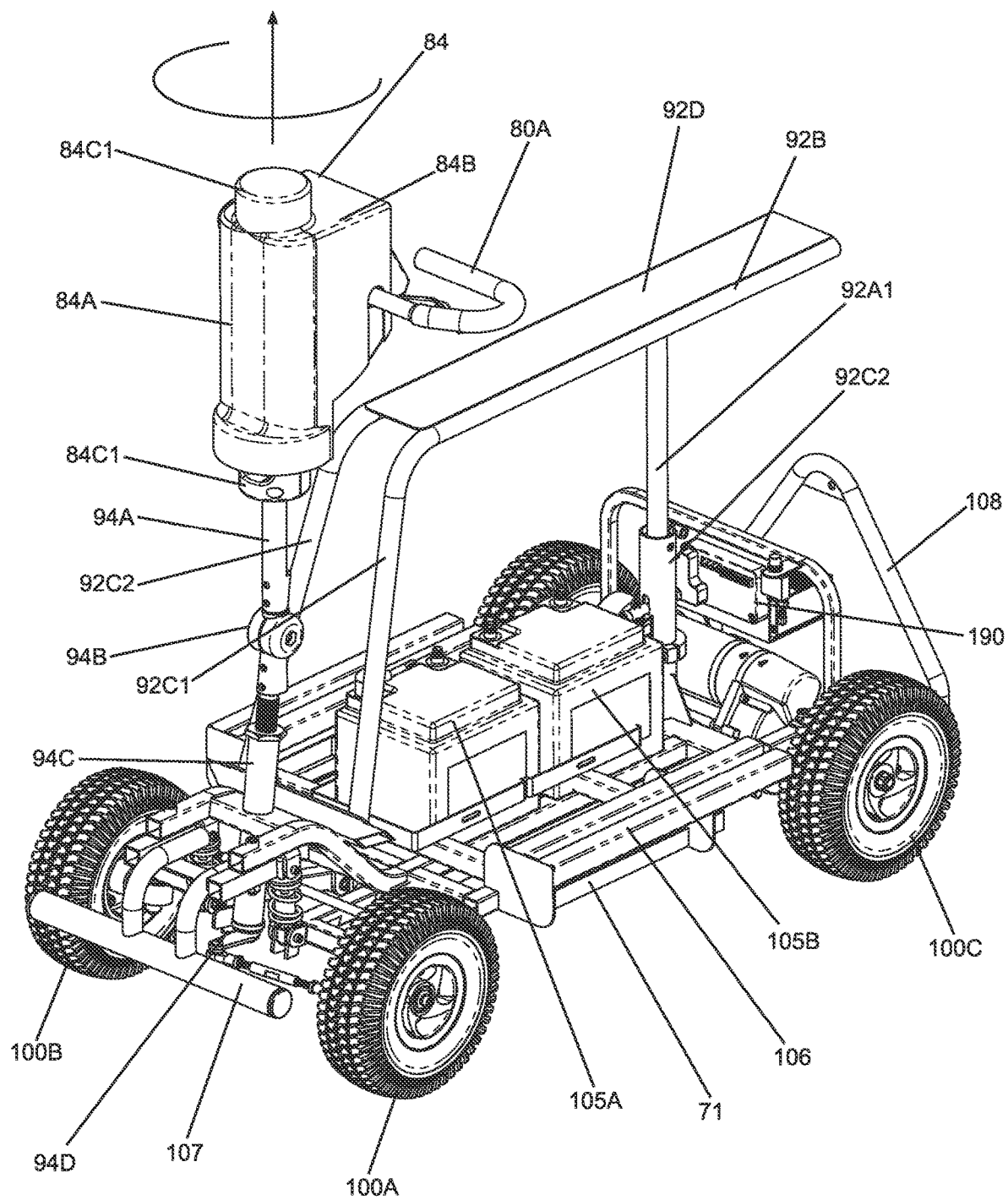
FIG. 12H is an elevated side partially cross-sectional view of the electrically-powered entertainment vehicle shown in FIGS. 12A, modified by the addition of (i) a child rider seat, a smartphone holder mounted on the steering console, and (i) forward and rearward looking trail camera systems having field of views (FOVs) looking both forwardly in the direction of travel, as well as rearwardly in the direction of the operation and passengers aboard the vehicle, having two rear wheels driven by an electrically-powered drive train and motor, and two front wheels steerable by a manually-controlled steering console.
Figure 12I:
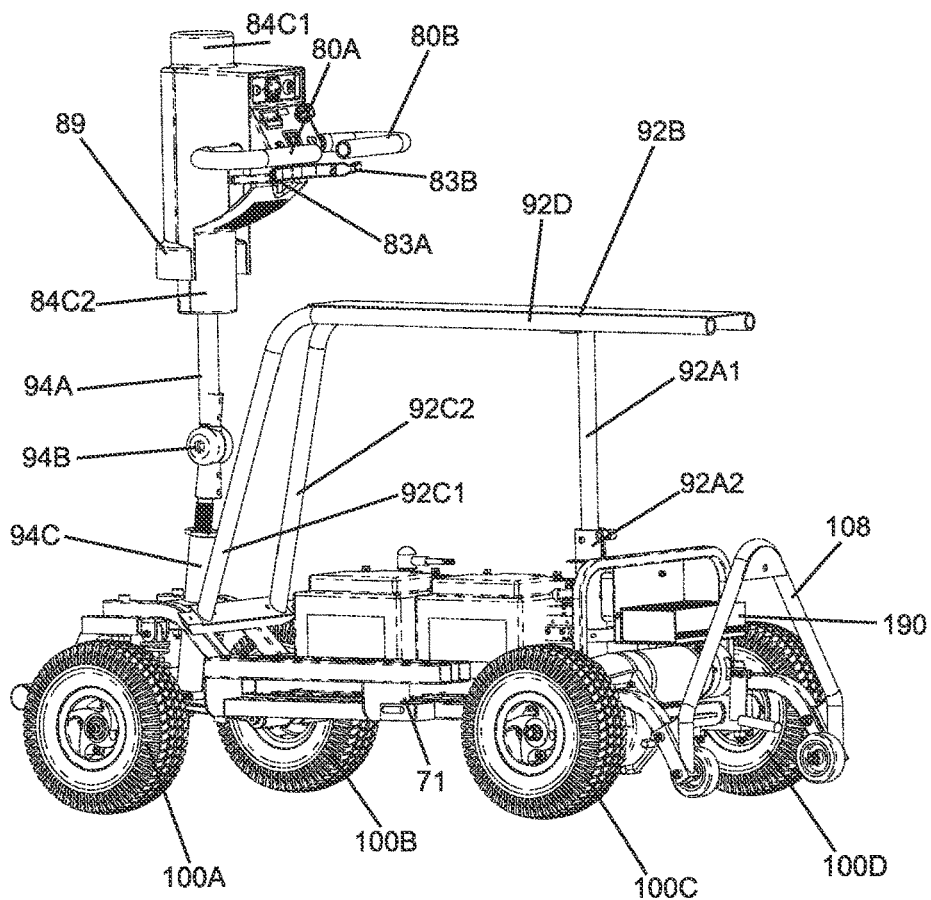
FIG. 12I is a perspective view of the electric entertainment vehicle of the present invention, with its animal character head assembly removed from its support, the animal character skin covering from the vehicle chassis, and the seat and cushioning assembly removed for illustration, while illustrating its steering console enabling its operator to manually steer to front wheels of electric entertainment vehicle.
Figure 12J:
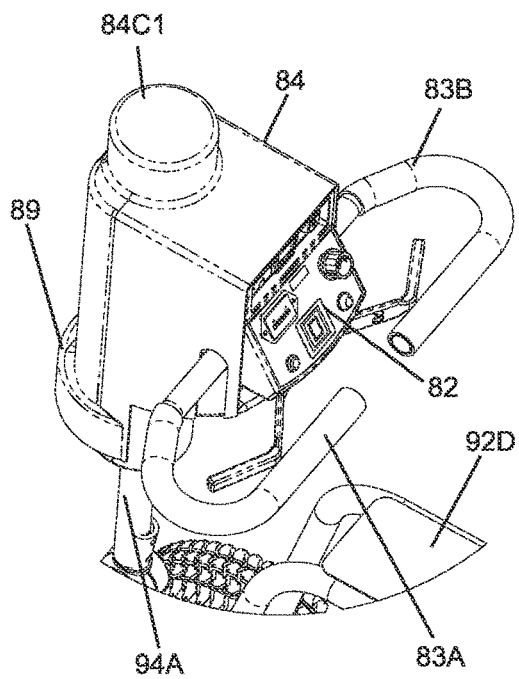
FIG. 12J is a partially cut-away view of the steering console shown in FIG. 12I and provided for to steer to front wheels of the electric entertainment vehicle of the present invention.
Figure 12K:
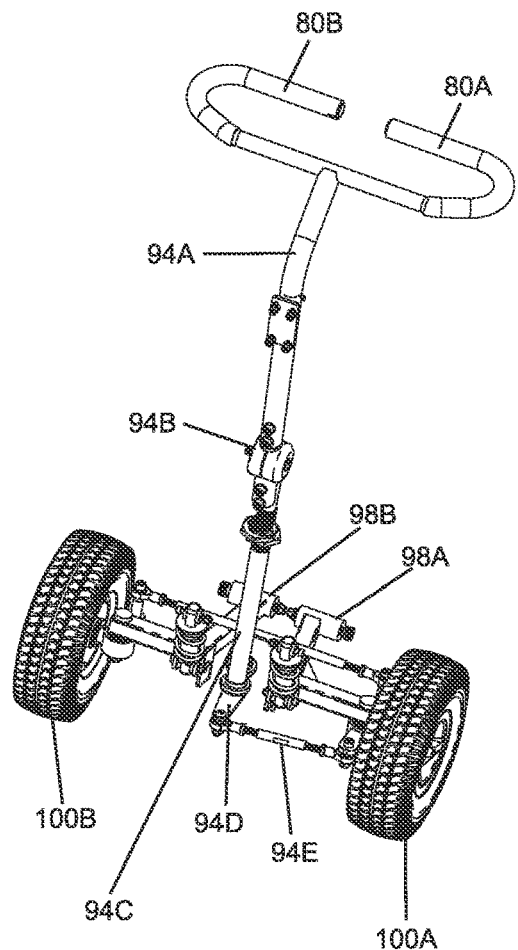
FIG. 12K is a perspective view on the front wheel steering mechanism assembly connected to the front wheels and steering linkage used to steer to front wheels of the electric entertainment vehicle of the present invention, but shown removed therefrom for purposes of illustration.
Figure 12L:
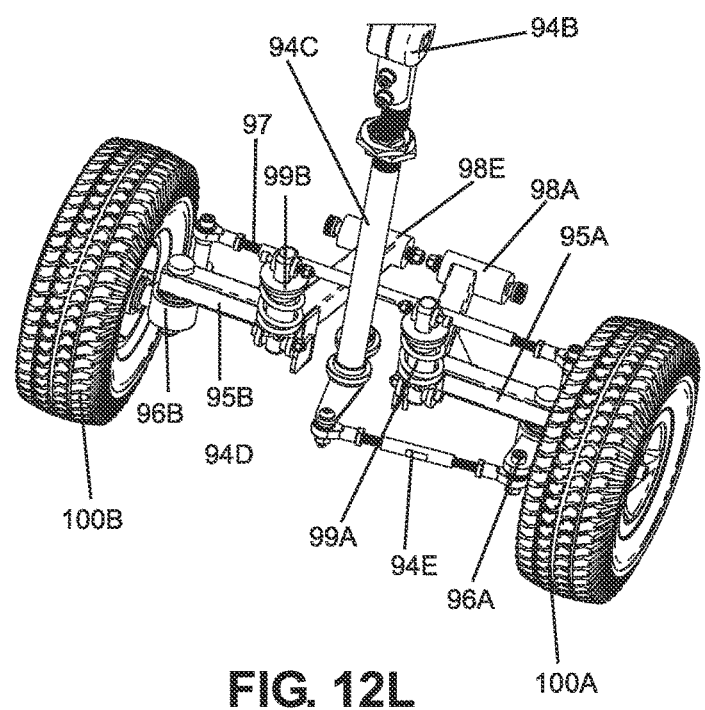
FIG. 12L is a partially cut-away view on the front wheel steering mechanism assembly shown in FIG. 12K.
Figure 12M:
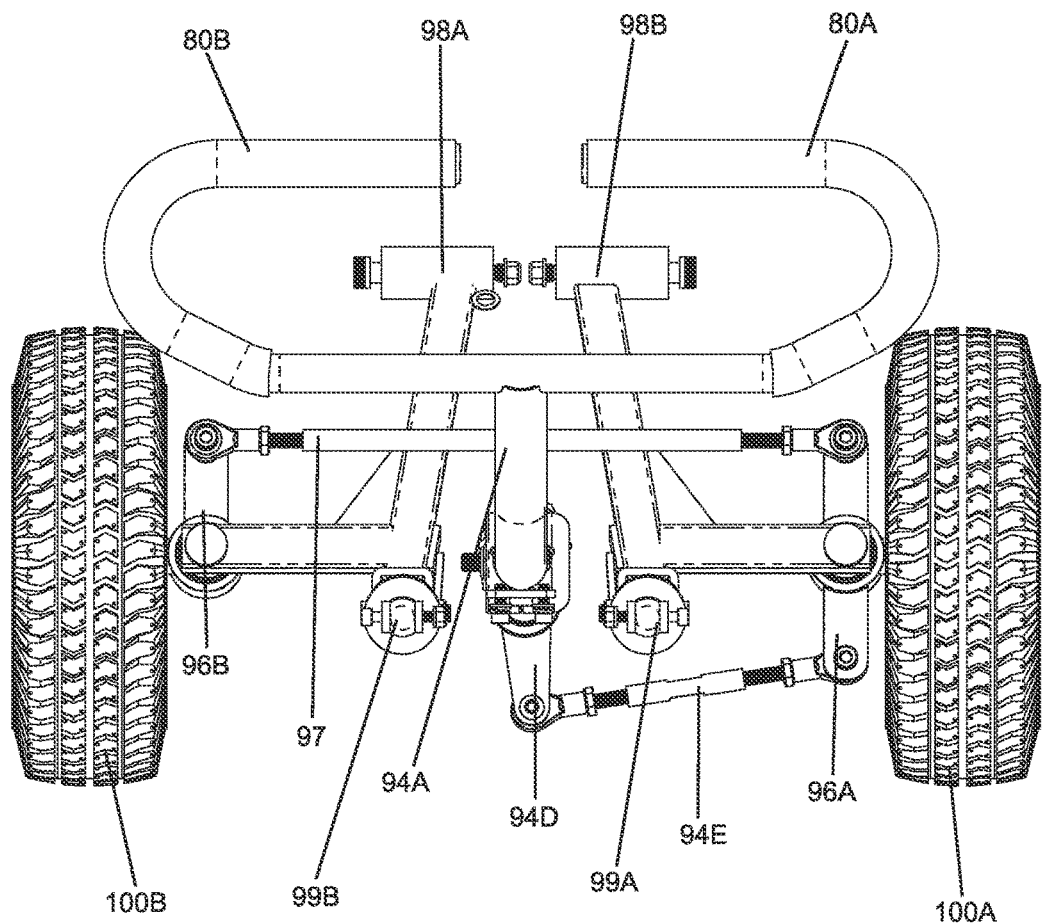
FIG. 12M is a plan view on the front wheel steering mechanism assembly connected to the front wheels and steering linkage shown in FIG. 12K, used to steer to front wheels of the electric entertainment vehicle of the present invention.
Figure 12N:
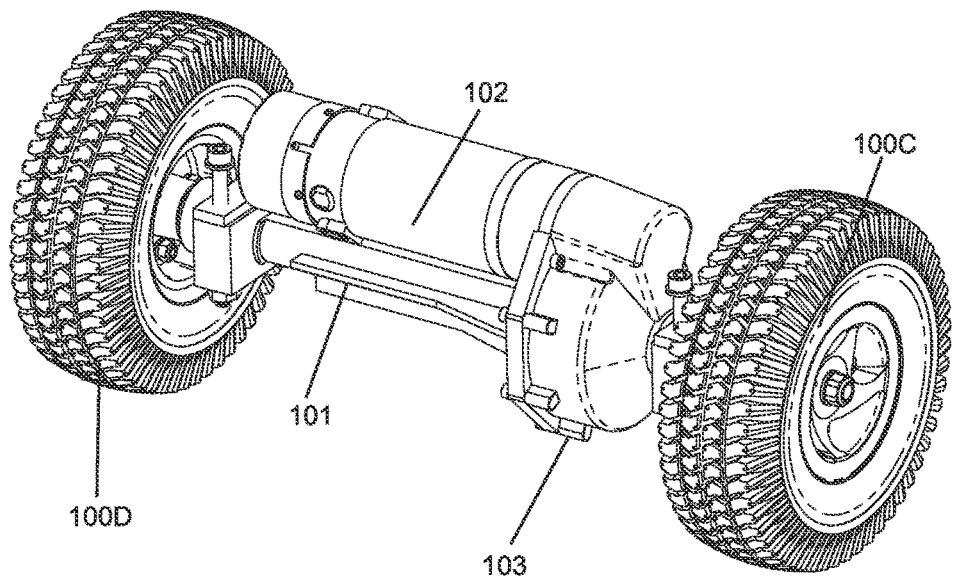
FIG. 12N is a perspective view on the rear wheels connected to the electric-motor riven drive train used to drive the electric entertainment vehicle of the present invention.
Figure 12O:
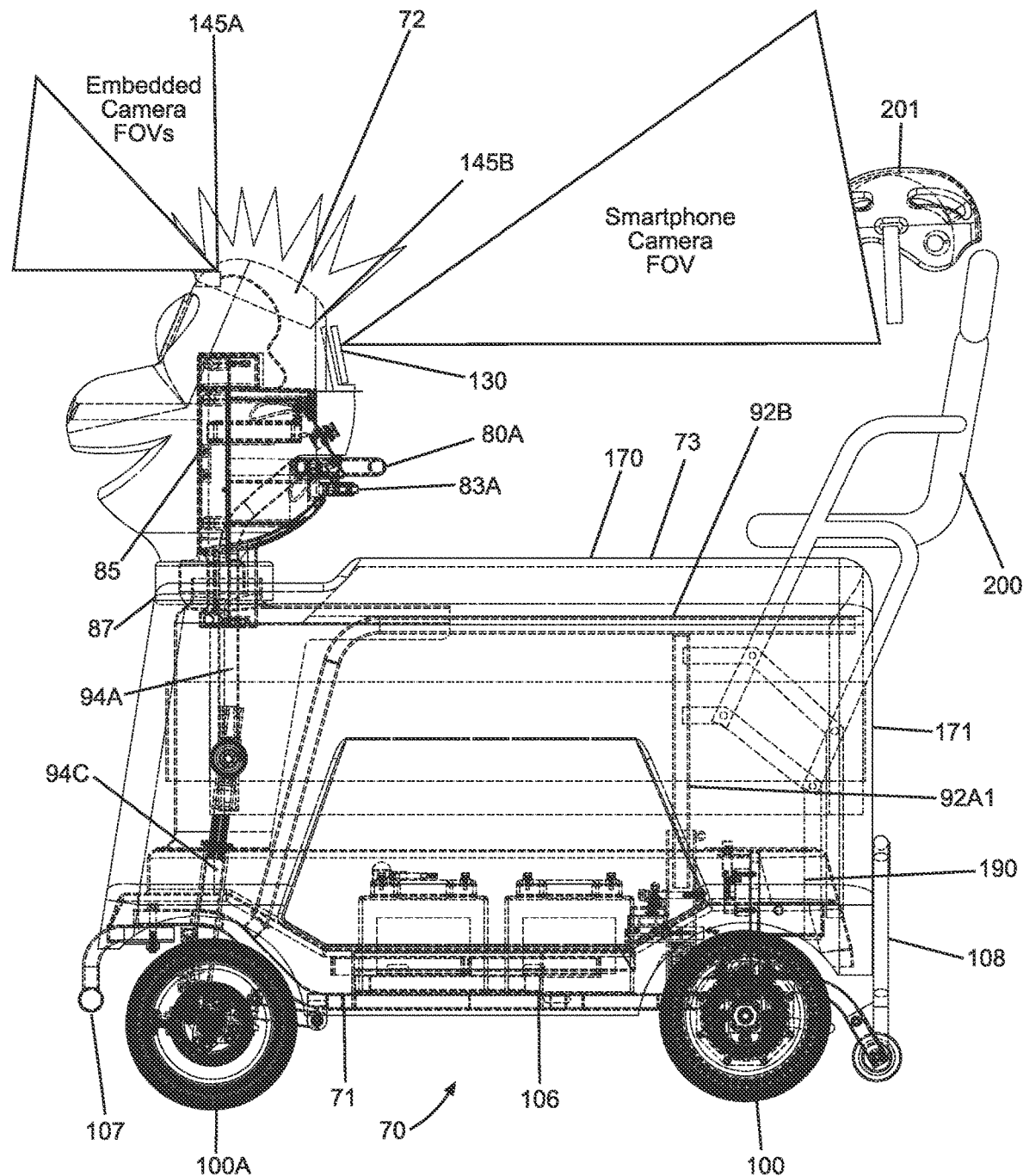
FIG. 12O is an elevated side partially cross-sectional view of the first illustrative embodiment of the electrically-powered entertainment vehicle system, wherein (i) a first pair of binocular field of views (FOVs) project forwardly from a first pair of digital video camera modules embedded within the character head assembly, and (ii) a second pair of binocular field of views (FOVs) project rearwardly from a second pair of digital video camera modules embedded within the character head assembly, and communicating with the mobile smartphone of the guest renter during vehicle operation.
Figure 13:
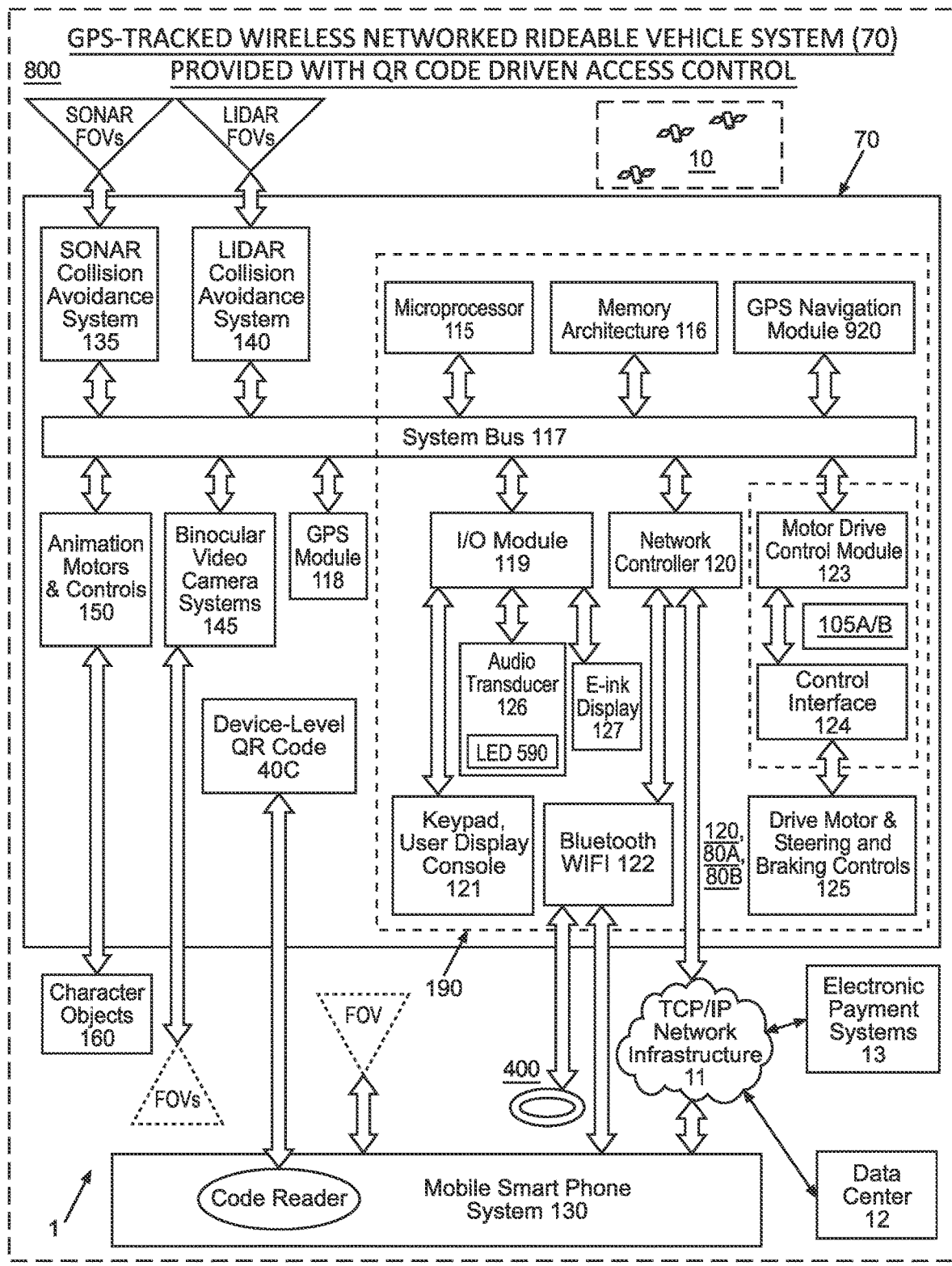
FIG. 13 is a schematic block system diagram showing the various system components used to construct the electrically-powered entertainment vehicle of FIGS. 9A through 12H.
Figure 14A:
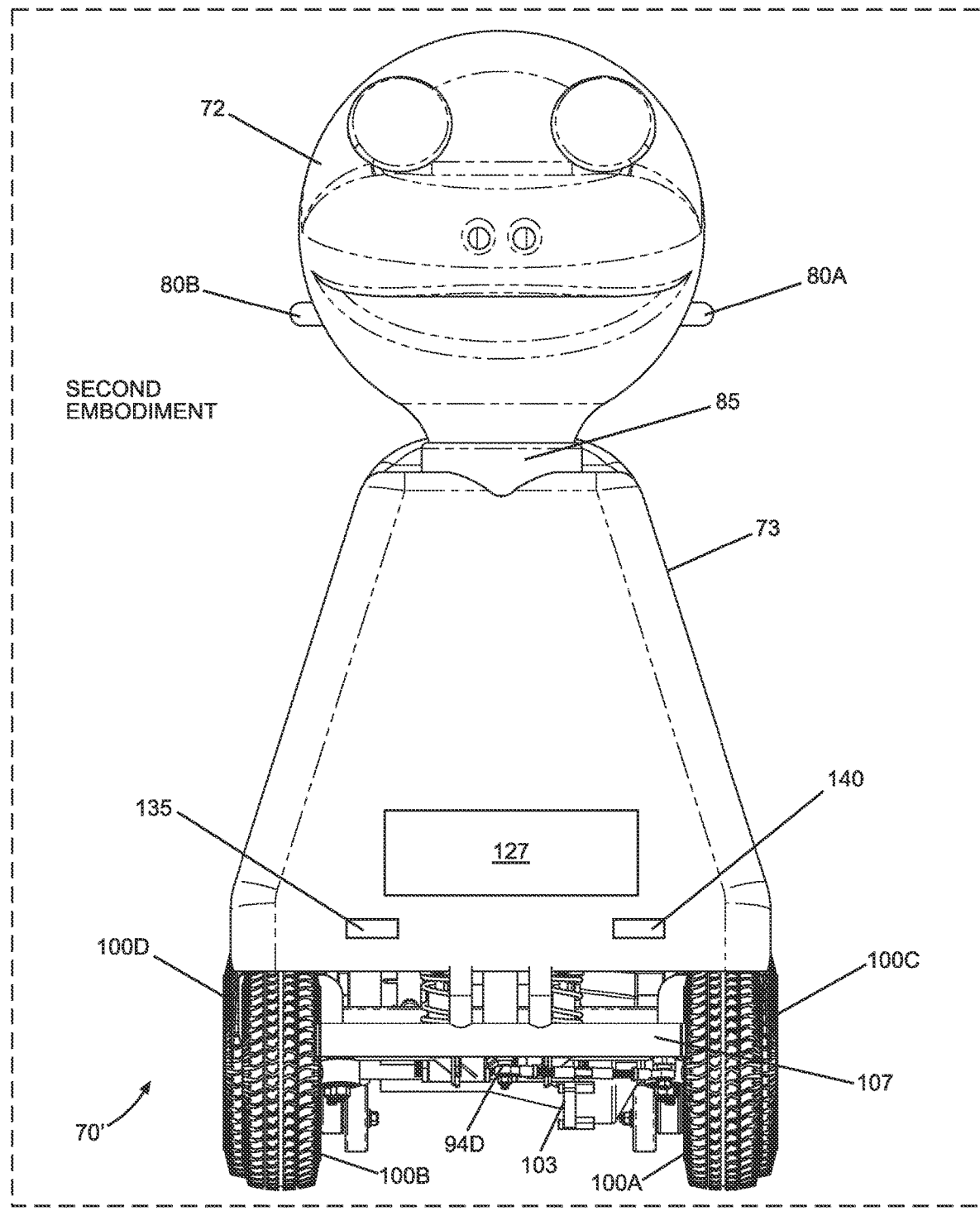
FIG. 14A is an elevated front view of a second illustrative embodiment of the electrically-powered entertainment vehicle system of the present invention, wherein the animal-shaped character head assembly and animal body skirt covering are both installed and configured on the chassis of the vehicle, having two rear wheels driven by an electrically-powered drive train and motor, and two front wheels steerable by a manually-controlled steering console.
Figure 14B:
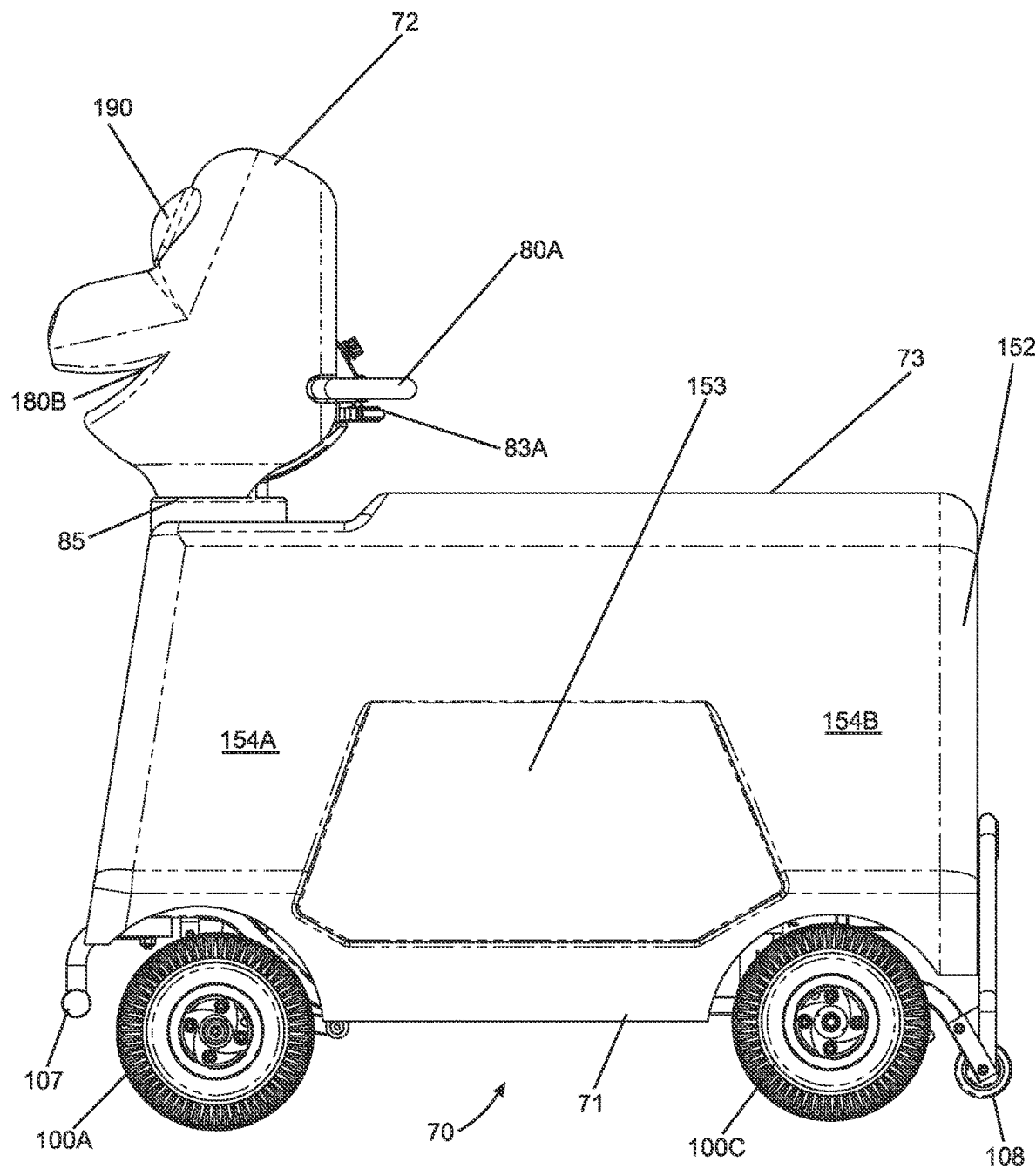
FIG. 14B is an elevated side view of the second illustrative embodiment of the electrically-powered entertainment vehicle system shown in FIG. 14A, wherein (i) an animal-shaped character head assembly and (ii) its animal body skirt covering, are both installed and configured on the chassis of the vehicle.
Figure 14C:
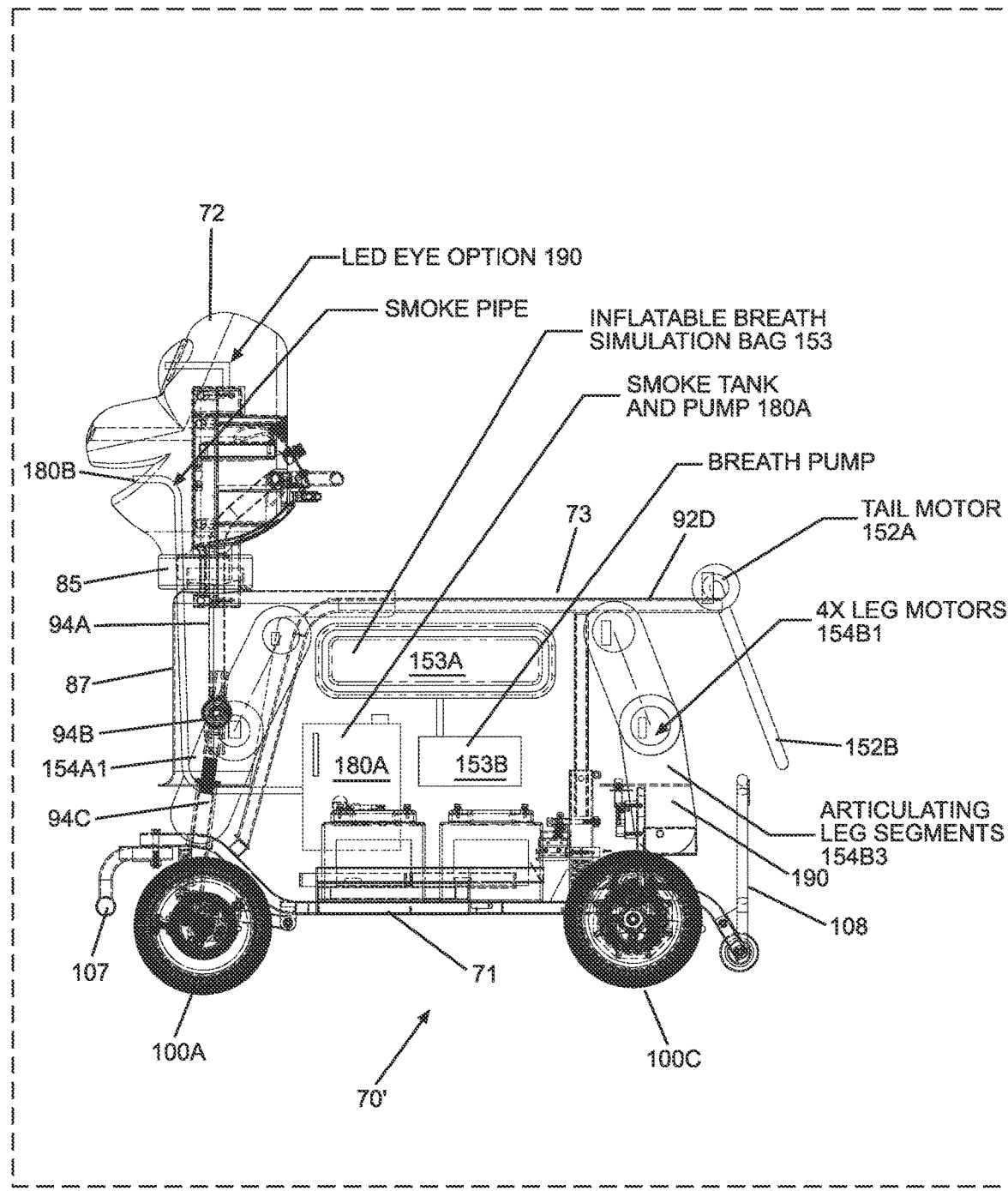
FIG. 14C is a cross-sectional view of the second illustrative embodiment of the electrically-powered entertainment vehicle system shown in FIG. 14A, wherein (i) an animal-shaped character head assembly and (ii) animal body skirt covering are both installed and configured on the chassis of the vehicle, having four wheels, an electrically-powered drive motor electronically-controlled by controls on the steering console, and electronically-controlled motor-driven body portions that can be driven into animation during vehicle operation.
Figure 14D:
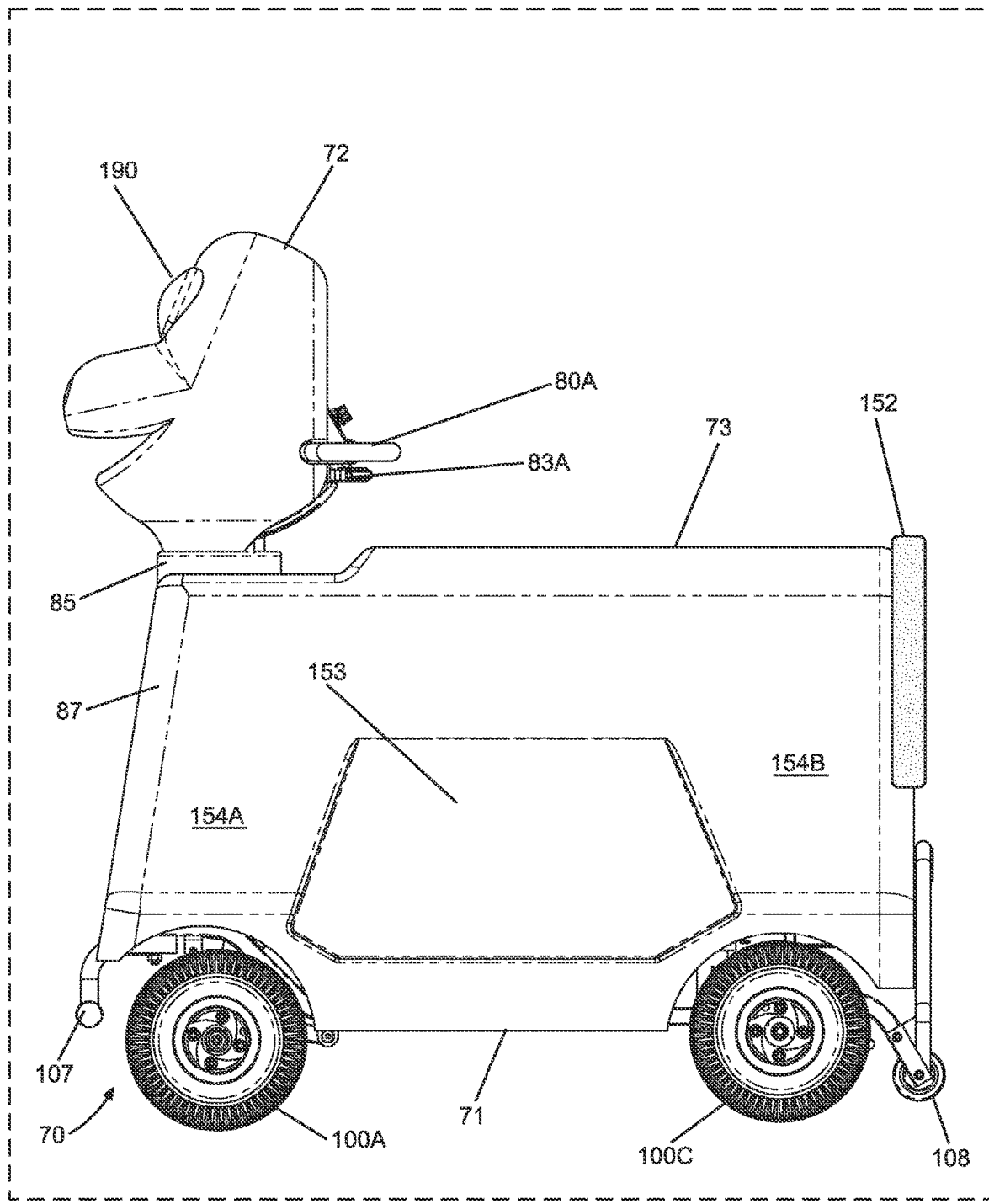
FIG. 14D is an elevated side view of the second illustrative embodiment of the electrically-powered entertainment vehicle system shown in FIG. 14A, wherein certain of its electronically-controlled motor-driven body portions are driven into animation during vehicle operation to emulate life-like resemblance and behavior.
Figure 14E:
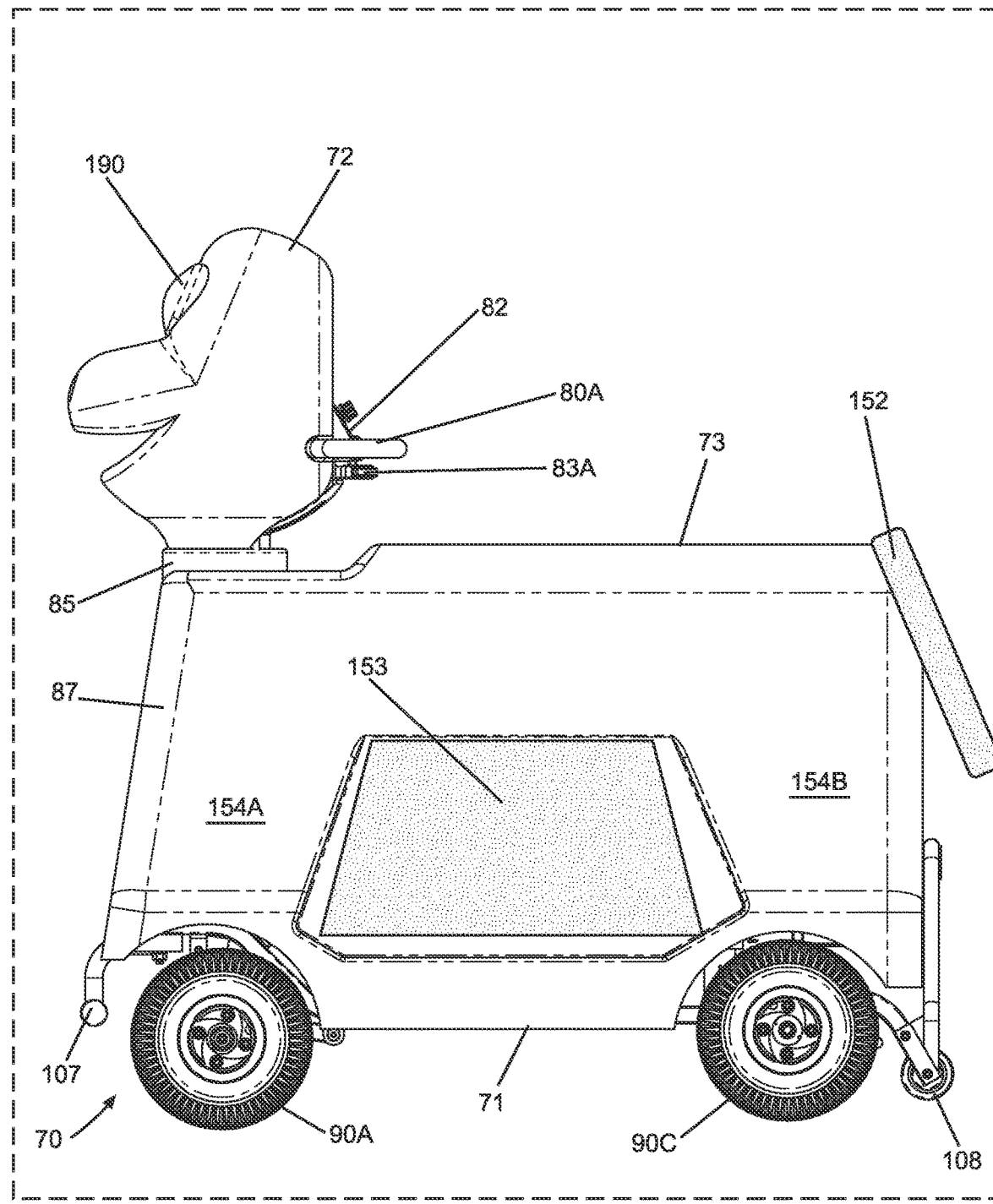
FIG. 14E is an elevated side view of the second illustrative embodiment of the electrically-powered entertainment vehicle system shown in FIG. 14D, wherein certain of its various electronically-controlled motor-driven body portions are driven into animated motion and/or transition during vehicle operation so as to emulate life-like resemblance and other forms of animated behavior.
Figure 16A:
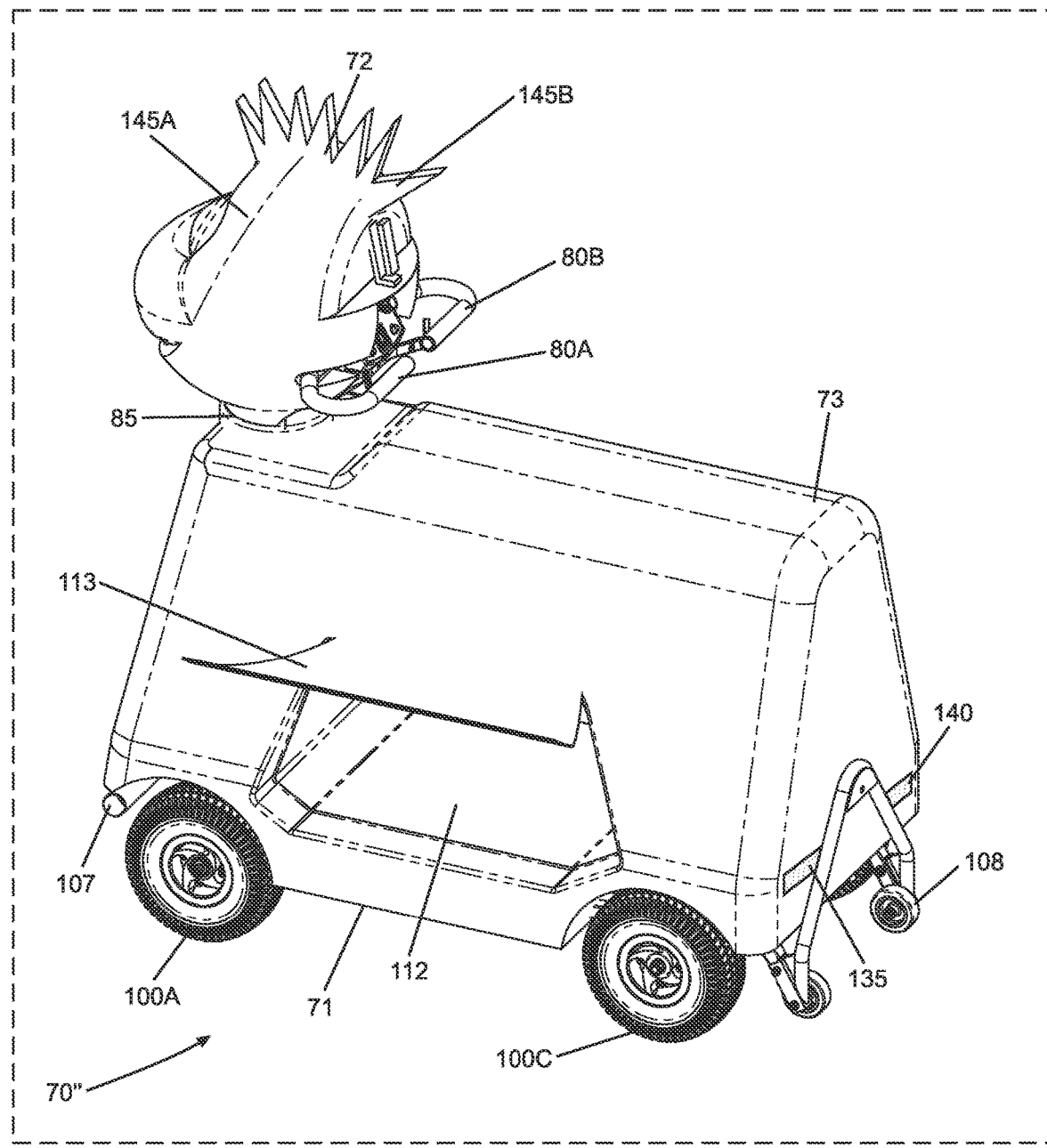
FIG. 16A is an perspective front view of a third illustrative embodiment of the electrically-powered entertainment vehicle system of the present invention, wherein (i) the animal-shaped body portion is provided with a pass-through central housing architecture that is adapted to contain and house either (i) a first networked single-sided personal storage locker system located on left side of vehicle, and a second networked single-sided personal storage locker system located on the right side of the vehicle, or a single networked double-sided personal storage locker system located beneath the seat portion of the vehicle, supported on the vehicle chassis, above the battery storage modules, and (ii) the animal body skirt covering is provided with flexible hinged-like panels, overlapping with locker door panels, and fastened with Velcro® hook and loop fasteners, so that the guest users can quickly lift up the animal skin panels and access the storage locker from either side of the vehicle to access and store personal belongings during the course of the vehicle rental.
Figure 16B:
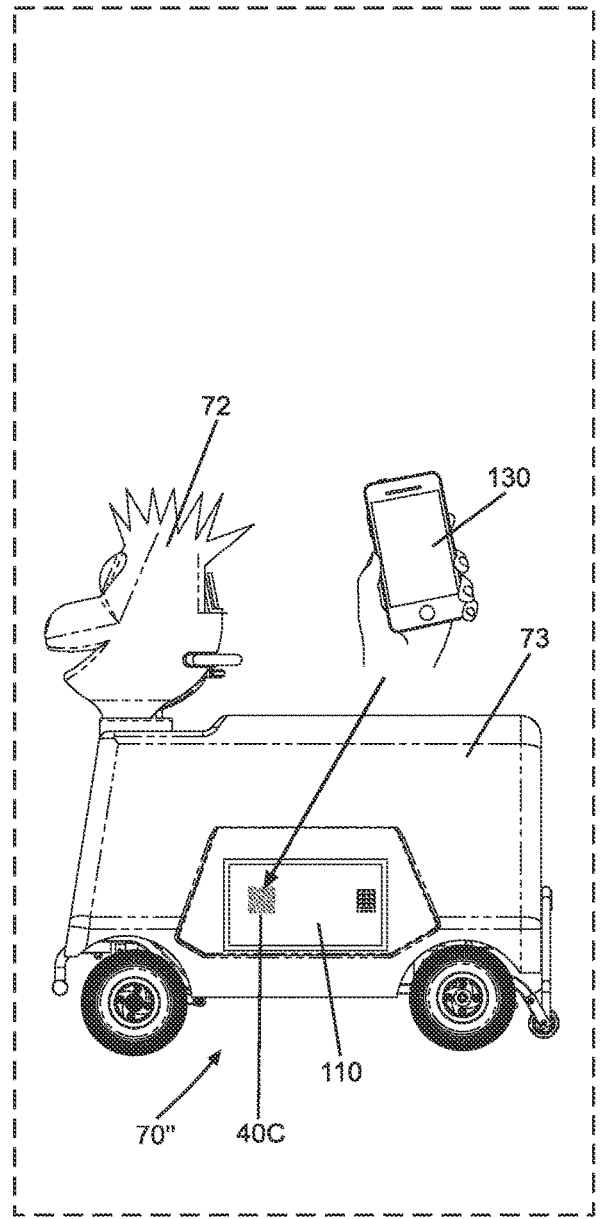
FIG. 16B is an elevated side view of the third illustrative embodiment of the electrically-powered entertainment vehicle system shown in FIG. 16A, showing the animal skin covering panel pulled back and revealing the networked storage locker system located on the left side of the vehicle.
Figure 16C:
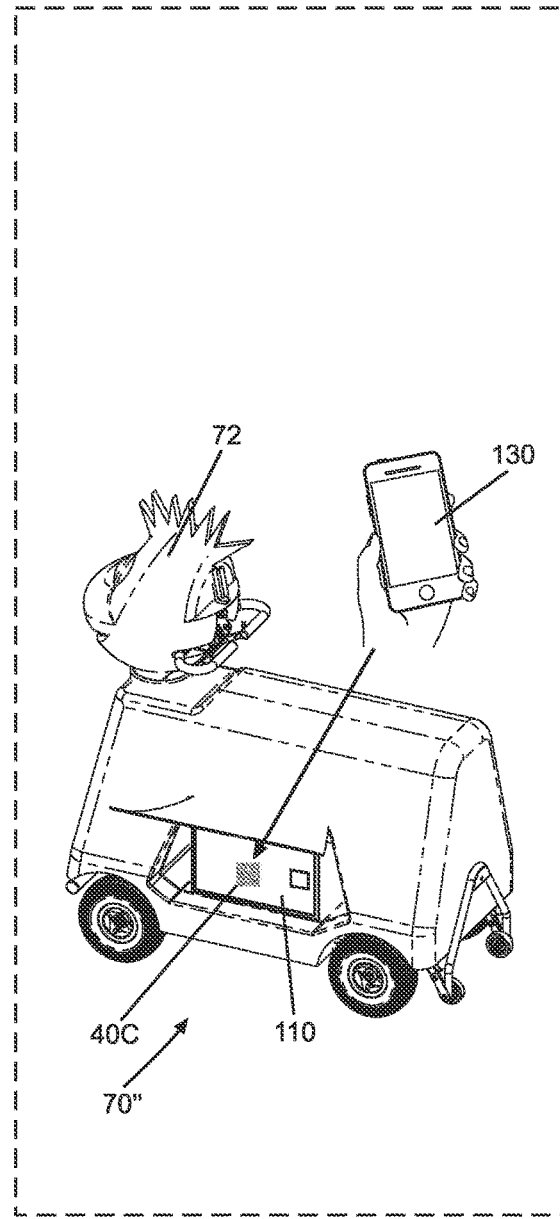
FIG. 16C is perspective side view of the third illustrative embodiment of the electrically-powered entertainment vehicle system shown in FIG. 16A, showing the animal skin covering panel pulled back and revealing the networked storage locker system located on the left side of the vehicle.
Figure 16D:
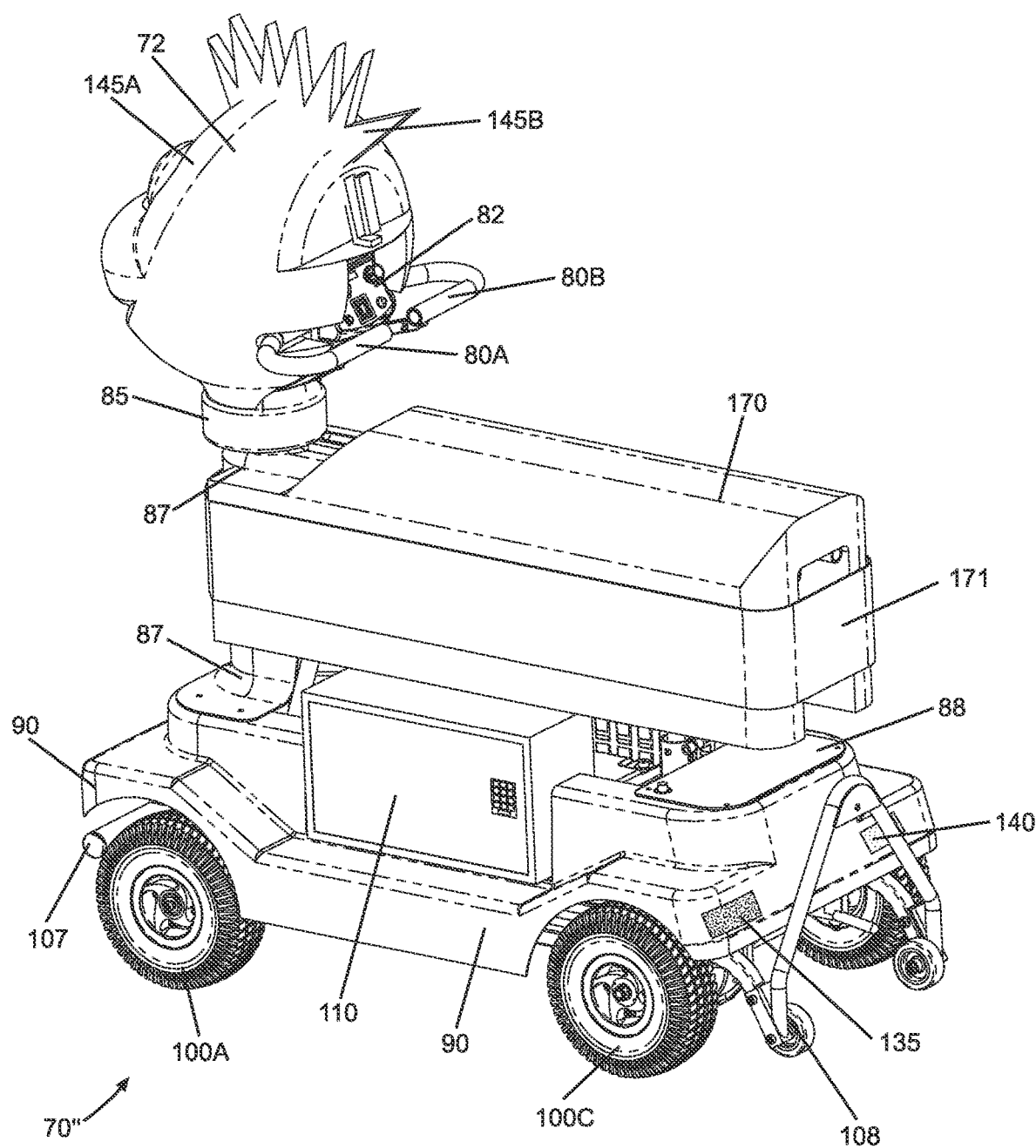
FIG. 16D is a rear perspective view of the third illustrative embodiment of the electrically-powered entertainment vehicle system shown in FIG. 16A, wherein the animal skin covering has been removed to reveal the personal storage locker system mounted on its chassis frame, above its four rubber tires.
Figure 18:
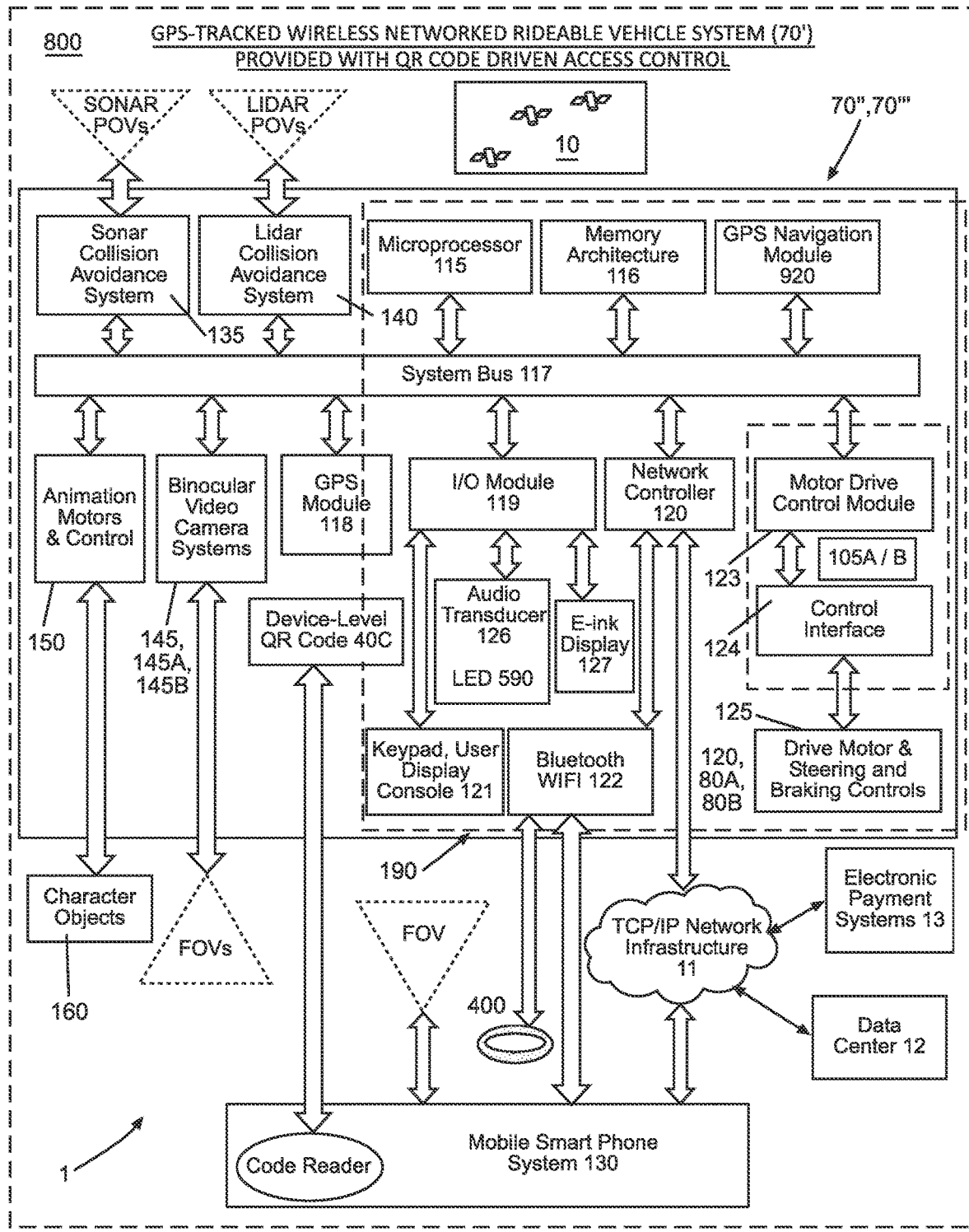
FIG. 18 is a schematic block system diagram showing the various system components used to construct the electrically-powered amusement ride vehicles of FIGS. 16A through 17A.

A set of lighting LEDs 590 integrated into the body exterior 73 of the vehicle system 70;

A set of audio-speakers 126 integrated into the animal head assembly 72 and other body portions for producing sounds and/or playing music from a smartphone application running on the rider's mobile phone or computing system 130;

An integrated digital video/still camera systems 145A and 145B integrated into the animal character head assembly 72 as shown in FIGS. 11A and 11B, with the Field of Views (FOVS) of the cameras oriented in several directions, including the direction of the riders sitting on the vehicle's seating saddle, to facilitate the easy capture of high resolution color photos of riders having fun and experiencing excitement, all transmittable to a specified email address at the instructions of the riders, for (i) reviewing and purchasing/licensing, and/or (ii) distribution and transmission to others across private networks and/or public social networks as desired, using the same (or different) mobile application used to initiate and conduct the vehicle rental transaction, but also many other social media applications as desired or required by the application at hand;

A set of customizable e-ink bumper displays 127, as shown in FIGS. 13, 15 and 18, allowing guest riders to express and entertain themselves, while riding the rented vehicle, via the Bluetooth wireless communication interface 122 and using controls wirelessly supported through the guest rider's mobile smartphone device 130 carried on their person or held in a vehicle supported mounting device adapted for holding the mobile phone 130, and wirelessly integrated with any suitable marketing communication network, or consumer product advertising network allowing consumer brands to send and post messages on the e-ink bumper or door panel display structures 127, as illustrated in FIGS. 4, 5A and 5B;

A set of electronic-ink (e-ink) message displays 127 posted or otherwise mounted aboard each vehicle, as shown in FIG. 10B to send message to world from the guest's mobile smartphone 130 wirelessly interfaced with the Bluetooth communication interface 122 provided within the steering assembly 84;

One or more electronically-controlled ultrasonic vapor, steam and/or smoke generators 180A mounted aboard the vehicle 70, in the head and/or the character body portions of the ridable vehicle, as shown in FIG. 14C, actuatable by the passenger and/or other GPS-trackable event so as to initiate and emulate certain animal behaviors using the vehicle 70;

An electric beverage cooler and/or personal electronically-locked safe module option 110 mounted aboard each rideable vehicle, as shown in FIGS. 16B, 16C and 16D;

An electronic wireless-networked storage locker module 110 option for mounting aboard each rideable vehicle, beneath the setting assembly as shown in FIGS. 16B, 16C and 16D;

An UV-ray-blocking/sun-screening canopy 950 mounted above the seat assembly as shown in FIG. 12O;

A GPS-tracking module 118, with supporting X-band antennas, mounted within the vehicle for supporting GPS-tracking services of the vehicle moving while deployed within the wireless GP-tracking vehicle access control system network;

One or more GPS-electronic fence-based systems 900 schematically depicted in FIG. 8F, supporting the marketing of goods/services to the guests driving rented vehicles, as illustrated in FIG. 5A;

A set of protective wheel coverings (matching ornamental body) over each wheel on the vehicle 70;

A set of maximum vehicle speed control limits adjustably set by the GPS-tracking wireless system network 1 for each GPS-tracked vehicle 70 deployed for monitored and remotely-controlled operation within particular predefined zones specified within an environment/facility;

A set of GPS-tracking/RFID-enabled wristbands 400, each being worn by authorized drivers linked to specific vehicle 70, and detected by a steering wheel proximity detector to automatically enable system operation only when a GPS-tracking/RFID-banded guest is sitting in operator/driver's seat 170;

A set of GPS-tracking/RFID-enabled family wristbands 400, each being worn by a group of family members, and being GPS-tracked along with the rented vehicle by the GPS-tracking system network 1 so to maintain the family within a locally managed distance about the rented vehicle moving within the facility, as illustrated in FIGS. 6, 13, 15 and 18;

A LIDAR-based automated collision avoidance system 140 integrated into vehicle as shown in FIGS. 13, 15, 18, for automatically sensing the environment surrounding each ride vehicle system using LADAR beams and detecting the presence of animate and/or inanimate objects within the vehicle's surrounding 360 degree field, and where precisely such detected objects reside (and where they are moving) relative to the location of the vehicle at any moment in time, and carry out real-time methods to automatically avoid collision and/or other strategies of avoidance to promote the safety and enjoyment of both the vehicle operators and park guests;

A sonar-based automated collection avoidance system 135 integrated into the vehicle and adapted for automatically stopping vehicle motion when in proximity of an object (e.g. pedestrian or park fixture) located within 6-8 feet from the vehicle's front bumper during forward motion, or when in proximity of an object located 6-8 feet from the vehicle's rear bumper during backward motion (if enabled), as illustrated in FIGS. 13, 15 and 18, for automatically sensing the environment surrounding each ride vehicle system using ultrasonic beams and detecting the presence of animate and/or inanimate objects within the vehicle's surrounding 360 degree field, and where precisely such detected objects reside (and where they are moving) relative to the location of the vehicle at any moment in time, and carry out real-time methods to automatically avoid collision and/or other strategies of avoidance to promote the safety and enjoyment of both the vehicle operators and park guests;

An automated cloud-based GPS-enabled navigation system (i.e. module) 920, integrated into each vehicle, for (i) providing directions, displays and messages to guest riders about specific directions required to reach particular park sites in the environment, as well as (ii) generating and executing automated navigation control instructions to control and navigate the vehicle along a specific course of travel to a specific destination, while avoiding any obstacles that may be presented along the course travel, informed by the SONAR and LIDAR based systems 145A and 145B described herein;

An automated electric-battery recharging notifications and messages displayed on the steering console display 121;

An automated display of recharging docking station (700) locations within a facility, and notifications on when battery recharging operations are recommended, or mandatory, for each electric entertainment vehicle, based on the state of a vehicle's battery-cell based electrical energy storage system 105A, 105B aboard a given vehicle;

Device-Level machine-readable QR codes 40C on each vehicle to enable access and control within the GPS-based cloud-based vehicle access control system network 1;

A set of narrow-body electric-battery storage modules configured and stored beneath the seating assembly 170 as shown in FIG. 12F;

A narrow seating construction 171 as shown in FIG. 12A, 12F, 12G for enabling safe seating on vehicle during transport operations;

A mobile-phone carrier support 82 for securing holding the guest's smartphone or table computer 130 while allowing its FOV to be projected rearwardly for selfie-type video imaging during vehicle operation;

An automated binocular video camera system 145A mounted onboard within the animal character head assembly 72 with FOVs directed for forward motion imaging, as shown in FIGS. 12F and 12O;

An automated binocular video camera system 145B mounted onboard within the animal character head assembly 72 with FOVs directed for rearward motion imaging;

An animal sounds emulation production system 126 for producing selected animal or inanimate object sounds from a transducer aboard the vehicle when triggered from a button on steering column and/or the guest operator's mobile smartphone;

An automated lighting effects generation system 591 integrated into the animal body exterior for producing desired lighting effects from LEDs 590 mounted within the surface of the vehicle's body;

An animated motion control surfaces 150 mounted on the vehicle chassis to enable animal body motion and behaviors, and/or facial expressions, under remote control of (i) the operator, or under automated control of the vehicle system, or (ii) GPS-tracking system network 118 triggered when near particular GPS-specified objects in the park facility, as shown in FIG. 5A, to promote enjoyment, amusement and a fun ride experience;

A dashboard-mounted electric power recharging port 450 for snap-lock insertion of a suitably adapted power recharging plug that fits into the power recharging port 450 and is connected on one end to a flexible power cable that extends back to a DC power recharging station, known in the electric vehicle power recharging arts; Related to GPS:

A Virtual Odometer, wherein the GPS tracks the vehicle milage, and automatically sends notice to staff and SM technicians after X miles of riding—that vehicle maintenance and service is due;

Vehicle Dashboard Camera 145B (FIG. 16A) used as driving safety tool, wherein a dashboard digital camera 145B is mounted in the dashboard or head portion of the vehicle and configured in a loop-record mode, and/or synchronized for storage and archiving on a cloud-based information server, and/or arranged for video data storage on a memory card maintained aboard the vehicle (or on a local wireless network), for the purpose of encouraging guests to be cautious while riding and operating the electric vehicle, and reduce frivolous and/or fraudulently commenced litigation against the park and/or electric ride vehicle operator;

These various technical and inventive features will be described in greater detail hereinafter and in the Drawings.

Specification of the GPS-Tracked Electrically-Powered Electric Ride Vehicle System of the Present Invention Equipped with a Sample Animal Head Assembly and Generic Animal Skin Covering FIG. 10A shows a first illustrative embodiment of the GPS-tracked electrically-powered entertainment ride vehicle system of the present invention. As shown, the vehicle 70 is provided with (i) an animal character head portion 72 embodied about the steering console 84 of the vehicle system, and (ii) an animal body skirt portion 73 covering over and supported by the chassis 71 of vehicle having four wheels 100A, 100B, 100C and 100D. As shown in FIGS. 12H, 12I, 12J, 12K, 12L, 12M and 12N, the two front wheels 100A and 100B are steerable using the steering linkage 94A, 94B, 94C and 94D provided within the steering column assembly 84. The pair of rear wheels 100C and 100D are mounted on an axle 101 that is electrically-powered with torque via a drive motor 102 and drive train 103 that is electronically-controlled by controls provided on the steering console 82.

Figure 10C:
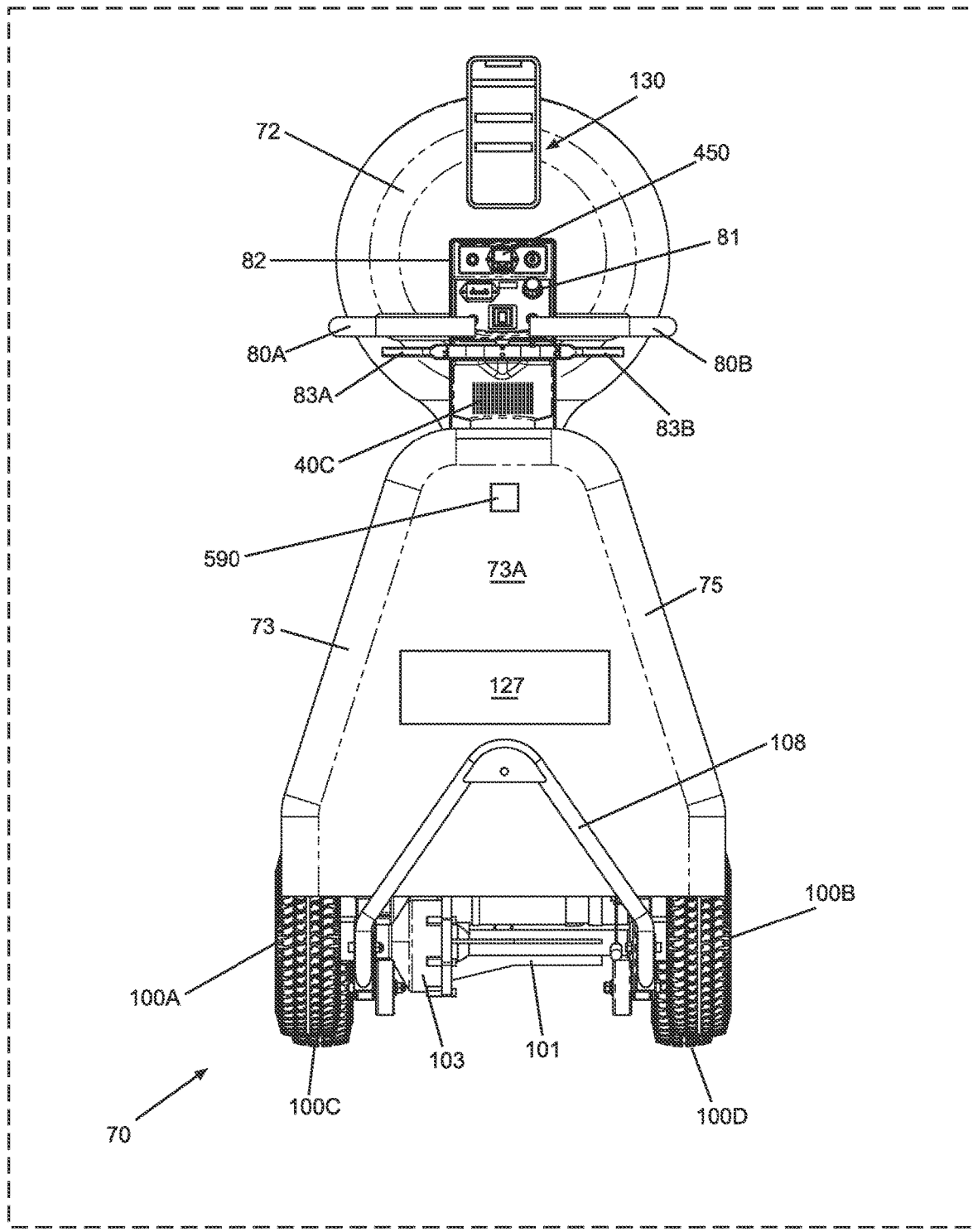
FIG. 10C is an elevated rear view of the first illustrative embodiment of the embodiment of the GPS-tracked electrically-powered entertainment vehicle system of the present invention shown in FIG. 10A.
Figure 10D:
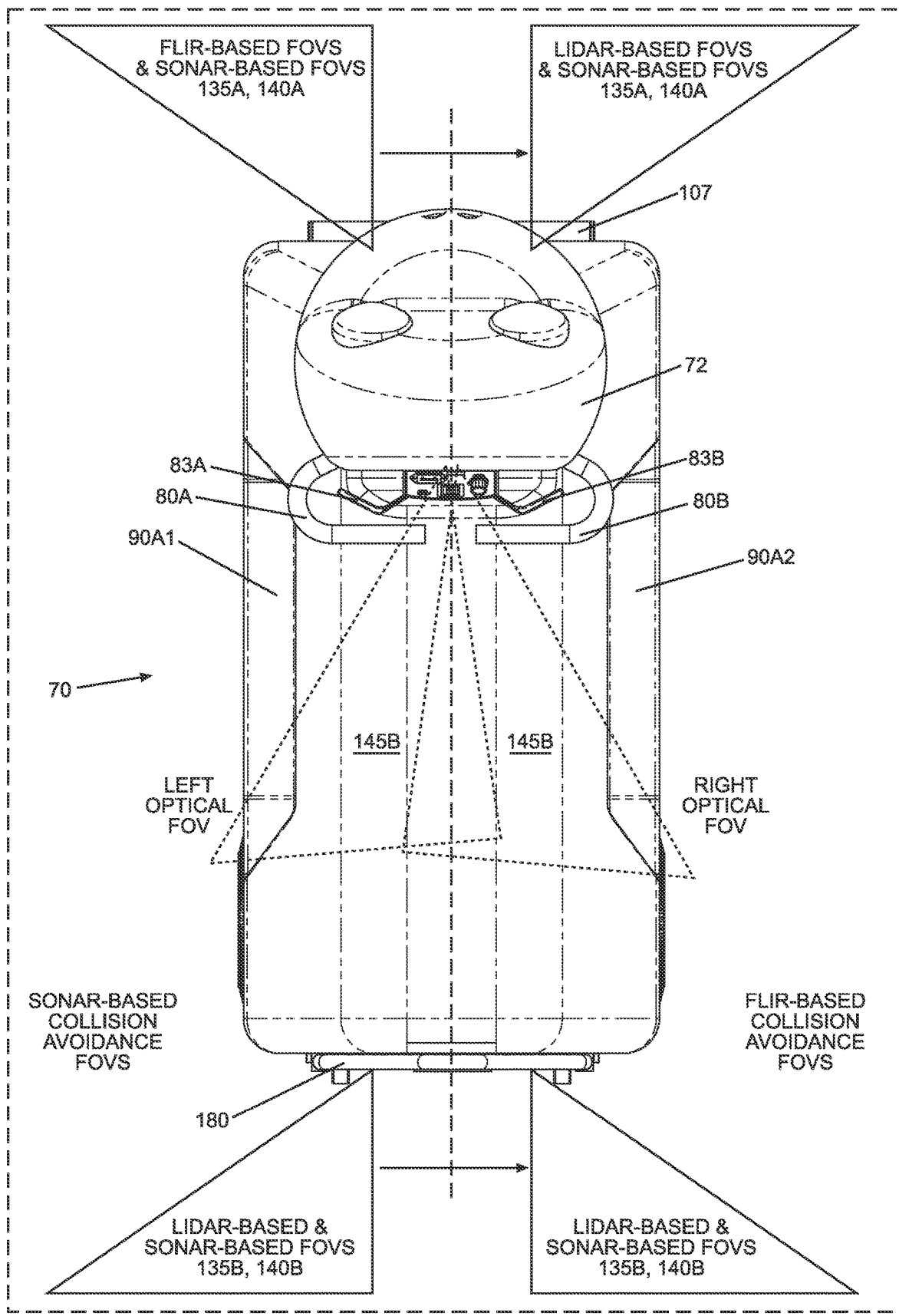
FIG. 10D is a plan view of the first illustrative embodiment of the embodiment of the GPS-tracked electrically-powered entertainment vehicle system shown in FIG. 10A, showing the spatial boundaries of operation and fields of view (FOV) of (i) the FLIR-based and SONAR-based collision avoidance subsystems installed in both the front and rear regions of the entertainment vehicle system, and (ii) the optical-based left and right.
Figure 10E:
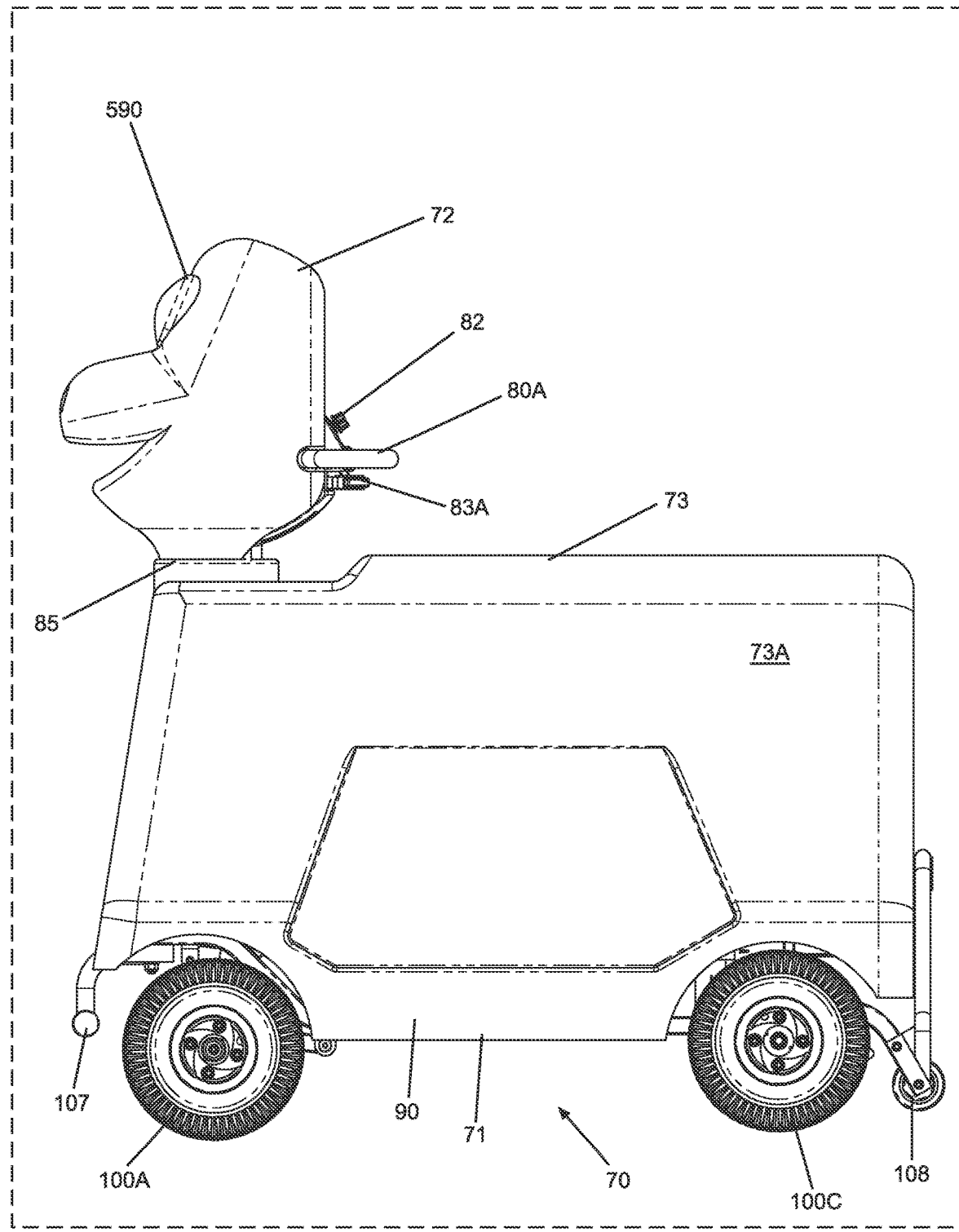
FIG. 10E is an elevated side view of the first illustrative embodiment of the GPS-tracked electrically-powered entertainment vehicle system shown in FIG. 13D.

FIGS. 10B and 10C show the GPS-tracked electrically-powered ride vehicle system 70 in FIG. 10A from front and review views. FIG. 10D shows the GPS-tracked electrically-powered amusement ride vehicle system 70 from a plan view. As shown, the LIDAR-based FOVs 140A, 140B of the LIDAR-based collision avoidance system 140, and the SONAR-based FOVs 135A and 135B of the SONAR-based collision avoidance system 135, are mounted on the front and rear ends of the vehicle chassis 71, as shown, and spatially extend about the vehicle for automated object detection and collision avoidance functions supported by the vehicle and described herein. These FOVS provide the vehicle with visual knowledge and multi-dimensional information on what objects are located in the local vicinity of the vehicle's body when the vehicle is stationary, as well as when the vehicle is engaged in motion. These subsystems are used to control the drive system so that the vehicle system is operated in a safe manner, including automatically avoiding collisions with other objects during vehicle operation. Also as illustrated in FIGS. 10D, 12F and 12O, left and right optical-based FOVs extending in forward and rearward directions, 145A and 145B, are generated by the binocular video camera systems 145 embedded within the front and rear portions of the animal character head assembly 72, and other parts of the character body as may be required.

Specification of the GPS-Tracked Electrically-Powered Electric Ride Vehicle System of the Present Invention Equipped with a Generic Spherical Head Assembly Mounted and Animal Skin Covering Removed for Illustration Purposes FIGS. 11A and 11B show the first illustrative embodiment of the GPS-tracked electrically-powered amusement ride vehicle system 70 of the present invention. As shown in FIGS. 11A, 11B, 11C, 11D, 11E, 11F and 11G, the system 70 is provided with a spherically-shaped character head 72 embodied about the steering console 84 of the vehicle system. As shown, its animal body skirt 73 covering is removed from and supported by the vehicle chassis 71 which has four wheels 100A, 100B, 100C and 100D and an electrically-powered drive motor 102 that is electronically-controlled by controls on the steering console 84.

Figure 11C:
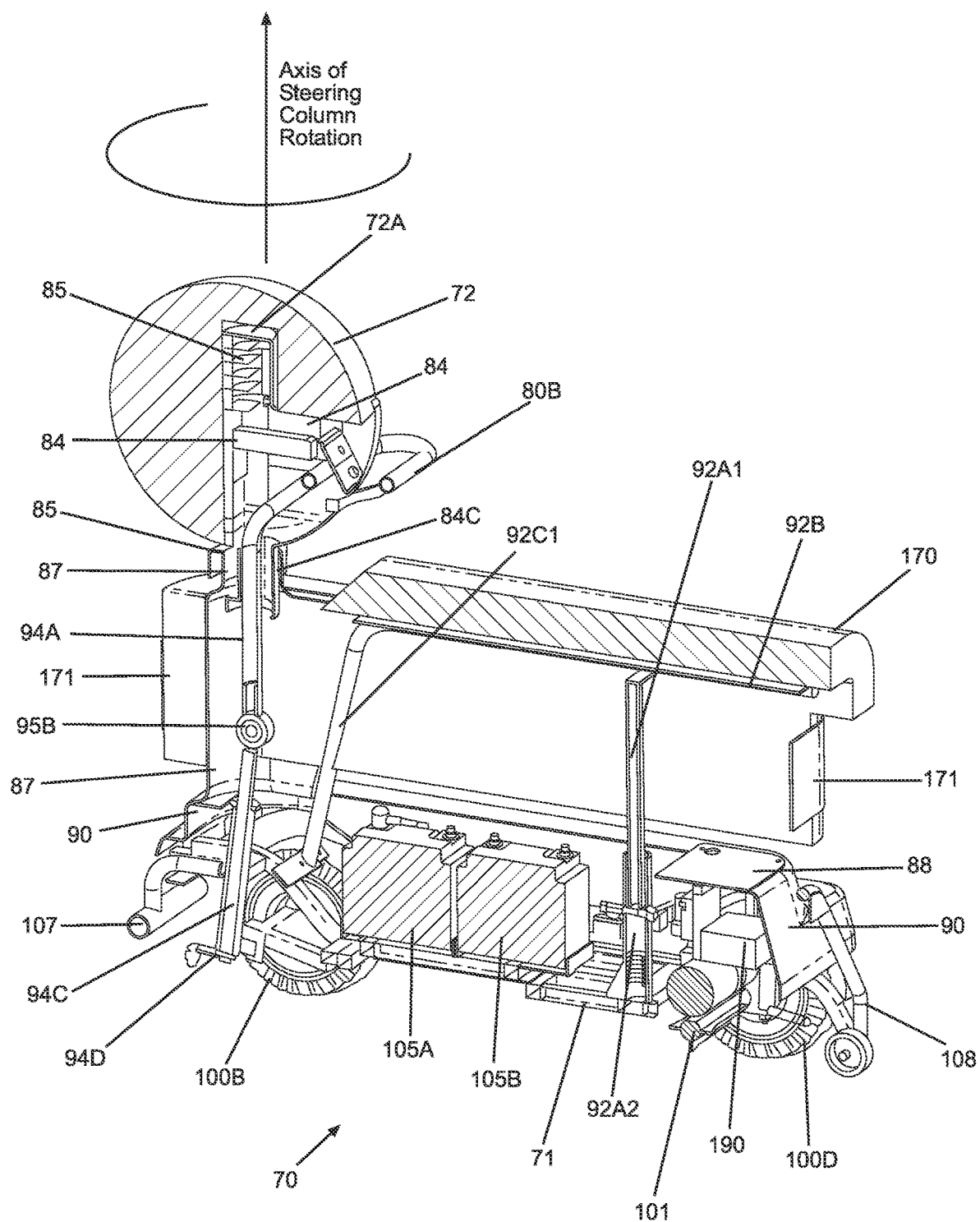
FIG. 11C is a cross-sectional view of a first illustrative embodiment of the electrically-powered amusement ride vehicle system taken along line 11C-11C in FIG. 11B.

As best shown in FIG. 11C, seating cushioning paddling 170 is mounted on and about the structural seating member 92B mounted above the vehicle chassis 71 by seat posts 92A1,92A2, 92B, 9492C1 and 92C2. Within the chassis, a set of electrical chemical-cell batteries 105A, 105B are mounted between the front and rear wheels 100A, 100B and 100C, 100D, and the steering linkage 94A, 94B, 94C, 94D and rear wheel drive train assembly 101, 102 and 103 above the front-rear axle plane.

Figure 11D:
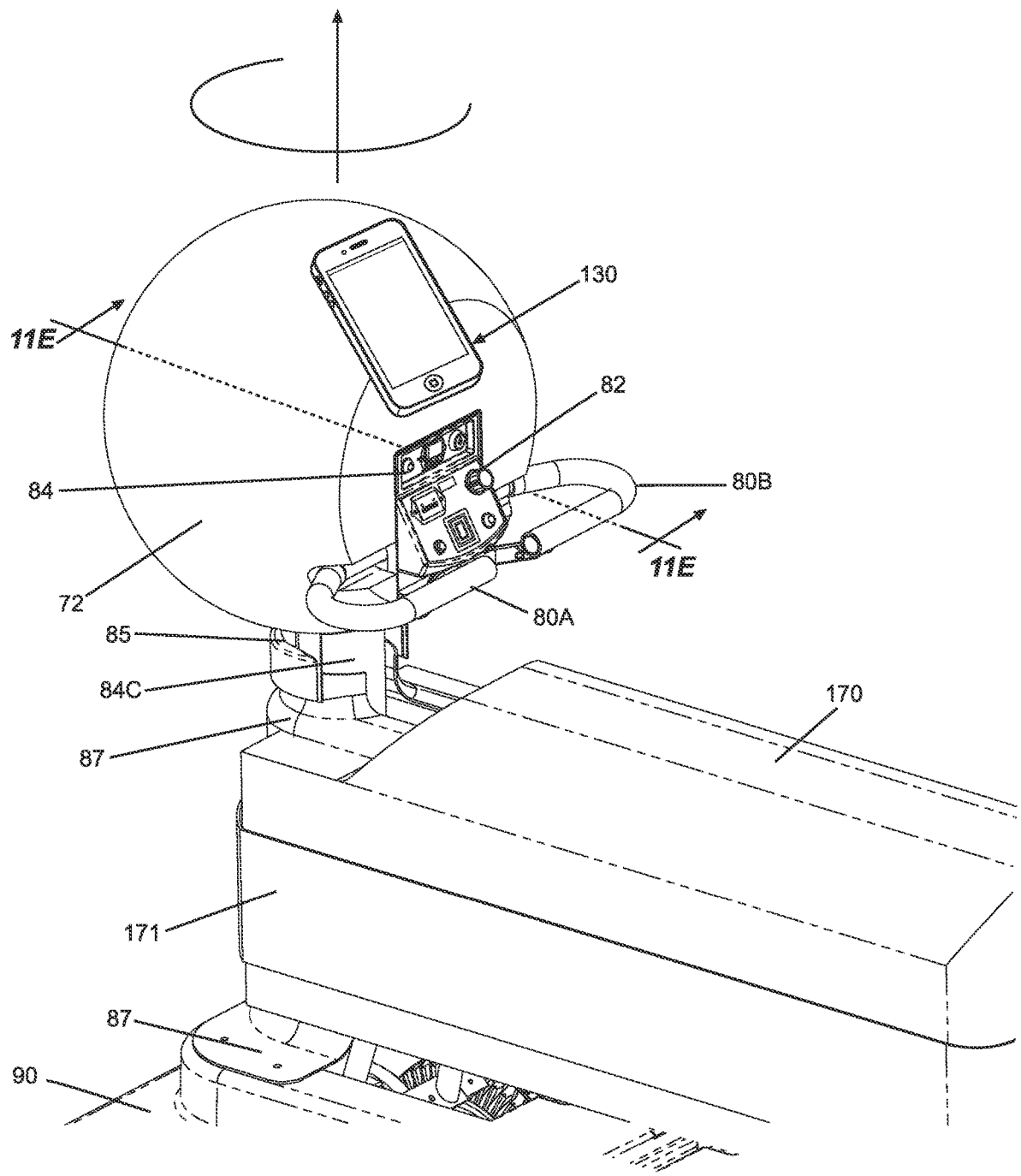
FIG. 11D is a perspective partially-cut-away view of the first illustrative embodiment of the electrically-powered amusement ride vehicle system of the present invention shown in FIG. 11B.
Figure 11E:
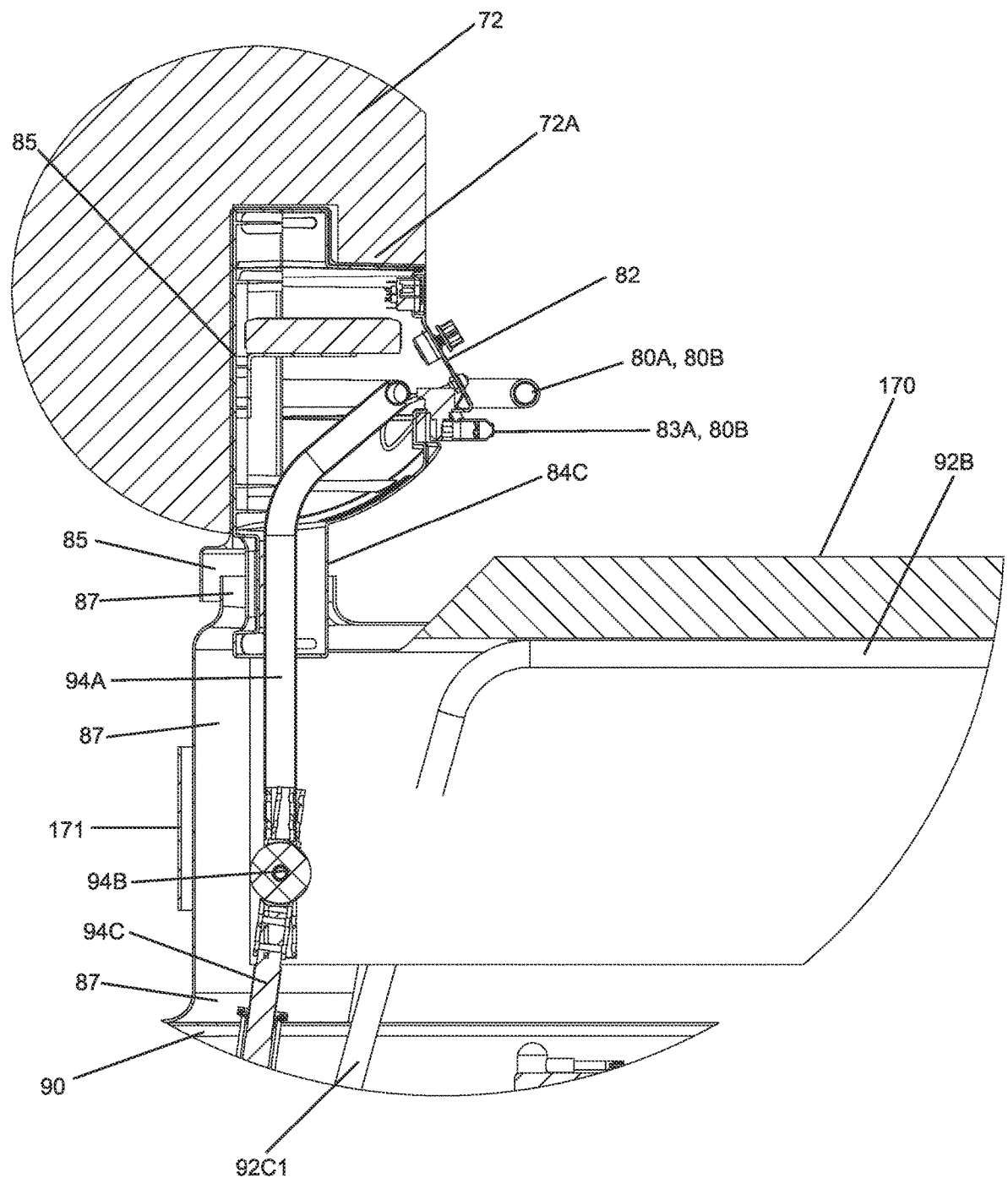
FIG. 11E is a cross-sectional elevated side view of the first illustrative embodiment of the electrically-powered ride vehicle system of the present invention taken along line 11E-11E in FIG. 11D.

FIGS. 11C, 11D and 11E show a spherical-type animal character head assembly 72 mounted on the supporting neck-like portion 84C, 85 of the electrically-powered ride vehicle system 70 shown in FIG. 11B. The molded plastic component that expresses the facial and head features of the animal character head assembly 72 is supported by a strong structural framework 85, about which the plastic, foam and/or like material is artistically molded. In turn, the structural framework 85 is adapted for releasable mounting onto a matching structural framework 84 supported on the steering column assembly of the vehicle chassis 71.

Figure 11F:
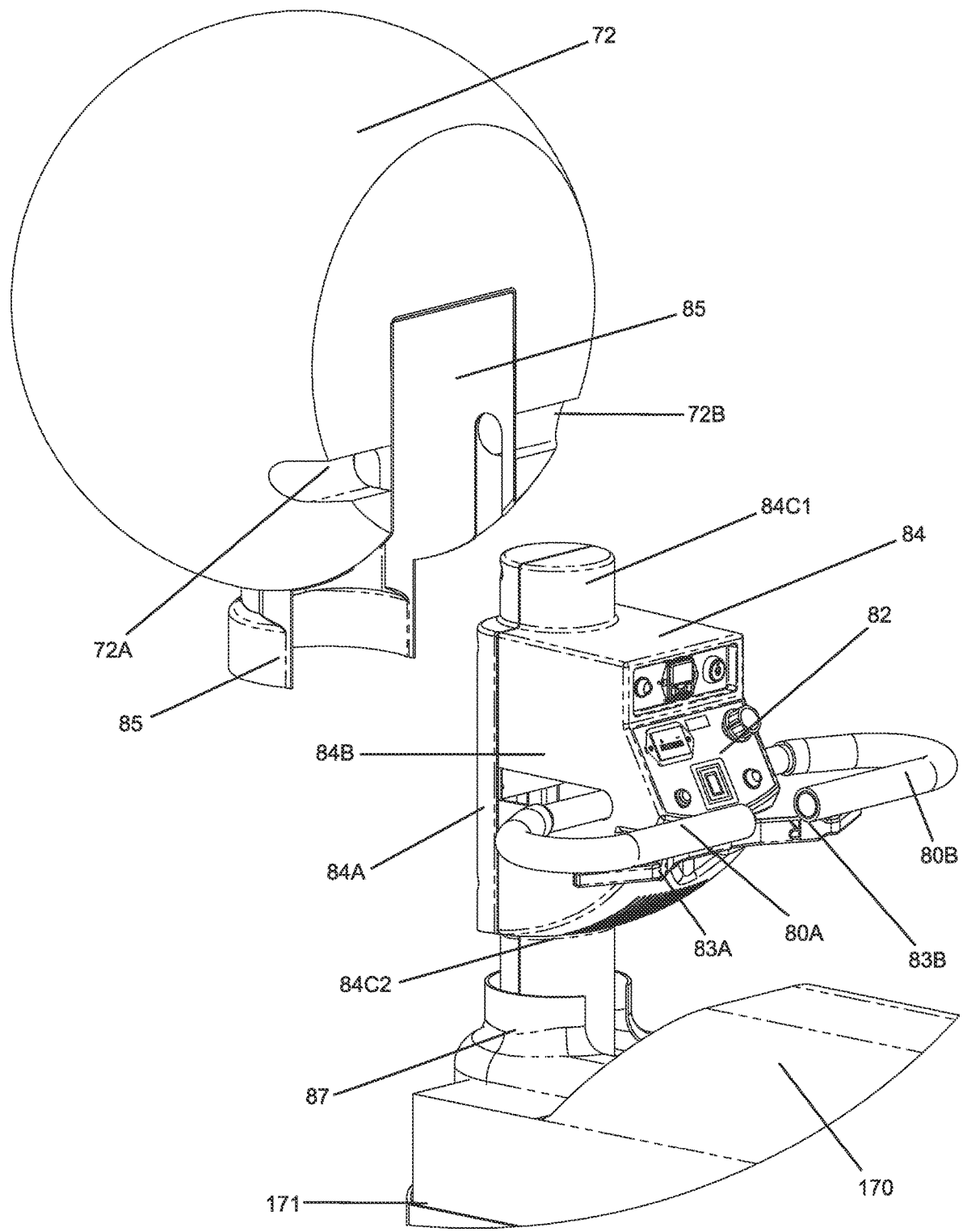
FIG. 11F is a perspective view of the first illustrative embodiment of the electrically-powered amusement ride vehicle in FIG. 14E, shown with its character head mounting portion removed off and from the steering console assembly.

FIG. 11F shows the spherical-type animal character head mounting portion 85 while being mounted on the matching steering console assembly 84 which has a cylindrical post portion 84C1 that fits into a matching cylindrical recess 71A formed in the head assembly portion 72, illustrated in FIG. 11C.

Figure 11G:
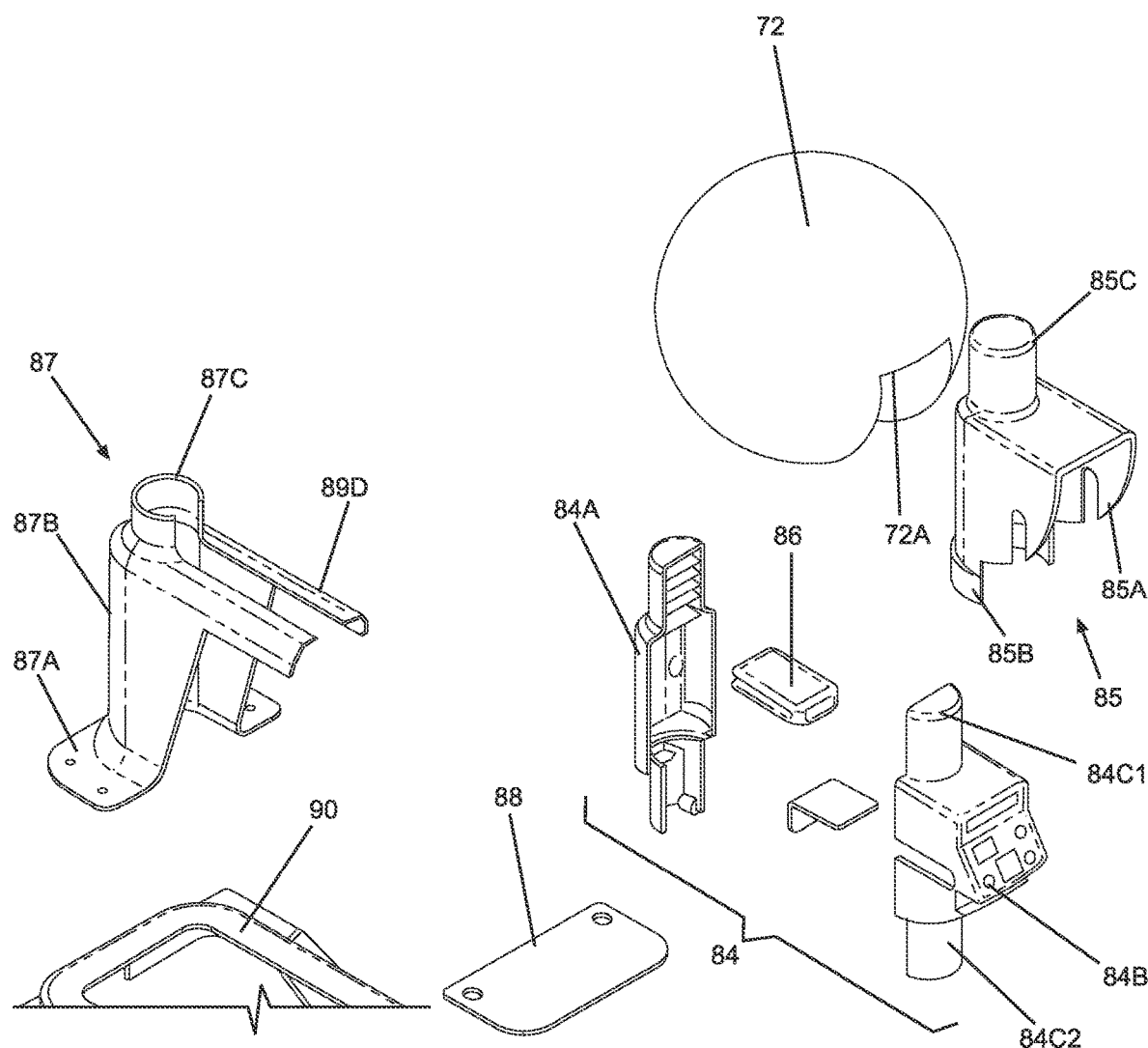
FIG. 11G is an exploded view of the front portion of the first illustrative embodiment of the electrically-powered ride vehicle in FIG. 14F, showing the basic components used to construct the character head mounting portion and character head mounting assembly.

As shown in FIG. 11G, steering console assembly 84 is constructed from several basic components, namely: a front console housing portion 84B having upper and lower cylindrical post halves 84C1, 84C2; and a rear console housing 84A also having upper and lower cylindrical halves 84C1 and 84C2, that join the upper and lower cylindrica; post halves 84C1 and 84C2 when the housing sections 84A and 84B are brought together as illustrated in FIGS. 11F and 11G, and fastened with screws. The exterior housing formed by sections 84A and 84B closely matches the support and mounting bracket 85A about which the animal character head is formed and molded. This allows for the animal character head assembly 72 to easily be constructed independent of the animal character portion, and mounted with a few screws or other mechanism once mounted and registered, as shown in FIGS. 11C, 11D, 11E, 11F and 11G.

As shown in FIG. 11C, a rigid steering column housing framework 87 is provided with a collar portion 87A at its upper end for rotatably mounting the steering console assembly 84, and a foot portion 87D for mounting on the lower body portion 90. The purpose of the steering column housing framework 87 is to provide a structural framework and support for the steering console assembly 84, while allowing the steering linkage 94A, 94B, 94C and 94D to pass through the hollow inner passageway of the framework 87 and establish a connection to the steering linkage formed by elements 94D, 94E, 95A, 95B, 96A, 96B and 97. As clearly illustrated in FIGS. 12K and 12L, turning the steering handles 80A and 80B rotates the steering shaft 94A and linkage 94B, 94C and 94D which, in turn, rotates the pivoting front wheels 100A, 100B via steering linkage formed by 94E and 97 in particular, to control the steering of the wheels 100A, 100B in both left and right directions, as further illustrated in FIGS. 12I, 12J, 12K, 12L, and 12M.

Specification of the Modular Construction of the Electric Animal Character Vehicle of the First Illustrative Embodiment of the Present Invention As shown in FIGS. 12A through 12O, the animal character vehicle of the present invention 70 has an animal character head portion 72 that is rotatably connected to an animal character body portion covered by its animal skin 73. The animal character body portion 73 supports a seat portion 170 mounted to a chassis framework support a set of rear wheels 100C and 100D driven by an electric motor 102, and a set of front rotatable wheels 100A, 100B that are connected to a steerable linkage 94A, 94B, 94C and 94D. As shown, the animal character body portion 73 is covered by an animal character skin covering 73A that is fastened to the chassis housing 71 by Velcro® loop and hook fastening materials. The animal skin covering 73A can be made from any flexible material that can conform to the underneath surface contours of the lower body portion 90 supported by the vehicle chassis 71, and/or molded material that provides surface contours required by the animal body skin characteristics.

As shown in FIG. 12E, the vehicle chassis 71 supports a set of electrical chemical-cell battery modules. 105A, 105B configured in a narrow arrangement beneath the seat portion 170 to form a narrow body geometry that can be easily and safely straddled in a comfortable manner while riding the electric entertainment vehicle 70. The electronic and power control module 190, realizing many of the subsystems indicated in system diagram of FIG. 13, is also mounted on the chassis framework 71. Sensors associated with the LIDAR and SONAR based collision avoided subsystems sensors 140 and 135 are mounted on the front and rear portion of the chassis framework 71.

As shown in FIGS. 11D, 11E, 11F and 12H, 12I and 12J, the animal character head portion 72 comprises: a first mounting portion 85 encapsulated by and supporting a plastic material 72C molded into the shape of an animal character head portion, and allowing a steering bar assembly 94A, and linkage 94B and 94C to pass through the framework 87 to the front steering linage 94E, 96A, 96B and 97, while the steering bar handles 80A and 80B are freely accessible by a human guest while riding on the seat portion. As shown, the steering bar assembly 80A, 80B is connected to the front wheel steering linkage assembly 95A, 94B, 94C and 94D so that movement of the steering bar assembly 80A, 80B results in the steering of the front wheels 100A and 100B of the animal character vehicle 70.

Figure 10F:
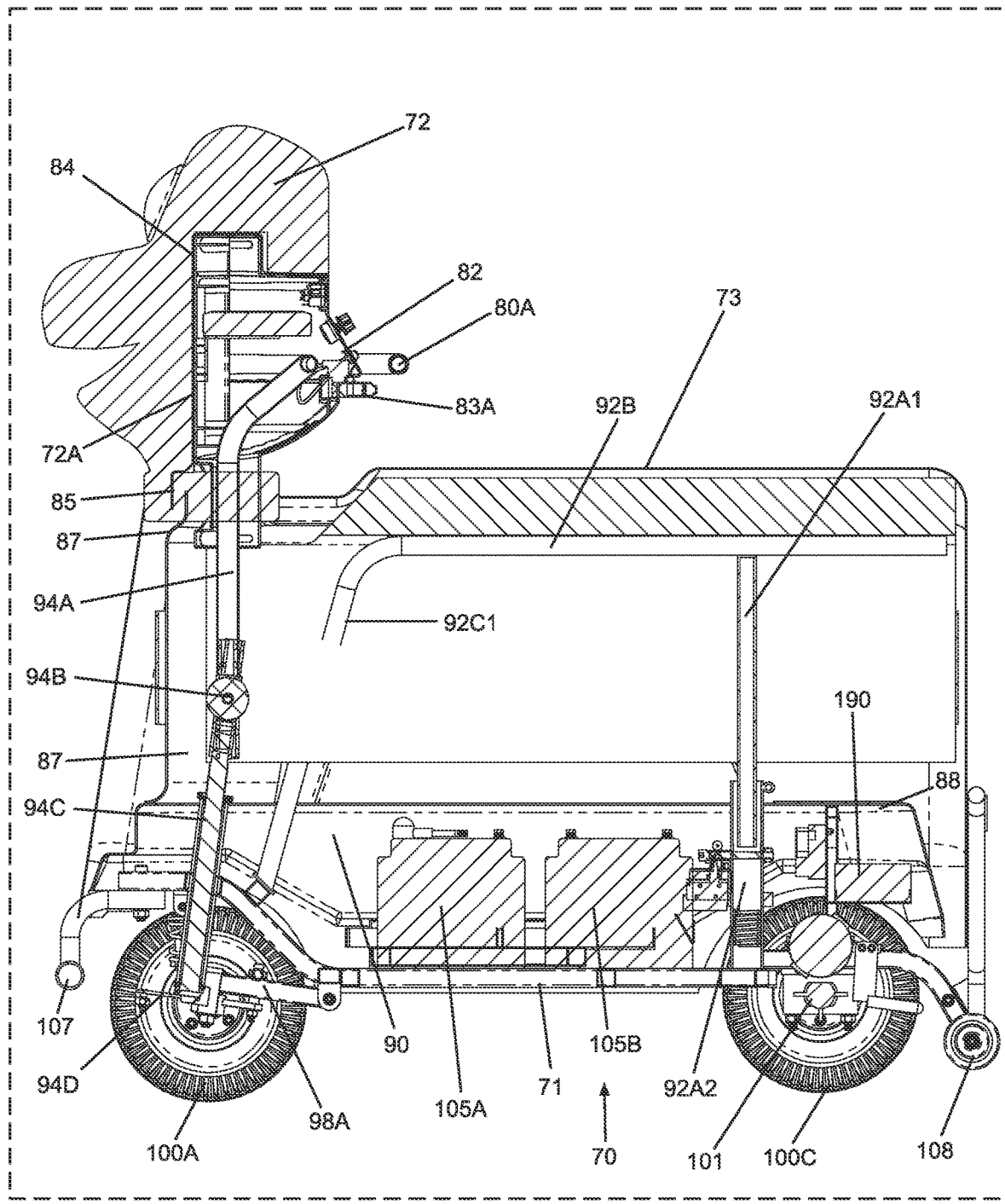
FIG. 10F is an elevated cross-sectional view of the first illustrative embodiment of the GPS-tracked electrically-powered entertainment vehicle system taken along line 10F-10F in FIG. 10D.

As shown in FIGS. 11D, 11E, 1F, 12E, and 12H, the animal character body portion 72 comprises: a second mounting portion 84 adapted for physical interconnection with the first mounting portion 85, so as to support the animal character head portion 72 above the animal character body portion 72 on collar 87A of the steering column framework 87, rotatable along the virtual steering axis of the vehicle, while allowing the human guest to steer the front wheels 100A, 100B of the animal character vehicle using the steering bar assembly 80A, 80B as the animal head portion 72 freely rotates about an axis of rotation passing through the second mounting portion 85 and along the steering column shaft within the framework 87, as shown in FIGS. 10F, 11E, and 12E.

FIGS. 12A, 12B, 12C and 12D show the first illustrative embodiment of the electrically-powered amusement ride vehicle system shown in FIG. 11A, wherein (i) a spherically-shaped character head assembly and (ii) its animal body skirt covering 73A are both removed from the chassis of the vehicle 71, which has two rear wheels 100C and 100D which are driven by an electrically-powered DC trans-axle motor (e.g. 24 Volt) 102 and associated drive train 1003, supplied with electric power from two (2) 12 Volt 40 Ah Lithium-ion batteries, or functionally similar batteries, commercially available from various vendors including MK Battery, a wholly owned subsidiary of East Penn Manufacturing Co.) of Anaheim Calif. The two front wheels 100A and 100B are steerable by a manually-controlled steering console 94A, 94B, 94C and 94D shown in FIGS. 12K, 12L, 12M and 12N.

FIGS. 12D and 12E show the electrically-powered amusement ride vehicle system shown in FIG. 11A, with its animal skin covering removed to reveal its skin scaffolding structures. As shown, the sculptured foam seat cushioning 170 provides the skin contour designed for the animal character body portion, and can be removed easily in a modular manner to quickly construct different present invention. By replacing the sculptured foam seat cushioning 170 supported by the animal characters upon the vehicle chassis system of the seating system and support posts 92C1, 92C2, 92A1, 92B, the geometrical mass and shape of the desired target animal character can be quickly realized, once the animal head assembly portion 72 is attached and matched to the animal character body 73.

FIG. 12F is a plan view of the first illustrative embodiment of the electrically-powered entertainment vehicle system 70 shown in FIG. 11, wherein (i) a spherically-shaped character head assembly 72, and (ii) its animal body skirt covering 73A, are both removed from the chassis of the vehicle, having two rear wheels 100C, 100D driven by an electrically-powered drive train and motor 102, 103, and two front wheels 100A, 100B steerable by a manually-controlled steering handles 80A, 80B, via steering linkage 94A, 94B, 94C and 94D.

FIG. 12G shows the components of the electrically-powered entertainment vehicle 70 shown in FIG. 12E, comprising: a chassis structure 71 supporting four rubber-tire wheels 10A, 100B, 100C and 100D connected by a pair of axles mounted to the chassis 71; a pair of foot rest decks 90A1, 90A2 formed in the lower body housing, with a front deck 90B and rear deck portions 90C and 90C for allowing the riders to mount themselves onto the seating portion 170; an electrical battery support bracket assembly 106 for mounting on the chassis 71; a steering column and console assembly 84, a seat support bar assembly 92B, 92A1, 92A2, 9C1, 92C2 mounted to the chassis 71; a seat cushion assembly 170 configured and mounted over the seat support bar assembly 92B and fastened thereto by way of a banding assembly 171; steering console assembly 84 consisting of first and second housing halves 84A, 84B for surrounding the upper portion of the steering shaft 94A to form head assembly mounting post 84C, about which a congruent bracket assembly 85 supporting animal head portion assembly 72 can be supported and mounted in a releasable manner; a steering column cover housing and framework 87, for rotatably mounting the steering console assembly 84 and protecting the steering column and linkage 94A, 94B, 94C and 94D extending to the front wheel linkage; front bumper 107 fastened to the front portion of the chassis 71; and anti-wheelie bar mechanism 108 mounted to the rear portion of the chassis 71.

FIGS. 12H and 12O shows the electrically-powered entertainment vehicle 70 in FIGS. 12E, with the following modifications: a child rider seat 200 is mounted to the chassis 71 and seat post assembly 92A1; a smartphone holder 175 is mounted on the steering console 82 for releasably supporting a smartphone so that its camera's FOV captures the facial expressions of the vehicle riders. As shown, this embodiment also includes forward and rearward looking digital camera systems 145A and 145B, mounted within the animal character head assembly 72, with their field of views (FOVs) configured for looking (i) forwardly in the direction of vehicle travel, (ii) in the direction of rearward travel, and (iii) in the direction of the passengers sitting up and riding aboard the vehicle system 70. Notably, safety helmets 201 would be provided aboard each vehicle to be worn by all passengers to promote and ensure passenger safety while riding aboard the vehicle.

As shown in FIG. 13, the following system components are used to construct the electrically-powered entertainment vehicle 70 shown in FIGS. 9A through 12H. As shown, the vehicle system 70 comprises: a system bus 117 supporting communication among a microprocessor 115, a memory architecture 116; a LIDAR collision avoidance subsystem 140; a SONAR collision avoidance subsystem 135; animation motor and controls 150; video camera systems 145A, 145B (145); a GPS signal processing module 118; a I/O module 119; with audio transducer 126; keyboard and user display console 121; Bluetooth wireless communication interface 122; WIFI interface 122; network controller 120; motor drive control module 123 interfaced with a control interface 125 for drive motors 102, transmission 103 and steering controls, SONAR-based collision avoidance subsystem, 135; LIDAR-based collision avoidance subsystem 140; and embedded optical-based binocular video camera systems, 145; e-ink display 127; all of which are interfaced with the cloud-based infrastructure 11 operably connected to one or more data centers 12, electronic payment systems 13, and many mobile computing systems including mobile smart phones 130. Each of these system components have been described in greater detail hereinabove and/or hereinafter.

Specification of GPS-Tracked Electrically-Powered Entertainment Vehicle of the Second Illustrative Embodiment of the Present Invention, Wherein Animal Head Assembly and Animal Skin Covering are Provided with Animated Features and Behaviors FIGS. 14A through 15 show a second illustrative embodiment of the GPS-tracked electrically-powered entertainment vehicle of the present invention 70', wherein animal head assembly 72 and animal skin 73 covering are provided with animated features and behaviors.

As shown in FIGS. 14A, 14B, 14C, 14D and 14E, the animal-shaped character head assembly 72 and animal body skirt covering 73A are both installed and configured on the chassis of the vehicle 71, while the electronically-controlled motor-driven body portions 152, 153, 154A, 154B can be driven into animation during vehicle operation, to emulate life-like resemblance and behavior. In accordance with the principles of the present invention, any one or more of these electronically-controlled motor-driven body portions 152 (i.e. resembling an animal tail), body portions electronically-controlled motor-driven body portions 153 (resembling animal chest cavity movement during breathing), and electronically-controlled motor-driven body portions 154A, 154B (resembling movement of front and rear legs) are driven into animated motion and/or transition (using electronically driven motors, levers and mechanical mechanisms disposed beneath the animal; skin 73A, during vehicle operation so as to emulate life-like resemblance and other forms of animated behavior.

FIG. 14C reveals some of the technical details underlying such electronically-controlled animated features, including a smoke tank and pump 180A mounted to the vehicle chassis for generating streams of smoke, vapor and/or steam that is released through the mouth or facial orifices formed in the animal character head assembly 73, and/or other animal character body portion 73. Controls can be generated on within the steering console 82, from the mobile phone 130, and/or using onboard electronic control circuitry.

As shown in FIG. 15, the system components used to construct the electrically-powered entertainment vehicle of FIG. 14A, comprises: a system bus 117 supporting communication among a microprocessor 115, a memory architecture 116; a LIDAR collision avoidance subsystem 140; a SONAR collision avoidance subsystem 135; animation motor and controls 150; video camera systems 145A, 145B (145); a GPS signal processing module 118; a I/O module 119; with audio transducer 126; a keyboard and user display console 121; a Bluetooth wireless communication interface 122; a WIFI interface 122; a network interface controller 120; a motor drive control module 123 interfaced with a control interface 125 for driving motors 102, transmission 103 and steering controls, a SONAR-based collision avoidance subsystem, 135; a LIDAR-based collision avoidance subsystem 140; and embedded optical-based binocular video camera systems, 145; and an e-ink display 127; all of which are interfaced with the cloud-based infrastructure 11 operably connected to one or more data centers 12, electronic payment systems 13, and many mobile computing systems including mobile smart phones 130.

Specification GPS-Tracked Electrically-Powered Entertainment Vehicle of the Third Illustrative Embodiment of the Present Invention, Wherein the Animal Body Portion is Adapted for Onboard Storage of Personal Belongings in Personal Networked Portable Storage Locker FIGS. 16A through 16F show a third illustrative embodiment of the electrically-powered entertainment vehicle system of the present invention 70", wherein (i) its animal-shaped body portion 73 is provided with a pass-through central housing architecture 112 that is adapted to contain and house either (i) a first networked single-sided personal storage locker system 110 located on left side of vehicle 70", and a second networked single-sided personal storage locker system located on the right side of the vehicle 70", or a single networked double-sided personal storage locker system 110' located beneath the seat portion of the vehicle, supported on the vehicle chassis, above the battery storage modules 105A, 105B, and (ii) its animal body skirt 73 covering is provided with flexible hinged-like panels 113, overlapping with locker door panels 110, and fastened with Velcro® hook and loop fasteners, so that the guest users can quickly lift up the animal skin panels and access the storage locker from either side of the vehicle to access and store personal belongings during the course of the vehicle rental.

FIGS. 16B and 16C show the third illustrative embodiment of the electrically-powered entertainment vehicle system shown in FIG. 16A, with the animal skin covering panel 113 pulled back and revealing the networked storage locker system 110 located on the left side of the vehicle.

Figure 16E:
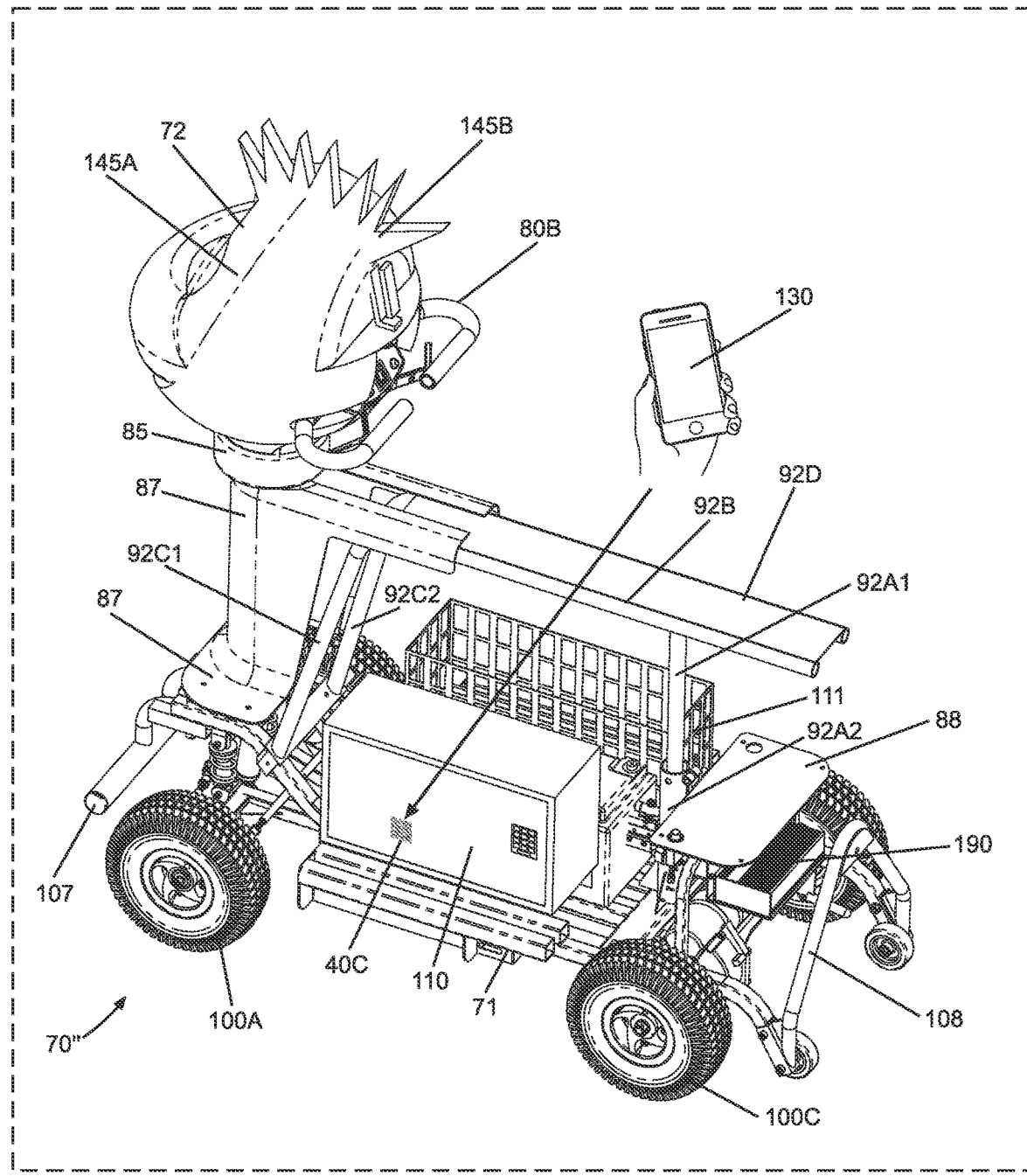
FIG. 16E is a perspective view of the third illustrative embodiment of the electrically-powered entertainment vehicle system shown in FIGS. 16A through 16D, wherein the animal skin covering and seating assembly have been removed to reveal a networked personal storage locker system mounted on the left side of the chassis frame, and an open storage basket mounted on the right side of the chassis frame, for storing and holding personal possessions while riding the vehicle about the amusement park facility.

FIG. 16E shows the third illustrative embodiment of the electrically-powered entertainment vehicle system shown in FIGS. 16A and 16D, with its animal skin covering and seating assembly removed to reveal a networked personal storage locker system 110 mounted on the left side of the chassis frame, and an open storage basket mounted on the right side of the chassis frame, for storing and holding personal possessions while riding the vehicle about the amusement park facility.

Figure 16F:
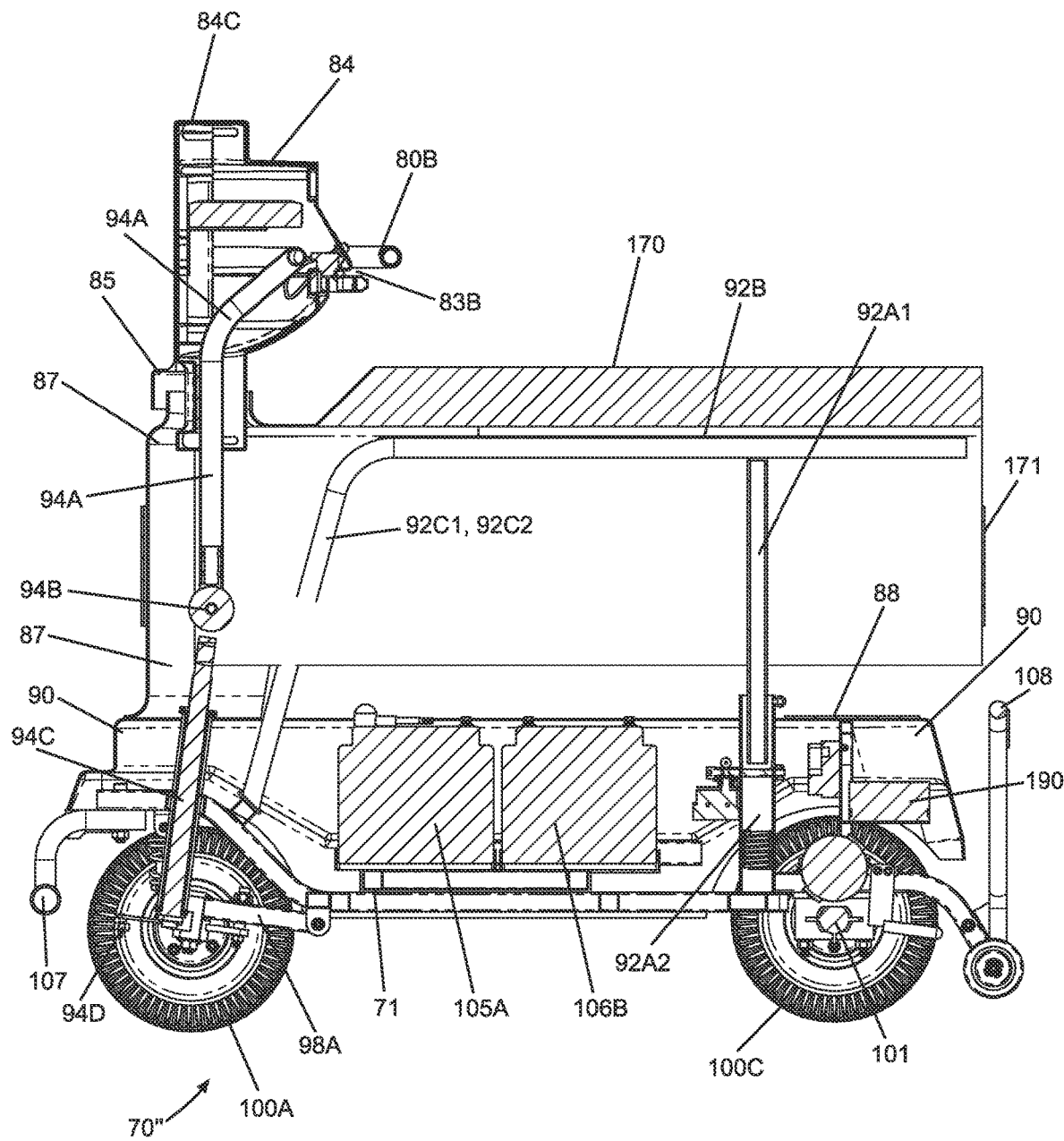
FIG. 16F is a perspective view of the third illustrative embodiment of the electrically-powered entertainment vehicle system taken along line 16F-16F shown in FIG. 16D, showing the location of the battery storage modules mounted on the vehicle chassis frame, beneath the storage locker and open storage basket adapted for holding personal possessions while riding the vehicle.

FIG. 16F shows the third illustrative embodiment of the electrically-powered entertainment vehicle system 70", with its battery storage modules 105A, 105B mounted on the vehicle chassis frame 71, beneath the storage locker 110 and open storage basket 111 adapted for holding personal possessions while riding the vehicle.

Figure 17A:
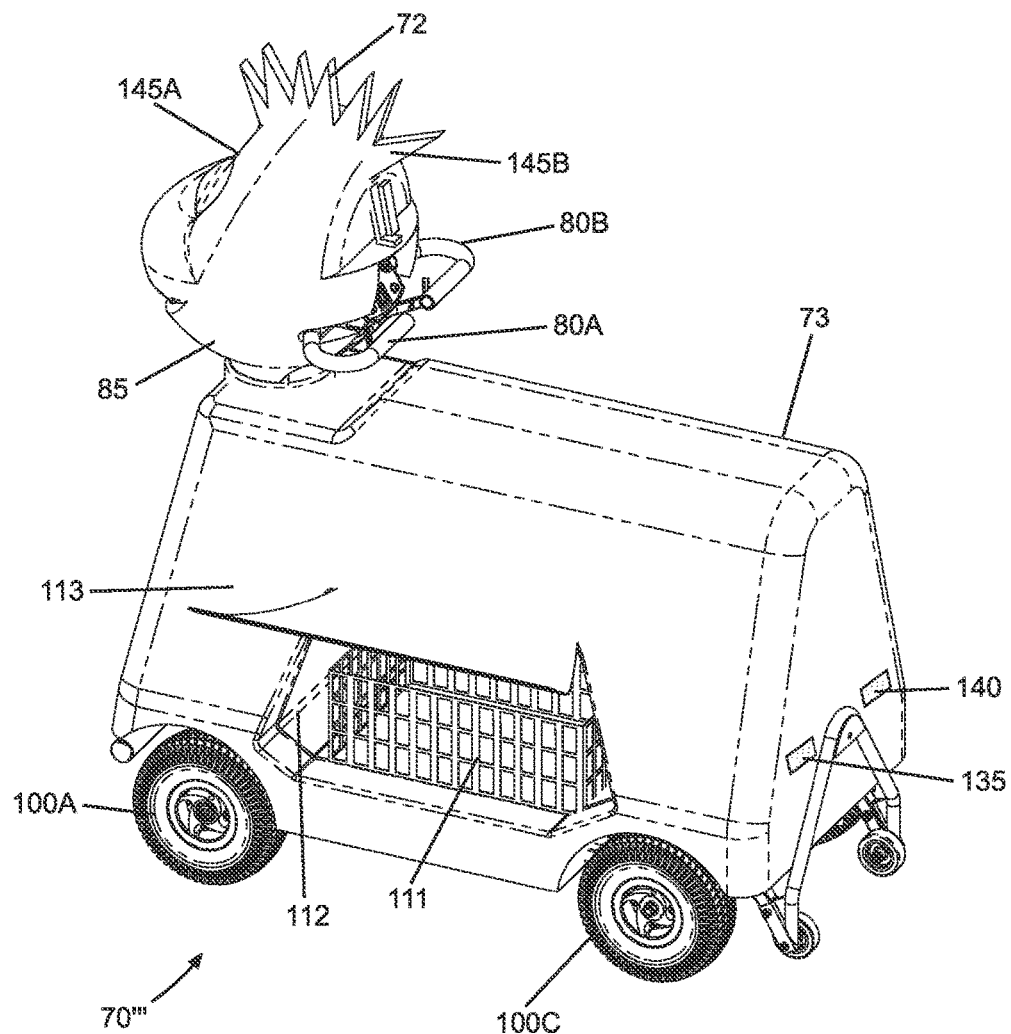
FIG. 17A is an perspective front view of a fourth illustrative embodiment of the electrically-powered entertainment vehicle system of the present invention, wherein (i) the animal-shaped body portion is provided with a pass-through central housing architecture that is adapted to contain and house a pair of open-type top loading storage baskets located on the left and right sides of the vehicle, supported on the vehicle chassis, above the battery storage modules, and (ii) the animal body skirt covering is provided with flexible hinged-like panels, overlapping with the top-loading open storage baskets, and fastened with Velcro® hook and loop fasteners, so that the guest users can quickly lift up the animal skin panels and access the storage baskets from either side of the vehicle to access and store personal belongings during the course of the vehicle rental.
Figure 17B:
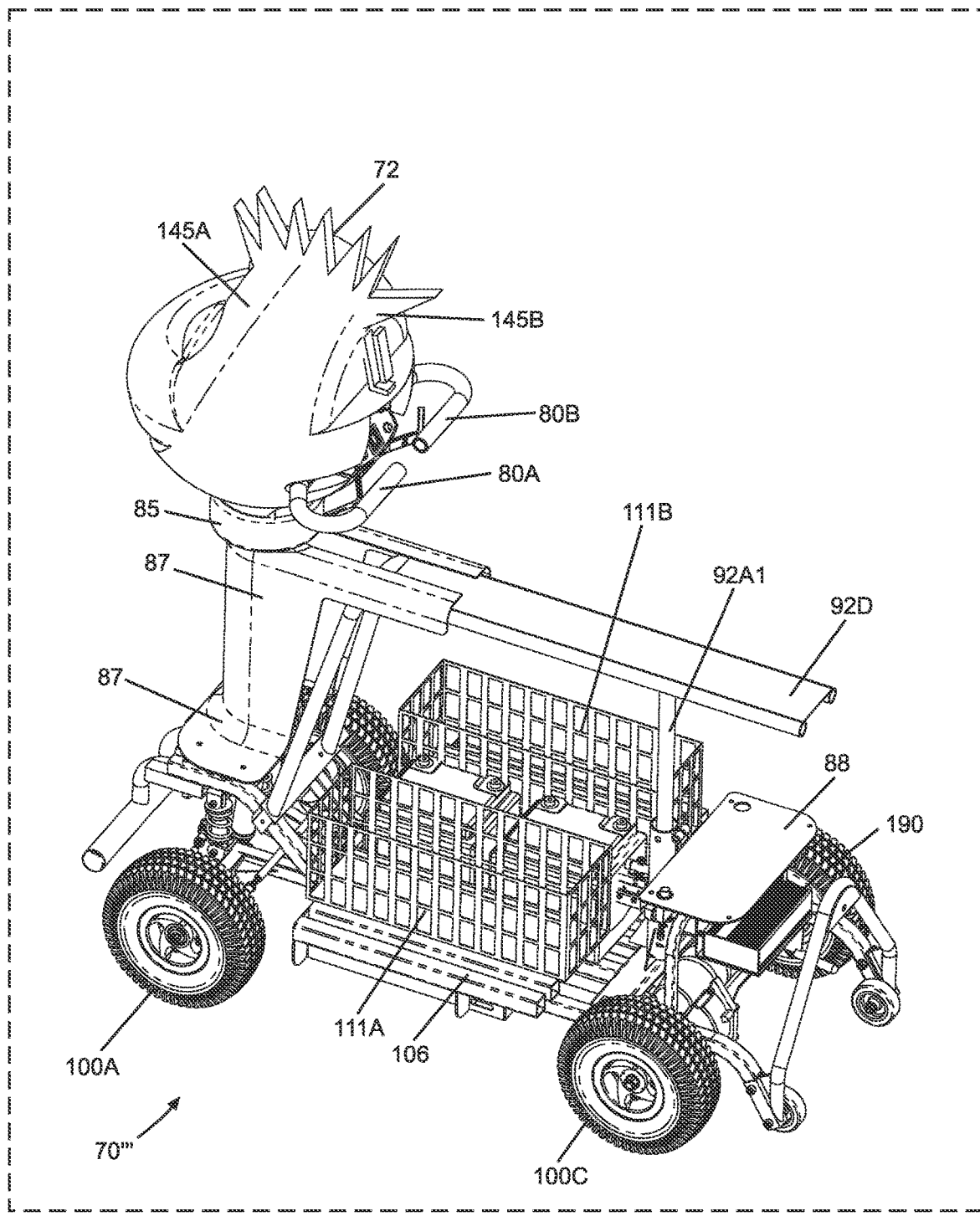
FIG. 17B is a perspective view of the fourth illustrative embodiment of the electrically-powered entertainment vehicle system shown in FIG. 17A, wherein its animal skin covering and seating assembly have been removed to reveal the double top-loading storage basket system mounted on the left and rights sides of the chassis frame, for holding personal possessions while riding the vehicle.

Specification GPS-Tracked Electrically-Powered Entertainment Vehicle, Wherein the Animal Body Portion is Adapted for Onboard Storage of Personal Belongings within Open-Top Storage Baskets Beneath Seating FIGS. 17A and 17B show a fourth illustrative embodiment of the electrically-powered entertainment vehicle system of the present invention 70''', wherein its animal-shaped body portion is provided with a pass-through central housing architecture 112 that is adapted to contain and house a pair of open-type top loading storage baskets 111 located on the left and right sides of the vehicle, supported on the vehicle chassis, above the battery storage module 105A. As shown, the animal body skirt covering 73 is provided with flexible hinged-like panels 113 overlapping with the top-loading open storage baskets 111, and fastened with Velcro® hook and loop fasteners. This way the guest users can quickly lift up the animal skin panels 113 and access the storage baskets 111 from either side of the vehicle to access and store personal belongings during the course of the vehicle rental.

FIG. 17B is a perspective view of the fourth illustrative embodiment of the electrically-powered entertainment vehicle system shown in FIG. 17A. As shown, the animal skin covering 73A and seating assembly 170 have been removed to reveal the double top-loading storage basket system 111 mounted on the left and rights sides of the chassis frame 71, for holding personal possessions while riding the vehicle.

As shown FIG. 18, the electrically-powered amusement ride vehicles 70", 70''' in FIGS. 16A and 17A, each comprise the following components, namely: a system bus 117 supporting communication among a microprocessor 115, and a memory architecture 116 to support the programmed microprocessor 115; an LIDAR collision avoidance subsystem 140; a SONAR collision avoidance subsystem 135; animation motor and controls 150; video camera systems 145A, 145B (145); a GPS signal processing module 118; a I/O module 118; with audio transducer 126; keyboard and user display console 121; a Bluetooth wireless communication interface 122; a WIFI interface 122, including RFID readers for reading RFID ID bracelets 400; a network interface controller 120; a motor drive control module 123 interfaced with a control interface 125 for drive motors 102, transmission 103 and steering controls, a SONAR-based collision avoidance subsystem, 135; a LIDAR-based collision avoidance subsystem 140; and embedded optical-based binocular video camera systems 145 (145A, 145B) supporting various field of views (FOVs); animation motors and controls 150 for controlling the behavior of specific character objects 160), and an e-ink display 127; all of which are interfaced with the cloud-based infrastructure 11 operably connected to one or more data centers 12, electronic payment systems 13, and many mobile computing systems including mobile smart phones 130.

Specification of the Cloud-Based GPS-Enabled Vehicle Navigation System Integrated into Each Electric Entertainment Vehicle for Supporting Both Manual and Automated Modes of Vehicle Navigation to Specific Destination Sites and Along Selected Courses within a Facility Each vehicle has an automated cloud-based GPS-enabled vehicle navigation system (i.e. module) 920, integrated into its system architecture and configured for supporting both manual and automated modes of vehicle navigation to specific destination sites, and along selected courses, within a facility, wherein the GPS-enabled wireless vehicle access control system network 1 has been deployed. In its manual navigation mode, the system generates and provides directions, displays and messages to guest riders about specific directions required to reach particular park sites in the environment. In its automated navigation mode, the system generates and executes sets of automated navigation and vehicle-control instructions for controlling and navigating the vehicle along a specific course of travel to a specific destination, while avoiding any obstacles that may be presented along the course travel, automatically informed by the SONAR and LIDAR based systems 145A and 145B described herein. The guest user's mobile smartphone 130 may be wirelessly interfaced using the wireless interface 122 shown in FIGS. 13, 15 and 18, so that the mobile smartphone 130 and its touchscreen display surface can be enlisted in manual and automated vehicle navigation functions.

Figure 20A:
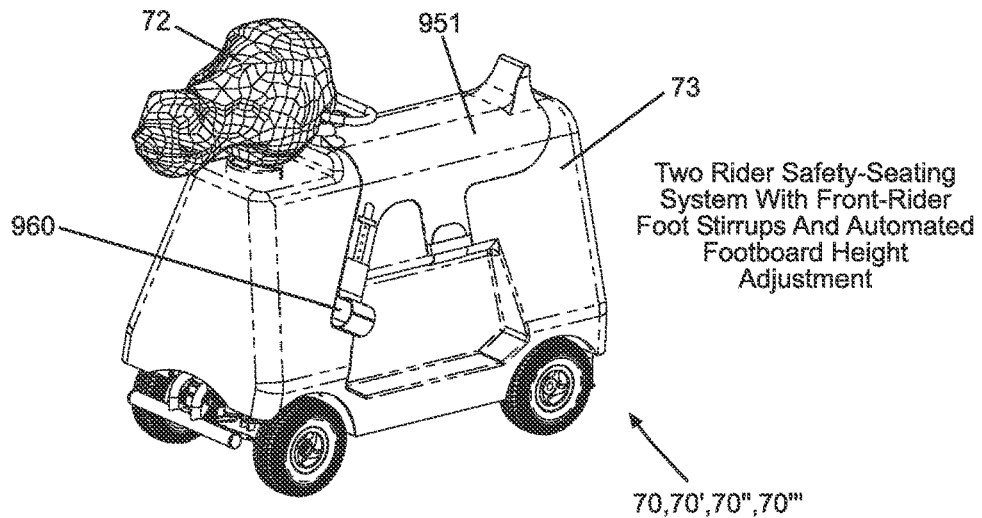
FIG. 20A is a perspective front view of a fifth illustrative embodiment of the electrically-powered entertainment vehicle system of the present invention, embodying many of the features of other embodiments, wherein the system is further provided with a dual rider safety seating system having adjustable foot stirrups for supporting the feet of a small-sized passenger sitting before a larger-sized passenger/rider whose feet are placed firmly on automated height-adjustable left and right floor-boards mounted on both sides of the vehicle system.
Figure 20B:
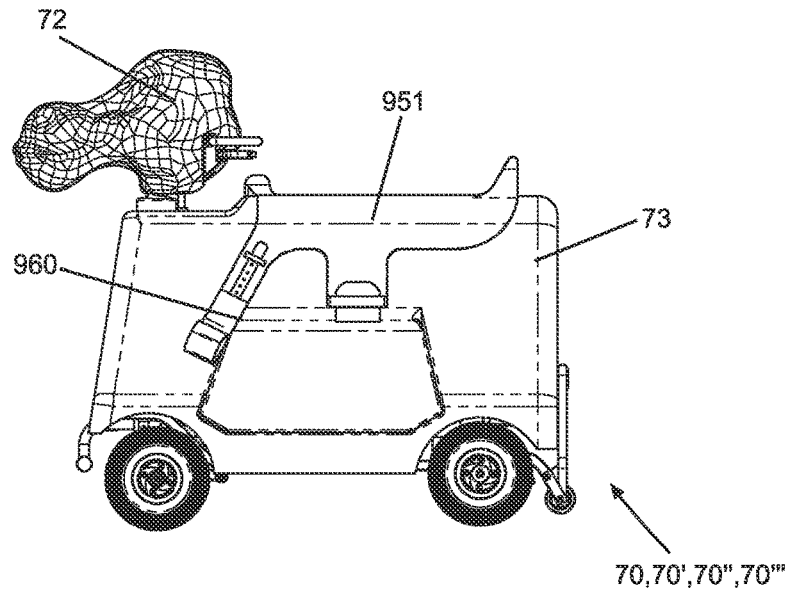
FIG. 20B is an elevated side view of the fifth illustrative embodiment of the electrically-powered entertainment vehicle system of the present invention shown in FIG. 20A.
Figure 20C:
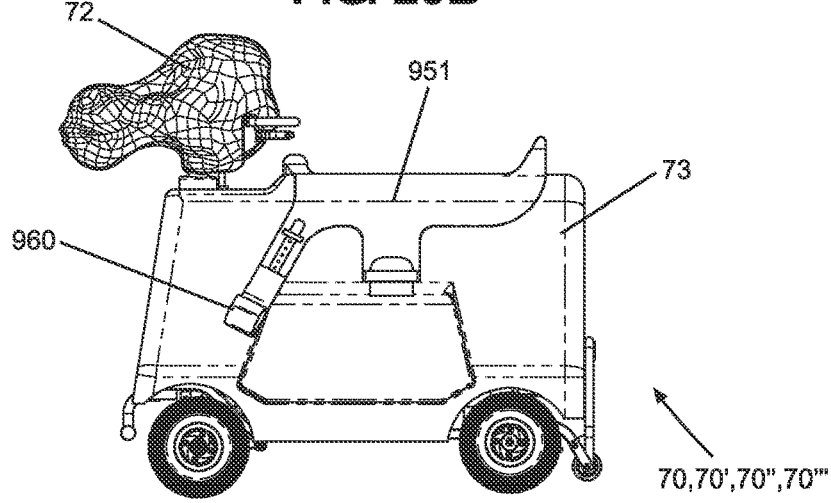
FIG. 20C is an elevated side view of the fifth illustrative embodiment of the electrically-powered entertainment vehicle system of the present invention, shown in FIGS. 20A and 20B, showing the adjustable foot stirrups supporting the feet of a small-sized passenger sitting before a larger-sized passenger/rider whose feet are placed firmly on automated height-adjustable left and right floor-boards mounted on both sides of the vehicle system.

Specification a Fifth Illustrative Embodiment of the Electrically-Powered Entertainment Vehicle System of the Present Invention Embodying Two Rider Safety Seating Features FIGS. 20A, 20B and 20C show a fifth illustrative embodiment of the electrically-powered entertainment vehicle system of the present invention 70, 70', 70", 70''' embodying many of the features of other the illustrative embodiments. In addition, such vehicle systems further include a dual rider safety seating system 550 having adjustable foot stirrups 560 for supporting the feet of a small-sized passenger while sitting before a larger-sized passenger/rider whose feet are placed firmly on automated height-adjustable left and right floor-boards 954A and 954B mounted on both sides of the vehicle system.

As shown in FIG. 20C, the adjustable foot stirrups 560 support the feet of a small-sized passenger 580 who is sitting before a larger-sized passenger/rider 581, whose feet are placed firmly on automated height-adjustable left and right floor-boards 954A and 954B mounted on both sides of the vehicle system. As shown, the automated height-adjustable left and right floor-board panels 954A and 954B automatically move up and/or down so as to automatically adjust to the length of the passenger's legs while he/she is seated on the seat saddle of the vehicle, using the automated floor-board positioning mechanism 95 shown and illustrated in FIGS. 24A. 24B, 24C, 24D and 24E. As shown in FIGS. 24A-24D and 24E, position sensors 952A. 952B are mounted about the footboard panels and/or related support assembly 954A and 954B, to determine, at any moment in time, the actual position of each left and right footboard panel 954A and 954B using the left and right footboard position analyzer 955. The footboard position analyzer 955 transmits the digital and/or analog footboard position data signals to the automated intelligent passenger seating safety control subsystem 956 for processing, and determination how much footboard movement is required to support the feet of the passengers actively sitting on the seat saddle 951 above the footboards. The automated intelligent passenger seating safety control subsystem 956 generates drive signals that are provided to the footboard panel position controller 957 so as to enable and electro-mechanically control the left and right footboards and support assembly shown in FIGS. 24A through 24D. The automated intelligent passenger seating safety control subsystem 956, footboard position analyzer 955 and the footboard panel position controller 957 can be realized using a conventional suitably programmed microprocessor with a memory architecture.

Figure 21A:
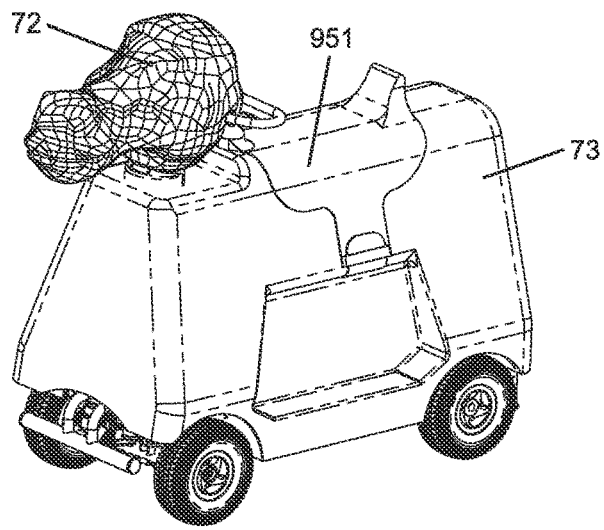
FIG. 21A is a perspective front view of a sixth illustrative embodiment of the electrically-powered entertainment vehicle system of the present invention, embodying many of the features of other embodiments, wherein the system is further provided with a single rider safety seating system for a passenger sitting on the seat portion/saddle while feet are placed firmly on automated height-adjustable left and right floor-boards mounted on both sides of the vehicle system.
Figure 21B:
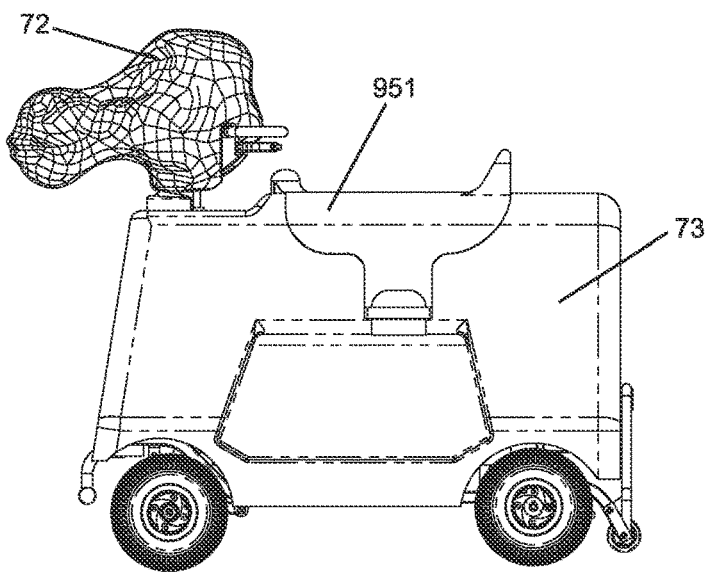
FIG. 21B is an elevated side view of the sixth illustrative embodiment of the electrically-powered entertainment vehicle system of the present invention shown in FIG. 21A.

Specification a Sixth Illustrative Embodiment of the Electrically-Powered Entertainment Vehicle System of the Present Invention Embodying Single Rider Safety Seating Features FIGS. 21A and 21B show a sixth illustrative embodiment of the electrically-powered entertainment vehicle system of the present invention embodying many of the features of other embodiments. In particular, the system is further provided with a single rider safety seating system for a passenger sitting on the seat portion/saddle while feet are placed firmly on automated height-adjustable left and right floor-boards mounted on both sides of the vehicle system.

Figure 21C:
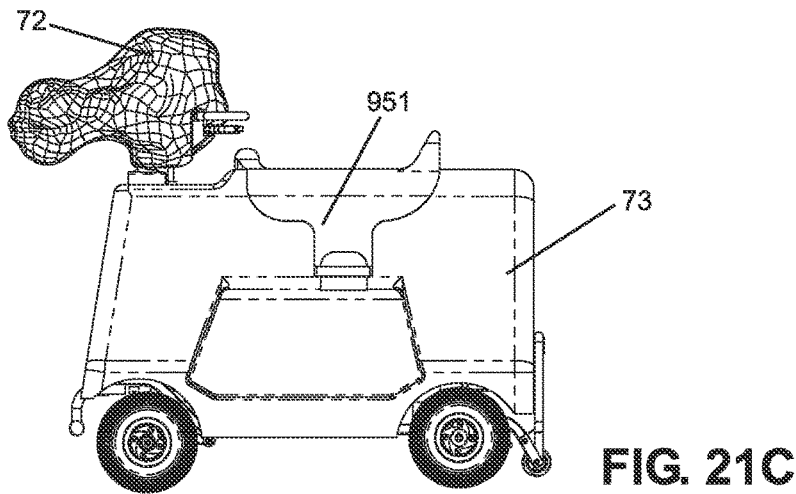
FIG. 21C is an elevated side view of the sixth illustrative embodiment of the electrically-powered entertainment vehicle system of the present invention, shown in FIGS. 21A and 21B, showing the passenger sitting and having his/her feet placed firmly on automated height-adjustable left and right floor-boards mounted on both sides of the vehicle system.

In FIG. 21C, the electrically-powered entertainment vehicle system in FIGS. 21A and 21B, is shown with the passenger 980 sitting and having his/she feet placed firmly on automated height-adjustable left and right floor-boards 954A and 954B mounted on both sides of the vehicle system.

Figure 22A:
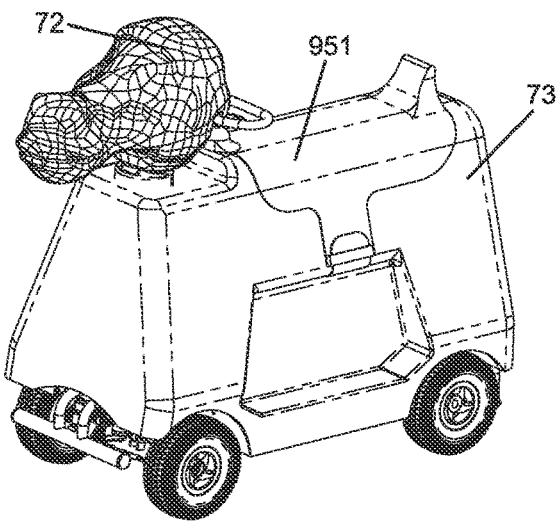
FIG. 22A is a perspective front view of a seventh illustrative embodiment of the electrically-powered entertainment vehicle system of the present invention, embodying many of the features of other embodiments, wherein the system is further provided with a dual rider safety seating system for a first passenger sitting before a second passenger/rider with their feet placed firmly on automated height-adjustable left and right floor-boards mounted on both sides of the vehicle system.
Figure 22B:
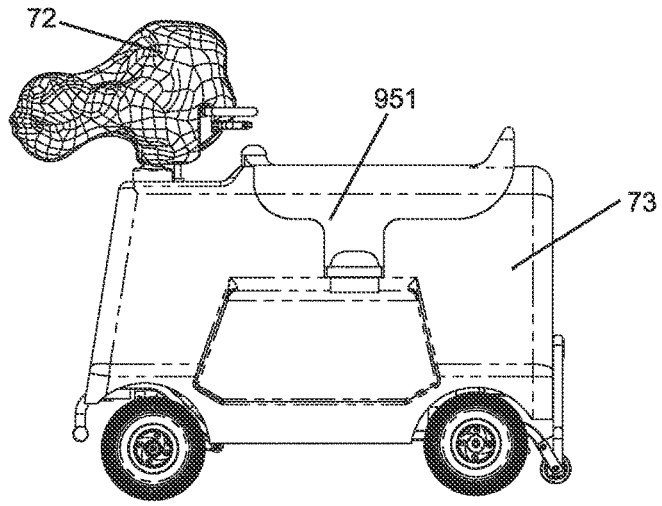
FIG. 22B is an elevated side view of the seventh illustrative embodiment of the electrically-powered entertainment vehicle system of the present invention, shown in FIG. 22A.

Specification a Seventh Illustrative Embodiment of the Electrically-Powered Entertainment Vehicle System of the Present Invention Embodying Two Rider Safety Seating Features FIGS. 22A and 22B show a seventh illustrative embodiment of the electrically-powered entertainment vehicle system of the present invention embodying many of the features of other embodiments. In particular, the system is further provided with a dual rider safety seating system for a first passenger sitting before a second passenger/rider with their feet placed firmly on automated height-adjustable left and right floor-boards mounted on both sides of the vehicle system.

Figure 22C:
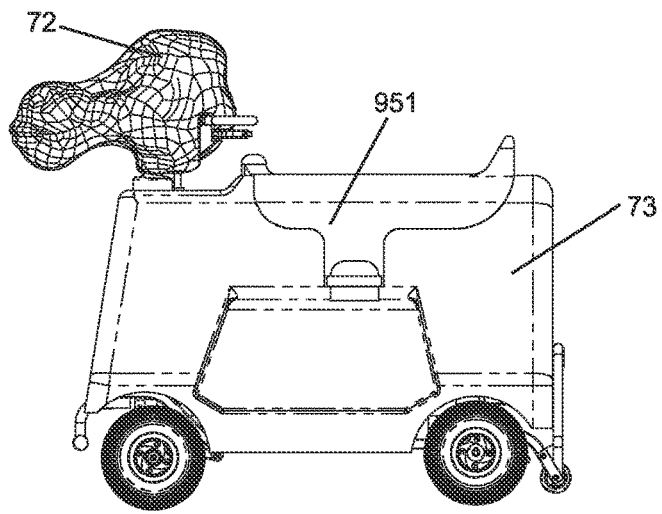
FIG. 22C is an elevated side view of the seventh illustrative embodiment of the electrically-powered entertainment vehicle system of the present invention, shown in FIGS. 22A and 22B, showing the feet of the passengers placed firmly on automated height-adjustable left and right floor-boards mounted on both sides of the vehicle system.
Figure 24A:
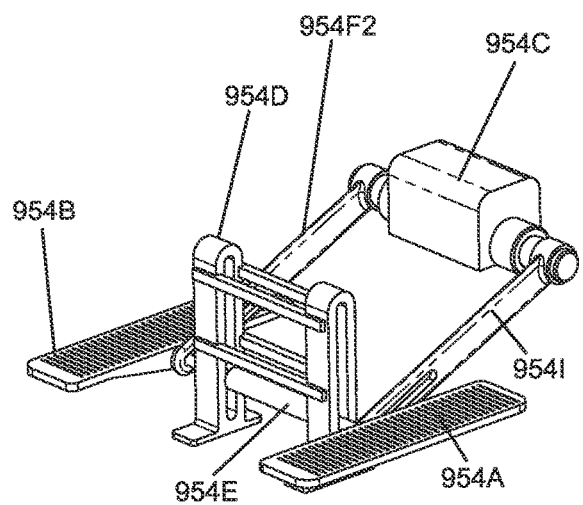
FIG. 24A is a first perspective view of the automated footboard height adjustment mechanism employed in the electrically-powered entertainment vehicle systems of the present invention, shown in FIGS. 20A through 23B.
Figure 24B:
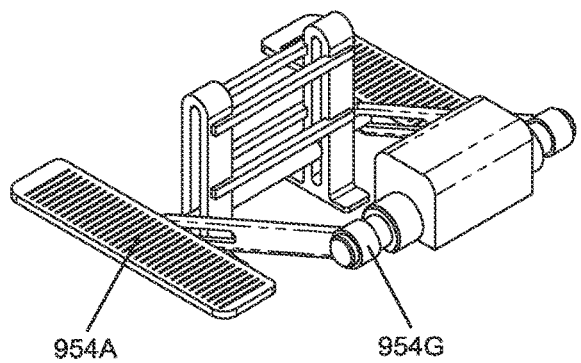
FIG. 24B is a second perspective view of the automated footboard height adjustment mechanism employed in the electrically-powered entertainment vehicle systems of the present invention, shown in FIGS. 20A through 23B.
Figure 24C:
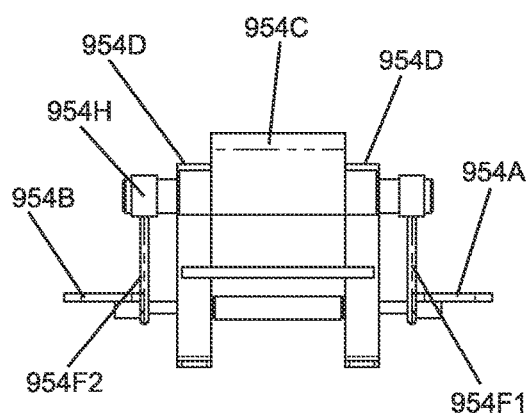
FIG. 24C is a first elevated front view of the automated footboard height adjustment mechanism employed in the electrically-powered entertainment vehicle systems of the present invention, shown in FIGS. 20A through 23B.
Figure 24D:
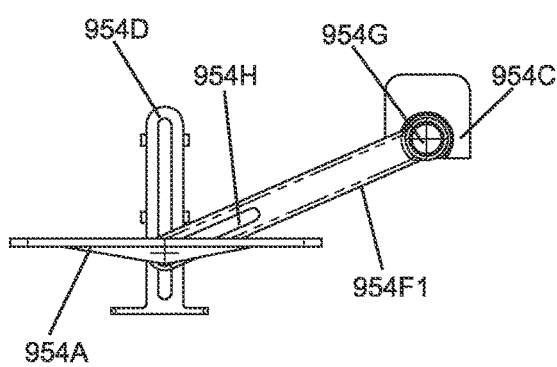
FIG. 24D is an elevated side view of the automated footboard height adjustment mechanism employed in the electrically-powered entertainment vehicle systems of the present invention, shown in FIGS. 20A through 23B.
Figure 24E:
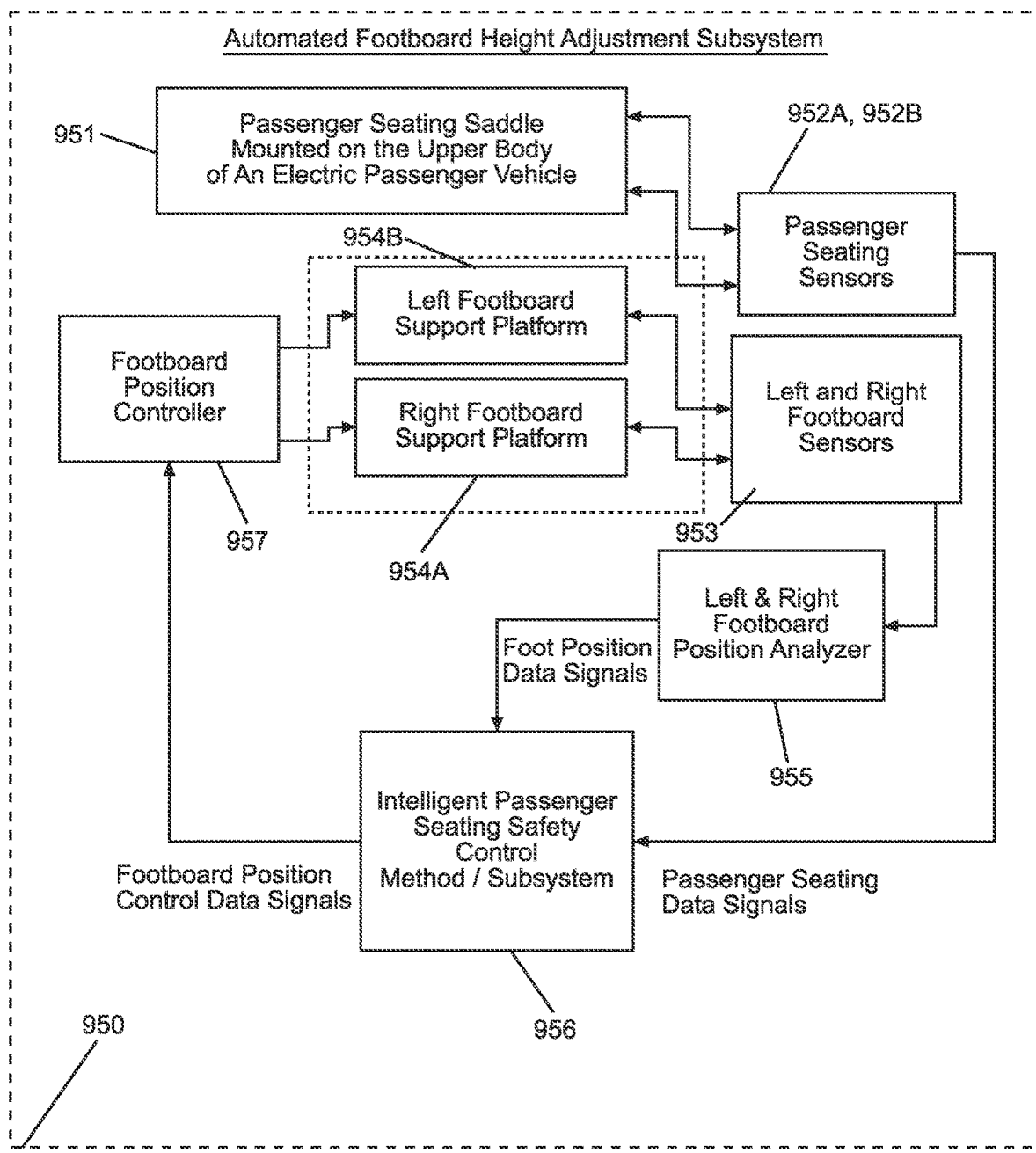
FIG. 24E is a high-level schematic block diagram describing the structure of the automated footboard height adjustment subsystem employed in the rider seating safety subsystem employed in the electrically-powered entertainment vehicles of the present invention.

In FIG. 22C, the electrically-powered entertainment vehicle system in FIGS. 22A and 22B, is shown with both the first and second passengers 980, 981 sitting on the seat saddle and having their feet placed firmly on the automated height-adjustable left and right floor-boards 954A and 954B mounted on both sides of the vehicle system, and controlled using the mechanism shown in FIG. 24E and method described in the flow chart of FIG. 24F.

Figure 23A:
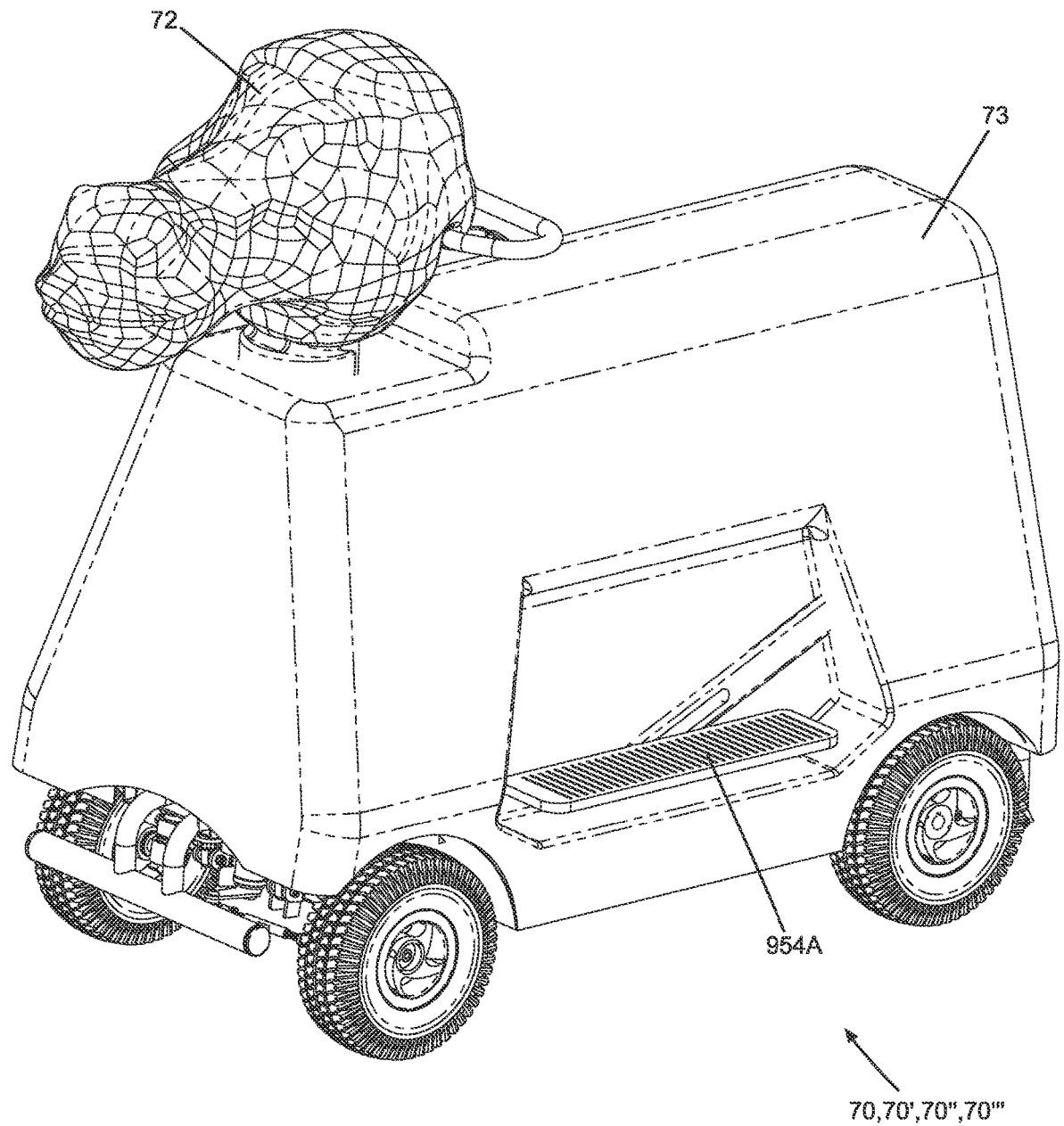
FIG. 23A is a perspective view of the electrically-powered entertainment vehicle system of the present invention, shown in FIGS. 20A through 22B, with the rider safety saddle assembly removed for purposes of illustration of the automated footboard height adjustment subsystem installed in the vehicle system.

Specification of the Automated Footboard Height Adjustment Mechanism Employed in the Electrically-Powered Entertainment Vehicle System of the Present Invention, Embodying Two Rider Safety Seating Features FIG. 23A is a perspective view of the electrically-powered entertainment vehicle systems of the present invention, shown in FIGS. 20A through 22B, with the rider safety saddle assembly removed for purposes of illustration of the automated footboard height adjustment subsystem installed in the vehicle system.

Figure 23B:
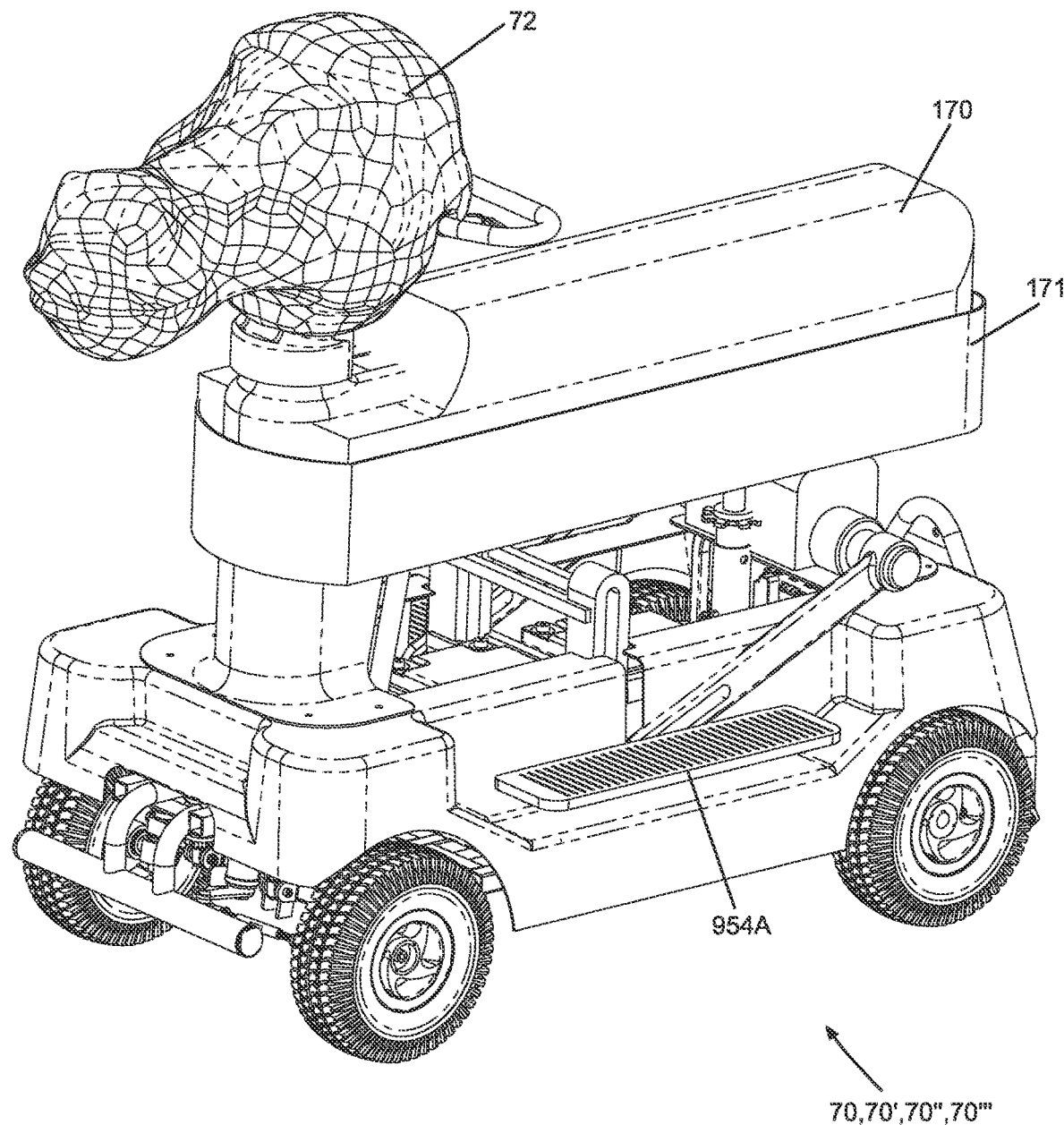
FIG. 23B is a perspective view of the electrically-powered entertainment vehicle systems of the present invention, shown in FIGS. 20A through 22B, with the animal character skin removed for purposes of illustration of the automated footboard height adjustment mechanism supporting the rider seating safety system employed in the vehicle system.

FIG. 23B is a perspective view of the electrically-powered entertainment vehicle systems of the present invention, shown in FIGS. 20A through 22B, with the animal character skin removed for purposes of illustration of the automated footboard height adjustment mechanism supporting the rider seating safety system employed in the vehicle system.

Figure 23C:
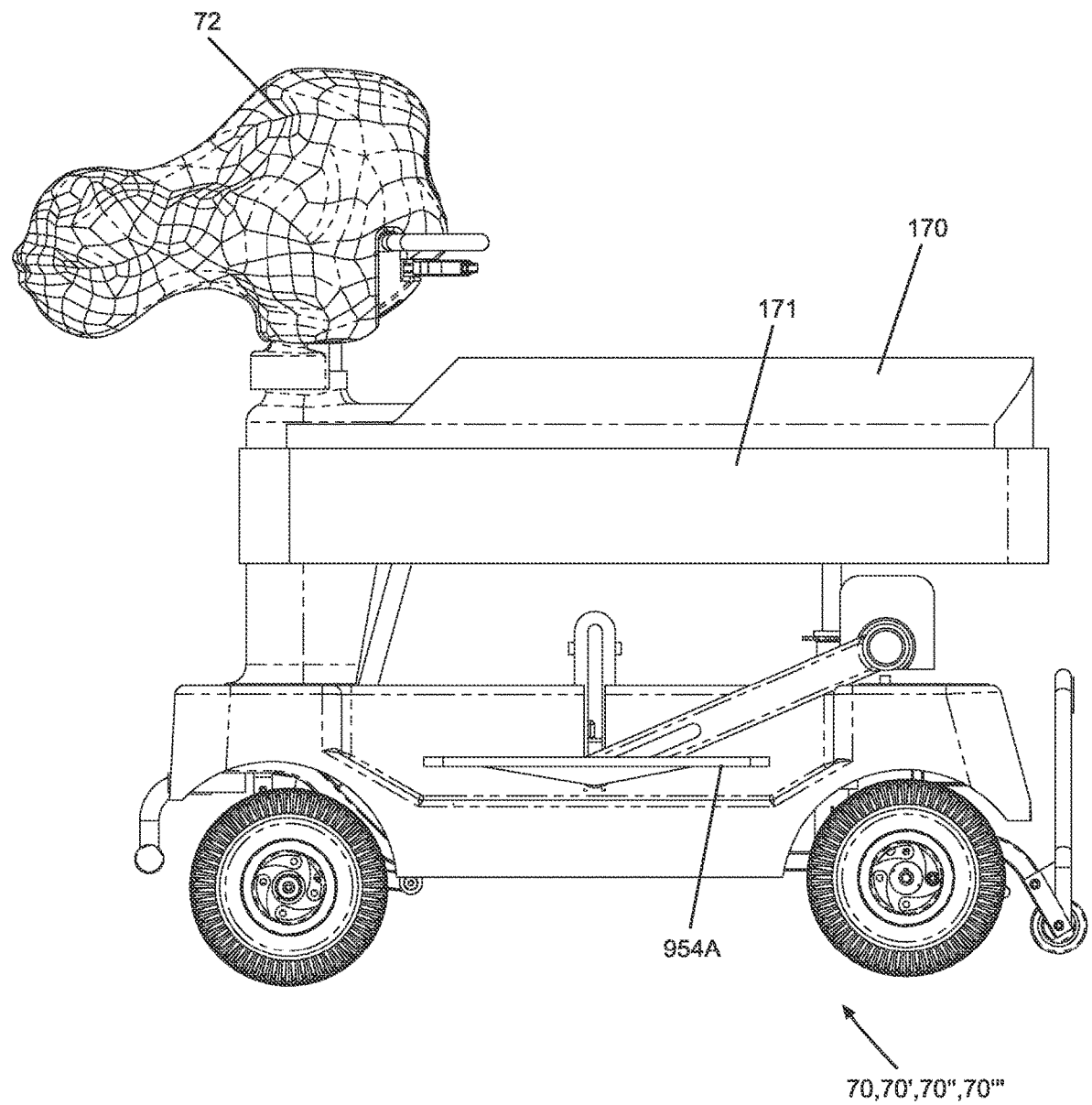
FIG. 23C is an elevated side view of the electrically-powered entertainment vehicle system of the present invention, shown in FIGS. 20A through 23B, with the animal character skin removed for purposes of illustration of the automated footboard height adjustment mechanism supporting the rider seating safety system employed in the vehicle system.

FIG. 23C is an elevated side view of the electrically-powered entertainment vehicle systems of the present invention, shown in FIGS. 20A through 23B, with the animal character skin removed for purposes of illustration of the automated footboard height adjustment mechanism supporting the rider seating safety system employed in the vehicle system.

Figure 23D:
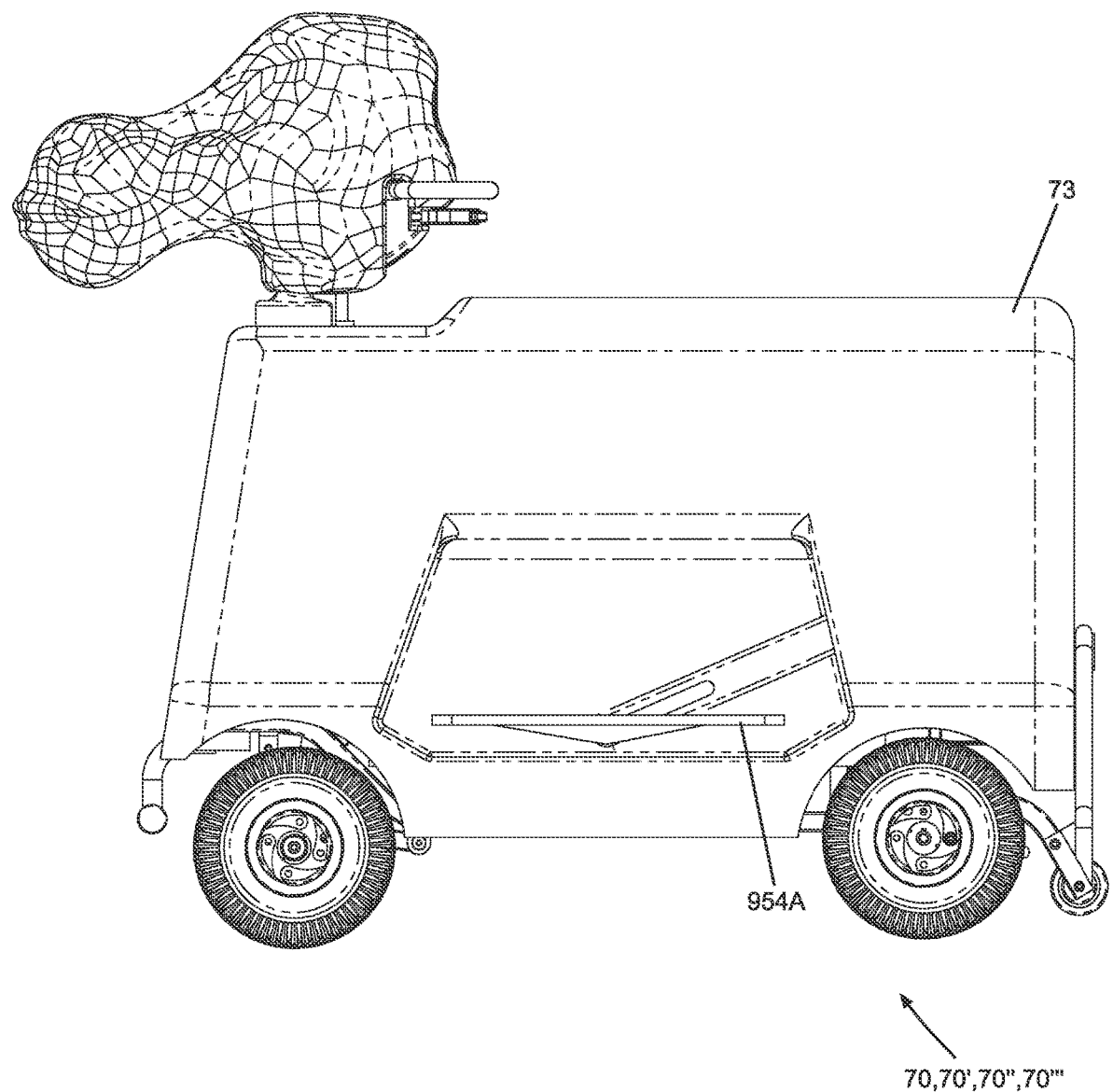
FIG. 23D is an elevated side view of the electrically-powered entertainment vehicle system of the present invention, shown in FIGS. 20A through 22C, showing the automated footboard height adjustment mechanism configured in a first position.

FIG. 23D is an elevated side view of the electrically-powered entertainment vehicle systems of the present invention 70 shown in FIGS. 20A through 22C, showing the automated footboard height adjustment mechanism configured in a first position.

Figure 23E:
FIG. 23E is an elevated side view of the electrically-powered entertainment vehicle system of the present invention, shown in FIGS. 20A through 20D, showing two passengers seated on the saddle seat assembly of the vehicle, while the feet of the smaller rider sitting up front are held by a set of adjustable stirrups, while the feet of the larger passenger are supported on the left and right floorboards arranged in first position, which is automatically controlled by the automated footboard height adjustment mechanism of the present invention.
Figure 23F:
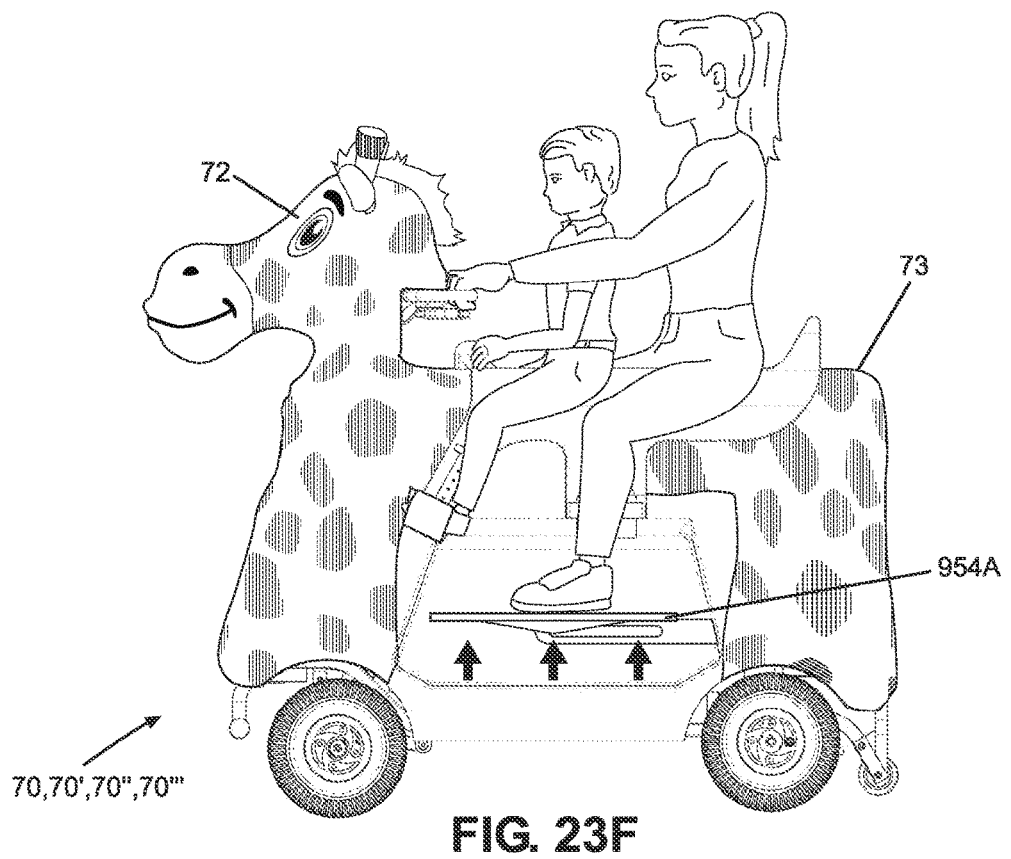
FIG. 23F is an elevated side view of the electrically-powered entertainment vehicle system of the present invention, shown in FIGS. 20A through 20D, showing two passengers seated on the saddle seat assembly of the vehicle, while the feet of the smaller rider sitting up front are held by a set of adjustable stirrups, while the feet of the larger passenger are supported on the left and right floorboards arranged in second automatically-adjusted (i.e. elevated) position providing stability to the rider sitting on the saddle seat assembly of the vehicle.

FIG. 24A shows a first perspective view of the automated footboard height adjustment mechanism employed in the electrically-powered entertainment vehicle systems of the present invention 70 shown in FIGS. 20A through 23B.

FIG. 24B is a second perspective view of the automated footboard height adjustment mechanism employed in the electrically-powered entertainment vehicle systems of the present invention 70 shown in FIGS. 20A through 23B.

FIG. 24C is a first elevated front view of the automated footboard height adjustment mechanism employed in the electrically-powered entertainment vehicle systems of the present invention 70 shown in FIGS. 20A through 23B.

FIG. 24D is an elevated side view of the automated footboard height adjustment mechanism employed in the electrically-powered entertainment vehicle systems of the present invention 70 shown in FIGS. 20A through 23B.

FIG. 24E shows a high-level schematic block diagram describing the structure of the automated footboard height adjustment subsystem employed in the rider seating safety. As shown, the system comprises: a passenger seating saddle 951 mounted on the upper body portion of the electric passenger vehicle; an array of passenger seating sensors 952A and 952B, integrated with the passenger seating saddle 951; left and right footboard sensors 953 integrated with left and right footboard support platforms 954A and 954B; a footboard position controller 957 providing electrical control signals to footboard platforms 954A and 954B, in response to footboard position control data signals generated by an intelligent passenger seating safety control subsystem 956; and a left and right footboard position analyzer 955 receiving and processing sensor signals from footboard sensors 953, and generating foot position data signals that are supplied to the intelligent passenger seating safety control subsystem 956.

During operation, the system 950 automatically senses and monitors that one or two passengers are sitting on the seating saddle, as the case may be, while automatically sensing the passengers' foot positions on the left and right footboards, and based on detected measurements automatically controls and adjusted the footboard support platforms to support the feet and legs of the passenger based on their particular physical dimensions and characteristics. The system 950, when integrated with other systems supported within the vehicles 70, 70', 70" and 70'", automatically ensures that the vehicle can be driven only when the passengers are safely seat in their saddles with the feet planted on the floorboard for safety and securing reasons, to reduce the risk of accidents while riding the vehicle within the environment.

FIG. 23E shows the electrically-powered entertainment vehicle system of the present invention, shown in FIGS. 20A through 20D. As shown, two passengers are seated on the saddle seat assembly of the vehicle, while the feet of the smaller rider sitting up front are held by a set of adjustable stirrups, while the feet of the larger passenger are supported on the left and right floorboards arranged in first position. As described above, the height and position of the foot floorboard platform is automatically controlled by the automated footboard height adjustment mechanism of the present invention.

FIG. 23F shows the electrically-powered entertainment vehicle system of the present invention, shown in FIGS. 20A through 20D. In this view, taken a view moments after the view shown in FIG. 23E, the same two passengers are still seated on the saddle seat assembly of the vehicle, with the feet of the smaller rider sitting up front being held by the set of adjustable stirrups, while the feet of the larger passenger are now supported on the left and right floorboards arranged in second automatically-adjusted (i.e. elevated) position providing stability to the rider sitting on the saddle seat assembly of the vehicle. This automated floorboard height adjustment was automatically adjusted by its control system described above so as to accommodate the physical characteristics of the rider whose feet are automatically sensed, detected and monitored by onboard sensors, to realize the safety seating features and principles of the present invention.

Specification of Method of Automated Intelligent Passenger Seating Safety Control According to the Present Invention As shown in FIG. 24F, and described in supporting FIGS. 23A through 24E, a novel method of the present invention is described for automatically and intelligently controlling a passenger seating saddle 951 mounted on an electric passenger vehicle 70, using sensors, motors, moving platforms and intelligent control logic as taught herein. The objective of this aspect of the present invention is to provide a best-in-class passenger safety seating solution as described great detail and in accordance with the principles of the present invention.

As indicated in Step A of FIG. 24F, the method involves automatically detecting the presence of one or more passengers sitting on a seating saddle 951 mounted on an electric passenger vehicle 950, as shown in FIGS. 20C, 21C and 22C.

As indicated in Step B of FIG. 24F, the method then involves using the sensors 952A and 952B mounted in the footboard platforms 954A and 954B to automatically sense and detect the presence of the left and right feet of each detected passenger, and determine if the footboards 954A and 954B require adjustment to support the legs of each passenger sitting in the seating saddle 951 of the passenger vehicle.

As indicated in Step C of FIG. 24F, the method then involves using the electrically-driven motor 954C to automatically adjust the position of the footboards 954A and 954B on left and right sides of the electric passenger vehicle until the feet of the detected passengers are detected as being supported in stable manner on the footboard under the detected passenger riding conditions.

As indicated in Step D of FIG. 24F, the method involves using a programmed processor 956 to automatically generate a vehicle enable signal supplied to the vehicle motion controller(s) so as to enable the electric passenger to be operated in a motion-enabling state of operation.

As indicated in Step E of FIG. 24F, during vehicle operation, the method is practiced so that the position of the passengers on the seating saddle 951, and passenger feet on the footboards 954A and 954B, are automatically sensed and detected on a continuous manner by the advanced sensing technology, and in the event of disruptions in essential passenger riding conditions (i.e. feet must be on floorboards, etc.) are detected by the subsystem 956, then a vehicle disable signal is automatically generated by the subsystem to disable the passenger from operating the vehicle in any motion-enabling state of operation, for passenger safety purposes. If desired, or required, a disable-override switch or button can be mounted on the driver's console to enable vehicle operation, regardless of such automatically detection of violations in essential passenger riding conditions, preferably maintained as logical rules within non-volatile memory of the subsystem 956.

As indicated in Step F of FIG. 24F, when the embedded method using sensors 952A and 952B automatically sense and detect that the passengers are seated once again on the seating saddle 951 of the vehicle, and their feet are positioned on the footboards 954A and 954B in a safe manner, then the programmed process 950 will automatically generate a vehicle re-enable signal provided to the vehicle propulsion microcontroller, which will enable the passenger to continue operating the vehicle in a motion-enabling state of operation while essential rider conditions are being satisfied.

Figure 19:
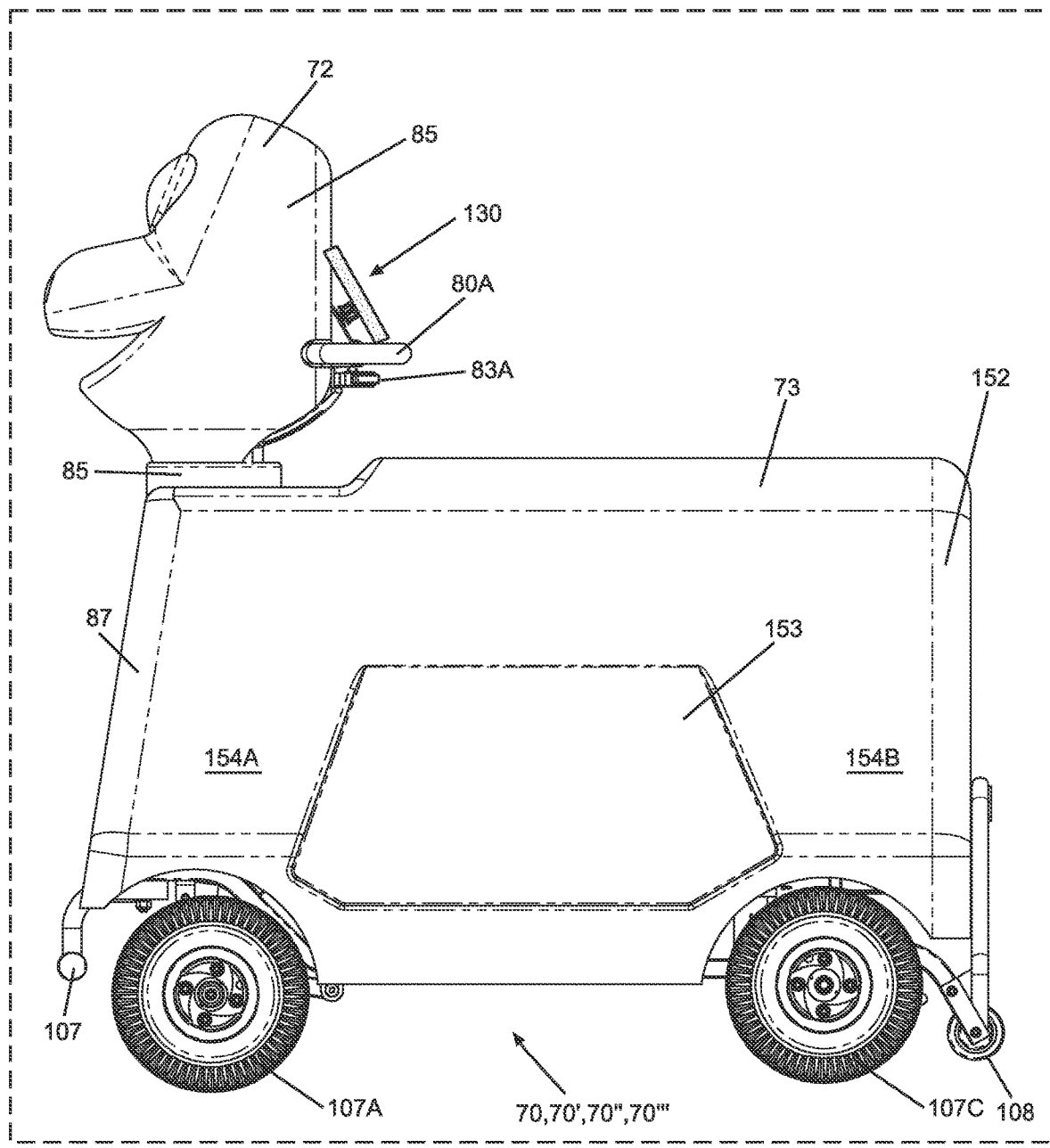
FIG. 19 is an elevated side view of an illustrative embodiment of the electrically-powered entertainment vehicle system shown in FIG. 17A, wherein a mobile phone system is used to electronically-activate (i.e. digitally unlock) and enable operation of the vehicle via wireless communications, with wireless communication equipment embedded within the steering console of the vehicle.

Specification of GPS-Tracked Wireless Networked Rideable Vehicle System Activated Specification of Method of Using a Mobile Phone Application as a Digital Key for Accessing and Controlling Vehicle Access Control FIG. 19 shows an electrically-powered entertainment vehicle system of the present invention 70, 70', 70" and 70'". These systems are configured for remote access and control using a mobile phone 130 functioning as a digital key for activating the vehicle into a state of operation. As shown in FIGS. 23A, 20B and 23C, a mobile phone system 130 is used to electronically-activate (i.e. digitally unlock) and enable the operation of the vehicle(s) 70, 70', 70" and 70'" via wireless (Bluetooth) communication signaling, with wireless communication equipment 122 embedded within the steering console 84 of the vehicle system, as shown in FIGS. 13, 15 and 18.

Figure 25A:
FIG. 25A is a graphical user interface (GUI) screen of the mobile smartphone shown in FIGS. 7A and 19, deployed on the wireless access control system network of the present invention, and showing the first step in the method of electronically-activating the vehicle to operate using a digital key supplied to the vehicle by the mobile phone system.

As indicated in FIG. 25A, a graphical user interface (GUI) screen of the mobile smartphone shown in FIGS. 7A and 19 is used to carry out the first step in the method of electronically-activating the vehicle 70, 70', 70" and 70'" to operate using a digital key supplied to the vehicle by the mobile phone system 130.

Figure 25B:
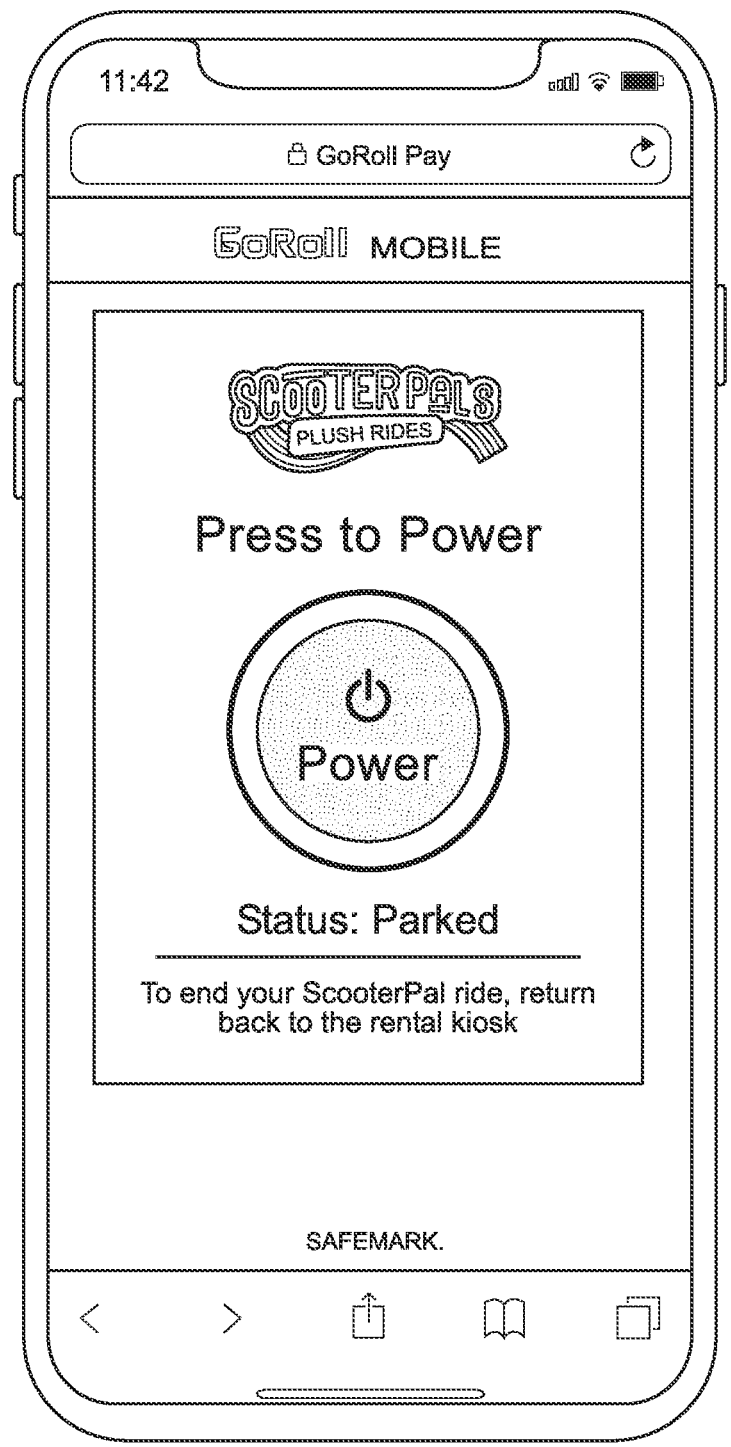
FIG. 25B is a graphical user interface (GUI) screen of the mobile smartphone shown in FIGS. 7A and 19, deployed on the wireless access control system network of the present invention, and showing the second step in the method of electronically-activating the vehicle involving selecting POWER to power up the vehicle.

As indicated in FIG. 25B is a graphical user interface (GUI) screen of the mobile smartphone shown in FIGS. 7A and 19, deployed on the wireless access control system network 1, and showing the second step in the method of electronically-activating the vehicle 70, 70', 70" and 70'" involving selecting POWER to power up the vehicle.

Figure 25C:
FIG. 25C is a graphical user interface (GUI) screen of the mobile smartphone shown in FIGS. 7A and 19, deployed on the wireless access control system network of the present invention, and showing the third step in the method of electronically-activating the vehicle involving selecting PARK to park and stop the vehicle.

As indicated in FIG. 25C is a graphical user interface (GUI) screen of the mobile smartphone shown in FIGS. 7A and 19, deployed on the wireless access control system network 1, and showing the third step in the method of electronically-activating the vehicle 70, 70', 70" and 70'" involving selecting PARK to park and stop the vehicle, and un-power the vehicle, to end the ride and request the guest to return the vehicle to a rental kiosk.

Specification on Overview of Multi-Level Code Scanning Driven Method of and System for Accessing and Controlling Rented Networked Devices within an Environment Having Different Site Locations where Rented Networked Devices Might be Accessed and Used As will be described in greater detail below, there are three primary code scanning workflows that guest users can undertake to rent, access, control and use networked devices (e.g. EVCs, strollers, wheelchairs etc.) using mobile smartphones and other mobile computing devices 130 to scan QR Codes 40A, 40B and 40C, display messages, and receipts, and instructions on how to use the rented networked vehicles 70, 70', 70" and 70'" with minimal contact of public surfaces.

In the illustrative embodiments of the present invention, there are three primary code scanning workflows disclosed and illustrated I the following Drawings: Facility-Level Code (i) Scanning Followed by Device-Level Scanning illustrated in FIGS. 26A and 26B, FIGS. 27A through 27D, FIGS. 28A through 28Q and FIG. 29; (ii) Site-Level Code Scanning Followed by Device-Level Scanning shown in FIGS. 30A and 30B, FIGS. 31A through 31C, FIGS. 32A through 32P, and FIG. 33; and (iii) Device/Vehicle-Level Code Scanning Followed by Vehicle-Level Scanning shown in FIGS. 34A and 34B, FIGS. 35A and 35B, FIGS. 36A through 36N, and FIG. 37.

Each of these scanning workflows and associated methods will be described in greater detail below with reference to their underlying data processing method that provides the system with intelligence and significant levels of automation in the field of device rental, access and control.

Notably, in each of these three workflows, the system administrator of a networked electric vehicle 70, 70', 70" and 70'" has the option of enabling the guest user as follows: (i) automatically unlock the electric vehicle upon successfully scanning the Device-Level QR Code 40C on rented vehicle, without manual entry of the guest-set 4 digit access PIN on either the virtual keypad of mobile smartphone 130 or hardware keypad 158 provide on each vehicle steering console 82; (ii) automatically unlock the electric vehicle upon successfully scanning the Device-Level QR Code 40C on the of the rented vehicle, and also manual entering the guest-set 4 digit access PIN on the virtual keypad of the user's mobile smartphone 130; or (iii) automatically unlock the electric vehicle upon successfully manually entering the guest-set 4 digit access PIN on the hardware keypad 158 provide on the vehicle console 84. Any one or more of these vehicle unlocking methods can be enabled by a system administer using programming techniques known in the art to enable a guest user to unlock a rented vehicle deployed at a site within a facility hosting the system network 1.

While first vehicle access method described above (i) has the advantage of quick vehicle access by the simple scanning of a Door-Level QR Code 40C scanned by an authorized mobile phone containing a transaction identifier (i.e. digital cookie) linked to a specific vehicle and rental transaction identifier maintained within the locally and globally maintained database systems of the present invention, there is still the unlikely and low risk of theft and fraud should the mobile smartphone 130 get lost or stolen and then used to unlock a rented vehicle authorized by the mobile smartphone.

The second vehicle access method is based on a form of 2-factor authentication, requiring both code scanning with the mobile smartphone, and entry of the access PIN via the virtual keypad supported by the mobile smartphone 130. This is the most secure method supported on the system network 1, and is preferred in most instances.

The third vehicle access method only requires entering the access PIN selected for the rented vehicle using the hardware physical keypad 158 mounted on the vehicle console 84, to automatically unlock the rented vehicle. When enabled, this method allows guest users to access their rented vehicle, even when electrical power and network connectivity within the facility is disrupted for one reason or another, assuming that back-up battery power is provided to each vehicle system to enable the vehicle to be returned to its rental site in the event of a network failure across the park environment. This prevents guests from ever being locked out of a rented vehicle and their ability to operate the same under almost any set of circumstances within a facility that may cause disruption in services.

Preferably, all three vehicle access control methods described above are enabled to operate with each of the code scanning workflows described below and specified in the Drawings. It is understood, however, that other vehicle access methods will be developed and adapted for use with the wireless vehicle access control system network 1 according to the principles of the present invention disclosed herein.

Specification of the Method of Managing Access Control to a Networked Vehicle by Scanning Facility-Level QR Codes Posted at the Entrance Gate or Outside of an Amusement Park Facility Using a Mobile Smartphone Wireless Connected to the Wireless Access Control System Network of the Present Invention FIGS. 26A and 26B, and FIGS. 27A through 27D describe the primary steps involved when carrying out the methods of managing access control to a networked vehicle system 70 by scanning facility-level QR codes 40A posted at the entrance gate or outside of an amusement park facility 800, using a mobile smartphone 130 wireless connected to the wireless access control system network of the present invention.

Figure 26A:
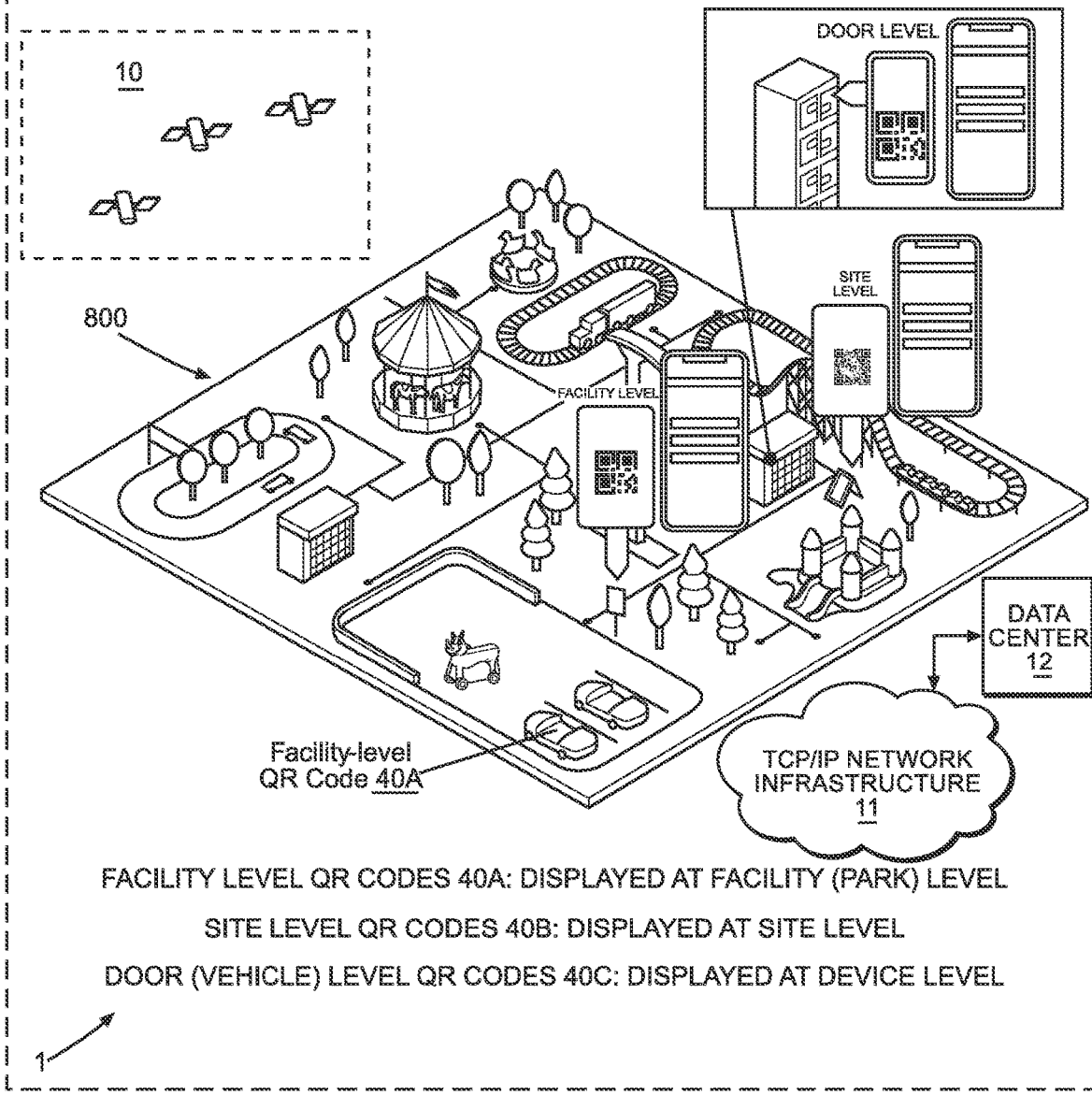
FIG. 26A is a schematic representation illustrating showing a perspective view of an amusement park facility, with a sign posted at the entrance date of the park, displaying a Facility-Level QR code as shown in FIG. 21B, which upon scanning with a web-enabled mobile smartphone is engineered to direct the guest user to a web-based e-commerce-enabled rental and access control transaction, and allowing selection of a Site location of choice within the amusement park for their ride vehicle rental within the amusement park, and then allowing the wireless system network to automatically assign an available entertainment vehicle to the guest at the selected Site at a given time and date.
Figure 26B:
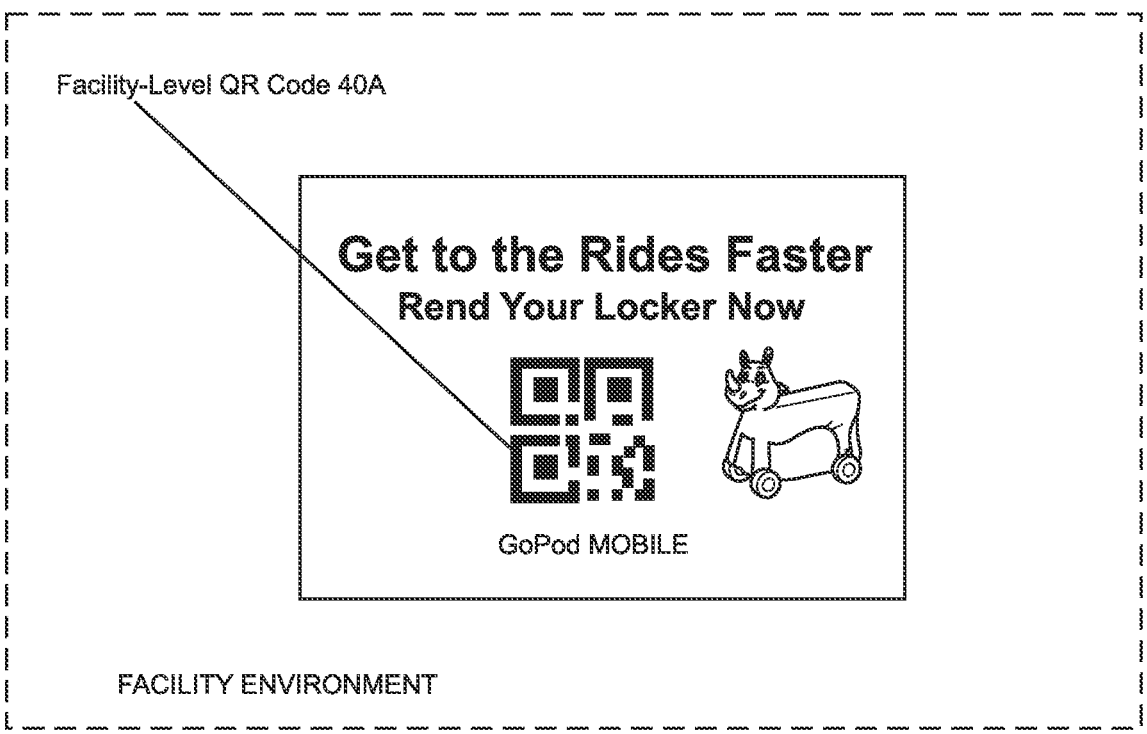
FIG. 26B is an enlarged view of the Facility-Level QR Code posted at the entrance gate of the amusement park illustrated in FIG. 26A.

FIG. 26A shows a perspective view of an amusement park facility 800, with a sign posted at the entrance date of the park, displaying a Facility-Level QR code 40A as shown in FIG. 26B which, upon scanning with a web-enabled mobile smartphone 130, is engineered to direct the guest user to a web-based e-commerce-enabled vehicle rental and access control transaction having the largest scope of services, encapsulating the entire facility. This allows guest users to select a Site location of choice within the amusement park 800 for their vehicle rental within the amusement park, and then allow the wireless system network to automatically assign an available vehicle to the guest at the selected Site.

FIG. 26B shows an enlarged view of the Facility-Level QR Code 40A posted at the entrance gate of the amusement park illustrated in FIG. 25A.

Figure 28A:
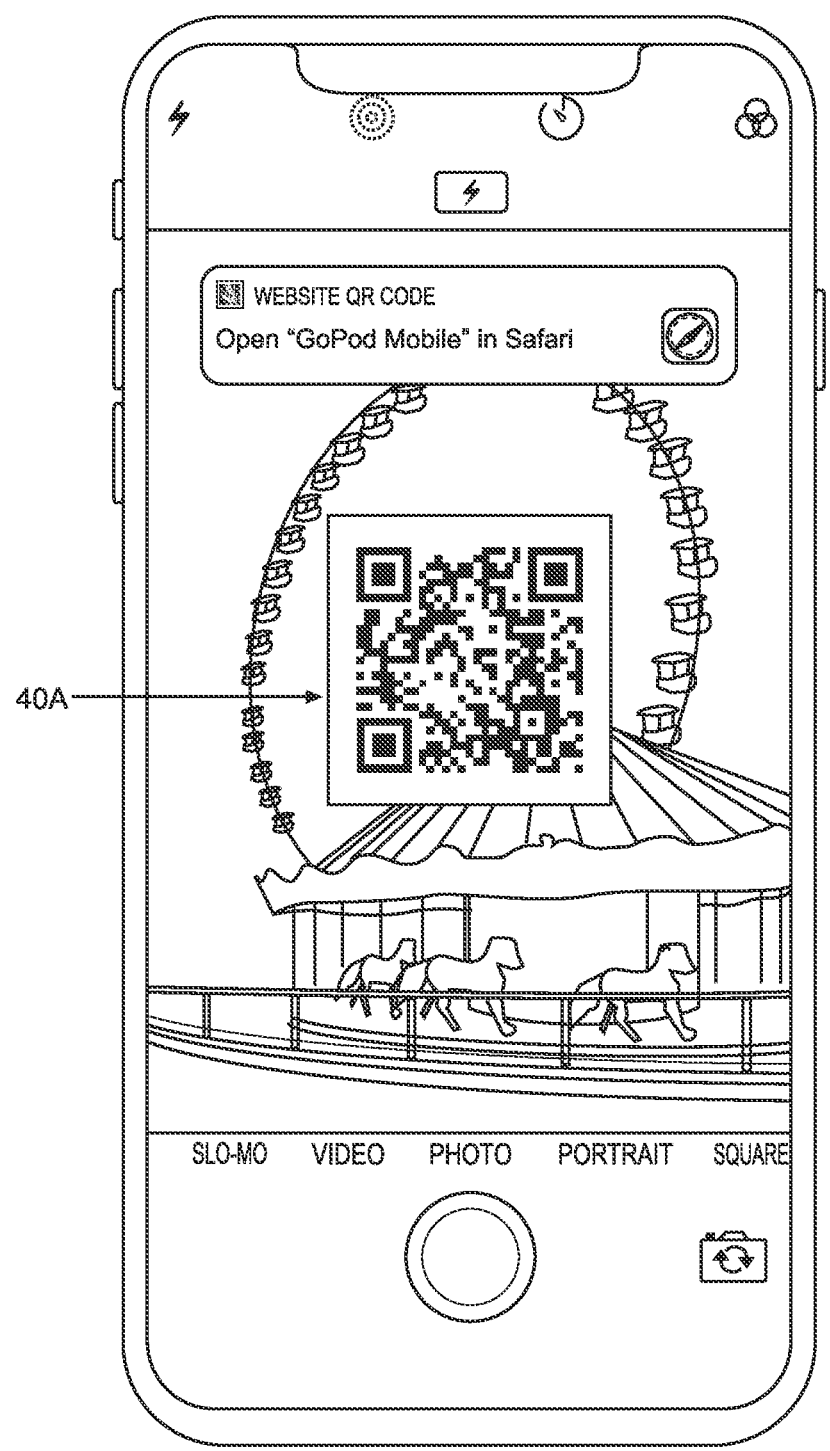
FIG. 28A is a graphical user interface (GUI) screen of the mobile smartphone shown in FIG. 7A, deployed on the wireless access control system network of the present invention, and showing the first step in the facility-level access control method involving (i) the scanning of a Facility-Level QR Code as shown in FIGS. 26A and 26B, and (ii) automatically directing the smartphone web-browser application (e.g. Apple Safari) to parse and analyze the scanned QR code and serve, load and display the webpage specified by the URL encoded in the Facility-Level QR Code as illustrated in table of FIG. 3, and whereupon, the application server stores a "Rental Transaction Identifier-Facility Entry" (RTI-FE) within the cache on the mobile smartphone.
Figure 28B:
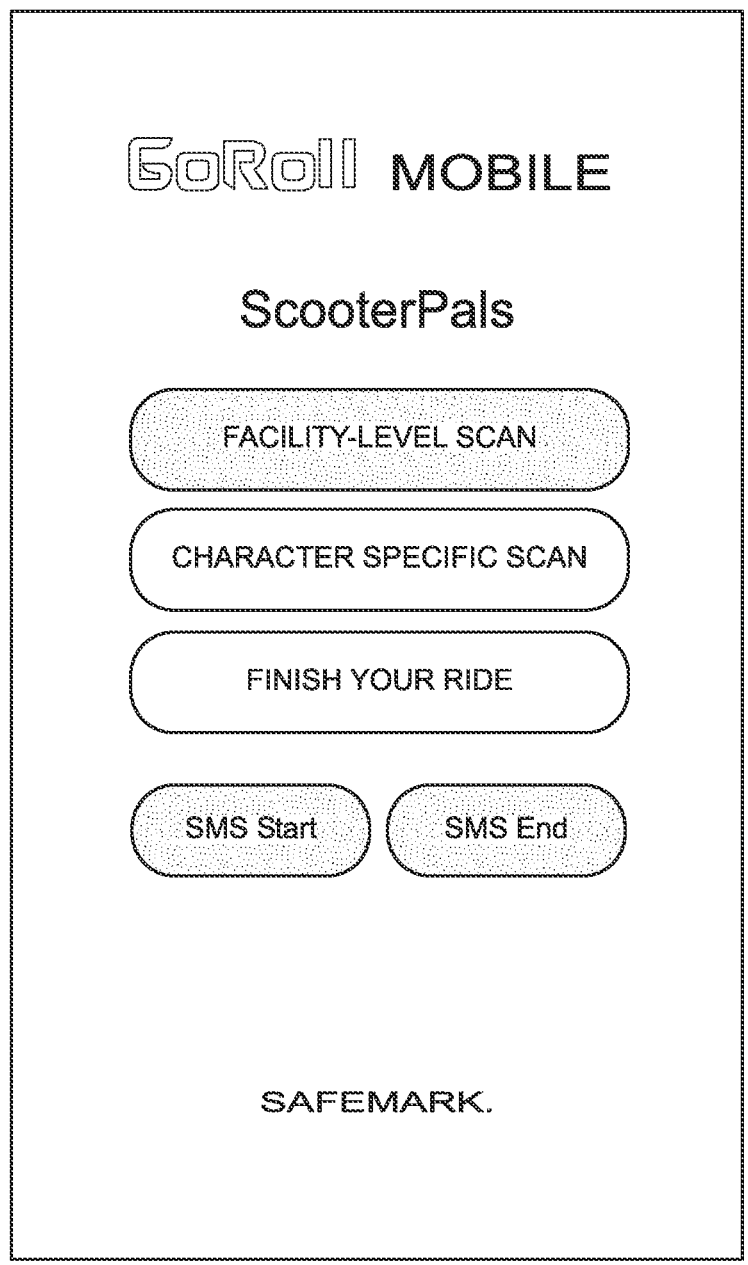
FIG. 28B is a graphical user interface (GUI) screen of the mobile smartphone shown in FIG. 7A, deployed on the wireless access control system network of the present invention, and showing the second step in the method involving the selection of one or more options from the group consisting of (i) facility-level scanning, (ii) character-specific scanning, and (iii) finish your ride.
Figure 28C:
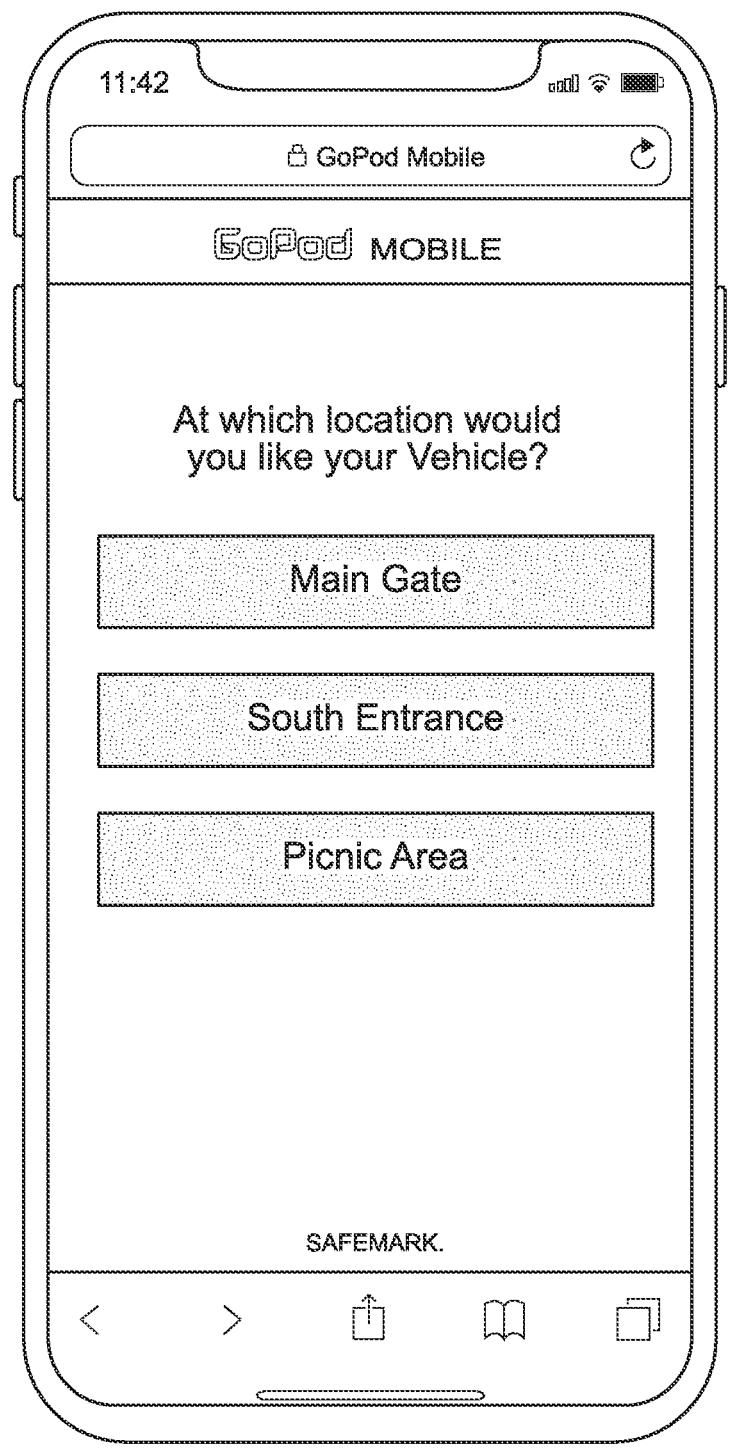
FIG. 28C is a graphical user interface (GUI) screen of the mobile smartphone shown in FIG. 7A, deployed on the wireless access control system network of the present invention, and showing the third step in the facility-level access control method of the present invention involving the selection of which Site within the Facility (e.g. amusement park) (e.g. Main Gate, South Entrance, or Picnic Area) where the guest user would like to rent and access a rideable vehicle.
Figure 28D:
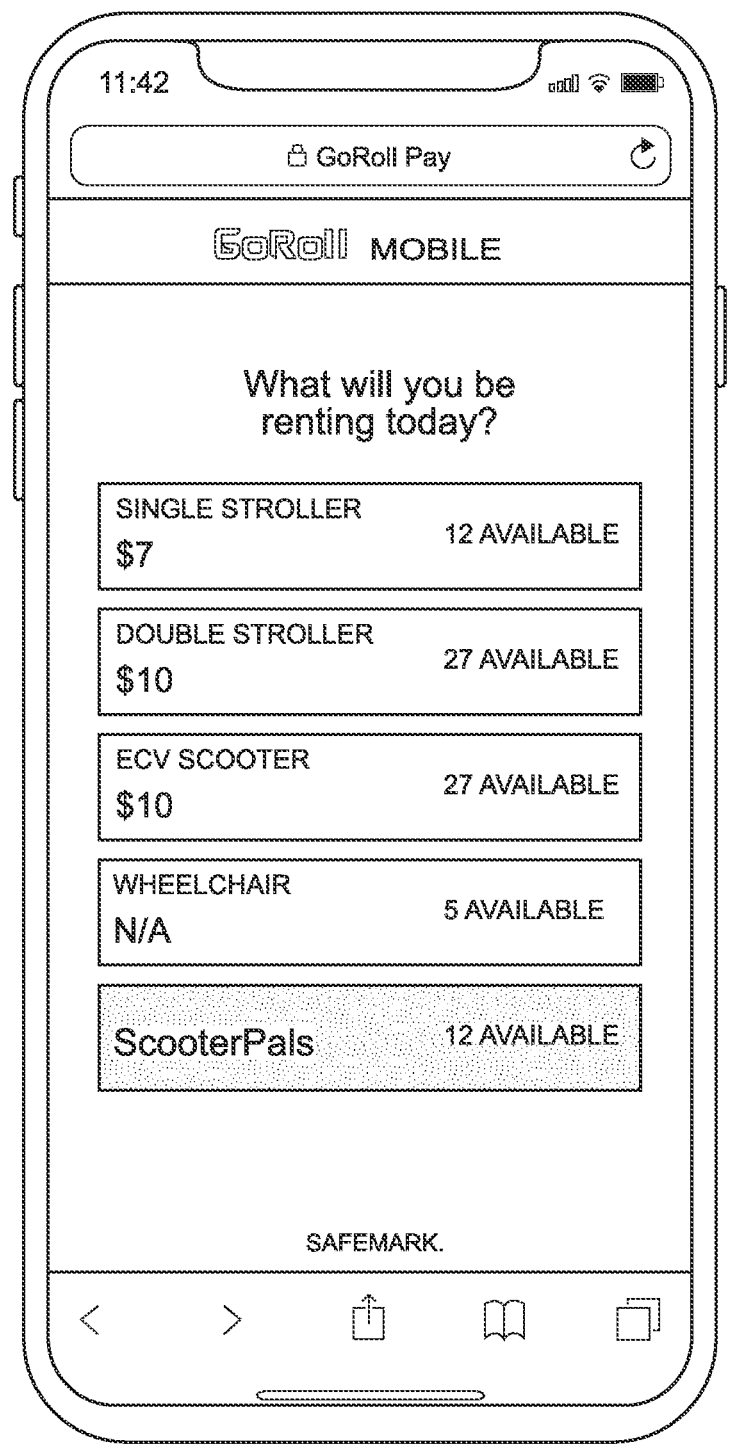
FIG. 28D is a graphical user interface (GUI) screen of the mobile smartphone shown in FIG. 7A, deployed on the wireless access control system network of the present invention, and showing the fourth step in the facility-level access control method of the present invention involving the selection of a particular mobility vehicle (e.g. entertainment vehicles, single and double strollers, ECV scooters, and wheelchairs) at the selected Site within the Facility which the guest user would like to rent and access a rideable vehicle.
Figure 28E:
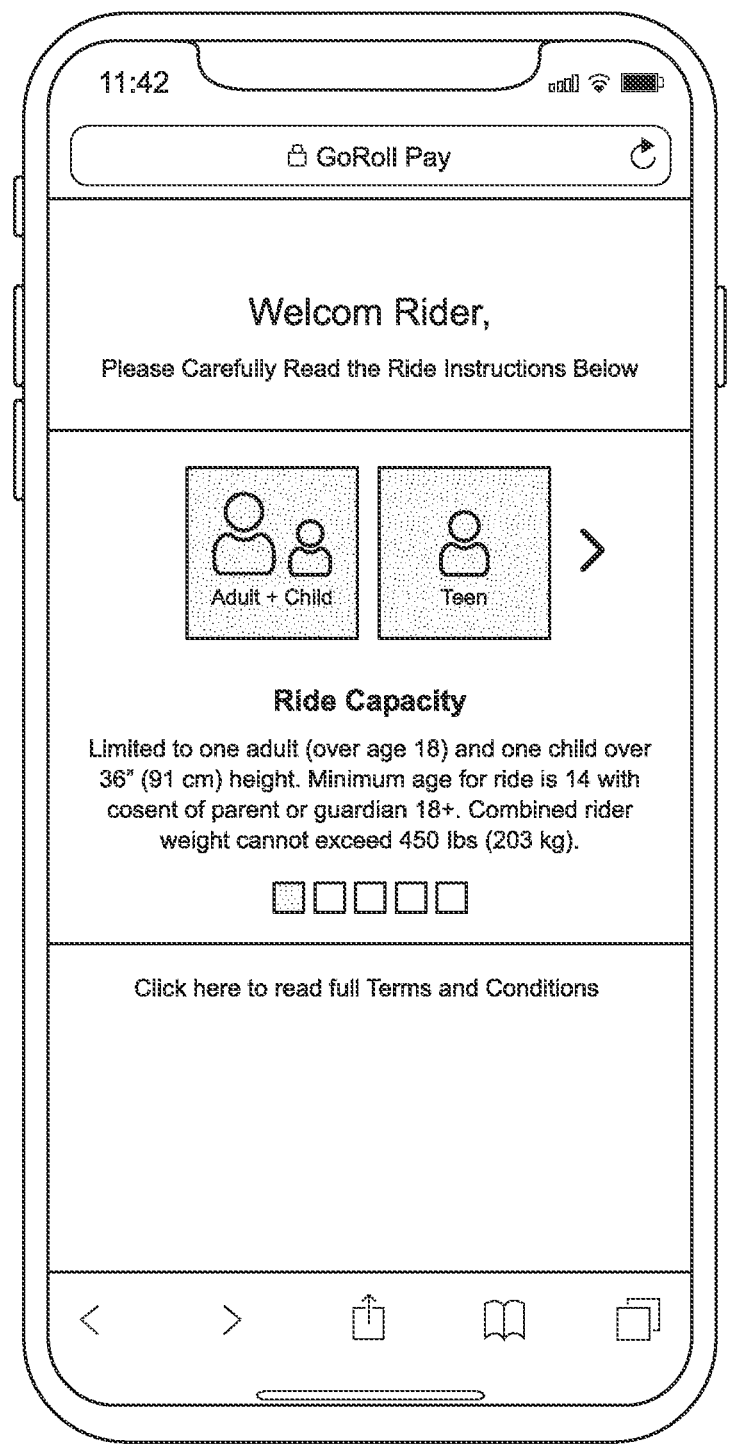
FIG. 28E is a graphical user interface (GUI) screen of the mobile smartphone shown in FIG. 7A, deployed on the wireless access control system network of the present invention, and showing the fifth step in the facility-level access control method of the present invention involving the guest user being advise on rider capacity under the terms and conditions of the vehicle rental agreement.
Figure 28F:
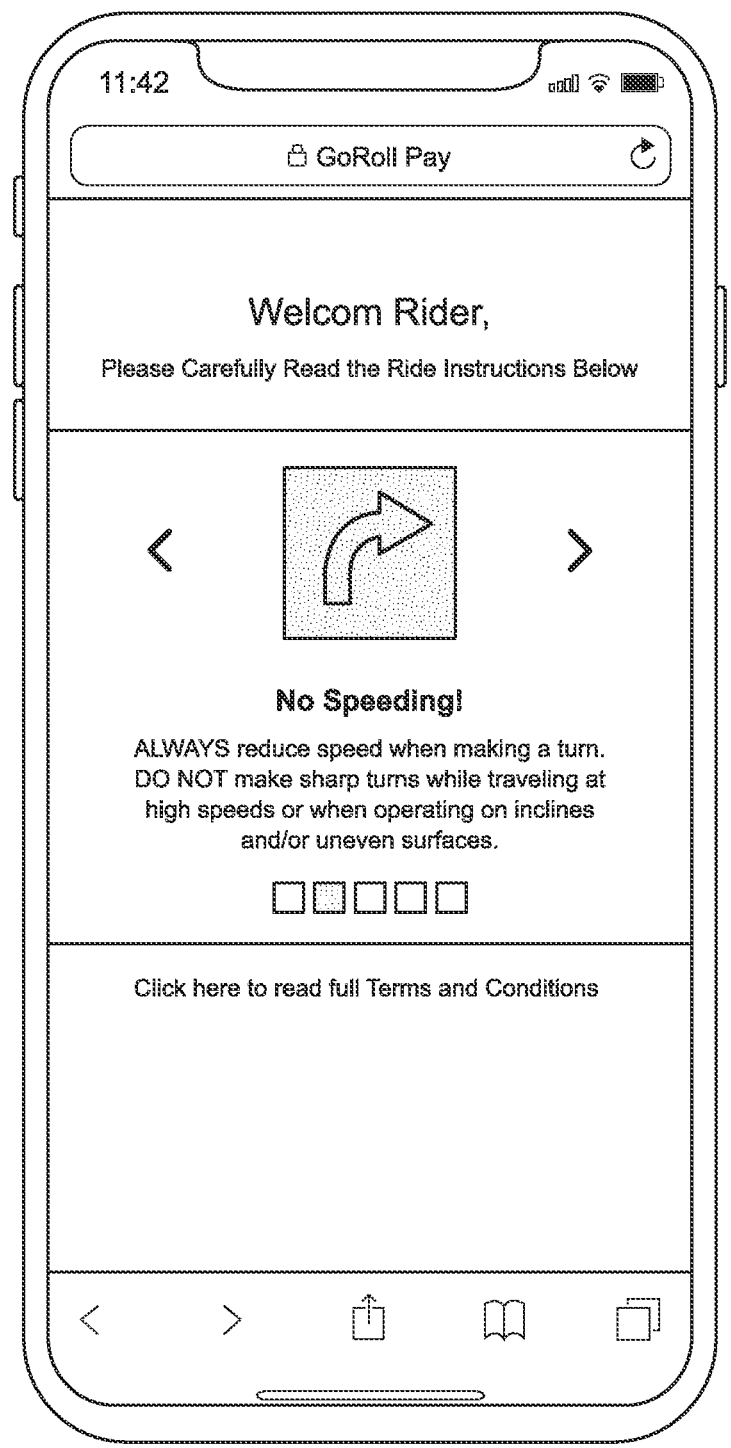
FIG. 28F is a graphical user interface (GUI) screen of the mobile smartphone shown in FIG. 7A, deployed on the wireless access control system network of the present invention, and showing the sixth step in the facility-level access control method of the present invention involving the guest user being advise on policy of no speeding under the terms and conditions of the rental agreement.
Figure 28G:
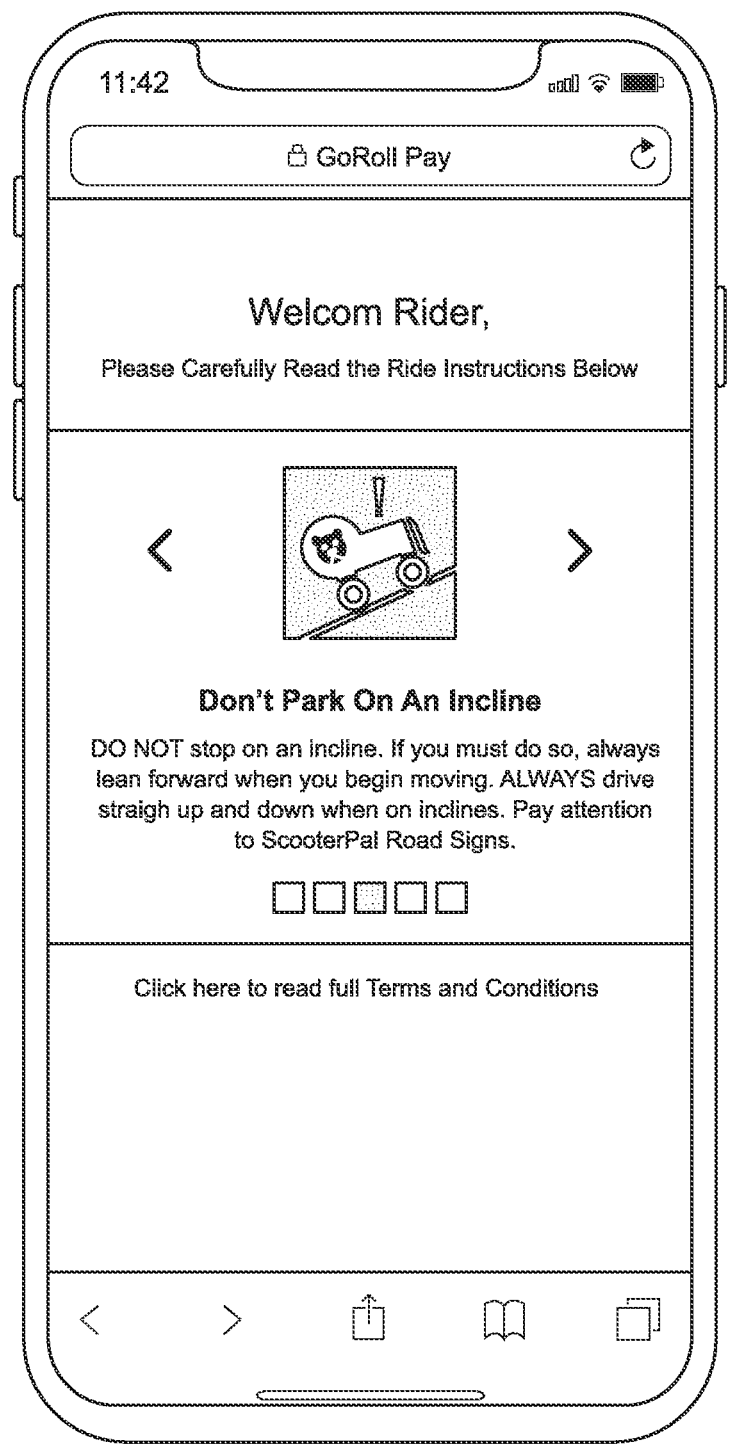
FIG. 28G is a graphical user interface (GUI) screen of the mobile smartphone shown in FIG. 7A, deployed on the wireless access control system network of the present invention, and showing the seventh step in the facility-level access control method of the present invention involving the guest user being advise on policy of no parking on an incline road surface under the terms and conditions of the rental agreement.
Figure 28H:
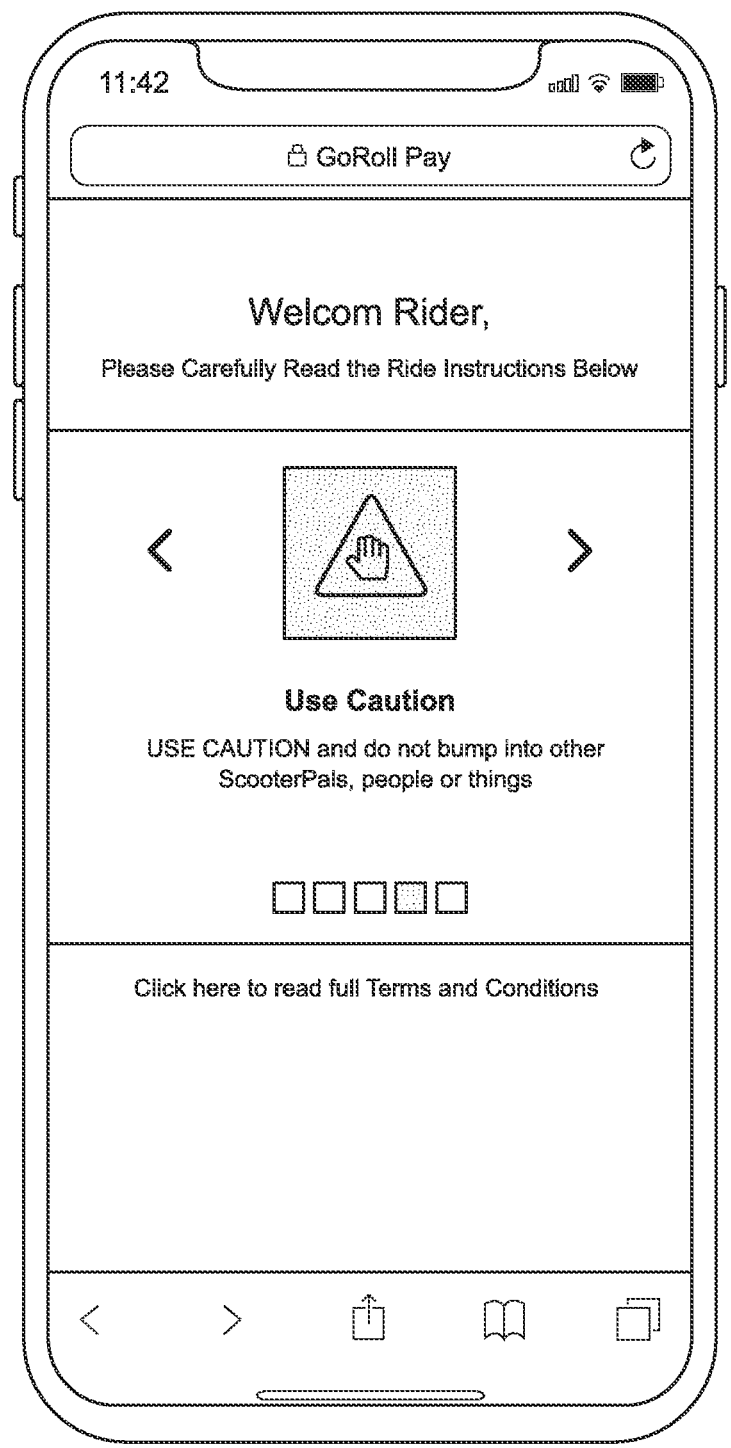
FIG. 28H is a graphical user interface (GUI) screen of the mobile smartphone shown in FIG. 7A, deployed on the wireless access control system network of the present invention, and showing the eighth step in the facility-level access control method of the present invention involving the guest user being advise on policy of always using caution under the rental agreement.
Figure 28I:
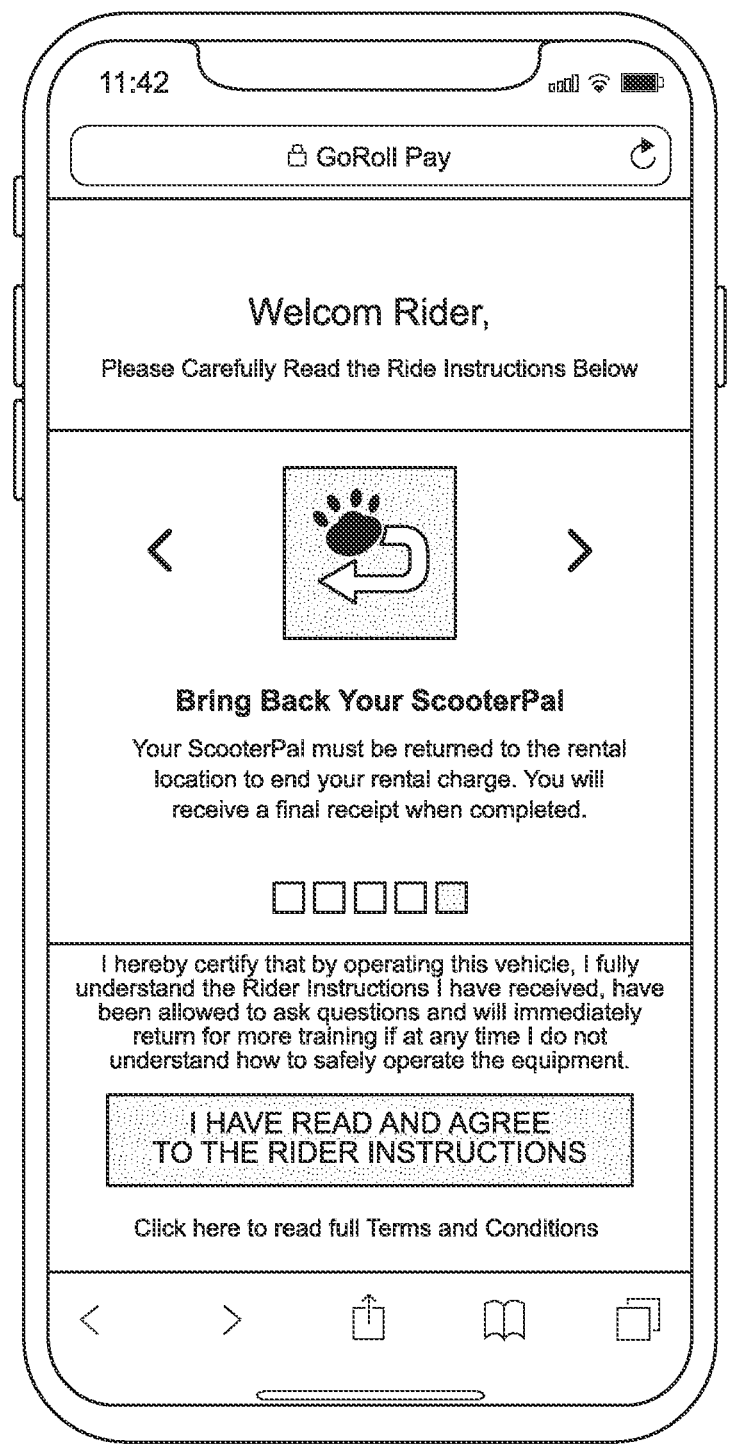
FIG. 28I is a graphical user interface (GUI) screen of the mobile smartphone shown in FIG. 7A, deployed on the wireless access control system network of the present invention, and showing the ninth step in the facility-level access control method of the present invention involving the guest user being advise on policy of returning vehicle to original rental location.
Figure 28J:
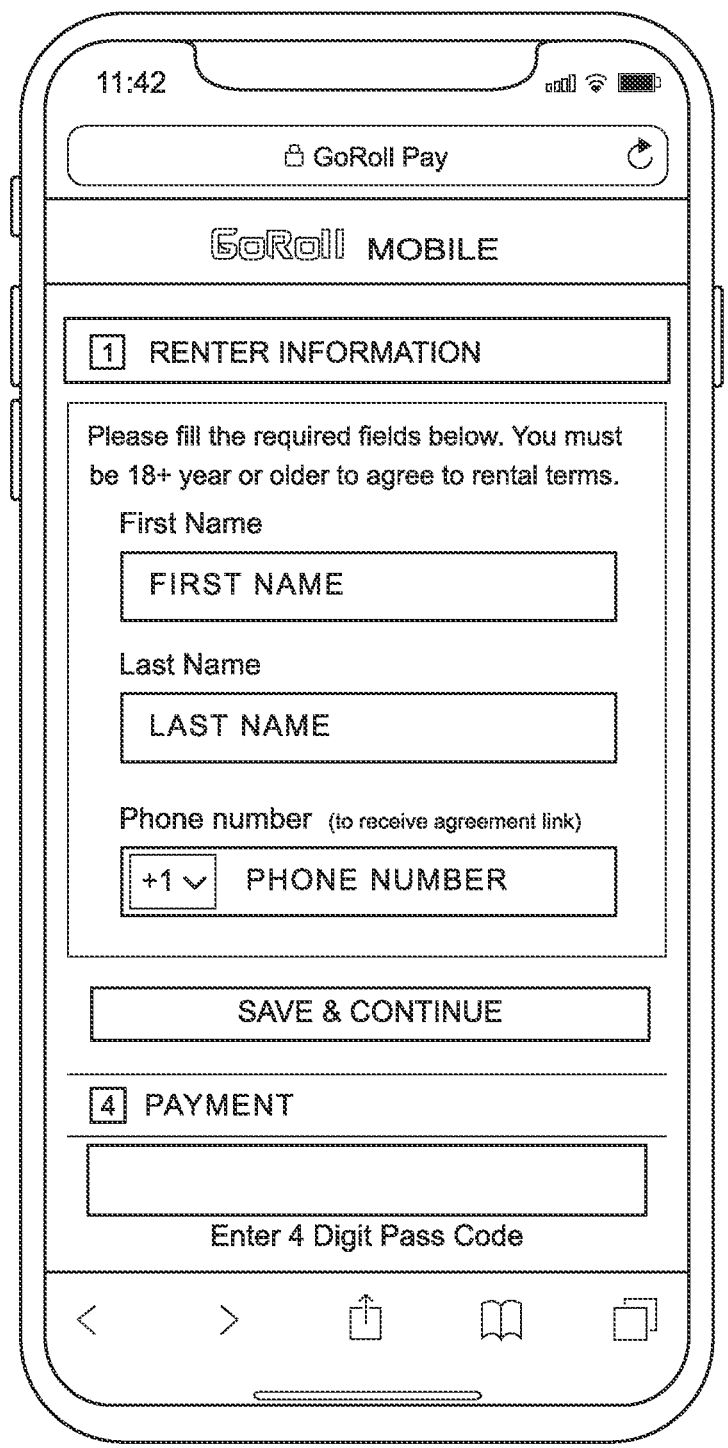
FIG. 28J is a graphical user interface (GUI) screen of the mobile smartphone shown in FIG. 7A, deployed on the wireless access control system network of the present invention, and showing the tenth step in the facility-level access control method of the present invention involving the user's provision of (i) first and last name and phone number of mobile phone to be used to access the wireless access control system network, and if required, (ii) a four or fixed digit passcode for use as a two factor authentication to access and control a particular vehicle on the system network.
Figure 28K:
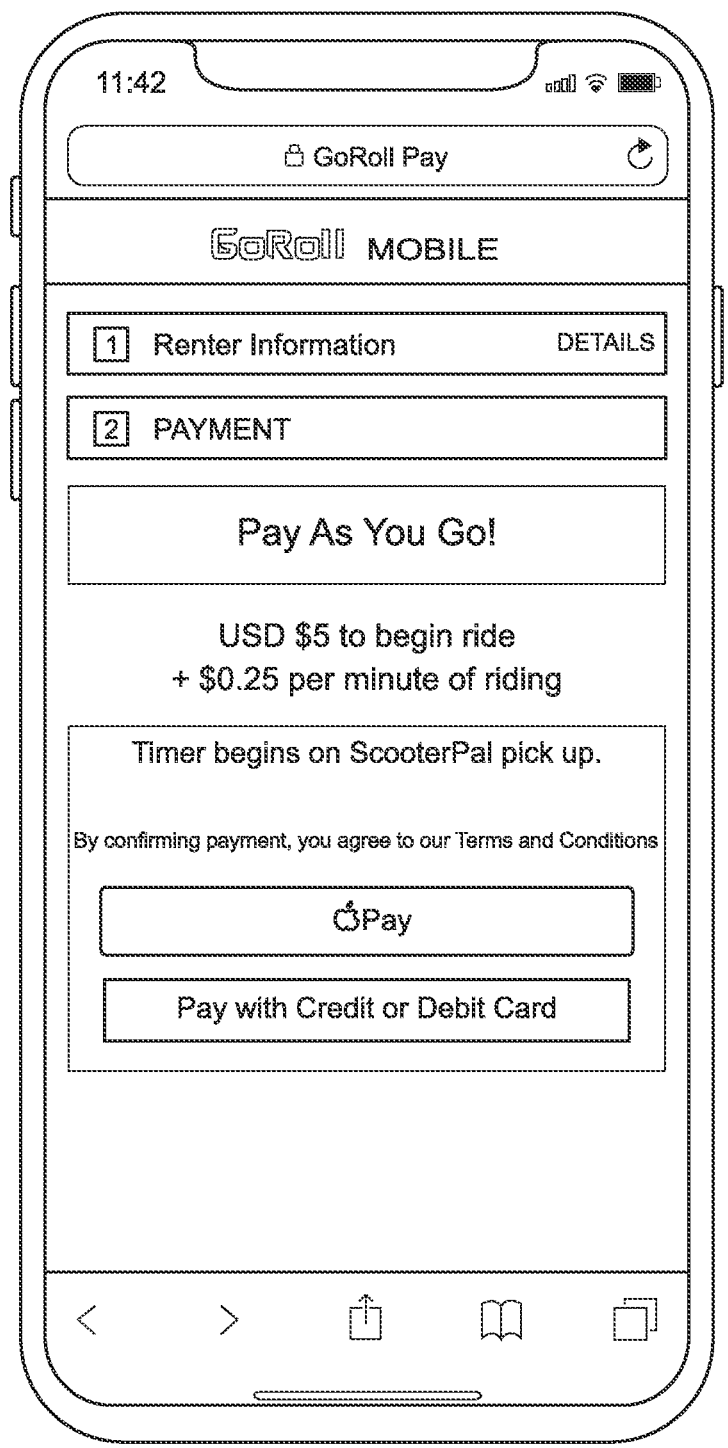
FIG. 28K is a graphical user interface (GUI) screen of the mobile smartphone shown in FIG. 7A, deployed on the wireless access control system network of the present invention, and showing the eleventh step in the facility-level access control method of the present invention displaying the selected rideable vehicle, text receipt phone number, and total price of the vehicle rental (tax included), and providing several options for the user to make payment (e.g. using ApplePay® or using a credit card or debit card of the user, in which case, the card number and expiration date i.e. month/year are requested)
Figure 28L:
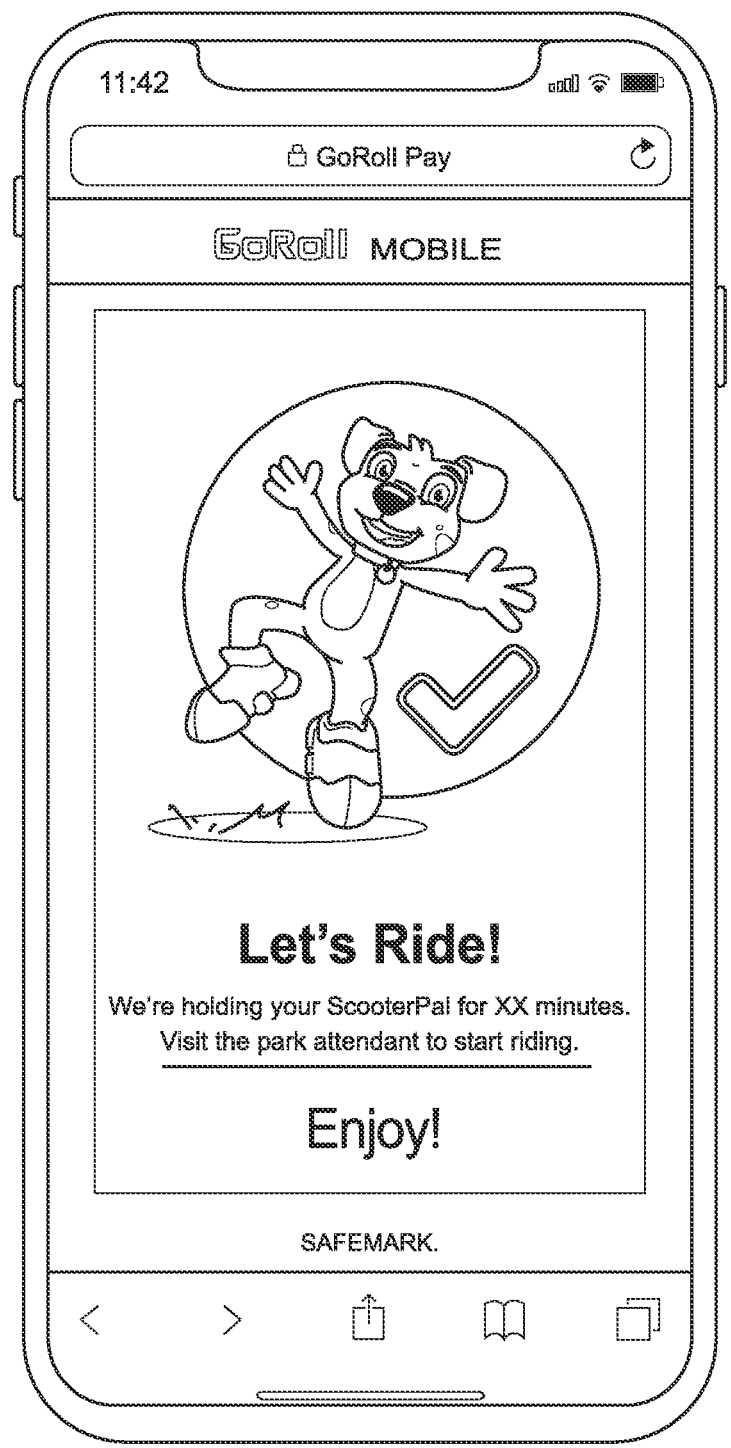
FIG. 28L is a graphical user interface (GUI) screen of the mobile smartphone shown in FIG. 7A, deployed on the wireless access control system network of the present invention, and showing the twelfth step in the facility-level access control method of the present invention displaying, after the payment transaction has been successfully completed, a message indicating that the rented vehicle is ready for use in riding around the facility supported by a "Let's Ride" message and other rental and vehicle information.
Figure 28M:
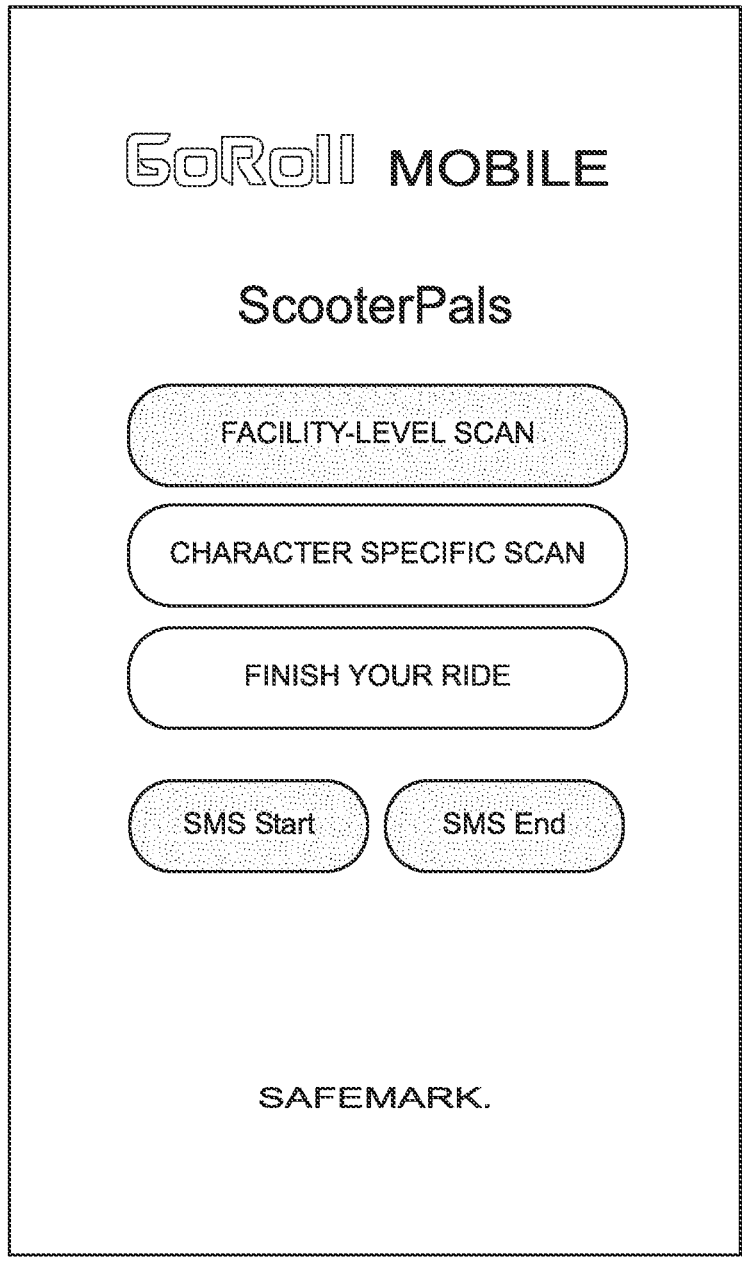
FIG. 28M is a graphical user interface (GUI) screen of the mobile smartphone shown in FIG. 7A, deployed on the wireless access control system network of the present invention, and showing the thirteenth step in the facility-level access control method of the present invention displaying, a screen for use in selecting the character specific scanning function to read the vehicle/device-level QR code on the animal character specific electric vehicle rented at the facility level of the park environment.
Figure 28N:
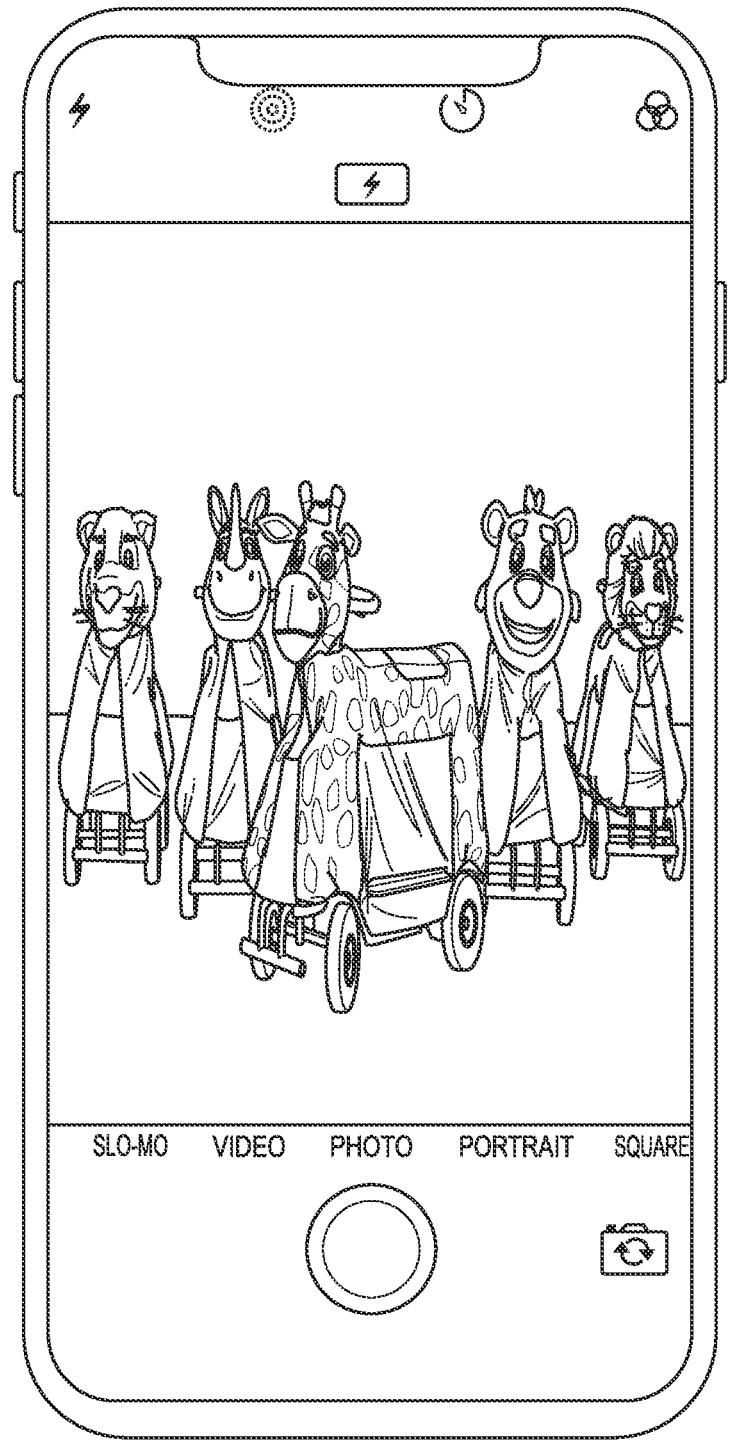
FIG. 28N is a graphical user interface (GUI) screen of the mobile smartphone shown in FIG. 7A, deployed on the wireless access control system network of the present invention, and showing the fourteenth step in the facility-level access control method of the present invention scanning the vehicle-level QR code on the recently rented vehicle using the same mobile smartphone recognized and tagged on the wireless access control system network.
Figure 28O:
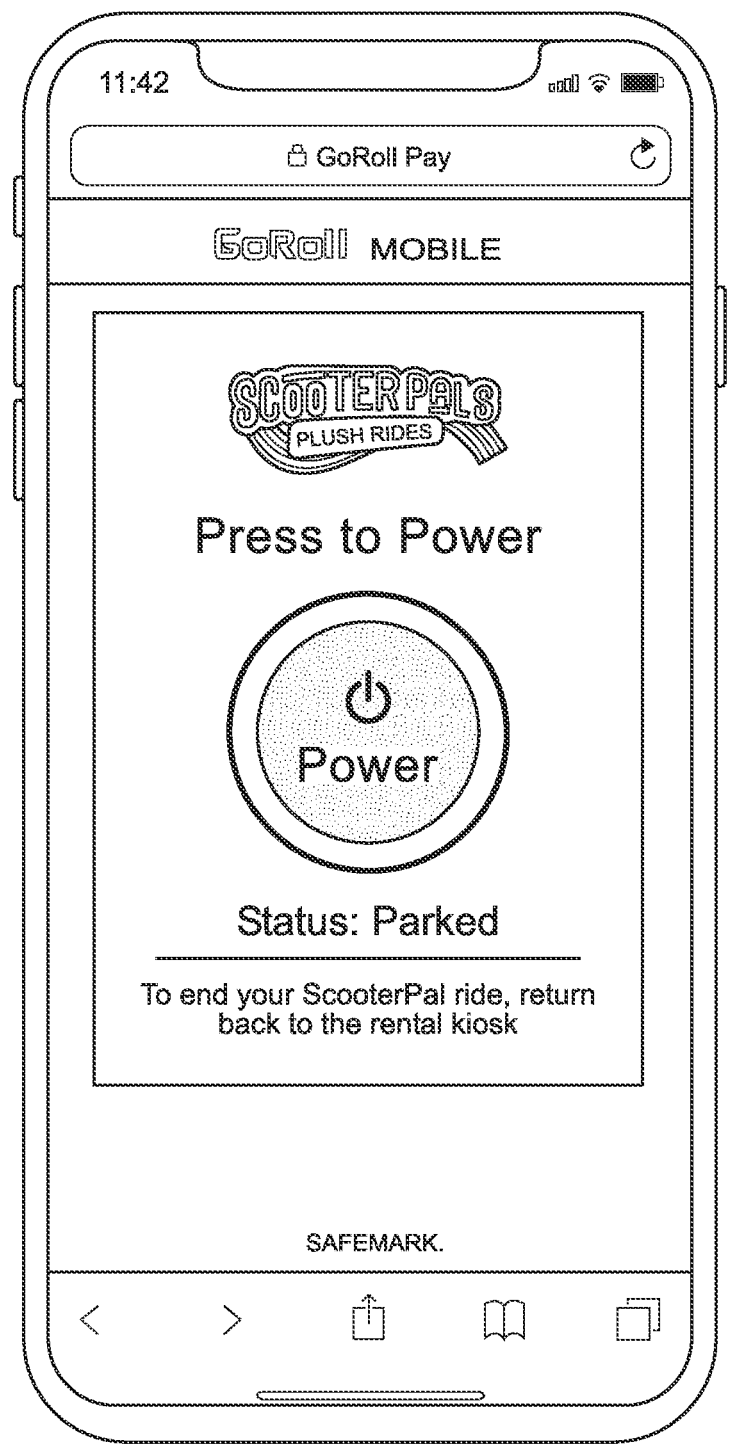
FIG. 28O is a graphical user interface (GUI) screen of the mobile smartphone shown in FIG. 7A, deployed on the wireless access control system network of the present invention, and showing the fifteenth step in the facility-level access control method of the present invention displaying a "Power" button and a message to press and select the Power button to power up and ride the vehicle, and commence the vehicle rental.
Figure 28P:
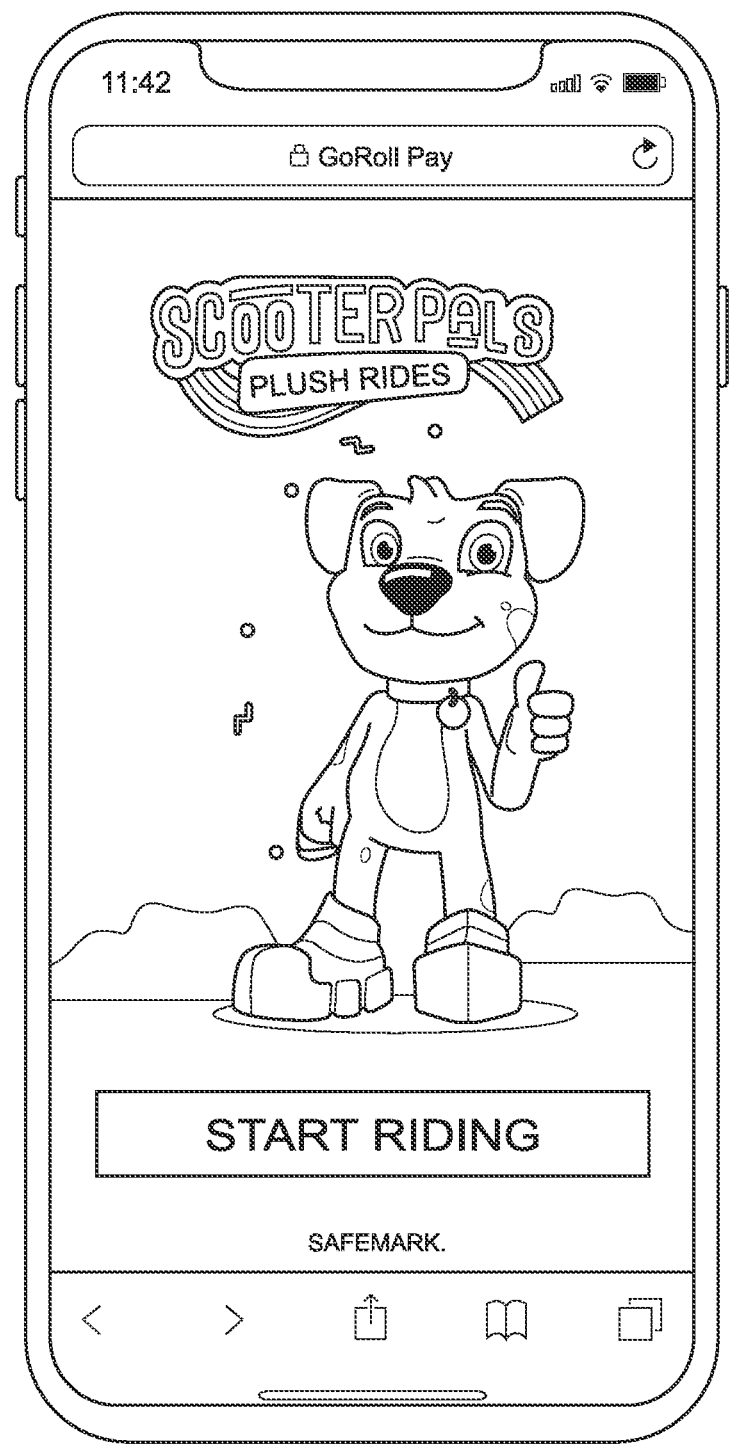
FIG. 28P is a graphical user interface (GUI) screen of the mobile smartphone shown in FIG. 7A, deployed on the wireless access control system network of the present invention, and showing the sixteenth step in the facility-level access control method of the present invention displaying "start riding" the vehicle.
Figure 28Q:
FIG. 28Q is a graphical user interface (GUI) screen of the mobile smartphone shown in FIG. 7A, deployed on the wireless access control system network of the present invention, and showing the seventeenth step in the facility-level access control method of the present invention displaying, a "Park" button, and a message to press and select the Park button to power down and park the vehicle at a rental kiosk, and end the vehicle rental.

Method of Practicing a Facility-Level Access Control by Scanning of a Facility-Level QR Code for Renting a Networked Vehicle, and then Scanning a Device-Level QR Code for Accessing and Controlling the Rented Networked Vehicle The method described and illustrated in FIGS. 27A through 27D is supported by the GUI screens shown in FIG. 28A through 28Q.

As indicated in Step A of FIG. 27A, and shown in FIGS. 28A and 28B, a mobile smartphone 130 deployed on the wireless access control system network 1 is used to practice a facility-level access control method by (i) scanning of a Facility-Level QR Code 40A, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier-Facility Entry" (RTI-FE) (e.g. digital token/cookie) within the cache on the mobile smartphone 130 of the guest seeking to rent a specified vehicle that will meet their requirements.

As indicated in Step B of FIG. 27A, and shown in FIG. 27C, the mobile smartphone 130 deployed on the wireless access control system network is used to practice a facility-level access control method by selecting which Site within the Facility (e.g. Main Gate, South Entrance, or Picnic Area) where the guest user would like to rent and access a vehicle 151 to ride about the park facility.

As indicated in Step C of FIG. 27B, and shown in FIG. 27D, the mobile smartphone 130 deployed on the wireless access control system network 1 is used to practice a facility-level access control method by selecting (i) what kind of mobility solution (e.g. entertainment vehicle) the guest user would like to rental today, and also (ii) the time/date of the rental at the Site within the Facility when would the guest user would like to rent and ride the electric amusement vehicle.

As indicated in Step D of FIG. 27B, and shown in FIGS. 28E through 28I a mobile smartphone deployed on the wireless access control system network 1 is used to practice a facility-level access control method, whereby the guest user places a request to rent the ride vehicle previously specified by the site, time/date, and type selected by the guest within the Facility, and displays the price of the ride rental and availability at the time of the rental offer (prior to acceptance and order placement), as well as the terms & conditions of the rental agreement, and if acceptable, then accepts the terms and condition of the vehicle rental.

As indicated in Step E of FIG. 27B, and shown in FIG. 28J, the mobile smartphone 130 deployed on the wireless access control system network 1 is used to practice a facility-level access control method by the user's selection of a four-digit passcode (if required, by the application) for supporting two-factor authentication when accessing and controlling a vehicle 70 to be rented and used on the system network 1.

As indicated at Step F of FIG. 22B, and shown in FIG. 28J, the mobile smartphone 130 deployed on the wireless access control system network is used to practice a facility-level access control method by displaying the selected vehicle 70 and user passcode, and entering the guest's phone number, to which the system network will transmit vehicle information and a rental receipt via SMS/text once the user enters the phone number information to initiate the web-based transaction between the web-enabled mobile phone and the system's web-enabled e-commerce-supported vehicle access control servers maintained at the data center.

As indicated in Step G of FIG. 27C, and shown in FIG. 28K, the mobile smartphone deployed on the wireless access control system network is used to practice a facility-level access control method by displaying the selected device, entered passcode, text receipt phone number, and total price of the vehicle rental (tax included), and providing several options for the user to make payment (e.g. using ApplePay® or using a credit card or debit card of the user, in which case, the card number and expiration date, i.e. month/year are requested).

As indicated in Step H of FIG. 27C, and shown in FIG. 28L, the mobile smartphone deployed on the wireless access control system network is used to practice a facility-level access control method by displaying, after the prior payment transaction has been successfully completed, a message that the networked rental ride vehicle is ready, along with a message to go to a particular site to access and ride the vehicle 70.

As indicated at Step I in FIG. 27D, and as shown in FIGS. 28L, 28M and 28N, the guest user goes to the Site in the facility where the rented ride vehicle is located, and then scans the device/vehicle-level QR code 40C posted thereon. Typically, this step involves (i) scanning the Device-Level QR code 40C on the rented vehicle 70 using the user's web-enabled mobile smartphone 130, (ii) automatically directing the smartphone web-browser application to parse and analyze the scanned QR code and serve, load and display the webpage specified by the URL encoded in the Device-Level QR Code 40C, and (iii) executing the access control transaction script for the vehicle rental transaction identified by the "Rental Transaction Identifier-Facility Entry" stored in cache in the smartphone 130 by the application servers 12B, so as to determine the state of the transaction for the Device-Level Access Control Method.

As indicated at Step J in FIG. 27D, as shown in FIG. 28O, the mobile smartphone 130 displays a message that the vehicle is parked, and to press the button "POWER" to start the vehicle 70. The message also indicates the status "PARKED", and requests the guest user to return the vehicle to the rental kiosk when ready to end the vehicle ride.

As shown in FIG. 23P, the system displays the message to the guest user on its mobile phone 130k to "START RIDING."

As indicated at Step K in FIG. 27D, as shown in FIG. 28Q, the mobile smartphone 130 displays the status as "POWERED," and the message to press the button "PARK" to stop and park the vehicle and terminate the vehicle rental agreement, that is, after bringing the vehicle 70 back to the rental kiosk within the park facility.

These GUI screen flows are merely exemplary and it is understood that more detailed flows will be generated and displayed in practice to guide guest users in carrying out the facility-level/vehicle-level access control method of the present invention described above.

Method of Renting, Accessing and Controlling a Networked Vehicle by Scanning Facility-Level QR Code at Facility Level, and then Scanning a Device-Level QR Code on the Rented Device at a Site FIG. 29 describes the primary data processing steps that take place when practicing the method of renting, accessing and controlling a networked vehicle according to the present invention, particularly, when (i) first scanning a Facility-Level QR code 40A at a park using a web-enabled mobile phone to rent a networked vehicle 70, 70', 70", 70''', and (ii) then scanning a Device-level QR code 40C on the rented device at a site in the facility when it is time for access and use at the site in the facility, as the case may be.

While the method summarized above, and described in greater detail below, is a typical use case when using the Facility-Level/Device-Level Scanning Methods of the present invention disclosed and claimed herein, there will be other embodiments of this general method that will be adapted to serve the varied needs and requirements of a multitude of applications and users around the world. Below the illustrative method will be described in greater technical detail with reference to actions undertaken by both the guest and system during the distributed data processing method, using the data elements collected, stored and managed within the database system represented in FIGS. 21A and 21B, and 29, and elsewhere in this Patent Specification.

As indicated at Step 1 of FIG. 29, the method involves the guest user using a Web-Enabled Mobile Phone 130 to scan a Facility-Level QR Code 40A posted at a Facility having one or more Sites (e.g. Rides/Attractions) supporting a plurality of rental networked devices (e.g. vehicle within a specified vehicle ride system).

As indicated at Step 2 of FIG. 29, the method involves the system (i.e. system servers 12) automatically generating and storing a Rental Transaction Record and Identifier in the System Database 12 in response to the scanning of the Facility-Level QR Code 40A and rental of a networked vehicle 70 during a web-based e-commerce rental transaction.

As indicated at Step 3 of FIG. 29, the method involves the system 12 automatically generates and stores a Device Identifier (i.e. Digital Token/Cookie) on the Mobile Phone 130 scanning the Facility-Level QR Code 40A. The system then requests the guest to enter his or her Access PIN (e.g. 4 digit code), and then the system automatically assigns a networked device (e.g. vehicle #) 70 to the guest (though this could be a selection process providing the guest to choose a vehicle at the Ride Site) and issues the vehicle rental agreement. The cookie (i.e. digital token) stored on the mobile phone can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Facility-Level QR Code 40A.

As indicated at Step 4 of FIG. 29, the method involves, at the vehicle/device level, the guest using the Mobile Phone 130 to scan a Device-Level QR Code 40C on the rented vehicle.

As indicated at Step 5 of FIG. 29, the method involves the system automatically reading and updating the Rental Transaction Record and Identifier stored in the System Database maintained on the Datacenter Servers 12.

As indicated at Step 6 of FIG. 29, the method involves the system automatically reading the Device Identifier (i.e. Cookie) stored on the Mobile Phone 130 used to scan the Facility-Level QR Code 40A and rent the networked vehicle 70, and then access and use the device.

As indicated at Step 7 of FIG. 29, the method involves, after the guest completes the ride experience, for the guest, at the door level, to then use the Mobile Phone 130 to scan Device-Level QR Code 40C on the rented vehicle 70.

As indicated at Step 8 of FIG. 29, the method involves the system automatically reading and updating the Rental Transaction Record and identifier stored in the System Database 12.

As indicated at Step 9 of FIG. 29, the method involves the system automatically reading the Device Identifier (i.e. Cookie) on Mobile Phone 130 used to scan the Facility-Level QR Code 40A and the Device-Level QR Code 40C. The system also requests the guest to enter the Access PIN and then determines and displays on the mobile phone display if an extra rental fee is due because the vehicle rental time went over the agreed to rental limit (i.e. rental time overage) set by the ride ticket held by the guest, as managed by the ride management server 351 in FIG. 351, connected to the system via an application programming interface (API), as shown in FIG. 15.

As indicated at Step 10 of FIG. 29, the method involves the guest then using the Mobile Scanning Phone 130 to access the rented vehicle, retrieve belongings therefrom, pay for extra vehicle rental time if and as required by determined rental overage, and then terminates the rental transaction.

As indicated at Step 11 of FIG. 29, the method involves the system automatically reading and updating the Rental Transaction Record and Identifier stored in the System Database, to reflect that the vehicle is AVAILABLE for rental and use.

As indicated at Step 12 of FIG. 29, the method involves the system automatically driving the Device Rental Status Indication Light (LED) on the available vehicle 70 to visually indicate rental AVAILABILITY Status, for quick recognition by guest users who might be searching for a rental vehicle at the Site, and wish to practice a direct vehicle-level access control method of QR scanning, described in greater detail hereinafter.

These above described data processing operation supported behind the scenes on the system network of the present invention are exemplary in nature and may be practiced differently depending on the particular illustrative embodiment being practiced for any given situation.

In the illustrative embodiment described above, the system requested the guest user to provide an access PIN, after scanning a Vehicle-Level QR Code to access a rented vehicle, to provide a form of 2-factor authentication for added security. However, it is understood in alternative embodiments practicing 1-factor authentication, it is possible for the system network to automatically unlock and operate a vehicle upon the guest user performing any of the 1-factor operations: (i) simply using his or her web-enabled mobile phone 130 to scan and read its vehicle-level QR code 40C as described in detail herein; (ii) by manually entering the access PIN via a physical keypad provided on each the steering console 84 of the vehicle if so supported; or (iii) by manually entering the access PIN via a virtual keypad provided on the mobile phone application used to scan the device-level QR code 40C posted on the rented vehicle, if so supported.

Figure 30A:
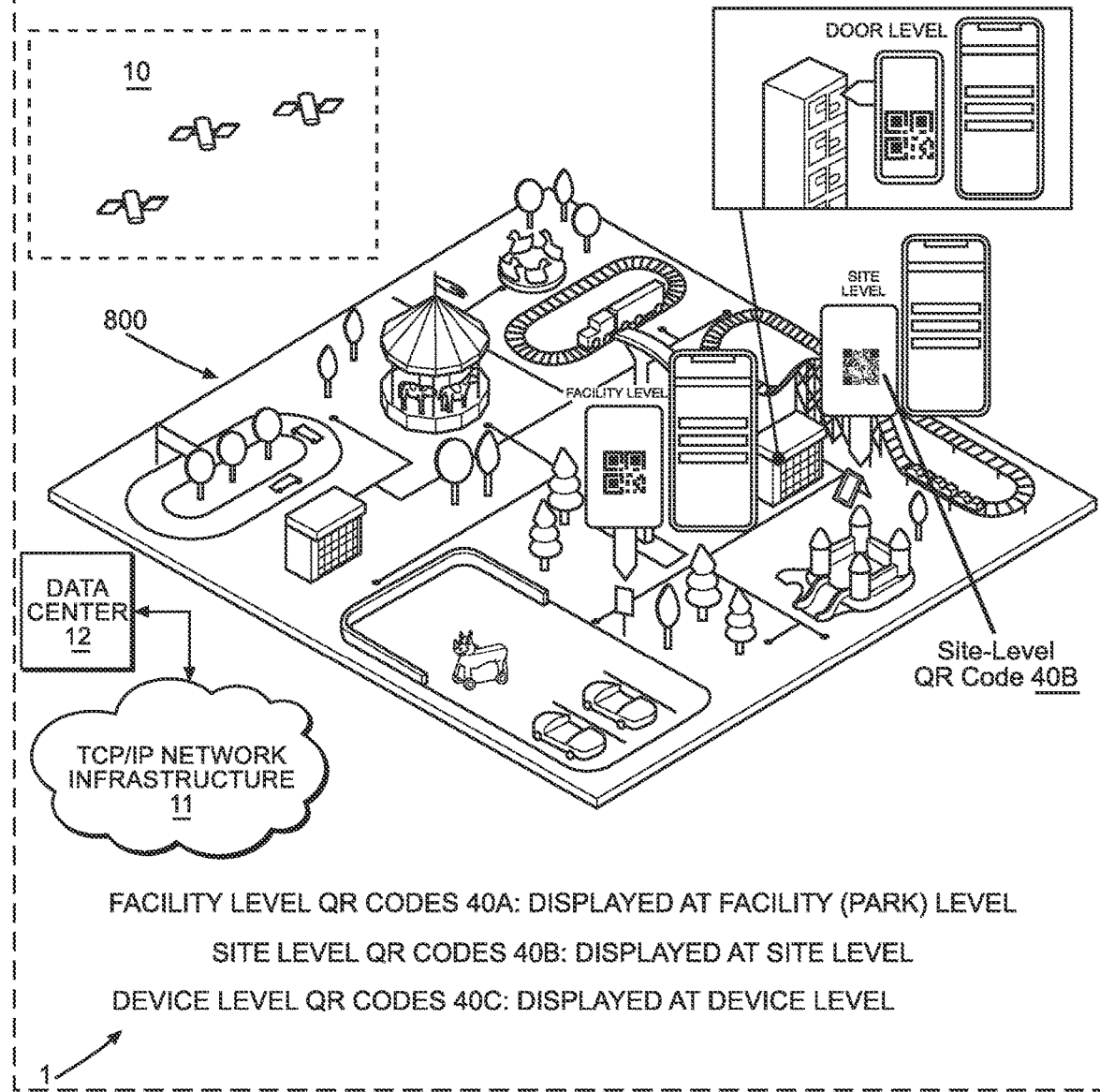
FIG. 30A is a schematic illustrating showing a perspective view of an amusement park facility, with a sign posted at a Site in the park, displaying a Site-Level QR code as shown in FIG. 34B, which upon scanning with a web-enabled mobile smartphone is engineered to direct the guest user to a web-based e-commerce-enabled vehicle rental and access control transaction having a narrowed scope of services within the facility, and allowing guest users to select a vehicle, mobility solution or other service at the Site within the amusement park, and then allow the wireless system network to automatically assign an available vehicle to the guest at the selected Site.
Figure 30B:
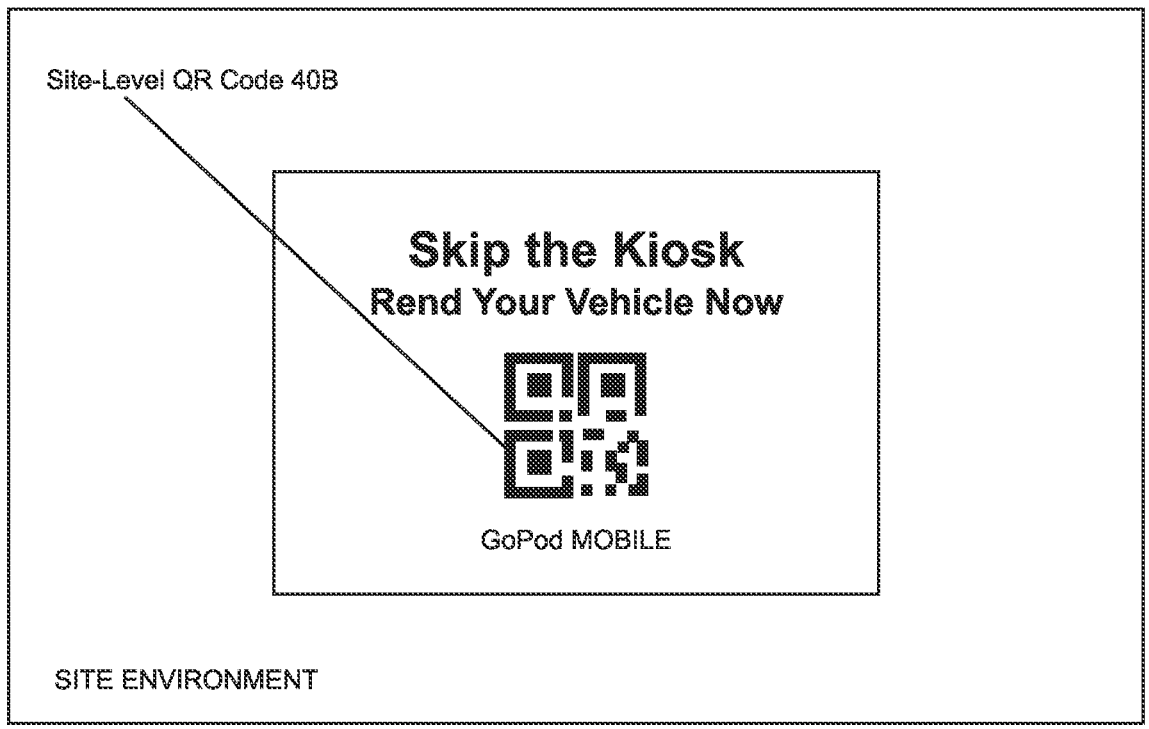
FIG. 30B is an enlarged view of the Site-Level QR Code posted at a Site within the amusement park illustrated in FIG. 30A, wherein at the Site Level, the user is able to scan a Site-Level QR code that is intelligently assigned to that Site location, and users will select a mobility solution, and the wireless system network will automatically assign an available vehicle, (wheelchair or stroller) to the user at that Site, as the case may be.

Specification of the Method of Managing Access Control to a Networked Vehicle by Scanning Site-Level QR Codes Posted at a Particular Site in an Amusement Park Facility, Using a Mobile Smartphone Wireless Connected to the Wireless Access Control System Network of the Present Invention FIG. 30A illustrates an amusement park facility, with a sign posted at a Site in the park, displaying a Site-Level QR code 40B as shown in FIG. 30B which, upon scanning with a web-enabled mobile smartphone 130, is engineered to direct the guest user to a web-based e-commerce-enabled vehicle rental and access control transaction having a narrowed scope of services within the facility. This allows guest users to select a networked vehicle (e.g. mobility solution) 70, and then allow the wireless system network to automatically assign, for example, an available vehicle 70 to the guest at the selected Site.

FIGS. 31A, 31B, 31C and 31D describe the primary steps involved when carrying out the method of managing access control to a networked entertainment vehicle 70 by first scanning site-level QR codes 40B posted at a particular Site in the amusement park facility shown in FIGS. 30A and 30B, using a mobile smartphone 130 wirelessly connected to and in communication with the wireless access control system network 1, so as to rent the vehicle, and thereafter, scanning the device/vehicle-level QR code 40C on the rented vehicle 70 to access and control and ride the vehicle in the park facility.

FIG. 30B shows and enlarged view of the Site-Level QR Code 40B posted at a Site within the amusement park illustrated in FIG. 30A, wherein at the Site Level, the user is able to scan a Site-Level QR code 40B that is intelligently assigned to that Site location, and users will select a vehicle 70, and the wireless system network will automatically assign an available vehicle to the user at that Site, as the case may be.

Method of Practicing a Facility-Level Access Control by Scanning of a Site-Level QR Code for Renting a Networked Vehicle, and then Scanning a Device/Vehicle-Level QR Code for Accessing and Controlling the Rented Networked Vehicle within the Geo-Fenced Facility The method described and illustrated in FIGS. 32A through 32C is supported by the GUI screens shown in FIG. 32A through 32P.

As indicated at Step A of FIG. 31A, and as shown in FIG. 32A, a mobile smartphone 130 deployed on the wireless access control system network 1 is used to practice a site-level access control method by (i) the scanning of a Site-Level QR Code 40B posted on a physical structure at the site within the facility, and (ii) automatically directing the smartphone web-browser application to parse and analyze the scanned QR code 40B, and serve, load and display the webpage specified by the URL encoded in the Site-Level QR Code 40B, and whereupon, the application server 12B automatically stores a "Rental Transaction Identifier-Site-Entry" (RTI-SE) (e.g. digital token/cookie) within the cache memory in the mobile smartphone 130 used to scan the QR Code and initiate the rental transaction.

As indicated at Step B of FIG. 31A, and as shown in FIG. 32B, the mobile smartphone 130 deployed on the wireless access control system network 1 is used to practice a site-level access control method, by selecting the time/date of the vehicle rental at the Site within the Facility when would the guest user would like to rent and access to store personal belongings.

Figure 31B:
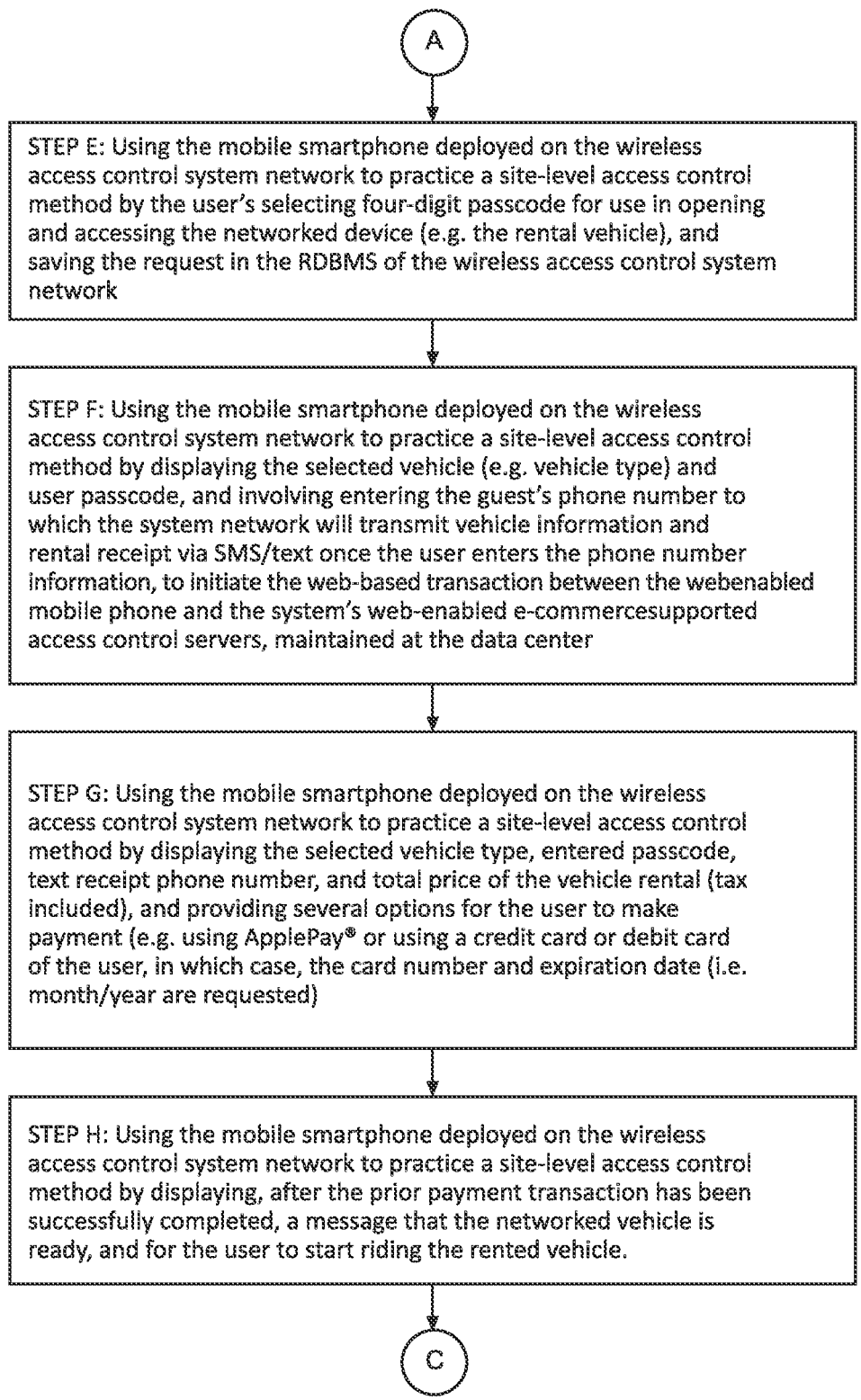
Figure 31C:
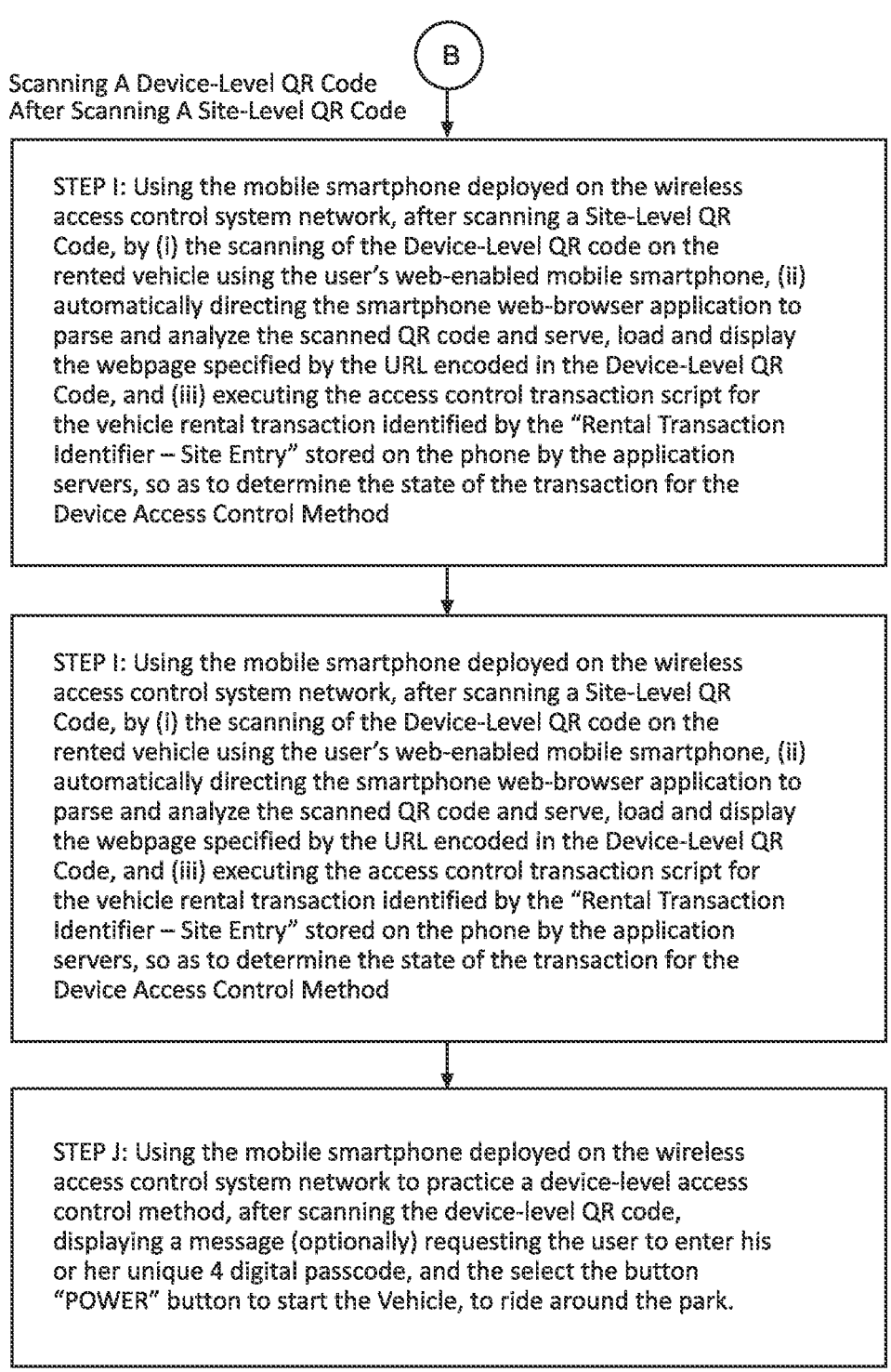

As indicated at Step C of FIG. 31C, and as shown in FIG. 32C, the mobile smartphone 130 deployed on the wireless access control system network is used to practice a site-level access control method by selecting (i) the mobility solution (e.g. entertainment vehicle, and then (ii) the vehicle type (e.g. lion, leopard, bear, elephant, etc.) at the selected Site within the Facility which the guest user would like to rent and access to ride around the facility.

As indicated at Step D of FIG. 31A, and as shown in FIGS. 32D through 32H, the mobile smartphone 130 deployed on the wireless access control system network 1 is used to practice a site-level access control method by the guest user confirming the vehicle type selected by the guest at the Site, while displaying the price of the vehicle rental and availability at the time of the rental offer (prior to acceptance and order placement), the terms and conditions of the vehicle rental agreement, and if acceptable, then the guest user accepts the terms and conditions of the rental agreement.

As indicated at Step E of FIG. 31B, and as shown in FIG. 32I, the mobile smartphone 130 deployed on the wireless access control system network 1 is used to practice a site-level access control method by the user's selecting four-digit passcode for use in opening and accessing the networked device (e.g. the rental vehicle), and saving the request in the RDBMS of the wireless access control system network.

As indicated at Step F of FIG. 31B, and as shown in FIG. 32I, the mobile smartphone deployed on the wireless access control system network is used to practice a site-level access control method by displaying the selected vehicle (e.g. vehicle type) and user passcode, and involving entering the guest's phone number to which the system network will transmit vehicle information and rental receipt via SMS/text once the user enters the phone number information, to initiate the web-based transaction between the web-enabled mobile phone and the system's web-enabled e-commerce-supported access control servers, maintained at the data center.

As indicated at Step G of FIG. 31B, and as shown in FIG. 32J, the mobile smartphone deployed on the wireless access control system network is used to practice a site-level access control method by displaying the selected vehicle type, entered passcode, text receipt phone number, and total price of the vehicle rental (tax included), and providing several options for the user to make payment (e.g. using ApplePay® or using a credit card or debit card of the user, in which case, the card number and expiration date (i.e. month/year are requested).

As indicated at Step H of FIG. 31B, and as shown in FIG. 32K, a mobile smartphone 130 deployed on the wireless access control system network 1 is used to practice a site-level access control method by displaying, after the prior payment transaction has been successfully completed, a message that the networked vehicle is ready, and for the user to start riding the rented vehicle.

As indicated at Step I of FIG. 31C, and as shown in FIGS. 32L and 32M, the mobile smartphone 130 deployed on the wireless access control system network 1 is used to practice a site-level access control method, after scanning a Site-Level QR Code, by (i) the scanning of the Device-Level QR code 40C on the rented vehicle using the user's web-enabled mobile smartphone, (ii) automatically directing the smartphone web-browser application to parse and analyze the scanned QR code and serve, load and display the webpage specified by the URL encoded in the Device-Level QR Code 40C, and (iii) executing the access control transaction script for the vehicle rental transaction identified by the "Rental Transaction Identifier-Site Entry" stored on the phone by the application servers, so as to determine the state of the transaction for the Device Access Control Method.

As indicated at Step J of FIG. 31C, and as shown in FIG. 32N, the mobile smartphone 130 deployed on the wireless access control system network 1 is used to practice a site-level access control method, after scanning a Device-Level QR Code, displaying a message (optionally) requesting the user to enter his or her unique 4 digital passcode, and the select the button "POWER" button to start the Vehicle, and as illustrated in FIG. 27O, for the guest user to start riding the rented vehicle around the park.

As indicated at Step K of FIG. 31C, and as shown in FIG. 32P, the mobile smartphone 130 deployed on the wireless access control system network 1 is used to practice a site-level access control method, by displaying a message requesting to user to select the PARK button to stop and park the vehicle at a rental kiosk, and end the vehicle rental.

Method of Renting, Accessing and Controlling a Networked Device by Scanning Site-Level QR Code at Park, and then Scanning a Device-Level QR Code on the Networked Device at the Site While the method summarized above, and described in greater detail below, is a typical use case when using the Site-Level/Device-Level Scanning Methods of the present invention disclosed and claimed herein, there will be other embodiments of this general method that will be adapted to serve the varied needs and requirements of a multitude of applications around the world. In FIG. 33, an illustrative method will be described in greater technical detail with reference to actions undertaken by both the guest and system during the distributed data processing method, using the data elements collected, stored and managed within the database system described throughout the Patent Specification.

As indicated at Step 1 of FIG. 33, the method involves the guest user using a Web-Enabled Mobile Phone 130 to scan a Site-Level QR Code 40B posted at a Facility having one or more Sites (e.g. Rides/Attractions) supporting a plurality or fleet of rental networked vehicle 70 deployed within the park facility.

As indicated at Step 2 of FIG. 33, the method involves the system (i.e. system servers 12) automatically generating and storing a Rental Transaction Record and Identifier in the System Database 12 in response to the scanning of the Site-Level QR Code 40B and rental of a networked device (e.g. Storage Locker 151) during a web-based e-commerce rental transaction.

As indicated at Step 3 of FIG. 33, the method involves the system 12 automatically generates and stores a Device Identifier (i.e. Digital Token/Cookie) on the Mobile Phone 130 scanning the Site-Level QR Code 40B. The system then requests the guest to enter his or her Access PIN (e.g. 4 digit code), and then the system automatically assigns a networked device (e.g. vehicle #) to the guest (though this could be a selection process providing the guest to choose a vehicle at the Ride Site) and issues the vehicle rental agreement. The cookie (i.e. digital token) stored on the mobile phone can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Site-Level QR Code.

As indicated at Step 4 of FIG. 33, the method involves, at the door level, the guest using the Mobile Phone 130 to scan a Device/Vehicle-Level QR Code 40C on the Rented Vehicle 70.

As indicated at Step 5 of FIG. 33, the method involves the system automatically reading and updating the Rental Transaction Record and Identifier stored in the System Database maintained on the Datacenter Servers 12.

As indicated at Step 6 of FIG. 33, the method involves the system automatically reading the Device Identifier (i.e. Cookie) stored on the Mobile Phone 130 used to scan the Site-Level QR Code 40B and rent the networked vehicle 70 and then access and ride the vehicle about the facility where permitted by the GPS-tracking based geo-fencing systems that may be installed and operational at any given moment in time and space.

As indicated at Step 7 of FIG. 33, the method involves, after the guest completes the ride experience, for the guest, at the door level, to then use the Mobile Phone 130 to scan Device-Level QR Code 40C on the rented entertainment vehicle 70.

As indicated at Step 8 of FIG. 33, the method involves the system automatically reading and updating the Rental Transaction Record and identifier stored in the System Database 12.

As indicated at Step 9 of FIG. 33, the method involves the system automatically reading the Device Identifier (i.e. Cookie) on Mobile Phone 130 used to scan the Site-Level QR Code 40B and the Device-Level QR Code 40C. The system also requests the guest to enter the Access PIN and then determines and displays on the mobile phone display if an extra rental fee is due because the vehicle rental time went over the agreed to rental limit (i.e. rental time overage) set by the ride ticket held by the guest, as managed by the ride management server 351 in FIG. 35I, connected to the system via an application programming interface (API), as shown in FIG. 15.

As indicated at Step 10 of FIG. 3, the method involves the guest then using the Mobile Scanning Phone 130 to access the Rented Vehicle 70, retrieve belongings therefrom, pay for extra vehicle rental time if and as required by determined vehicle rental overage, and then terminates the rental transaction.

As indicated at Step 11 of FIG. 33, the method involves the system automatically reading and updating the Rental Transaction Record and Identifier stored in the System Database, to reflect that the vehicle is AVAILABLE for rental and use.

As indicated at Step 12 of FIG. 33, the method involves the system automatically driving the Device (Rental) Status Indication Light (LED) on the available vehicle 70 to indicate rental AVAILABILITY Status, for recognition by guest users who are searching for a rental device at the Site.

These above described data processing operation supported behind the scenes on the system network of the present invention are exemplary in nature and may be practiced differently depending on the particular illustrative embodiment being practiced for any given situation. In the illustrative embodiment described above, the system requested the guest user to provide an access PIN, after scanning a Device-Level QR Code 40C to access a rented networked vehicle 70, to provide a form of 2-factor authentication for added security. However, it is understood in alternative embodiments practicing 1-factor authentication, it is possible for the system network to automatically unlock and start a rented vehicle 70 upon the guest user performing anyone of the following 1 factor authentication operations: (i) using a web-enabled mobile phone 130 to scan and read its Device-Level QR Code 40C as described in detail herein; (ii) manually entering the access PIN via the physical keypad provided on the console of the vehicle 70; or (iii) manually entering the access PIN via the virtual keypad displayed on the screen of the mobile phone 130.

Specification of Method of Enabling Contact-Less Access Control of Vehicle within an Amusement Park Enterprise by Scanning a Device-Level QR Code Using a Mobile Smartphone Connected to the Wireless Access Control System Network of the Present Invention FIG. 34A shows a Device-Level QR Code 40C (i.e. a machine-readable code, such as an optically-readable bar code symbol and/or RFID encoded tag component) physically posted or electrically displayed at several locations on each entertainment vehicle 70, 70', 70", 70''' in the GPS-tracked wireless vehicle control system network 1. FIG. 34B shows a GPS-tracked wireless networked vehicle 70, 70', 70", 70''' that is provided with a QR code 40C that is scanned to initiate a rental transaction and provide access and control operations, using a guest's mobile smartphone 130 deployed on the wireless vehicle access control system network 1.

FIGS. 35A and 35B describe the primary steps involved when carrying out the methods of managing access control to a networked vehicle 70, 70', 70" and 70''' by scanning device-level QR code 40C posted on the vehicle rented at amusement park facility using a mobile smartphone 130 wirelessly connected to the wireless access control system network 1 of the present invention 1.

The method described and illustrated in FIGS. 35A and 35B is supported by the GUI screens shown in FIG. 36A through 316N

As indicated at Step A of FIG. 35C, and as shown in FIGS. 36A and 36B, a mobile smartphone 130 deployed on the wireless access control system network 1 is used to practice the Device/Vehicle-Level Access Control Method by (i) the scanning of the device/vehicle-level QR code 40C on the rented networked vehicle 70, 70', 70", 70''' using the user's web-enabled mobile smartphone 130, (ii) automatically directing the smartphone web-browser application to parse and analyze the scanned QR code and serve, load and display the webpage specified by the URL encoded in the device-level QR code 40C, and (iii) executing the access control transaction script for the vehicle rental transaction identified by the "Rental Transaction Identifier-Site Entry" (e.g. digital token/cookie) stored on the phone by the application servers, so as to determine the state of the transaction for the Device-Level Access Control Method.

As indicated at Step B of FIG. 35A, and as shown in FIGS. 361C through 36H, the mobile smartphone 130 deployed on the wireless access control system network 1 is used to practice the device-level access control method by (i) selecting the desired vehicle for rental, and then as shown at FIGS. 36D through 36H, (ii) displaying and reviewing the terms and conditions that must be accepted to rent the selected networked vehicle for a specific time/date, given its specified vehicle type and rental price at the Site, and then accepting the terms and conditions of the rental agreement.

As indicated at Step C of FIG. 35A, and as shown in FIG. 36I, the mobile smartphone 130 deployed on the wireless access control system network 1 is used to practice a device-level access control method, by entering the guest's phone number to which the system network will transmit vehicle information and rental receipt via SMS/text once the user enters the phone number information and to initiate a web-based transaction between the web-enabled mobile phone 130 and the system's web-enabled e-commerce-supported vehicle access control servers, maintained at the data center; and selecting a four-digit passcode for use in accessing and controlling the rental vehicle, and storage in the RDBMS of the wireless access control system network 1.

As indicated at Step D of FIG. 35B, and as shown in FIG. 36J, the mobile smartphone 130 deployed on the wireless access control system network 1 is used to practice a device-level access control method, and display the selected vehicle 70, entered passcode, text receipt phone number, and total price of the vehicle rental (tax included), and provide options for the user to make payment (e.g. using ApplePay® or using a credit card or debit card of the user, in which case, the card number and expiration date i.e. month/year are requested).

As indicated at Step E of FIG. 35B, and as shown in FIG. 36K, the mobile smartphone 130 deployed on the wireless access control system network 1 is used to practice a device-level access control method, and display, after the prior payment transaction, a message that the networked vehicle 70 is ready to ride ("Let's Ride"), immediately or when the guest renter is ready to do so.

As indicated at Step F of FIG. 35B, and as shown in FIGS. 36L and 36M, the mobile smartphone 130 deployed on the wireless access control system network 1 is used to practice a device-level access control method, and select the POWER button on the steering console to power up, start and ride the electric vehicle 70, with a passcode if required by the facility and rental agreement.

As indicated at Step G of FIG. 35B, and as shown in FIG. 36N, the mobile smartphone 130 deployed on the wireless access control system network 1 is used to practice a device-level access control method, and select the PARK button to power down, stop and park the vehicle 70 at a rental kiosk in the facility.

The above-described machine-readable code-driven access control method of the present invention shows how it is now possible to enable wireless rental, access and control to a specified vehicle 70 in a GPS-specified networked vehicle 70 using a web-enabled smartphone 130, to read a Device/Vehicle-Level machine-readable (QR) code symbol posted thereon so as to automatically initiate direct communication with the web-based communication/application/database servers maintained with the data center 12 of the wireless system network 1, and conduct the supporting web-based transaction. Each time the code symbol is scanned and the guest user seeks to open or access a rented networked vehicle 70 transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented vehicle 70, and locally operate its controller (provided with local battery power backup) and where the digital password (PIN) is stored in local memory of the vehicle 70 by the system network servers within the data center 12 during the web-based rental, access and control method of the present invention. This inventive feature allows the guest to unlock the electronically-controlled vehicle 70, and enable vehicular operation while the vehicle system 70 is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the vehicle controller, through its network adapter and antennas (e.g. using Bluetooth and/or WIFI protocols), to establish a communication session between the mobile smartphone 130 and the rented vehicle 70, and then enter the guest's digital password (i.e. PIN) via the virtual keypad (GUI screen) on the mobile smartphone 130, to locally operate its controller (provided with local battery power backup), and where the digital password (PIN) is stored in local memory of ride vehicle 70, by the system network servers within the data center 12 during the web-based rental, access and control method of the present invention. This inventive feature allows the guest to unlock the electronically-controlled rented vehicle 70, and enable vehicle operation while the vehicle is disconnected from the Internet infrastructure and/or during local power disruptions. Method of Renting, Accessing and Controlling a Networked Vehicle by Scanning a Device-Level QR Code on the Networked Vehicle for Rental at a Ride/Attraction Site in the Facility FIG. 37 describes the primary data processing steps that take place when practicing the method of renting, accessing and controlling a vehicle according to the present invention, particularly, when avoiding scanning of Facility-Level QR Codes 40A and Site Level QR Codes 40B, and renting and accessing a networked EEV 70, networked stroller, or networked wheelchair) for rental, access and use by (i) first scanning a Device-level QR Code 40C on the networked device at a ride/attraction site to rent out the device under acceptable terms and conditions, and (ii) then scanning the Device-Level QR code 40C on the rented device whenever it is necessary to access, control and use the rented device in the facility under the terms of the rental agreement.

While the method summarized above, and described in greater detail below, is a typical use case when using the Device-Level/Device-Level Scanning Methods of the present invention disclosed and claimed herein, there will be other embodiments of this general method that will be adapted to serve the varied needs and requirements of a multitude of applications around the world. Below the illustrative method will be described in greater technical detail with reference to actions undertaken by both the guest and system during the distributed data processing method, using the data elements collected, stored and managed within the database system represented in FIGS. 8A through 8G, and elsewhere in this Patent Specification.

As indicated at Step 1 of FIG. 37, the method involves the guest user using a Web-Enabled Mobile Phone 130 to scan a Device-Level QR Code 40C posted on the vehicle 70 for rental by the guest user within the facility.

As indicated at Step 2 of FIG. 37, the method involves the system (i.e. system servers 12) automatically generating and storing a Rental Transaction Record and Identifier in the System Database 12 in response to the scanning of the Device-Level QR Code 40C and rental of a networked vehicle 70 at a ride rental site location within the facility.

As indicated at Step 3 of FIG. 37, the method involves the system 12 automatically generates and stores a Device Identifier (i.e. Cookie/Digital Token) on the Mobile Phone 130 scanning the Device-Level QR Code 40C. The system then requests the guest to enter his or her Access PIN (e.g. 4 digit code), and then the system automatically assigns a device # (e.g. vehicle #) to the guest (though this could be a selection process providing the guest to choose a vehicle at the Ride Site) and issues the vehicle rental agreement. The cookie (i.e. digital token) stored on the mobile phone 130 can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Device-Level QR Code 40C.

As indicated at Step 4 of FIG. 37, the method involves the guest, after park experience, using the Mobile Phone 130 to scan Device-Level QR Code 40C on the rented vehicle 70.

As indicated at Step 5 of FIG. 37, the method involves the system automatically reading and updating the Rental Transaction Record and identifier stored in the System Database 12.

As indicated at Step 6 of FIG. 37, the method involves the system automatically reading the Device Identifier (i.e. Cookie) on Mobile Phone 130 used to scan the Device-Level QR Code 40AC. The system also requests the guest to enter the Access PIN and then determines and displays on the mobile phone display if an extra rental fee is due because the rental time went over the agreed to rental limit (i.e. rental time overage) set by the rental agreement.

As indicated at Step 7 of FIG. 37, the method involves the guest then using the Mobile Scanning Phone 130 to access the Rented and pay for extra rental time if and as required by determined vehicle rental overage, and then terminates the rental transaction.

As indicated at Step 8 of FIG. 37, the method involves the system automatically reading and updating the Rental Transaction Record and Identifier stored in the System Database, to reflect that the vehicle is once again AVAILABLE for rental and use.

As indicated at Step 19 of FIG. 37, the method involves the system automatically driving the Rental Status Indication Light (LED) on the available Networked Vehicle to indicate AVAILABILITY Status, for recognition by guest users who might be searching for a particular vehicle 70 to rent at a particular rental kiosk location at a given site within a facility.

These above described data processing operation supported behind the scenes on the system network of the present invention are exemplary in nature and may be practiced differently depending on the particular illustrative embodiment being practiced for any given situation. In the illustrative embodiment described above, the system requested the guest user to provide an access PIN, after scanning a Device-Level QR Code 40C to access a rented vehicle 70 to provide a form of 2-factor authentication for added security. However, it is understood in alternative embodiments practicing 1-factor authentication, it is possible for the system network to automatically unlock and open a rented vehicle upon the guest user (i) using his or her web-enabled mobile phone to scan and read its Device-Level QR code as described in detail herein, or (ii) manually entering the access PIN via the physical keypad provided on each vehicle console.

Specification of the GPS-Tracking Based Method of Controlling and Constraining the Motion of an Electric Entertainment Vehicle (EEV) Operating within a Geofenced Region of a Park Facility while Under the Control of a GPS-Tracking Vehicle Access Control System Network Referring now to FIG. 38, a new and improved method will be described for automatically controlling the motion and behavior of each electric entertainment vehicle 70, 70', 70", 70'" in response to the current GPS location of the vehicle detected by the GPS-tracking vehicle access control system network of the present invention. The details of this methods will be described below with reference to the table set forth in FIG. 8F.

As indicated at Block A in FIG. 38, the method involves setting up and maintaining a GPS-tracking vehicle access control system network 1 supporting a GPS-tracked geofence system installed within a facility, and operably connected to the GPS-tracking wireless system network.

As indicated at Block B in FIG. 38, the method involves defining GPS-defined regions or zones within the facility, in which particular electric entertainment vehicles should be operationally constrained according to GPS-Specific Vehicle Operation Rules (VORs) as specified in FIG. 8F, and FIG. 39 enforced on the system network.

As indicated at Block C in FIG. 38, the method involves assigning particular entertainment vehicles to particular GPS-defined regions (e.g. GPS Region No.) within the GPS-tracking wireless system network 1

As indicated at Block D in FIG. 38, the method involves assigning a unique vehicle identifier (e.g. Vehicle ID No.) to each entertainment vehicle available for rental on the system network within the facility.

As indicated at Block E in FIG. 38, the method involves a guest renting a GPS-tracked entertainment vehicle to ride within the facility, using a particular mobile smartphone registered with the GPS-tracking wireless system network 1, and adapted to read a device-level QR code on the vehicle 70 to initiate a rental transaction.

As indicated at Block F in FIG. 38, the method involves assigning a unique phone identifier to each mobile smartphone used to scan the device-level QR code used to initiate the rental transaction involving the electric entertainment vehicle; and automatically linking the vehicle identifier to the mobile phone identifier in the system network database to that the transaction can be recalled and used throughout the rental process by simply scanning the linked QR code symbol using the linked mobile phone.

As indicated at Block G in FIG. 38, the last step in the method involves operating one or more entertainment vehicles within the facility, while automatically controlling their operation by applying the GPS-Specific Vehicle-Operation Rules from FIG. 8F that apply when the electric entertainment vehicle is located in a GPS-specified and tracked region of the facility, at any moment in time and space determined by the GPS-tracking vehicle access controls system network of the present invention.

Methods of Recharging the Electric Battery Power Storage Modules Supported Aboard the Electric Vehicles of the Present Invention, and Methods of Vehicle Braking In general, the electrical power storage modules 105A, 105B (e.g. 12 Volt 40 Amp-hour Lithium ion batteries) used to drive the electrical DC motor assembly 102, are rechargeable by design so that the vehicle will function an ecologically sustainable transportation solution. Battery recharging operations can be carried out in different ways and using different methods, depending on the particular application.

Using a first possible method, each vehicle 70 is designed so that it permits its batteries to recharge in a "trickle" like manner using a solar (PV) panel to recharge the batteries while the vehicle is stationary.

Using a second possible method, the vehicle can be designed so that its batteries can be recharged using "a regenerative charging method" when the operator operates the braking system of the vehicle while the vehicle is in motion. When using this method, the kinetic energy stored in the motion of the wheels and vehicle are used to drive an electrical generator that supplied current and voltage to the batteries 105A, 105B to be recharged during momentary braking operations.

In vehicle systems that employ an "absence of throttle" braking method, an electrical generator is not provided, and the reverse emf voltages generated during absence of throttling, generates braking action, without coasting, and thus not permitting regenerative charging.

While absence of throttling braking is a more cost efficient method, its lack of support for regenerative recharging makes this method less attractive where efficiency and sustainability goals are paramount. Notwithstanding, different battery recharging and vehicle braking systems may be practiced when carrying out the principles of the present invention disclosed herein.

Driving GP S-Driven Commerce Applications

The GPS-tracking wireless platform of the present invention described herein can enable vendors and service providers to provide and deliver specific goods and/or services to the guests at their current location in the amusement park, and even send notifications, directions and digital mobile facility maps on the mobile phones of guest visitors to facilitate service delivery while guests are freely moving around the park or other environment.

The GPS-tracking wireless system network 1 and mobile phone 130 based methods of the present invention will also enable vendors and service providers to send product/service offers and promotions to mobile phones based on anything of value that has been previously rented/accessed via a mobility solution transaction; and then fulfil and deliver the offered Goods and Services using the user's mobile phone, for the purpose of providing better and more economical ways of driving commerce and delivering consumer value.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present disclosure.

While electronic payment systems were disclosed in the illustrative embodiments, for use in paying for rental and purchase agreements, it is understood that non-banking based credit/debit card payment systems, can be used, including but not limited to reimbursement, trading and/or barter systems. Such alternative value-based systems can include, for example, BITCOIN, tokens, and diverse forms of social-based value and/or economic credit in current used, or to be devised and used among people in the future.

While electronic-ink display systems have been disclosed herein because of their low power consumption and excellent performance in high-brightness outdoor environments, it is understood that any electronic visual display technology employing any display medium, including liquid crystal displays (LCDs), plasma, as well as electronic-ink, display media can be used to practice the information display aspects of the present invention.

While web-based mobile smartphones have been the preferred technology for reading machine-readable codes applied to the facility, site and device/thing levels, in accordance with the principles of the present invention, it is understood that web-enabled body-mounted computing devices, such as Apple® and Samsung® smartwatches can be used to practice the methods of the present invention. Also, it is understood that these code symbol scanning methods can involve using code reading devices that are separate systems from the web-enabled computing systems that support the transactions between the consumer and vendors/service providers who provide the articles that might be then accessed and controlled using the wireless system network of the present invention.

While GPS-tracking has been integrated into the core services of the wireless access and control system network 1 of the present invention disclosed herein, for use in GPS-tracking of articles and things that are rented, leased or even purchased, it is understood that not all transactions supported and services provided by the wireless system network of the present invention (i.e. "the Platform") will require GPS-tracking, while employing mobile communication devices 130 to support transactions and methods of access and control, as taught herein.

Also, in alternative embodiments of the present invention described hereinabove, the system can be realized as a stand-alone application, or integrated as part of larger system networks. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

What is claimed is:

1. An electrically-powered entertainment vehicle system comprising:
    an animal-shaped character head assembly formed about a first bracket assembly and fabricated using plastics, foam and/or other molding materials; and
    a vehicle chassis supporting a set of front wheels connected to a framework by way of steering linkage, and a set of rear wheels operably connected to the framework and driven by an electric motor and a power train;
    a steering handle assembly connected to said steering linkage, and about which a second bracket assembly is mounted for rotation about a virtual axis of rotation passing through the vehicle chassis;
    wherein said first bracket assembly and said second bracket assembly are releasably connected together, so as to allow said animal-shaped character head assembly to rotate about said virtual axis of rotation as said steering assembly is rotated to steer the course of travel of said electrically-powered entertainment vehicle system during system operation; and
    an animal body skin covering said vehicle chassis and forming an animal character body portion generally matching with the characteristics of said animal-shaped character head assembly;
    wherein said animal character body portion further comprises a motor-driven tail portion and a motor-driven chest portion, each adapted for being driven into animation during vehicle operation to emulate animal-like behavior.

2. The electrically-powered entertainment vehicle system of claim 1, which further comprises a GPS-tracked wirelessly-networked electrically-powered entertainment vehicle resembling an animal character and being provided with QR code-driven access control, using the GPS-tracking wireless vehicle access control system network.

3. The electrically-powered entertainment vehicle system of claim 1, which further comprises:
    a snap-fit smartphone and/or tablet holder mounted within driver's field of view (FOV) near said steering handle assembly, for use while operating the vehicle;
    wireless communication interface installed within the steering console and linkable to the guest operator's smartphone or tablet computer, enabling guests to use their smartphone/tablet computer running mobile apps to support GUIs and system operations,
    a transducer for producing animal sounds when triggered from a button on said steering handle assembly.

4. The electrically-powered entertainment vehicle system of claim 1, which further comprises:
    lighting effects integrated into said animal character head assembly and/or animal character body assembly, for expressing animal behaviors that promote enjoyment and a fun ride experience.

5. The electrically-powered entertainment vehicle system of claim 1, which further comprises:
    audio-speakers integrated into said animal head assembly and other body portions for playing music from a mobile smartphone application wirelessly connected.

6. The electrically-powered entertainment vehicle system of claim 1, which further comprises:
    one or more digital video/still camera systems integrated into said animal character head assembly, with a field of view (FOV) oriented in one or more directions, for capturing and photo and/or videos within the FOVs for transmission to a specified email address.

7. The electrically-powered entertainment vehicle system of claim 1, which further comprises:
    an e-ink bumper display, allowing guest to display messages via wireless communication link established with the guest's mobile smartphone device.

8. The electrically-powered entertainment vehicle system of claim 1, which further comprises:
    electronically-controlled ultrasonic vapor, steam and/or smoke generators mounted in said animal character head assembly and/or said animal character body portion, and actuatable by the guest rider and/or passenger and/or other GPS-trackable event so as to initiate and emulate certain animal behaviors when using said electrically-powered entertainment vehicle system.

9. The electrically-powered entertainment vehicle system of claim 1, which further comprises: an electric beverage cooler and/or personal electronically-locked safe module option mounted aboard said vehicle chassis.

10. The electrically-powered entertainment vehicle system of claim 1, which further comprises: a GPS-tracking module aboard the vehicle chassis, and a GPS-electronic fence-based system supporting the marketing of services/goods to the guests driving rented vehicles.

11. The electrically-powered entertainment vehicle system of claim 1, which further comprises: maximum vehicle speed control limits set by a GPS-tracking system network when said vehicle is GPS-tracked and automatically located within particular predefined zones within a facility.

12. The electrically-powered entertainment vehicle system of claim 1, which further comprises:
    GPS-tracking/RFID-enabled wristbands worn by authorized drivers linked to specific vehicle, and detected by a steering wheel proximity detector to automatically enable system operation only when a GPS-tracking/RFID-banded guest is sitting in operator/driver's seat.

13. The electrically-powered entertainment vehicle system of claim 1, which further comprises:
   GPS-tracking/RFID-enabled family wristbands worn by a group of family members, and being GPS-tracked along with the rented vehicle by the GPS-tracking system network so to maintain the family within a locally managed distance about the rented vehicle moving within the facility.

14. The electrically-powered entertainment vehicle system of claim 1, which further comprises:
   a LIDAR-based automated collision avoidance system integrated into said vehicle and/or a Sonar-based automated collection avoidance system integrated into said vehicle, and further adapted for automatically stopping the vehicle's motion when in proximity of an object located within a first specified range from the vehicle's front bumper during forward motion, or when in proximity of an object located within a second specified range from the vehicle's rear bumper during backward motion.

* * * * *